United States Patent
Baillie et al.

(10) Patent No.: US 12,497,414 B2
(45) Date of Patent: Dec. 16, 2025

(54) GROUP III AND LANTHANIDE BIS-PHENYL-PHENOXY METAL-LIGAND COMPLEXES

(71) Applicant: Dow Global Technologies LLC, Midland, MI (US)

(72) Inventors: Rhett A. Baillie, Lake Jackson, TX (US); Philip P. Fontaine, Pearland, TX (US); Jerzy Klosin, Midland, MI (US); Todd D. Senecal, Midland, MI (US); Johnathan E. DeLorbe, Lake Jackson, TX (US); Rafael Huacuja, Rosharon, TX (US); Evelyn Auyeung, Lake Jackson, TX (US); Robert David Grigg, Midland, MI (US); Sudipta Pal, Midland, MI (US); Brad C. Bailey, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 714 days.

(21) Appl. No.: 17/796,560

(22) PCT Filed: Jan. 29, 2021

(86) PCT No.: PCT/US2021/015723
§ 371 (c)(1),
(2) Date: Jul. 29, 2022

(87) PCT Pub. No.: WO2021/155158
PCT Pub. Date: Aug. 5, 2021

(65) Prior Publication Data
US 2023/0133760 A1 May 4, 2023

Related U.S. Application Data

(60) Provisional application No. 62/968,678, filed on Jan. 31, 2020.

(51) Int. Cl.
C07F 5/00 (2006.01)
C08F 2/38 (2006.01)
C08F 4/659 (2006.01)

(52) U.S. Cl.
CPC ............... C07F 5/003 (2013.01); C08F 2/38 (2013.01); C08F 4/65912 (2013.01)

(58) Field of Classification Search
CPC .... C07F 5/00; C07F 5/003; C07F 7/00; C07F 7/081; C08F 2/38; C08F 4/52; C08F 4/65908; C08F 4/65912; C08F 210/16; Y02P 20/52; Y02P 20/582
See application file for complete search history.

(56) References Cited

U.S. PATENT DOCUMENTS

| | | |
|---|---|---|
| 8,623,976 B2 | 1/2014 | Hou et al. |
| 9,029,487 B2 | 5/2015 | Klosin et al. |
| 9,522,855 B2 | 12/2016 | Klosin et al. |
| 2004/0010103 A1 | 1/2004 | Boussie et al. |
| 2005/0080281 A1* | 4/2005 | Boussie ............... C07C 217/80 556/9 |
| 2006/0025548 A1 | 2/2006 | Boussie et al. |
| 2007/0167315 A1 | 7/2007 | Arriola et al. |
| 2014/0088276 A1 | 3/2014 | Hou et al. |
| 2018/0171041 A1 | 6/2018 | Patton et al. |
| 2021/0147592 A1 | 5/2021 | Keaton et al. |

FOREIGN PATENT DOCUMENTS

| | | |
|---|---|---|
| CN | 103180347 A | 6/2013 |
| CN | 105294905 A | 2/2016 |
| CN | 109476783 A | 3/2019 |
| EP | 2609123 B1 | 8/2011 |
| WO | 2007136494 A2 | 11/2007 |
| WO | 2007136495 A2 | 11/2007 |
| WO | 2007136496 A2 | 11/2007 |
| WO | 2007136497 A2 | 11/2007 |
| WO | 2007136506 A2 | 11/2007 |
| WO | 2011146291 A1 | 11/2011 |
| WO | 2012027448 A1 | 3/2012 |

(Continued)

OTHER PUBLICATIONS

Emslie et al. "Synthesis and thermal reactivity of organoscandium and yttrium complexes of sterically less bulky salicylaldiminato ligands", Dalton Trans., 2003, 2615-2620.

(Continued)

*Primary Examiner* — Brian A Mccaig
(74) *Attorney, Agent, or Firm* — Dinsmore & Shohl, LLC

(57) ABSTRACT

Embodiments of this disclosure are directed to catalyst systems comprising a metal-ligand complex according to formula (I).

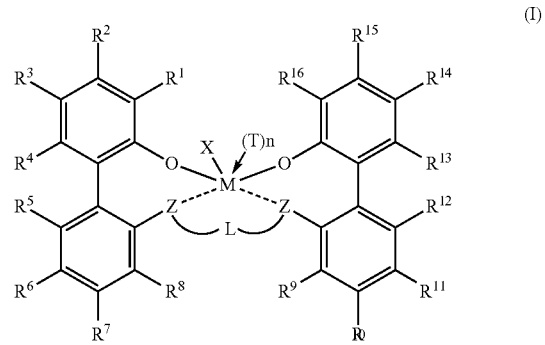

20 Claims, No Drawings

(56) References Cited

FOREIGN PATENT DOCUMENTS

| | | |
|---|---|---|
| WO | 2014105411 A1 | 7/2014 |
| WO | 2014105412 A1 | 7/2014 |
| WO | 2014105413 A1 | 7/2014 |
| WO | 2014105414 A1 | 7/2014 |
| WO | 2014105415 A1 | 7/2014 |
| WO | 2014210333 A1 | 12/2014 |
| WO | 2016003878 A1 | 1/2016 |
| WO | 2016014749 A1 | 1/2016 |
| WO | 2016089935 A1 | 6/2016 |
| WO | 2017004456 A1 | 1/2017 |
| WO | 2017004462 A1 | 1/2017 |
| WO | 2017058858 A1 | 4/2017 |
| WO | 2017058981 A1 | 4/2017 |
| WO | 2018022975 A1 | 2/2018 |
| WO | 2018170138 A1 | 9/2018 |
| WO | 2018170227 A1 | 9/2018 |
| WO | 2018170248 A1 | 9/2018 |
| WO | 2018183056 A1 | 10/2018 |
| WO | 2020047384 A1 | 3/2020 |

OTHER PUBLICATIONS

Hashimoto et al. "Kinetic Stabilizaiton of Carbazole Nitroxides by Inclusion in a Macrocage and Their Electron Spin Resonance Characterization", J. Org. Chem. 2019, 84, 11783-11789.

Jian et al. "Rare-earth metal bis(alkyl)s that bear a 2-pyridinemethanamine ligand: Dual catalysis of the polymerizations of both isoprene and ethylene", Dalton Trans., 2012, 41, 2367.

Pan et al. "Chain-Shuttling Polymerization at Two Different Scandium Sites: Regio- and Stereospecific "One-Pot" Block Copolymerization of Styrene, Isoprene, and Butadiene", Angew. Chem. Int. Ed. 2011, 50, 12012-12015.

Odian "Principles of Polymerization" Wiley-Interscience, A John Wiley & Sons, Inc., Publication, Fourth Edition, 2004, 835 pgs.

Japanese Office Action dated Apr. 2, 2024, pertaining to JP Patent Application No. 2023-061074, 10 pgs.

Soave, "Equilibrium constants from a modified Redlich-Kwong equation of state", Chemical Engineering Science, 1972, vol. 27, pp. 1197-1203, 7 pgs.

Xu et al., "Metal-size influence in isoselective 2-vinylpyridine polymerization", Polyhedron 165 (2019) 68-72, 5 pgs.

Valente, et al., "Isoprene-styrene chain shuttling copolymerization mediated by lanthanide half-sandwich complex and lanthanidocene: a straightforward access to a new type of thermoplastic elastomers", Angew. Chem., Int. Ed., vol. 53, pp. 4638-4641 (2014).

Liu et al., "Stereoselective Polymerization of Styrene with Cationic Scandium Precursors Bearing Quinolyl Aniline Ligands", Organometallics, vol. 29, pp. 1916-1923 (2010).

Döring et al., "Aminopyridinato-Ligand-Stabilized Lanthanoid Complexes: Synthesis, Reactivity, Ethylene and Isoprene Polymerization", Eur. J. Inorg. Chem., pp. 4255-4264 (2009).

International Search Report and Written Opinion dated May 10, 2021, pertaining to International Patent Application No. PCT/US2021/015723, 15 pgs.

International Search Report and Written Opinion dated May 10, 2021, pertaining to International Patent Application No. PCT/US2021/015733, 15 pgs.

Thailand Office Action dated Sep. 4, 2024, pertaining to TH Patent Application No. 2201004698, 7 pgs.

Brazilian Technical Report dated Jul. 4, 2024, pertaining to BR Patent Application No. BR 11 2022 014843.7, 8 pgs.

Japanese Office Action dated Dec. 17, 2024, pertaining to JP Patent Application No. 2022-544636, 8 pgs.

Japanese Office Action dated Aug. 20, 2024, pertaining to JP Patent Application No. 2022-544639, 6 pgs.

Xu et al. "Highly Robust Yttrium Bis(phenolate) Ether Catalysts for Excellent Isoselective Ring-Opening Polymerization of Racemic Lactide," Macromolecules (2017), vol. 50, pp. 515-522.

Brazil Technical Report dated Aug. 7, 2024, pertaining to BR Patent Application No. BR112022015190.0, 8 pgs.

Chinese Office Action and Search Report, dated Aug. 15, 2023, pertaining to Chinese Patent Application No. 202180017151.6, 10 pgs.

Tie-Qi Xu, et al., "Metal-size influence in isoselective 2-vinylpyrindine polymerization," Polyhedron, vol. 165, Mar. 21, 2019.

US Non-Final Office Action dated May 30, 2025, pertaining to U.S. Appl. No. 17/930,274, 8 pgs.

Singapore Office Action dated Jul. 17, 2025, pertaining to SG Patent Application No. 11202251280J, 5 pgs.

US Non-Final Office Action dated May 22, 2025, pertaining to U.S. Appl. No. 17/796,531, 8 pgs.

US Final Rejection dated Oct. 2, 2025, pertaining to U.S. Appl. No. 17/930,274, 6 pgs.

* cited by examiner

GROUP III AND LANTHANIDE BIS-PHENYL-PHENOXY METAL-LIGAND COMPLEXES

CROSS REFERENCE TO RELATED APPLICATIONS

This application is a national stage entry of PCT/US2021/015723 filed on Jan. 29, 2021, which claims priority to U.S. Provisional Patent Application No. 62/968,678 filed on Jan. 30, 2020, the entire disclosures of which are hereby incorporated by reference.

TECHNICAL FIELD

Embodiments of the present disclosure generally relate to olefin polymerization catalyst systems and processes and, more specifically to bis-phenylphenoxy metal-ligand complexes having a Group III or Lanthanide metal center.

BACKGROUND

Olefin-based polymers such as polyethylene, ethylene-based polymers, polypropylene, and propylene-based polymers are produced via various catalyst systems. Selection of such catalyst systems used in the polymerization process of the olefin-based polymers is an important factor contributing to the characteristics and properties of such olefin-based polymers.

Ethylene-based polymers and propylene-based polymers are manufactured for a wide variety of articles. The polyethylene and polypropylene polymerization process can be varied in a number of respects to produce a wide variety of resultant polyethylene resins having different physical properties that render the various resins suitable for use in different applications. The ethylene monomers and, optionally, one or more co-monomers are present in liquid diluents or solvents, such as alkanes or isoalkanes, of which hexane and isobutane are specific examples. Hydrogen may also be added to the reactor. The catalyst systems for producing ethylene-based may typically comprise a chromium-based catalyst system, a Ziegler-Natta catalyst system, and/or a molecular (either metallocene or non-metallocene (molecular)) catalyst system. The reactants in the catalyst system and the diluent are circulated at an elevated polymerization temperature within the reactor, thereby producing ethylene-based homopolymer or copolymer. Either periodically or continuously, part of the reaction mixture is removed from the reactor, including the polyethylene product dissolved in the diluent, and unreacted ethylene and one or more optional co-monomers. The reaction mixture may be processed after removal from the reactor to remove the polyethylene product from the diluent and the unreacted reactants, and the diluent and unreacted reactants are typically recycled back into the reactor. Alternatively, the reaction mixture may be sent to a second reactor, serially connected to the first reactor, where a second polyethylene fraction may be produced. Despite the research efforts in developing catalyst systems suitable for olefin polymerization, such as polyethylene polymerization, there is still a need to increase the efficiencies of catalyst systems that are capable of producing polymer with high molecular weights a narrow molecular weight distribution, and high selectivity towards ethylene.

SUMMARY

There is an ongoing need to create catalyst systems or metal-ligand complexes with a high selectivity toward ethylene during ethylene and α-olefin copolymerization reactions. Additionally, the metal-ligand complex should have high catalyst efficiency, increased efficiencies, and a versatile ability to produce polymers with a high or low molecular weight at high temperature (such as greater than 140° C. or approximately 190° C.).

Embodiments of this disclosure include a catalyst system comprising a metal-ligand complex according to formula (I):

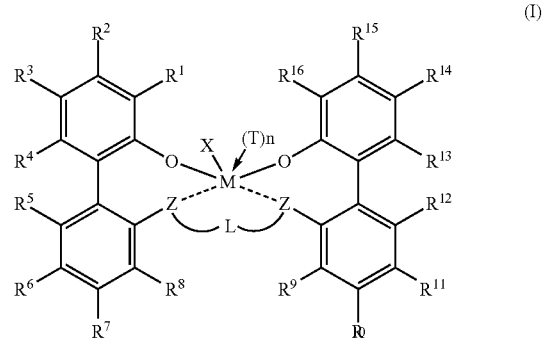

(I)

In formula (I), M is scandium, yttrium, a lanthanide metal or an actinide metal having an oxidation state of +3. Subscript n of (T)~ is 0, 1, or 2, and X is a ligand chosen from $(C_1-C_{40})$hydrocarbyl, $(C_1-C_{40})$heterohydrocarbyl, $-CH_2Si(R^C)_{3-Q}(OR^C)_Q$, $-Si(R^C)_{3-Q}(OR^C)_Q$, $-OSi(R^C)_{3-Q}(OR^C)_Q$, $-CH_2Ge(R^C)_{3-Q}(OR^C)_Q$, $-Ge(R^C)_{3-Q}(OR^C)_Q$, $-P(R^C)_{2-W}(OR^C)_W$, $-P(O)(R^C)_{2-W}(OR^C)_W$, $-N(R^C)_2$, $-NH(R^C)$, $-N(Si(R^C)_3)_2$, $-NR^CSi(R^C)_3$, $-NHSi(R^C)_3$, $-OR^C$, $-SR^C$, $-NO_2$, $-CN$, $-CF_3$, $-OCF_3$, $-S(O)R^C$, $-S(O)_2R^C$, $-OS(O)_2R^C$, $-N=C(R^C)_2$, $-N=CH(R^C)$, $-N=CH_2$, $-N=P(R^C)_3$, $-OC(O)R^C$, $-C(O)OR^C$, $-N(R^C)C(O)R^C$, $-N(R^C)C(O)H$, $-NHC(O)R^C$, $-C(O)N(R^C)_2$, $-C(O)NHR^C$, $-C(O)NH_2$, a halogen, or a hydrogen, wherein each $R^C$ is independently a substituted or unsubstituted $(C_1-C_{30})$hydrocarbyl, or a substituted or unsubstituted $(C_1-C_{30})$heterohydrocarbyl. Subscript Q is 0, 1, 2 or 3 and Subscript W is 0, 1, or 2. T is a Lewis base. When subscript n of (T)~ is 1, X and T are optionally connected. The metal-ligand complex is overall charge-neutral.

In formula (I), $R^1$ and $R^{16}$ are independently selected from the group consisting of $-H$, $(C_1-C_{40})$hydrocarbyl, $(C_1-C_{40})$heterohydrocarbyl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $-N=C(R^C)_2$, $R^CC(O)O-$, $R^COC(O)-$, $R^CC(O)N(R)-$, $(R^C)_2NC(O)-$, halogen, radicals having formula (II), radicals having formula (III), and radicals having formula (IV):

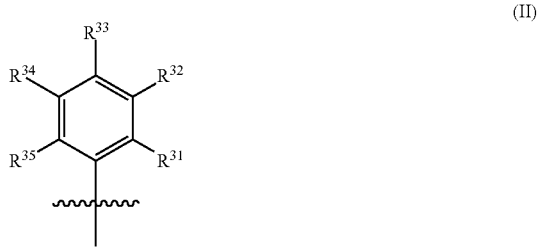

(II)

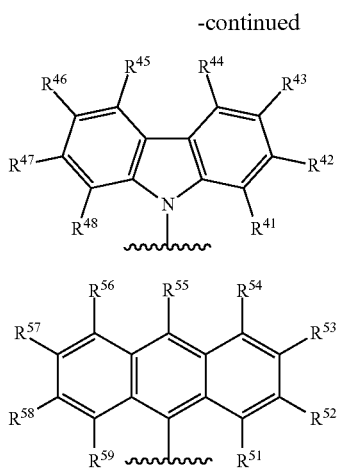

In formulas (II), (III), and (IV), each of $R^{31-35}$, $R^{41-48}$, and $R^{51-59}$ is independently chosen from —H, $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, $R^C$S(O)—, $R^C$S(O)$_2$—, $(R^C)_2$C=N—, $R^C$C(O)O—, $R^C$OC(O)—, $R^C$C(O)N$(R^N)$—, $(R^C)_2$NC(O)—, or halogen.

In formula (I), $R^2$, $R^3$, $R^4$, $R^5$, $R^6$, $R^7$, $R^8$, $R^9$, $R^{10}$, $R^{11}$, $R^{12}$, $R^{13}$, $R^{14}$, and $R^{15}$ is independently selected from —H, $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, $R^C$S(O)—, $R^C$S(O)$_2$—, $(R^C)_2$C=N—, $R^C$C(O)O—, $R^C$OC(O)—, $R^C$C(O)N(R)—, $(R^C)_2$NC(O)—, and halogen.

In formula (I), L is $(C_1-C_{40})$hydrocarbylene or $(C_1-C_{40})$heterohydrocarbylene; and each Z is independently chosen from —O—, —S—, —N$(R^N)$—, or —P$(R^P)$—.

In formulas (I), (II), (III), and (IV), each $R^C$, $R^P$, and $R^N$ is independently a $(C_1-C_{30})$hydrocarbyl, $(C_1-C_{30})$heterohydrocarbyl, or —H.

DETAILED DESCRIPTION

Specific embodiments of catalyst systems will now be described. It should be understood that the catalyst systems of this disclosure may be embodied in different forms and should not be construed as limited to the specific embodiments set forth in this disclosure.

Common abbreviations are listed below:

R, Z, M, X and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf trifluoromethane sulfonate; CV: column volume (used in column chromatography); EtOAc ethyl acetate; TEA: triethylaluminum; MAO: methylaluminoxane; MMAO: modified methylaluminoxane; LiCH$_2$TMS: (trimethylsilyl)methyllithium; TMS: trimethylsilyl; Pd(AmPhos)Cl$_2$: Bis(di-tert-butyl(4-dimethylaminophenyl)phosphine)dichloropalladium(II); Pd(AmPhos): Chloro(crotyl)(di-tert-butyl(4-dimethylaminophenyl)phosphine)palladium(II); Pd(dppf)Cl$_2$: [1,1'-Bis(diphenylphosphino)ferrocene]palladium(II) dichloride; ScCl$_3$: scandium(III) chloride; PhMe: toluene; THF: tetrahydrofuran; CH$_2$Cl$_2$: dichloromethane; DMF: N,N-dimethylformamide; EtOAc: ethyl acetate; Et$_2$O: diethyl ether; MeOH: methanol; NH$_4$Cl: ammonium chloride; MgSO$_4$: magnesium sulfate; Na$_2$SO$_4$: sodium sulfate; NaOH: sodium hydroxide; brine: saturated aqueous sodium chloride; SiO$_2$: silica; CDCl$_3$: chloroform-D; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days; TLC; thin layered chromatography; rpm: revolution per minute; rt: room temperature.

The term "independently selected" is used herein to indicate that the R groups, such as, $R^1$, $R^2$, $R^3$, $R^4$, and $R^5$, can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.) A chemical name associated with an R group is intended to convey the chemical structure that is recognized in the art as corresponding to that of the chemical name. Thus, chemical names are intended to supplement and illustrate, not preclude, the structural definitions known to those of skill in the art.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the "$(C_x-C_y)$" parenthetical may contain more than y carbon atoms depending on the identity of any groups $R^S$. For example, a "$(C_1-C_{50})$alkyl substituted with exactly one group $R^S$, where $R^S$ is phenyl (—C$_6$H$_5$)" may contain from 7 to 56 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "$(C_1-C_{50})$hydrocarbyl" means a hydrocarbon radical of from 1 to 50 carbon atoms and the term "$(C_1-C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1-C_{50})$hydrocarbyl may be an unsubstituted or substituted $(C_1-C_{50})$alkyl, $(C_3-C_{50})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl (—CH$_2$—C$_6$H$_5$)).

The terms "$(C_1-C_{50})$alkyl" and "$(C_1-C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1-C_{50})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{50})$aryl" means an unsubstituted or substituted (by one or more $R^S$) monocyclic, bicyclic, or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; 2-$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl include: substituted $(C_1-C_{20})$aryl; substituted $(C_6-C_{18})$aryl; 2,4-bis($[C_{20}]$alkyl)-phenyl; polyfluorophenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{50})$hydrocarbylene include unsubstituted or substituted $(C_6-C_{50})$arylene, $(C_3-C_{50})$cycloalkylene, and $(C_1-C_{50})$alkylene (e.g., $(C_1-C_{20})$alkylene). The diradicals may be on the same carbon atom (e.g., —CH$_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of $(C_2-C_{20})$alkylene α,ω-diradicals include ethan-1,2-diyl (i.e. —CH$_2$CH$_2$—), propan-1,3-diyl (i.e. —CH$_2$CH$_2$CH$_2$—), 2-methylpropan-1,3-diyl (i.e. —CH$_2$CH(CH$_3$)CH$_2$—). Some examples of $(C_6-C_{50})$arylene α,ω-diradicals include phenyl-1,4-diyl, napthalen-2,6-diyl, or napthalen-3,7-diyl.

The term "$(C_1-C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1-C_{50})$alkylene are unsubstituted $(C_1-C_{20})$alkylene, including unsubstituted —CH$_2$CH$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and —(CH$_2$)$_4$C*(H)(CH$_3$), in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —CF$_2$—, —C(O)—, and —(CH$_2$)$_{14}$C(CH$_3$)$_2$(CH$_2$)$_5$— (i.e., a 6,6-dimethyl substituted normal-1,20-eicosylene). Since as mentioned previously two $R^S$ may be taken together to form a $(C_1-C_{18})$ alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo [2.2.1]heptane, and 2,3-bis (methylene)bicyclo [2.2.2] octane.

The term "$(C_3-C_{50})$cycloalkylene" means a cyclic diradical (i.e., the radicals are on ring atoms) of from 3 to 50 carbon atoms that either is unsubstituted or is substituted by one or more $R^S$.

The term "heteroatom," refers to an atom other than hydrogen or carbon. Examples of groups containing one or more than one heteroatom include O, S, S(O), S(O)$_2$, Si($R^C$)$_2$, P($R^P$), N($R^N$), —N═C($R^C$)$_2$, —Ge($R^C$)$_2$—, —Si ($R^C$)—, boron (B), aluminum (Al), gallium (Ga), or indium (In), where each $R^C$ and each $R^P$ is unsubstituted $(C_1-C_{18})$ hydrocarbyl or —H, and where each $R^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1-C_{50})$heterohydrocarbyl may be unsubstituted or substituted. Non-limiting examples of the $(C_1-C_{50})$heterohydrocarbyl include $(C_1-C_{50})$heteroalkyl, $(C_1-C_{50})$hydrocarbyl-O—, $(C_1-C_{50})$hydrocarbyl-S—, $(C_1-C_{50})$hydrocarbyl-S (O)—, $(C_1-C_{50})$hydrocarbyl-S(O)$_2$—, $(C_1-C_{50})$hydrocarbyl-Si($R^C$)$_2$—, $(C_1-C_{50})$hydrocarbyl-N($R^N$)—, $(C_1-C_{50})$hydrocarbyl-P($R^P$)—, $(C_2-C_{50})$heterocycloalkyl, $(C_2-C_{19})$ heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$ heteroalkylene, $(C_1-C_{50})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_1-C_{50})$heteroaryl" means an unsubstituted or substituted (by one or more $R^S$) mono-, bi-, or tricyclic heteroaromatic hydrocarbon radical of from 1 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_1-C_{12})$heteroaryl) are defined in an analogous manner as having from x to y carbon atoms (such as 1 to 12 carbon atoms) and being unsubstituted or substituted by one or more than one $R^S$. The monocyclic heteroaromatic hydrocarbon radical is a 5-membered ring or a 6-membered ring. The 5-membered ring monocyclic heteroaromatic hydrocarbon radical has 5 minus h carbon atoms, where h is the number of heteroatoms and may be 1, 2, 3, or 4; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring monocyclic heteroaromatic hydrocarbon radical has 6 minus h carbon atoms, where h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The term "$(C_1-C_{50})$heteroalkyl" means a saturated straight or branched chain radical containing one to fifty carbon atoms and one or more heteroatom. The term "$(C_1-C_{50})$heteroalkylene" means a saturated straight or branched chain diradical containing from 1 to 50 carbon atoms and one or more than one heteroatoms. The heteroatoms of the heteroalkyls or the heteroalkylenes may include $Si(R^C)_3$, $Ge(R^C)_3$, $Si(R^C)_2$, $Ge(R^C)_2$, —$P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may be present in substituents $R^S$. The term "unsaturated" means containing one or more carbon-carbon double bonds or carbon-carbon triple bonds, or (in heteroatom-containing groups) one or more carbon-nitrogen double bonds, carbon-phosphorous double bonds, or carbon-silicon double bonds, not including double bonds that may be present in substituents $R^S$, if any, or in aromatic rings or heteroaromatic rings, if any.

The term "lanthanide metal" includes elements 57 through 71 (lanthanum (La) to lutetium (Lu)).

Embodiments of this disclosure include catalyst systems that include a metal-ligand complex according to formula (I):

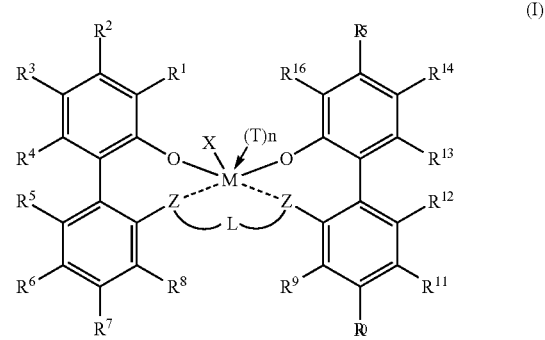

In formula (I), M is scandium, yttrium, a lanthanide metal or an actinide metal having an oxidation state of +3. Subscript n of $(T)_n$ is 0, 1, or 2, and X is a ligand chosen from $(C_1-C_{40})$hydrocarbyl, $(C_1-C_{40})$heterohydrocarbyl, —$CH_2Si(R^C)_{3-Q}(OR^C)_Q$, —$Si(R^C)_{3-Q}(OR^C)_Q$, —$OSi(R^C)_{3-Q}(OR^C)_Q$, —$CH_2Ge(R^C)_{3-Q}(OR^C)_Q$, —$Ge(R^C)_{3-Q}(OR^C)_Q$, —$P(R^C)_{2-W}(OR^C)_W$, —$P(O)(R^C)_{2-W}(OR^C)_W$, —$N(R^C)_2$, —$NH(R^C)$, —$N(Si(R^C)_3)_2$, —$NR^CSi(R^C)_3$, —$NHSi(R^C)_3$, —$OR^C$, —$SR^C$, —$NO_2$, —$CN$, —$CF_3$, —$OCF_3$, —$S(O)R^C$, $S(O)_2R^C$, —$OS(O)_2R^C$, —$N=C(R^C)_2$, —$N=CH(R^C)$, —$N=CH_2$, —$N=P(R^C)_3$, —$OC(O)R^C$, —$C(O)OR^C$, —$N(R^C)C(O)R^C$, —$N(R^C)C(O)H$, —$NHC(O)R^C$, —$C(O)N(R^C)_2$, —$C(O)NHR^C$, —$C(O)NH_2$, a halogen, or a hydrogen. Each $R^C$ is independently a substituted or unsubstituted $(C_1-C_{30})$hydrocarbyl, or a substituted or unsubstituted $(C_1-C_{30})$heterohydrocarbyl. Subscript Q is 0, 1, 2 or 3 and subscript W is 0, 1, or 2. T is a Lewis base. When subscript n of $(T)_n$ is 1, X and T are optionally connected. The metal-ligand complex is overall charge-neutral.

In formula (I), $R^1$ and $R^{16}$ are independently selected from the group consisting of —H, $(C_1-C_{40})$hydrocarbyl, $(C_1-C_{40})$heterohydrocarbyl, —$Si(R^C)_3$, —$Ge(R^C)_3$, —$P(R^P)_2$, —$N(R^N)_2$, —$OR^C$, —$SR^C$, —$NO_2$, —$CN$, —$CF_3$, $R^CS(O)$—, $R^CS(O)_2$—, —$N=C(R^C)_2$, $R^CC(O)O$—, $R^COC(O)$—, $R^CC(O)N(R)$—, $(R^C)_2NC(O)$—, halogen, radicals having formula (II), radicals having formula (III), and radicals having formula (IV):

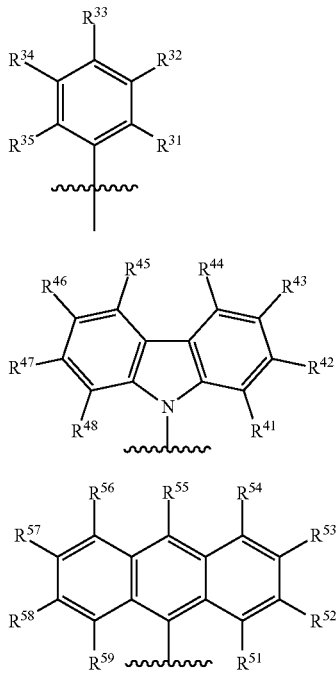

In some embodiments, in the metal-ligand complex of formula (I), either one of $R^1$ or $R^{16}$, or both $R^1$ and $R^{16}$, are chosen from radicals having formula (II), formula (III), or formula (IV). With the proviso that when M is yttrium or a lanthanide metal, $R^1$ is not —H, phenyl or tert-butyl; and $R^{16}$ is not —H, phenyl or tert-butyl.

When present in the metal-ligand complex of formula (I) as part of a radical having formula (II), formula (III), or formula (IV), the groups $R^{31\text{-}35}$, $R^{41\text{-}48}$, and $R^{51\text{-}59}$ of the metal-ligand complex of formula (I) are each independently chosen from $(C_1\text{-}C_{40})$hydrocarbyl, $(C_1\text{-}C_{40})$heterohydrocarbyl, $Si(R^C)_3$, $P(R^P)_2$, $N(R^N)_2$, $OR^C$, $SR^C$, $NO_2$, $CN$, $CF_3$, $R^CS(O)$—, $R^CS(O)_2$—, $(R^C)_2C=N$—, $R^CC(O)O$—, $R^COC(O)$—, $R^CC(O)N(R^N)$—, $(R^N)_2NC(O)$—, halogen, hydrogen (—H), or combinations thereof. Independently each $R^C$, $R^P$, and $R^N$ are unsubstituted $(C_1\text{-}C_{18})$hydrocarbyl, $(C_1\text{-}C_{30})$heterohydrocarbyl, or —H.

The groups $R^1$ and $R^{16}$ in the metal-ligand complex of formula (I) are chosen independently of one another. For example, $R^1$ may be chosen from a radical having formula (II), (III), or (IV) and $R^{16}$ may be a $(C_1\text{-}C_{40})$hydrocarbyl; or $R^1$ may be chosen from a radical having formula (II), (III), or (IV) and $R^{16}$ may be chosen from a radical having formula (II), (III), or (IV) the same as or different from that of $R^1$. Both $R^1$ and $R^{16}$ may be radicals having formula (II), for which the groups $R^{31\text{-}35}$ are the same or different in $R^1$ and $R^{16}$. In other examples, both $R^1$ and $R^{16}$ may be radicals having formula (III), for which the groups $R^{41\text{-}48}$ are the same or different in $R^1$ and $R^{16}$; or both $R^1$ and $R^{16}$ may be radicals having formula (IV), for which the groups $R^{51\text{-}59}$ are the same or different in $R^1$ and $R^{16}$.

In some embodiments, at least one of $R^1$ and $R^{16}$ is a radical having formula (II), where $R^{32}$ and $R^{34}$ are tert-butyl. In one or more embodiments, $R^{32}$ and $R^{34}$ are $(C_1\text{-}C_{12})$hydrocarbyl or $-Si[(C_1\text{-}C_{10})alkyl]_3$.

In some embodiments, when at least one of $R^1$ or $R^{16}$ is a radical having formula (III), one of or both of $R^{43}$ and $R^{46}$ is tert-butyl and $R^{41\text{-}42}$, $R^{44\text{-}45}$, and $R^{47\text{-}48}$ are —H. In other embodiments, one of or both of $R^{42}$ and $R^{47}$ is tert-butyl and $R^{41}$, $R^{43\text{-}46}$, and $R^{48}$ are —H. In some embodiments, both $R^{42}$ and $R^{47}$ are —H. In various embodiments, $R^{42}$ and $R^{47}$ are $(C_1\text{-}C_{20})$hydrocarbyl or $-Si[(C_1\text{-}C_{10})alkyl]_3$. In other embodiments, $R^{43}$ and $R^{46}$ are $(C_1\text{-}C_{20})$hydrocarbyl or $-Si(C_1\text{-}C_{10})alkyl]_3$. In some embodiments, $R^{42}$ and $R^{43}$ are linked to form a cyclic structure, and $R^{46}$ and $R^{47}$ are linked to form a cyclic structure.

In embodiments, when at least one of $R^1$ or $R^{16}$ is a radical having formula (IV), each $R^{52}$, $R^{53}$, $R^{55}$, $R^{57}$, and $R^{58}$ are —H, $(C_1\text{-}C_{20})$hydrocarbyl, $-Si[(C_1\text{-}C_{20})hydrocarbyl]_3$, or $-Ge[(C_1\text{-}C_{20})hydrocarbyl]_3$. In some embodiments, at least one of $R^{52}$, $R^{53}$, $R^{55}$, $R^{57}$, and $R^{58}$ is $(C_3\text{-}C_{10})$alkyl, $-Si[(C_3\text{-}C_{10})alkyl]_3$, or $-Ge[(C_3\text{-}C_{10})alkyl]_3$. In one or more embodiments, at least two of $R^{52}$, $R^{53}$, $R^{55}$, $R^{57}$, and $R^{58}$ is a $(C_3\text{-}C_{10})$alkyl, $-Si[(C_3\text{-}C_{10})alkyl]_3$, or $-Ge[(C_3\text{-}C_{10})alkyl]_3$. In various embodiments, at least three of $R^{52}$, $R^{53}$, $R^{55}$, $R^{57}$, and $R^{58}$ is a $(C_3\text{-}C_{10})$alkyl, $-Si[(C_3\text{-}C_{10})alkyl]_3$, or $-Ge[(C_3\text{-}C_{10})alkyl]_3$.

In some embodiments, when at least one of $R^1$ or $R^{16}$ is a radical having formula (IV), at least two of $R^{52}$, $R^{53}$, $R^{55}$, $R^{57}$, and $R^{58}$ are $(C_1\text{-}C_{20})$hydrocarbyl or $-C(H)_2Si[(C_1\text{-}C_{20})hydrocarbyl]_3$.

Examples of $(C_3\text{-}C_{10})$alkyl include, but are not limited to: propyl, 2-propyl (also called iso-propyl), 1,1-dimethylethyl (also called tert-butyl), cyclopentyl, cyclohexyl, 1-butyl, pentyl, 3-methylbutyl, hexyl, 4-methylpentyl, heptyl, n-octyl, tert-octyl (also called 2,4,4-trimethylpentan-2-yl), nonyl, and decyl.

In some embodiment of the metal-ligand catalyst according to formula (I), $R^1$ and $R^{16}$ are chosen from 3,5-di-tert-butylphenyl; 2,4,6-trimethylphenyl; 2,4,6-triisopropylphenyl; 3,5-diisopropylphenyl; carbazolyl; carbazol-9-yl, 1,2,3,4-tetrahydrocarbazolyl; 1,2,3,4,5,6,7,8-octahydrocarbazolyl; 3,6-bis-(3,5-di-tert-butylphenyl)carbazol-9-yl; 3,6-bis-(2,4,6-trimethylphenyl)carbazol-9-yl); 3,6-bis-(2,4,6-triisopropylphenyl)carbazol-9-yl; 2,7-di(tertiarybutyl)-carbazol-9-yl; 2,7-di(tertiary-octyl)-carbazol-9-yl; 2,7-diphenylcarbazol-9-yl; 2,7-bis(2,4,6-trimethylphenyl)-carbazol-9-yl anthracenyl; 1,2,3,4-tetrahydroanthracenyl; 1,2,3,4,5,6,7,8-octahydroanthracenyl; phenanthrenyl; 1,2,3,4,5,6,7,8-octahydrophenanthrenyl; 1,2,3,4-tetrahydronaphthyl; 2,6-dimethylphenyl; 2,6-diisopropylphenyl; 3,5-diphenylphenyl; 1-naphthyl; 2-methyl-1-naphthyl; 2-naphthyl; 1,2,3,4-tetra-hydronaphth-5-yl; 1,2,3,4-tetrahydronaphth-6-yl; anthracen-9-yl; 1,2,3,4-tetrahydroanthracen-9-yl; 1,2,3,4,5,6,7,8-octahydroanthracen-9-yl; 1,2,3,4,5,6,7,8-octahydrophenanthren-9-yl; indolyl; indolinyl; quinolinyl; 1,2,3,4-tetrahydroquinolinyl; isoquinolinyl; or 1,2,3,4-tetrahydroisoquinolinyl.

In formula (I), $R^2$, $R^3$, $R^4$, $R^5$, $R^6$, $R^7$, $R^8$, $R^9$, $R^{10}$, $R^{11}$, $R^{12}$, $R^{13}$, $R^{14}$, and $R^{15}$ is independently selected from —H, $(C_1\text{-}C_{40})$hydrocarbyl, $(C_1\text{-}C_{40})$heterohydrocarbyl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)$—, $R^CS(O)_2$—, $(R^C)_2C=N$—, $R^CC(O)O$—, $R^COC(O)$—, $R^CC(O)N(R)$—, $(R^C)_2NC(O)$—, and halogen.

In one or more embodiments, $R^2$, $R^4$, $R^5$, $R^{12}$, $R^{13}$, and $R^{15}$ are hydrogen; and each Z is oxygen.

In embodiments, the dotted lines are optionally dative bonds between the metal center, M, and the group Z. In some embodiments, one of the dotted lines connecting Z and M is dative and the other dotted line does not form a dative bond between Z and M. In various embodiments, both dotted lines form dative bonds between groups Z and M.

In various embodiments, $R^3$ and $R^{14}$ are $(C_1-C_{24})$alkyl. In one or more embodiments, $R^3$ and $R^{14}$ are $(C_4-C_{24})$alkyl. In some embodiments, $R^3$ and $R^{14}$ are 1-propyl, 2-propyl (also called iso-propyl), 1,1-dimethylethyl (also called tert-butyl), cyclopentyl, cyclohexyl, 1-butyl, pentyl, 3-methyl-1-butyl, hexyl, 4-methyl-1-pentyl, heptyl, n-octyl, tert-octyl (also called 2,4,4-trimethylpentan-2-yl), nonyl, and decyl. In embodiments, $R^3$ and $R^{14}$ are $-OR^C$, wherein $R^C$ is $(C_1-C_{20})$hydrocarbon, and in some embodiments, $R^C$ is methyl, ethyl, 1-propyl, 2-propyl (also called iso-propyl), or 1,1-dimethylethyl.

In one or more embodiments, one of $R^8$ and $R^9$ is not $-H$. In various embodiments, at least one of $R^8$ and $R^9$ is $(C_1-C_{24})$alkyl. In some embodiments, both $R^8$ and $R^9$ are $(C_1-C_{24})$alkyl. In some embodiments, $R^8$ and $R^9$ are methyl. In other embodiments, $R^8$ and $R^9$ are halogen.

In some embodiments, $R^3$ and $R^{14}$ are methyl; In one or more embodiments, $R^3$ and $R^{14}$ are $(C_4-C_{24})$alkyl. In some embodiments, $R^8$ and $R^9$ are 1-propyl, 2-propyl (also called iso-propyl), 1,1-dimethylethyl (also called tert-butyl), cyclopentyl, cyclohexyl, 1-butyl, pentyl, 3-methyl-1-butyl, hexyl, 4-methyl-1-pentyl, heptyl, n-octyl, tert-octyl (also called 2,4,4-trimethylpentan-2-yl), nonyl, and decyl.

In various embodiments, in the metal-ligand complex of formula (I), $R^6$ and $R^{11}$ are halogen. In some embodiments, $R^6$ and $R^{11}$ are $(C_1-C_{24})$alkyl. In various embodiments, $R^6$ and $R^{11}$ independently are chosen from methyl, ethyl, 1-propyl, 2-propyl (also called iso-propyl), 1,1-dimethylethyl (also called tert-butyl), cyclopentyl, cyclohexyl, 1-butyl, pentyl, 3-methylbutyl, hexyl, 4-methylpentyl, heptyl, n-octyl, tert-octyl (also called 2,4,4-trimethylpentan-2-yl), nonyl, and decyl. In some embodiments, $R^6$ and $R^{11}$ are tert-butyl. In embodiments, $R^6$ and $R^{11}$ are $-OR^C$, wherein $R^C$ is $(C_1-C_{20})$hydrocarbyl, and in some embodiments, $R^C$ is methyl, ethyl, 1-propyl, 2-propyl (also called iso-propyl), or 1,1-dimethylethyl. In other embodiments, $R^6$ and $R^{11}$ are $-SiR^C_3$, wherein each $R^C$ is independently $(C_1-C_{20})$hydrocarbyl, and in some embodiments, $R^C$ is methyl, ethyl, 1-propyl, 2-propyl (also called iso-propyl), or 1,1-dimethylethyl.

In some embodiments, any or all of the chemical groups (e.g., X and $R^{1-59}$) of the metal-ligand complex of formula (I) may be unsubstituted. In other embodiments, none, any, or all of the chemical groups X and $R^{1-59}$ of the metal-ligand complex of formula (I) may be substituted with one or more than one $R^S$. When two or more than two $R^S$ are bonded to a same chemical group of the metal-ligand complex of formula (I), the individual $R^S$ of the chemical group may be bonded to the same carbon atom or heteroatom or to different carbon atoms or heteroatoms. In some embodiments, none, any, or all of the chemical groups X and $R^{1-59}$ may be persubstituted with $R^S$. In the chemical groups that are persubstituted with $R^S$, the individual $R^S$ may all be the same or may be independently chosen. In one or more embodiments, $R^S$ is chosen from $(C_1-C_{20})$hydrocarbyl, $(C_1-C_{20})$alkyl, $(C_1-C_{20})$heterohydrocarbyl, or $(C_1-C_{20})$heteroalkyl.

In formula (I), L is $(C_1-C_{40})$hydrocarbylene or $(C_1-C_{40})$heterohydrocarbylene; and each Z is independently chosen from $-O-$, $-S-$, $-N(R^N)-$, or $-P(R^P)-$. In one or more embodiments, L includes from 1 to 10 atoms.

In formulas (I), (II), (III), and (IV), each $R^C$, $R^P$, and $R^N$ is independently a $(C_1-C_{30})$hydrocarbyl, $(C_1-C_{30})$heterohydrocarbyl, or $-H$.

In some embodiments of formula (I), the L may be chosen from $(C_3-C_7)$alkyl 1,3-diradicals, such as $-CH_2CH_2CH_2-$, $-CH(CH_3)CH_2C^*H(CH_3)$, $-CH(CH_3)CH(CH_3)C^*H(CH_3)$, $-CH_2C(CH_3)_2CH_2-$, cyclopentan-1,3-diyl, or cyclohexan-1,3-diyl, for example. In some embodiments, the L may be chosen from $(C_4-C_{10})$alkyl 1,4-diradicals, such as $-CH_2CH_2CH_2CH_2-$, $-CH_2C(CH_3)_2C(CH_3)_2CH_2-$, cyclohexane-1,2-diyldimethyl, and bicyclo[2.2.2]octane-2,3-diyldimethyl, for example. In some embodiments, L may be chosen from $(C_5-C_{12})$alkyl 1,5-diradicals, such as $-CH_2CH_2CH_2CH_2CH_2-$, and 1,3-bis(methylene)cyclohexane. In some embodiments, L may be chosen from $(C_6-C_{14})$alkyl 1,6-diradicals, such as $-CH_2CH_2CH_2CH_2CH_2CH_2-$ or 1,2-bis(ethylene)cyclohexane, for example.

In one or more embodiments, L is $(C_2-C_{40})$heterohydrocarbylene, and at least one of the from 2 to 10 atoms includes a heteroatom. In some embodiments, L is $-CH_2Ge(R^C)_2CH_2-$, where each $R^C$ is $(C_1-C_{30})$hydrocarbyl. In some embodiments, L is $-CH_2Ge(CH_3)_2CH_2-$, $-CH_2Ge(ethyl)_2CH_2-$, $-CH_2Ge(2-propyl)_2CH_2-$, $-CH_2Ge(t-butyl)_2CH_2-$, $-CH_2Ge(cyclopentyl)_2CH_2-$, or $-CH_2Ge(cyclohexyl)_2CH_2-$.

In one or more embodiments, L is chosen from $-CH_2-$; $-CH_2CH_2-$; $-CH_2(CH_2)_mCH_2-$, where m is from 1 to 3; $-CH_2Si(R^C)_2CH_2-$; $-CH_2Ge(R^C)_2CH_2-$; $-CH(CH_3)CH_2C^*H(CH_3)$; and $-CH_2(phen-1,2-di-yl)CH_2-$; where each $R^C$ in L is $(C_1-C_{20})$hydrocarbyl.

Examples of such $(C_1-C_{12})$alkyl include, but are not limited to methyl, ethyl, 1-propyl, 2-propyl (also called iso-propyl), 1,1-dimethylethyl, cyclopentyl, or cyclohexyl, butyl, tert-butyl, pentyl, hexyl, heptyl, n-octyl, tert-octyl (also called 2,4,4-trimethylpent-2-yl), nonyl, decyl, undecyl, and dodecyl.

In some embodiments, in the metal-ligand complex according to formula (I), both $R^8$ and $R^9$ are methyl. In other embodiments, one of $R^8$ and $R^9$ is methyl and the other of $R^8$ and $R^9$ is $-H$.

In the metal-ligand complex according to formula (I), X bonds with M through a covalent bond or an ionic bond. In some embodiments, X may be a monoanionic ligand having a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, carbonate, phosphate, sulfate, $HC(O)O-$, $HC(O)N(H)-$, $(C_1-C_{40})$hydrocarbylC(O)O$^-$, $(C_1-C_{40})$hydrocarbylC(O)N$((C_1-C_{20})$hydrocarbyl$)^-$, $(C_1-C_{40})$hydrocarbylC(O)N(H)$^-$, $R^KR^LB^-$, $R^KR^LN^-$, $R^KO^-$, $R^KS^-$, $R^KR^LP^-$, or $R^MR^KR^LSi^-$, where each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{20})$heterohydrocarbylene and $R^M$ is as defined above.

In some embodiments, X is a halogen, unsubstituted $(C_1-C_{20})$hydrocarbyl, unsubstituted $(C_1-C_{20})$hydrocarbylC(O)O$-$, or $R^KR^LN-$, wherein each of $R^K$ and $R^L$ independently is an unsubstituted$(C_1-C_{20})$hydrocarbyl. In some embodiments, each monodentate ligand X is a chlorine atom, $(C_1-C_{10})$hydrocarbyl (e.g., $(C_1-C_6)$alkyl or benzyl), unsubstituted $(C_1-C_{10})$hydrocarbylC(O)O$-$, or $R^KR^LN-$, wherein each of $R^K$ and $R^L$ independently is an unsubstituted $(C_1-C_{10})$hydrocarbyl.

In some embodiments, n is 1, and X and T are linked and selected from the group consisting of:

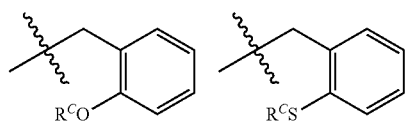

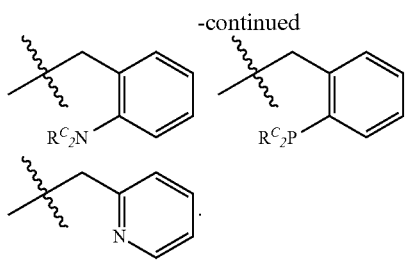

In further embodiments, X is selected from methyl; ethyl; 1-propyl; 2-propyl; 1-butyl; 2,2-dimethylpropyl; trimethylsilylmethyl; phenyl; benzyl; or chloro. X is methyl; ethyl; 1-propyl; 2-propyl; 1-butyl; 2,2-dimethylpropyl; trimethylsilylmethyl; phenyl; benzyl; and chloro. In one embodiment, n is 2 and at least two X independently are monoanionic monodentate ligands. In a specific embodiment, n is 2 and the two X groups join to form a bidentate ligand. In further embodiments, the bidentate ligand is 2,2-dimethyl-2-silapropane-1,3-diyl or 1,3-butadiene.

In one or more embodiments, each X is independently —(CH$_2$)SiR$^X_3$, in which each R$^X$ is independently a (C$_1$-C$_{30}$)alkyl or a (C$_1$-C$_{30}$)heteroalkyl and at least one R$^X$ is (C$_1$-C$_{30}$)alkyl. In some embodiments, when one of R$^X$ is a (C$_1$-C$_{30}$)heteroalkyl, the heteroatom is silica or oxygen atom. In some embodiments, R$^X$ is methyl, ethyl, propyl, 2-propyl, butyl, 1,1-dimethylethyl (or tert-butyl), pentyl, hexyl, heptyl, n-octyl, tert-octyl, or nonyl.

In one or more embodiments X is —(CH$_2$)Si(CH$_3$)$_3$, —(CH$_2$)Si(CH$_3$)$_2$(CH$_2$CH$_3$); —(CH$_2$)Si(CH$_3$)(CH$_2$CH$_3$)$_2$, —(CH$_2$)Si(CH$_2$CH$_3$)$_3$, —(CH$_2$)Si(CH$_3$)$_2$(n-butyl), —(CH$_2$)Si(CH$_3$)$_2$(n-hexyl), —(CH$_2$)Si(CH$_3$)(n-Oct)R$^X$, —(CH$_2$)Si(n-Oct)R$^X_2$, —(CH$_2$)Si(CH$_3$)$_2$(2-ethylhexyl), —(CH$_2$)Si(CH$_3$)$_2$(dodecyl), —CH$_2$Si(CH$_3$)$_2$CH$_2$Si(CH$_3$)$_3$ (herein referred to as —CH$_2$Si(CH$_3$)$_2$CH$_2$TMS). Optionally, in some embodiments, the metal-ligand complex according to formula (I), exactly two R$^X$ are covalently linked or exactly three R$^X$ are covalently linked.

In some embodiments, X is —CH$_2$Si(R$^C$)$_{3-Q}$(OR$^C$)$_Q$, —Si(R$^C$)$_{3-Q}$(OR$^C$)$_Q$, —OSi(R$^C$)$_{3-Q}$(OR$^C$)$_Q$, in which subscript Q is 0, 1, 2 or 3 and each R$^C$ is independently a substituted or unsubstituted (C$_1$-C$_{30}$)hydrocarbyl, or a substituted or unsubstituted (C$_1$-C$_{30}$)heterohydrocarbyl.

In some embodiments, X is B(R$^Y$)$_4$, Al(R$^Y$)$_4$, or Ga(R$^Y$)$_4$, wherein each R$^Y$ is —H, (C$_1$-C$_{30}$)hydrocarbyl, or halogen atom In the metal-ligand complex according to formula (I), each T bonds with M through a a dative bond or an ionic bond. In one or more embodiments, T is a Lewis base. The Lewis base may be a compound or an ionic species, which can donate an electron pair to an acceptor compound. For purposes of this description, the acceptor compound is M, the metal of the metal-ligand complex of formula (I). The Lewis base may be neutral or anionic. In some embodiments, the Lewis base may be a heterohydrocarbon or a hydrocarbon. Examples of neutral heterohydrocarbon lewis bases includes, but are not limited to, amines, trialkylamines, ethers, cycloethers, or sulfides. An example of anionic hydrocarbon includes, but is not limited to, cyclopentadiene. An example of a neutral hydrocarbon includes, but is not limited to, 1,3-buta-di-ene.

In one or more embodiments, the Lewis base may be a monodentate ligand that may a neutral ligand. In some embodiments, the neutral ligand may contain a heteroatom. In specific embodiments, the neutral ligand is a neutral group such as R$^T$NR$^K$R$^L$, R$^K$OR$^L$, R$^K$SR$^L$, or R$^T$PR$^K$R$^L$, where each R$^T$ independently is hydrogen, [(C$_1$-C$_{10}$)hydrocarbyl]$_3$Si(C$_1$-C$_{10}$)hydrocarbyl, (C$_1$-C$_{40}$)hydrocarbyl, [(C$_1$-C$_{10}$)hydrocarbyl]$_3$Si, or (C$_1$-C$_{40}$)heterohydrocarbyl and each R$^K$ and R$^L$ independently is as previously defined.

In some embodiments, the Lewis base is (C$_1$-C$_{20}$)hydrocarbon. In some embodiments, the Lewis base is cyclopentadiene or 1,3-buta-di-ene.

In various embodiments, the Lewis base is (C$_1$-C$_{20}$) heterohydrocarbon, wherein the hetero atom of the heterohydrocarbon is oxygen. In some embodiments, T is tetrahydrofuran, diethyl ether, or methyl tert-butyl ether (MTBE).

In the metal-ligand complex of formula (I), each Z independently is O, S, N(C$_1$-C$_{40}$)hydrocarbyl, or P(C$_1$-C$_{40}$) hydrocarbyl. In some embodiments, each Z is different. For example, one Z is O and the other Z is NCH$_3$. In some embodiments, one Z is O and one Z is S. In another embodiment, one Z is S and one Z is N(C$_1$-C$_{40}$)hydrocarbyl, (for example, NCH$_3$). In a further embodiment, each Z is the same. In yet another embodiment, each Z is O. In another embodiment, each Z is S.

In formula (I), each Z is connect to M via a dotted line. The dotted line defines an optional dative bond. In some embodiments, one of the dotted lines forms a dative bond between Z and M and the second dotted line does not directly connected or bonded Z to M. In various embodiments, each Z forms a dative bond with M. In other embodiments, each Z is not directly connect or bonded to M. Without intent to be bond by theory, it is believed that number of Z-M dative bonds depends on the atomic radius of the metal as defined by M.

In specific embodiments of catalyst systems, the metal-ligand complex according to formula (I) may include, without limitation, a complex having the structure of any of Inventive Metal-Ligand Complexes 1-38:

Complex 1
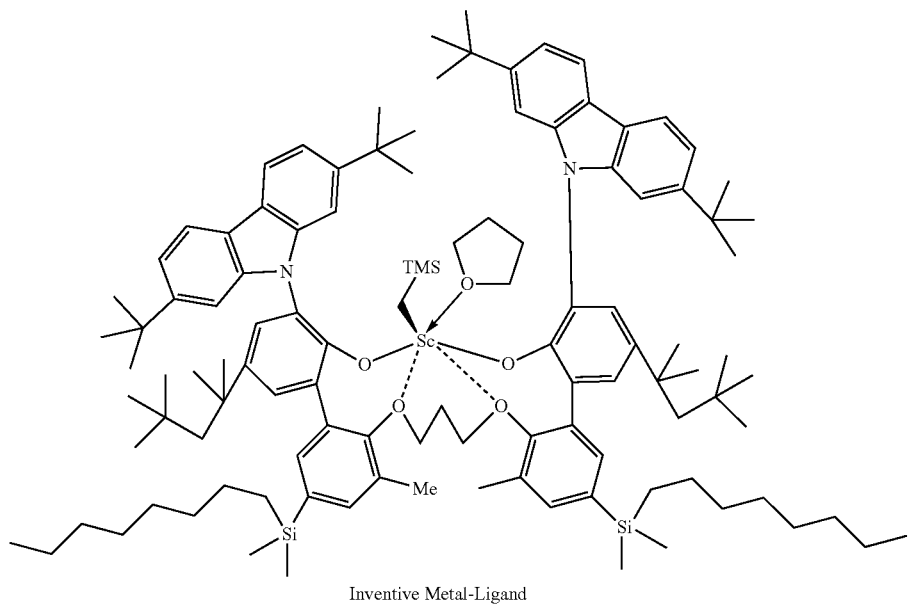
Inventive Metal-Ligand
Complex 2
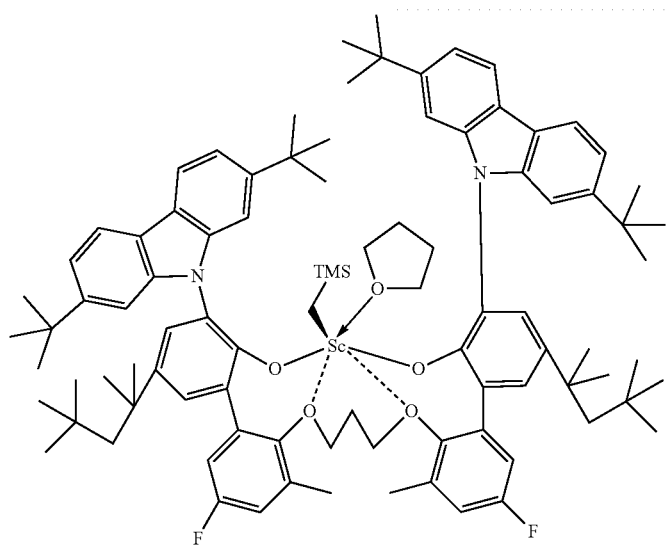
Inventive Metal-Ligand -continued
Complex 3
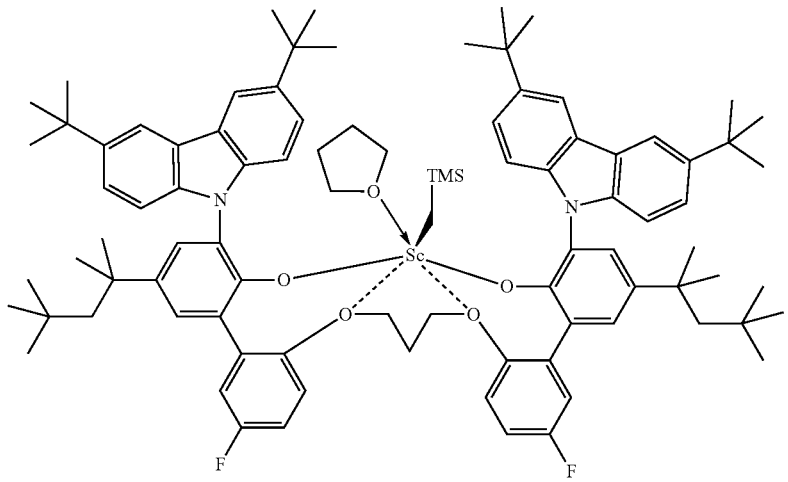
Inventive Metal-Ligand
Complex 4
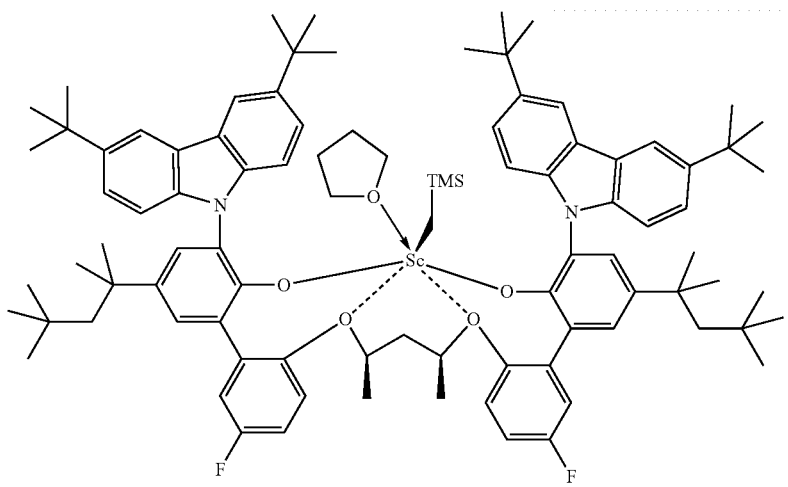
Inventive Metal-Ligand
Complex 5
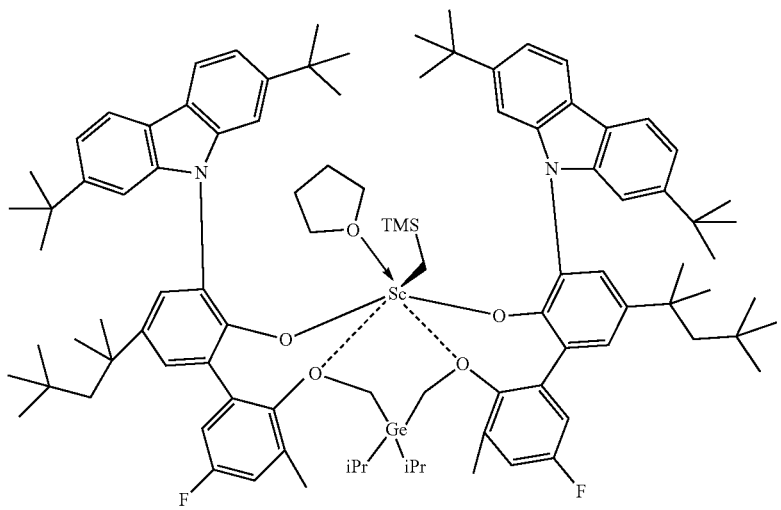
Inventive Metal-Ligand -continued
Complex 6
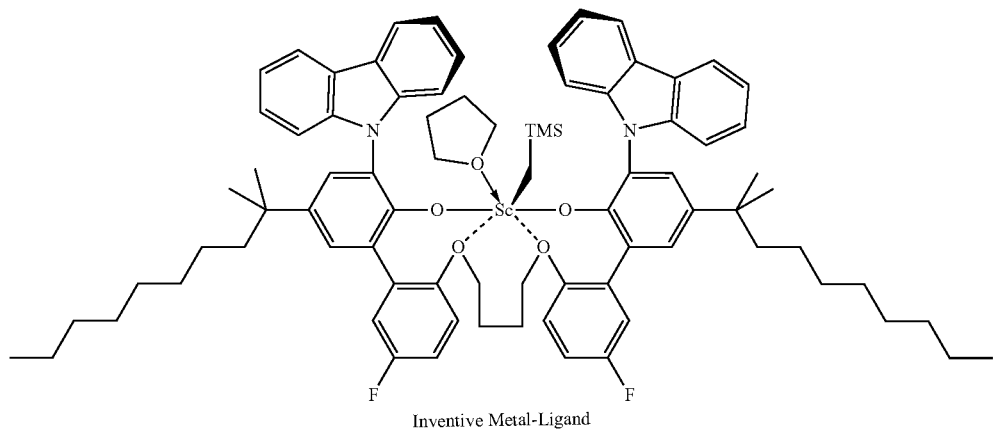
Inventive Metal-Ligand
Complex 7
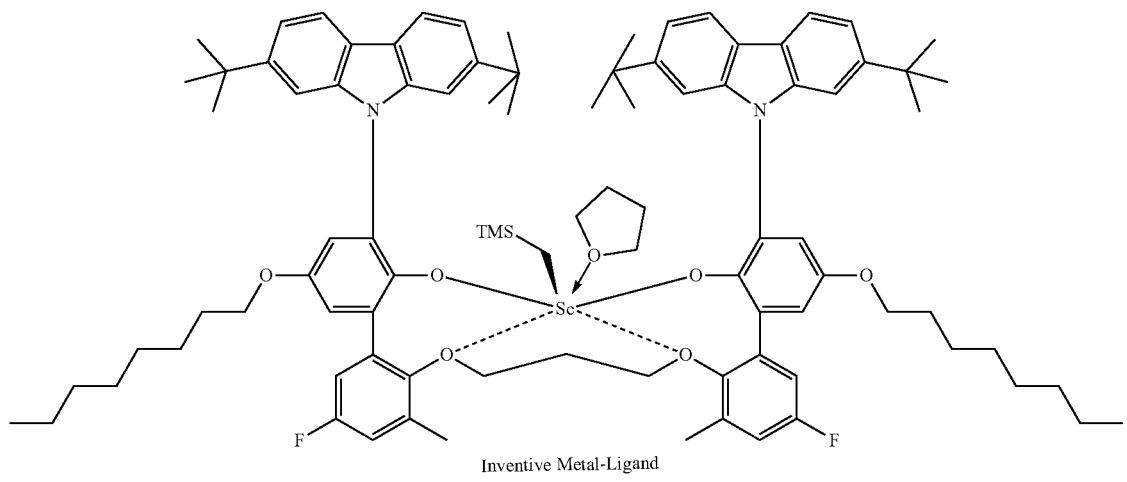
Inventive Metal-Ligand
Complex 8
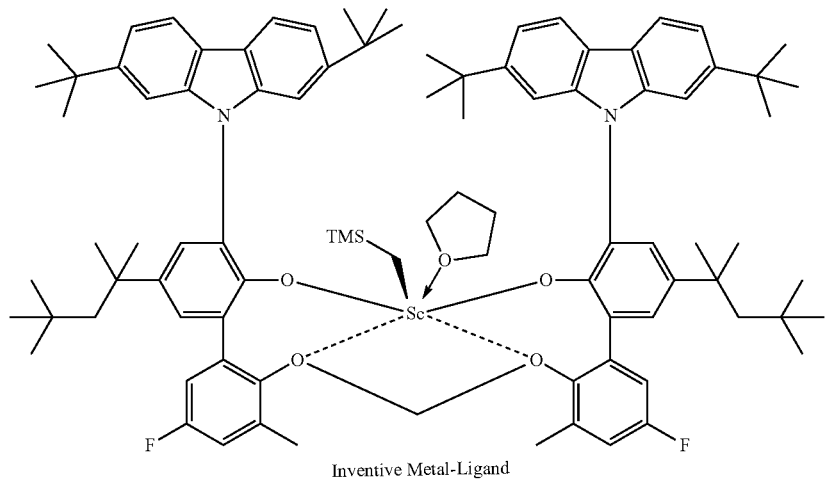
Inventive Metal-Ligand Complex 9
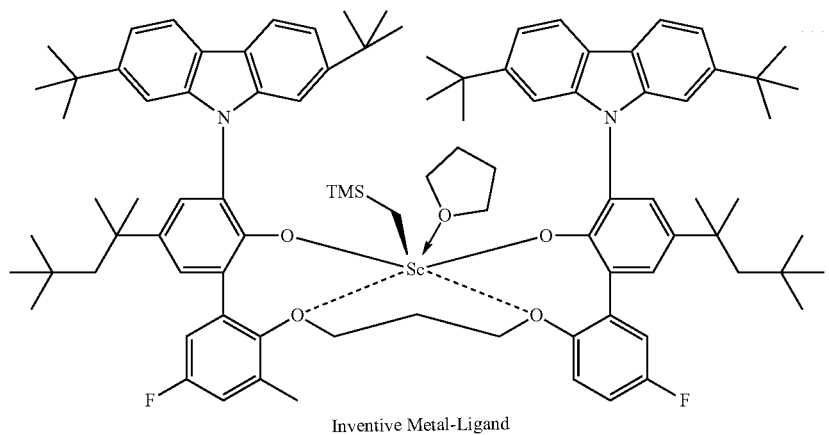
Inventive Metal-Ligand
Complex 10
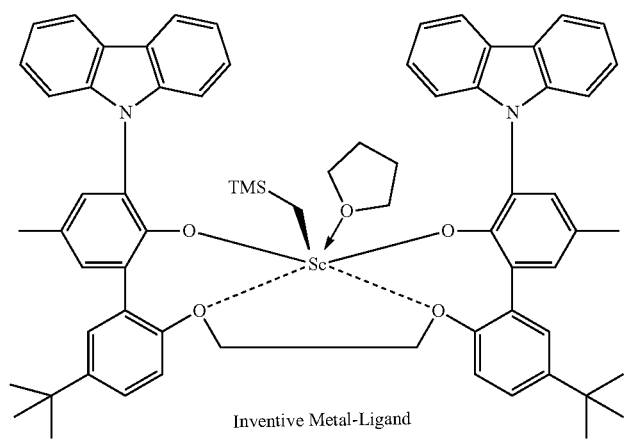
Inventive Metal-Ligand
Complex 11
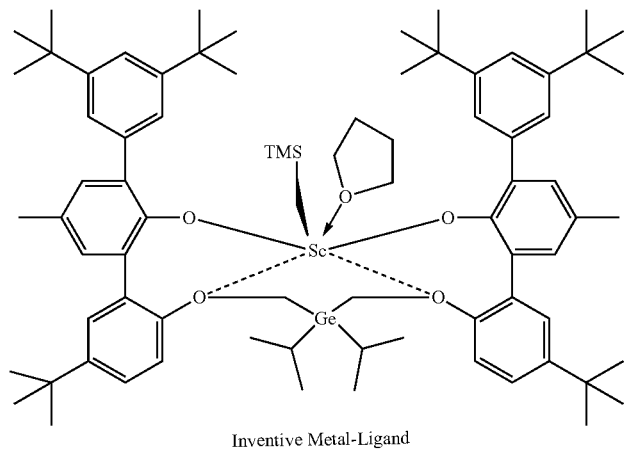
Inventive Metal-Ligand -continued
Complex 12
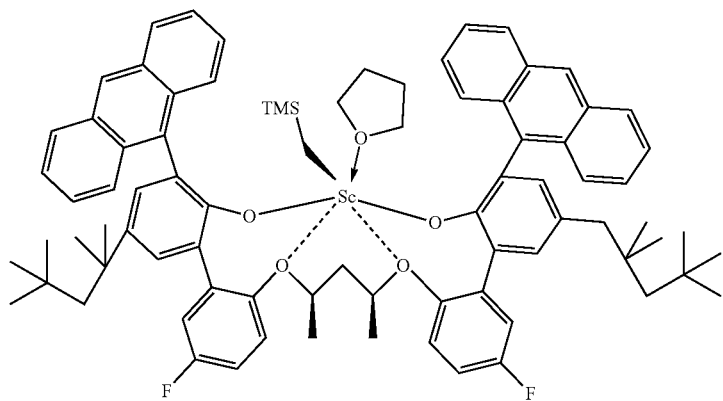
Inventive Metal-Ligand
Complex 13
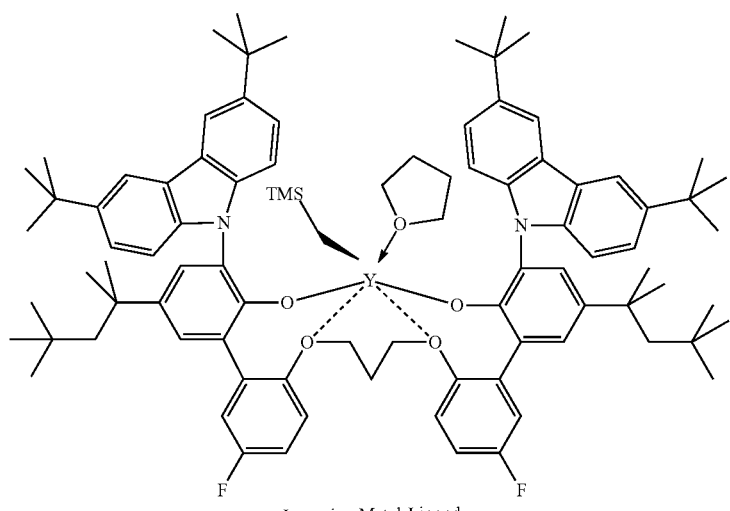
Inventive Metal-Ligand
Complex 14
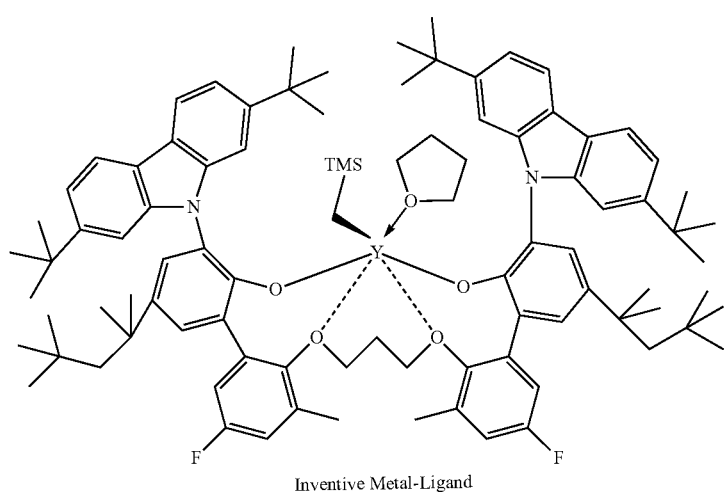
Inventive Metal-Ligand Complex 15
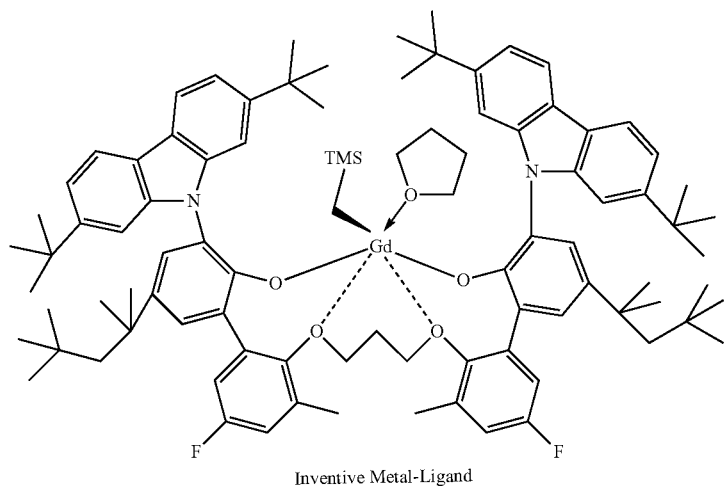
Inventive Metal-Ligand
Complex 16
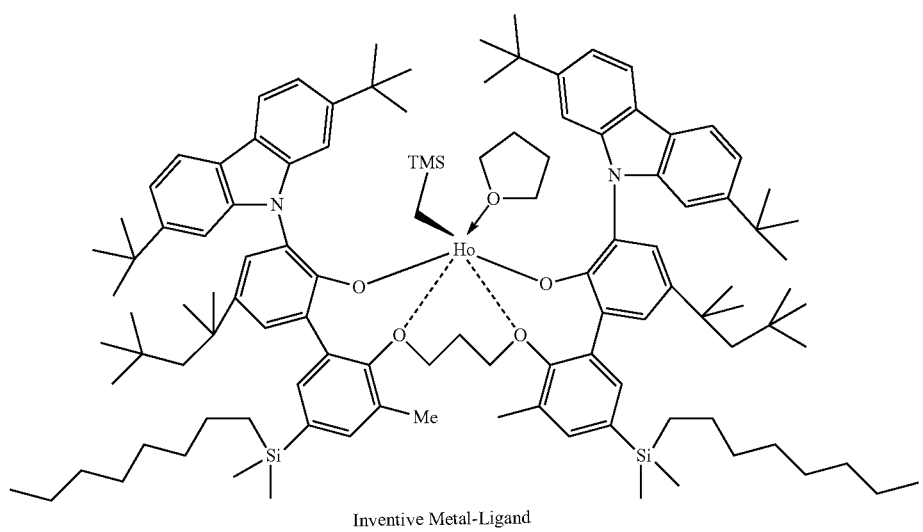
Inventive Metal-Ligand
Complex 17
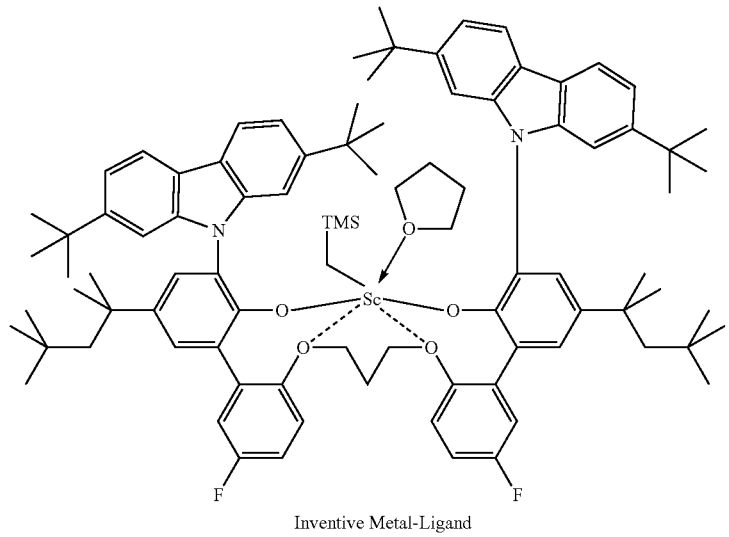
Inventive Metal-Ligand -continued
Complex 18
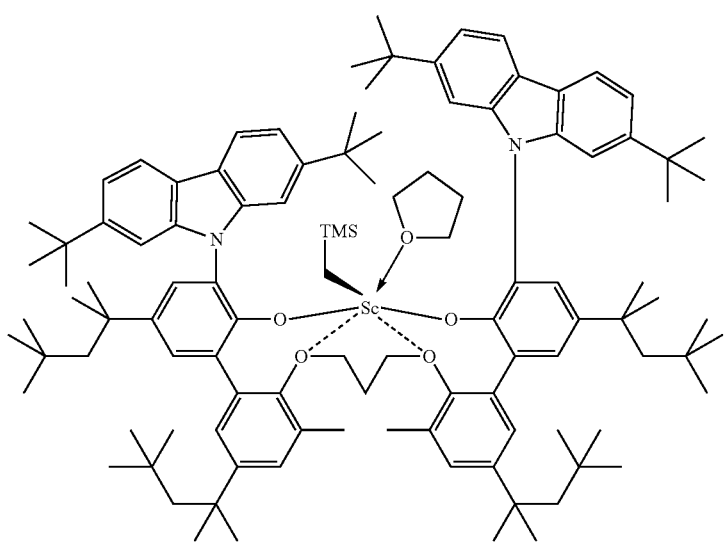
Inventive Metal-Ligand
Complex 19
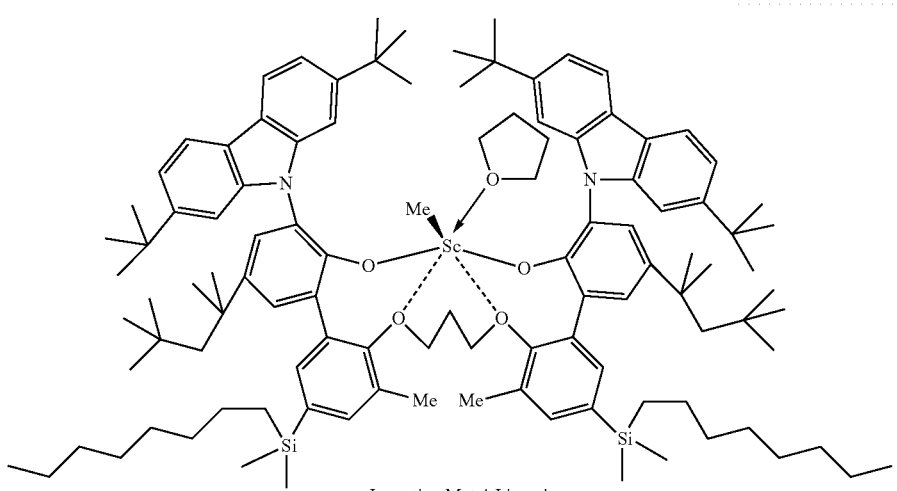
Inventive Metal-Ligand
Complex 20
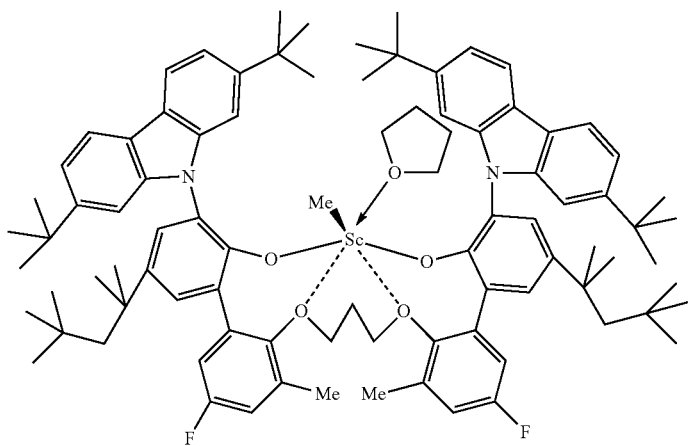
Inventive Metal-Ligand -continued
Complex 21
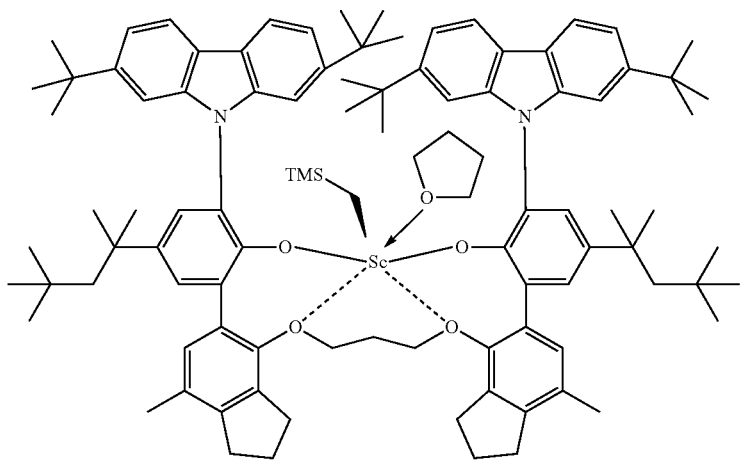
Inventive Metal-Ligand
Complex 22
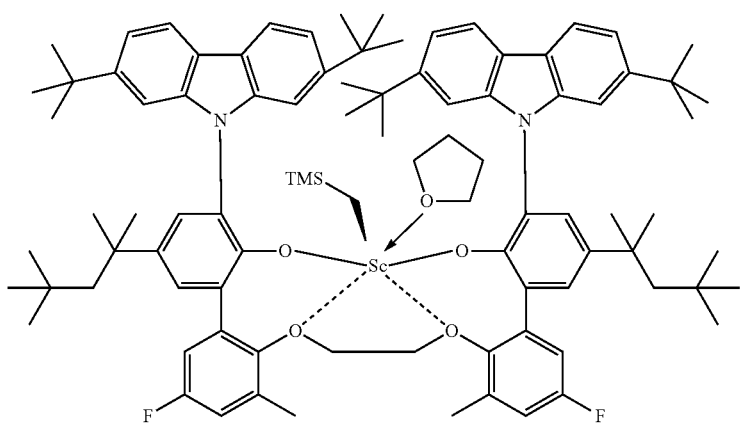
Inventive Metal-Ligand
Complex 23
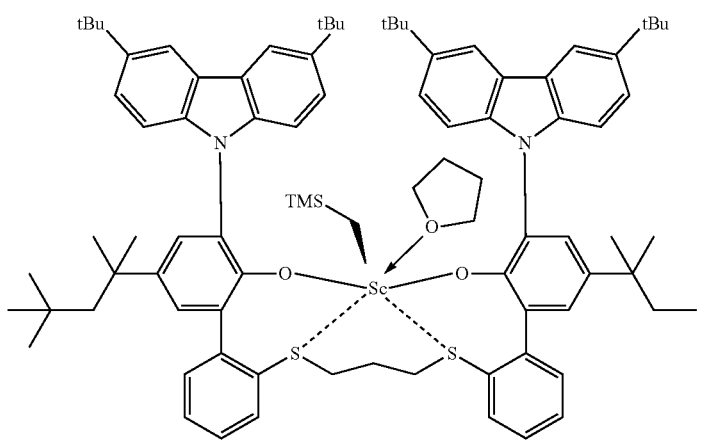
Inventive Metal-Ligand Complex 24
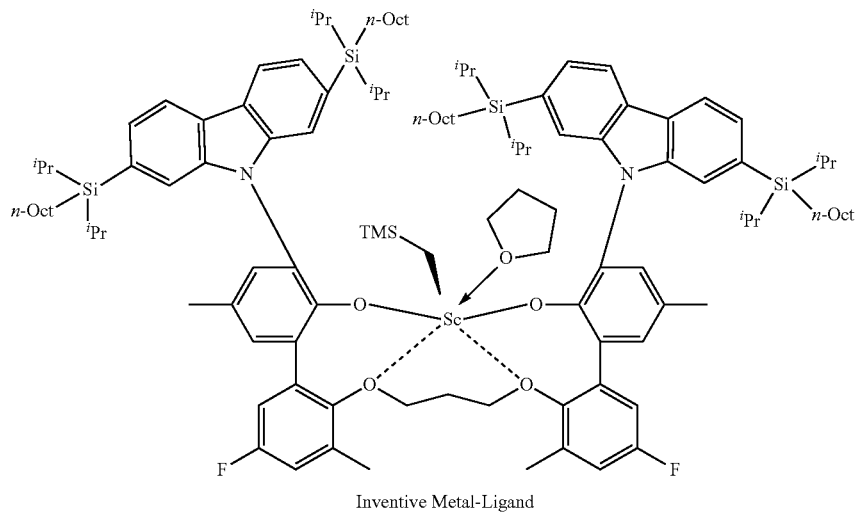
Inventive Metal-Ligand
Complex 25
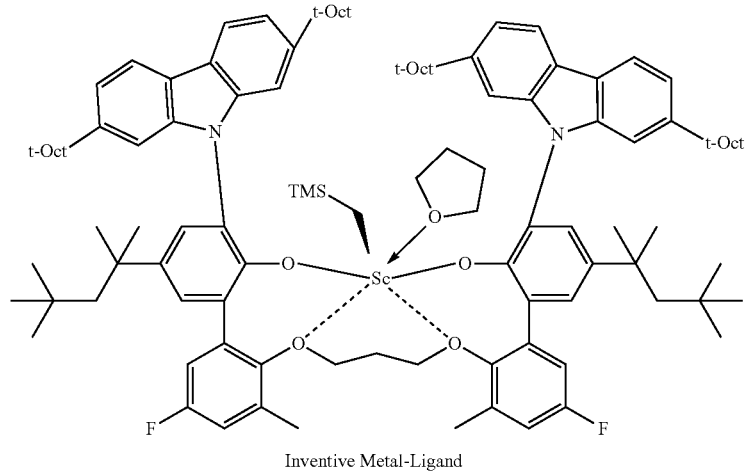
Inventive Metal-Ligand
Complex 26
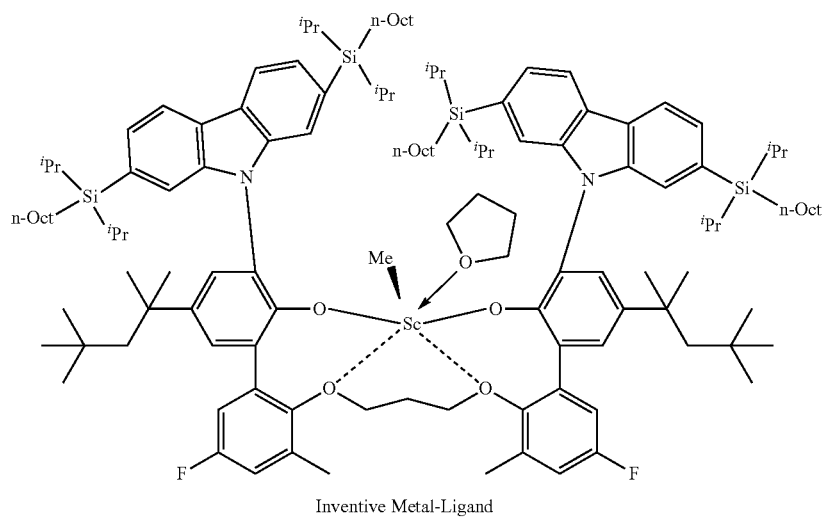
Inventive Metal-Ligand Complex 27
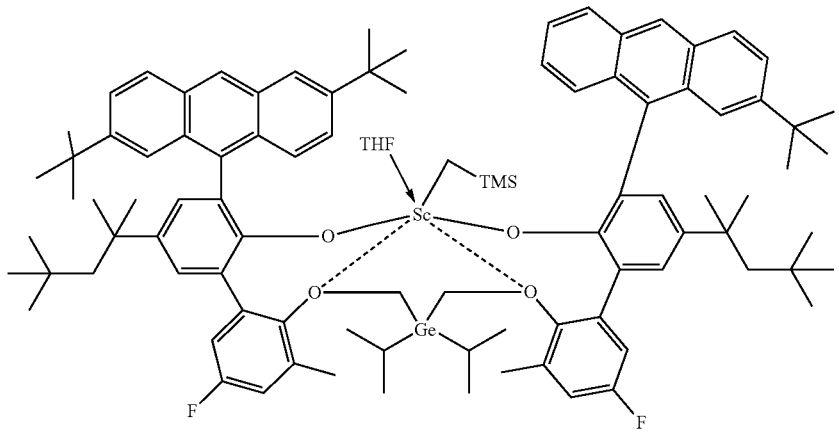
Inventive Metal-Ligand
Complex 28
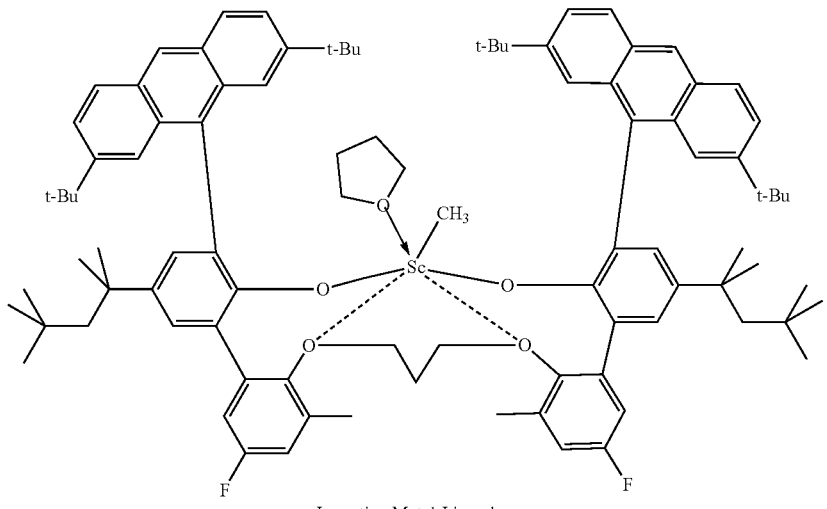
Inventive Metal-Ligand -continued
Complex 29
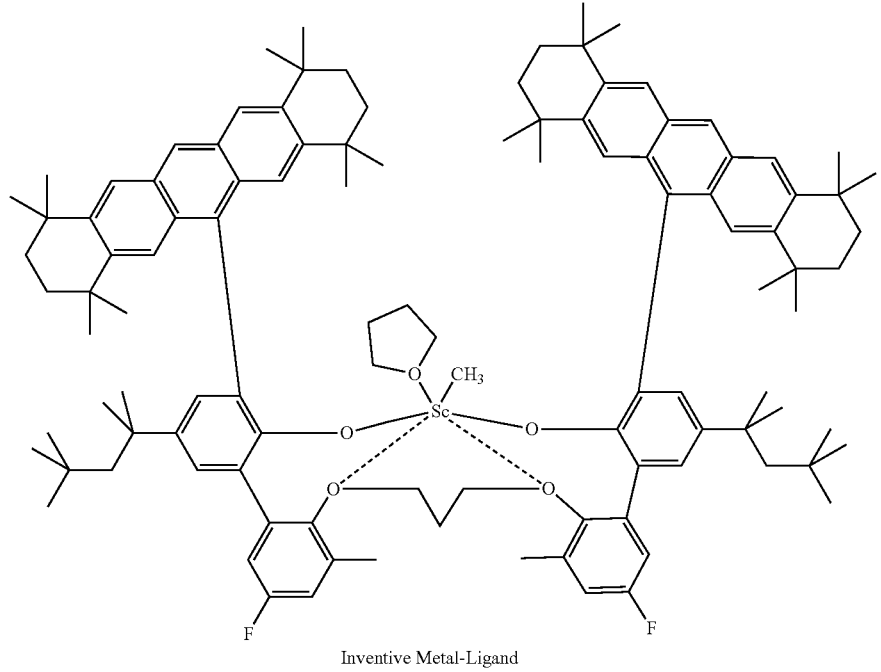
Inventive Metal-Ligand
Complex 30
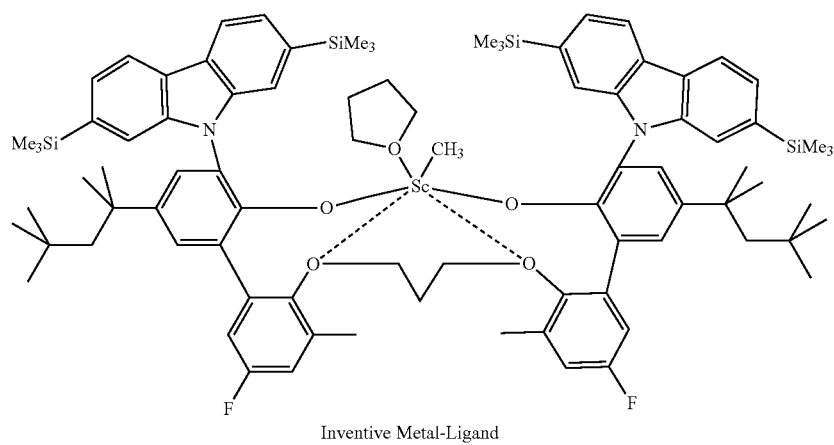
Inventive Metal-Ligand
Complex 31
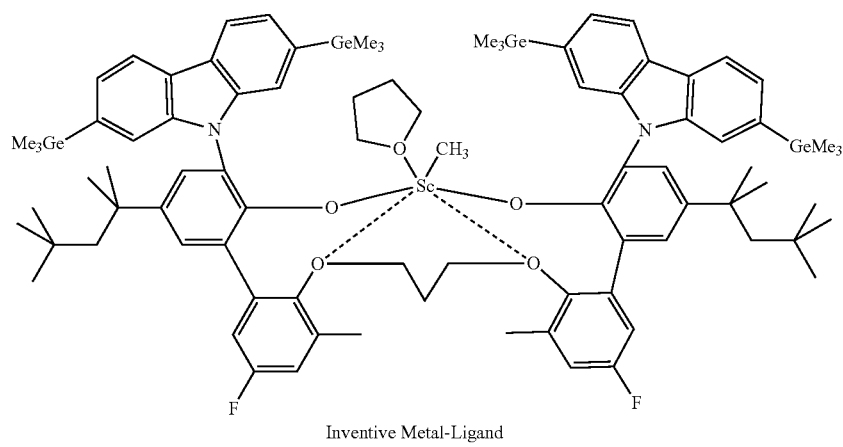
Inventive Metal-Ligand -continued
Complex 32
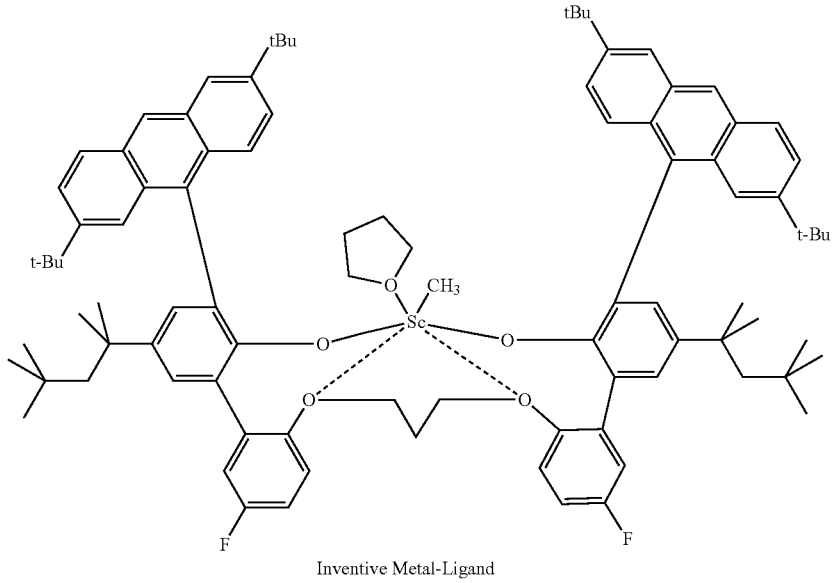
Inventive Metal-Ligand
Complex 33
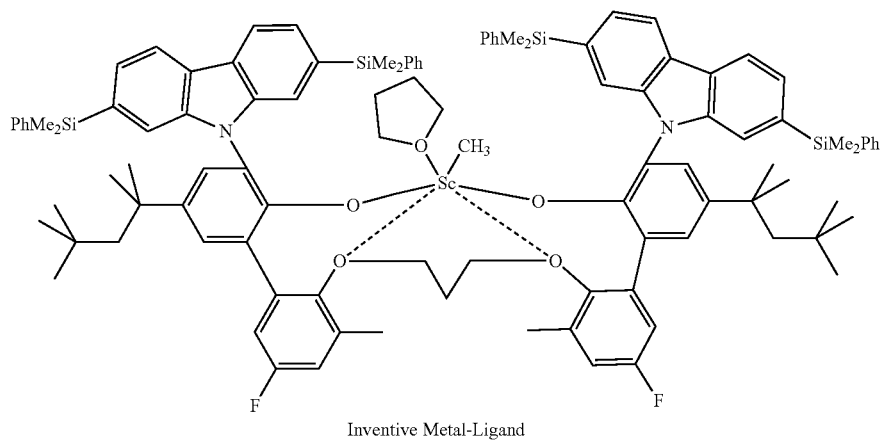
Inventive Metal-Ligand
Complex 34
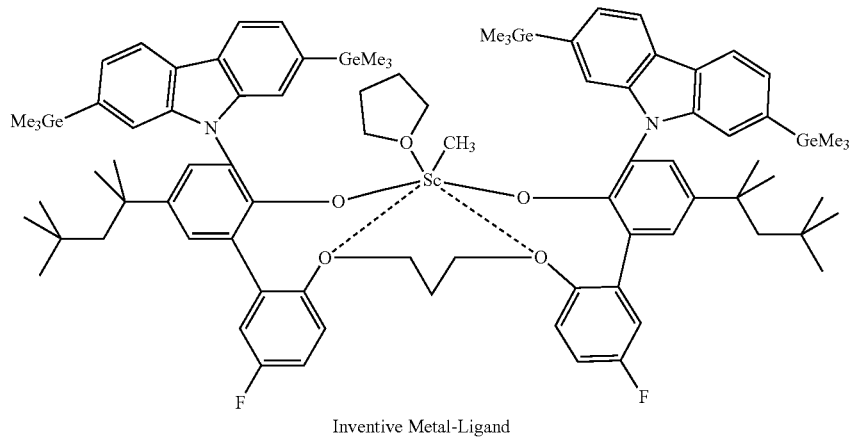
Inventive Metal-Ligand -continued
Complex 35
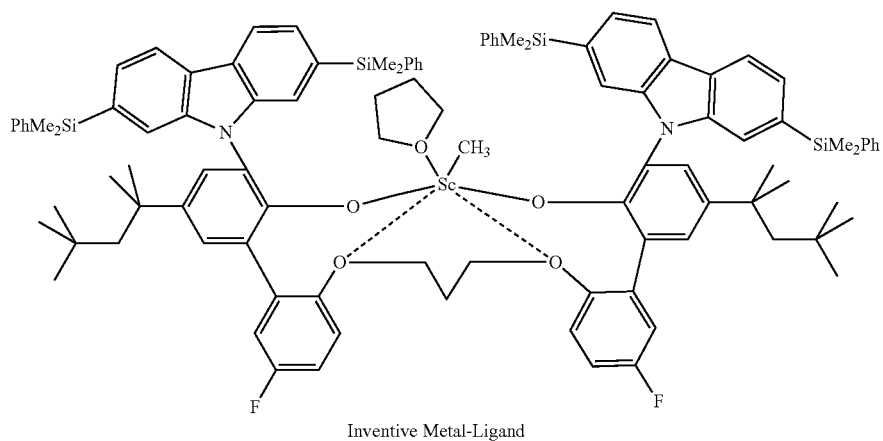
Inventive Metal-Ligand
Complex 36
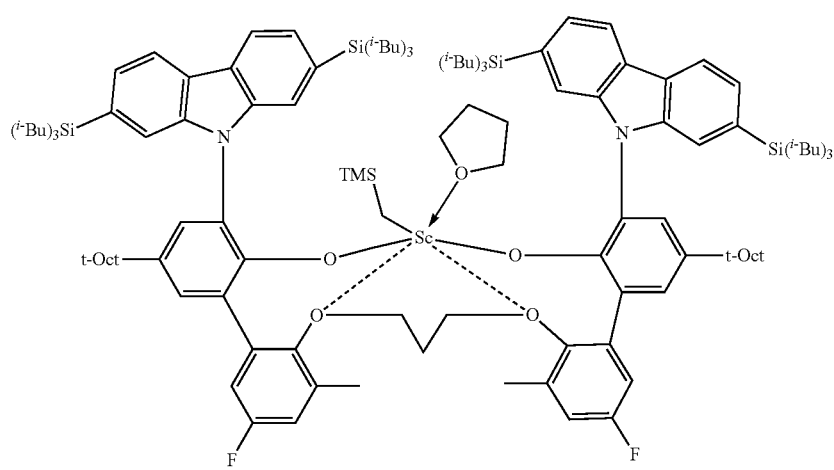
Inventive Metal-Ligand
Complex 37
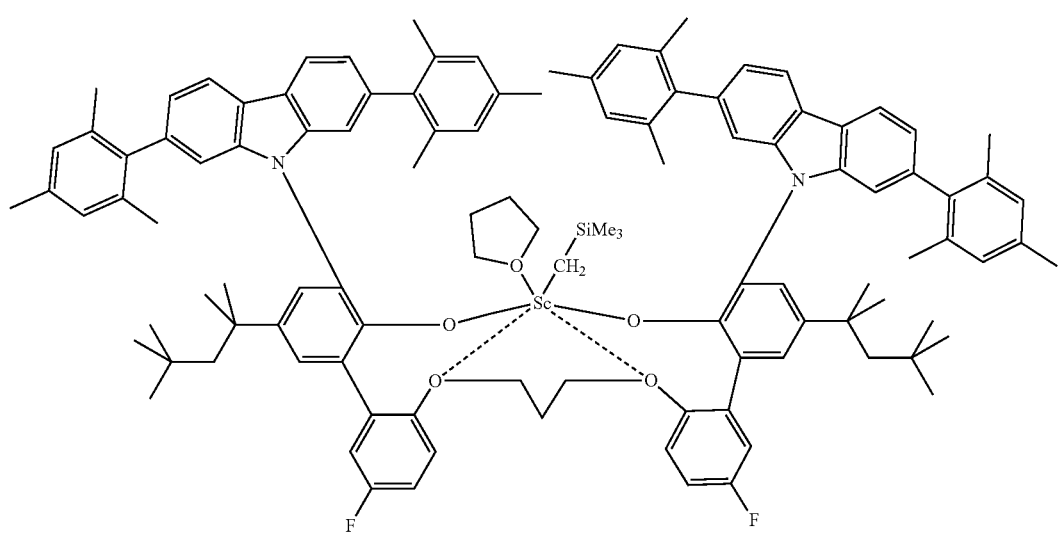
Inventive Metal-Ligand

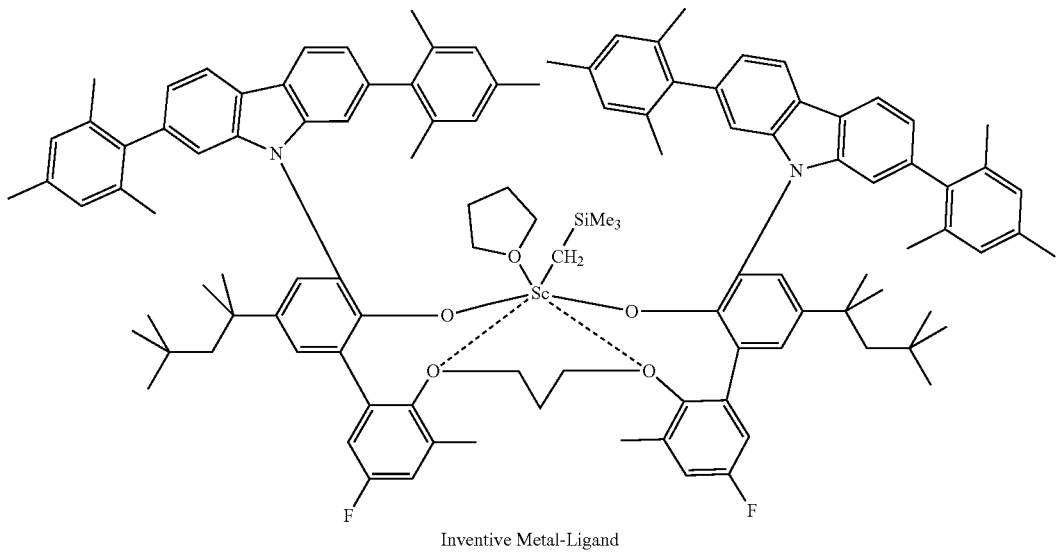

Complex 38
Inventive Metal-Ligand

Olefin Propagation

While a co-catalyst is not required to initiate olefin propagation on the metal-ligand complex of formula (I), it is believed that the metal-ligand catalyst is not efficient when the Lewis base, T, is coordinated to the metal center, M, of formula (I). Therefore, it is believed that during olefin propagation, the Lewis base disassociates from the metal center, M, and the metal-ligand complex has a structure according to formula (Ia):

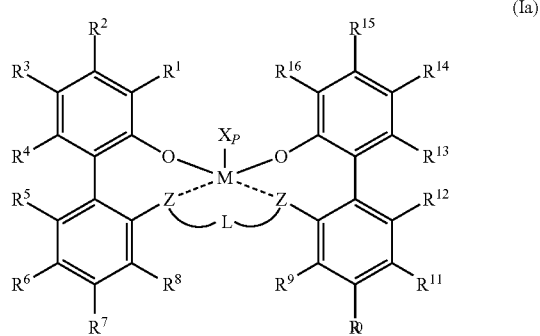

(Ia)

In formula (Ia), $R^1$ through $R^{16}$, M, Z, and L are as defined in formula (I). $X_P$ is hydrocarbyl, where the hydrocarbyl is branched or unbranched having at least 30 carbon atoms. More specifically, $X_P$ is the propagating olefin chain.

Additive Component

In some embodiments, the catalyst system does not include additives. An additive is a chemical agent present during the polymerization reaction the does not deter olefin propagation. In one or more embodiments, the catalyst system further comprises an additive. In some embodiments, the additives function as a co-catalyst. In other embodiments, the additives function as a scavenger or scavenging agent. A co-catalyst is a reagent that reacts in cooperation with a catalyst to catalyze the reaction or improve the catalytic activity of the catalyst. Without intent to be bound by theory, it is believed the Lewis Base, T, of formula (I), disassociates without the presence of a co-catalyst. However, it is also believed that a co-catalyst may promote the disassociation of the Lewis base and the metal center of the metal-ligand complex.

A scavenging agent sequesters impurities in the reactor prior to addition of the precatalyst, and as such, does not constitute and activator. Lower loading of alumoxanes do not act as co-catalysts, rather they serve as scavenging agent.

Suitable additives may include, but are not limited to, alkyl aluminums; polymeric or oligomeric alumoxanes (also known as aluminoxanes); neutral Lewis acids; and non-polymeric, non-coordinating, ion-forming compounds (including the use of such compounds under oxidizing conditions). Combinations of one or more of the foregoing additives and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

In some embodiments, the additive is a Lewis acid Group 13 metal compounds containing $(C_1-C_{20})$hydrocarbyl substituents as described herein. In some embodiments, the additives include tri$((C_1-C_{20})$hydrocarbyl)-substituted-aluminum or tri$((C_1-C_{20})$hydrocarbyl)-boron compounds. In other embodiments, the additives are chosen from tri(hydrocarbyl)-substituted-aluminum, tri$((C_1-C_{20})$hydrocarbyl)-boron compounds, tri$((C_1-C_{10})$alkyl)aluminum, tri$((C_6-C_{18})$aryl)boron compounds, and halogenated (including perhalogenated) derivatives thereof.

In one or more embodiments, the polymerization process further includes a borate-based additive. In some embodiments, the borate-based additive is selected from tris(fluoro-substituted phenyl)boranes, tris(pentafluorophenyl)borane. In some embodiments, the co-catalyst is a tri$((C_1-C_{20})$ hydrocarbyl)ammonium tetra$((C_1-C_{20})$hydrocarbyl)borate (e.g. bis(octadecyl)methylammonium tetrakis(pentafluorophenyl)borate). As used herein, the term "ammonium" means a nitrogen cation that is a $((C_1-C_{20})$hydrocarbyl$)_4$N$^+$ a $((C_1-C_{20})$hydrocarbyl$)_3$N(H)$^+$, a $((C_1-C_{20})$hydrocarbyl$)_2$N $(H)_2^+$, $(C_1-C_{20})$hydrocarbylN$(H)_3^+$, or N$(H)_4^+$, wherein each $(C_1-C_{20})$hydrocarbyl, when two or more are present, may be the same or different.

In one or more embodiments, the additive may be chosen from polymeric or oligomeric aluminoxanes, especially methyl aluminoxane, as well as inert, compatible, noncoordinating, ion forming compounds. Exemplary suitable additives include, but are not limited to modified methyl aluminoxane (MMAO), bis(hydrogenated tallow alkyl)methyl, tetrakis(pentafluorophenyl)borate(1-)ammonium, triethyl aluminum, butylatedhydroxy-toluene diethyl aluminum, bis-(butylatedhydroxy-toluene) ethyl aluminum, tris-(butylatedhydroxy-toluene) aluminum and combinations thereof.

In some embodiments, one or more co-catalysts may be used in combination with each other. A specific example of a co-catalyst combination is a mixture of a tri$((C_1-C_8)$hydrocarbyl)aluminum, tri$((C_1-C_4)$hydrocarbyl)borane, tri$((C_6-C_{18})$aryl)borane or an ammonium borate with an oligomeric or polymeric alumoxane compound. The ratio of total number of moles of one or more metal-ligand complexes of formula (I) to total number of moles of one or more of the co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the co-catalyst, preferably the ratio Al of the alumoxane and metal of the metal ligand complex of formula (I) (Al/M) is at least 20. When tris(pentafluorophenyl)borane alone is used as the co-catalyst, in some other embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1.

Catalyst System Properties

The procatalyst comprising the metal-ligand complex of formula (I) and one or more cocatalyst, as described herein, has a reactivity ratio $r_1$, as further defined hereinbelow, in the range of greater than 100; for example, greater than 150, greater than 200, greater than 300, or greater than 500.

For random copolymers in which the identity of the last monomer inserted dictates the rate at which subsequent monomers insert, the terminal copolymerization model is employed. In this model insertion reactions of the type $$\ldots M_iC^* + M_j \xrightarrow{k_{ij}} \ldots M_iM_jC^* \quad (A)$$

where $C^*$ represents the catalyst, $M_i$ represents monomer i, and $k_{ij}$ is the rate constant having the rate equation $$R_{P_{ij}} = k_{ij}[\ldots M_iC^*][M_j] \quad (B)$$

The comonomer mole fraction (i=2) in the reaction media is defined by the equation:

$$f_2 = \frac{[M_2]}{[M_1]+[M_2]} \quad (C)$$

A simplified equation for comonomer composition can be derived as disclosed in George Odian, *Principles of Polymerization*, Second Edition, John Wiley and Sons, 1970, as follows:

$$F_2 = \frac{r_1(1-f_2)^2 + (1-f_2)f_2}{r_1(1-f_2)^2 + 2(1-f_2)f_2 + r_2f_2^2} \quad (D)$$

From this equation the mole fraction of comonomer in the polymer is solely dependent on the mole fraction of comonomer in the reaction media and two temperature dependent reactivity ratios defined in terms of the insertion rate constants as:

$$r_1 = \frac{k_{11}}{k_{12}} \quad r_2 = \frac{k_{22}}{k_{21}} \quad (E)$$

Alternatively, in the penultimate copolymerization model, the identities of the last two monomers inserted in the growing polymer chain dictate the rate of subsequent monomer insertion. The polymerization reactions are of the form

$$\ldots M_iM_jC^* + M_k \xrightarrow{k_{ijk}} \ldots M_iM_jM_kC^* \quad (G)$$

and the individual rate equations are:

$$R_{P_{ijk}} = k_{ijk}[\ldots M_iM_j = C^*][M_k] \quad (H)$$

The comonomer content can be calculated (again as disclosed in George Odian, Supra.) as:

$$\frac{(1-F_2)}{F_2} = \frac{1 + \frac{r_1'X(r_1X+1)}{(r_1'X+1)}}{1 + \frac{r_2'(r_2+X)}{X(r_2'+X)}} \quad (I)$$

where X is defined as:

$$X = \frac{(1-f_2)}{f_2} \quad (J)$$

and the reactivity ratios are defined as:

$$r_1 = \frac{k_{111}}{k_{112}} \quad r_1' = \frac{k_{211}}{k_{212}} \quad (K)$$
$$r_2 = \frac{k_{222}}{k_{221}} \quad r_2' = \frac{k_{122}}{k_{121}}$$

For this model as well the polymer composition is a function only of temperature dependent reactivity ratios and comonomer mole fraction in the reactor. The same is also true when reverse comonomer or monomer insertion may occur or in the case of the interpolymerization of more than two monomers.

Reactivity ratios for use in the foregoing models may be predicted using well known theoretical techniques or empirically derived from actual polymerization data. Suitable theoretical techniques are disclosed, for example, in B. G. Kyle, *Chemical and Process Thermodynamics*, Third Addition, Prentice-Hall, 1999 and in Redlich-Kwong-Soave (RKS) Equation of State, *Chemical Engineering Science*, 1972, pp 1197-1203. Commercially available software programs may be used to assist in deriving reactivity ratios from experimentally derived data. One example of such software is Aspen Plus from Aspen Technology, Inc., Ten Canal Park, Cambridge, MA 02141-2201 USA.

Accordingly, the process for producing ethylene based polymers according to the present invention selectively gives the rich polyethylene (e.g., a high density polyethylene) or rich polyethylene segment of the poly(ethylene alpha-olefin) copolymer in the presence of alpha-olefin, which is substantially unpolymerized thereby. The process for producing ethylene-based polymers employs olefin polymerizing conditions. In some embodiments, the olefin polymerizing conditions independently produce a catalyst in situ that is formed by reaction of the procatalyst comprising metal-ligand complex of formula (I), and one or more cocatalysts in the presence of one or more other ingredients. Such other ingredients include, but are not limited to, (i) olefin monomers; (ii) another metal-ligand complex of formula (I); (iii) one or more of catalyst systems; (iv) one or more chain shuttling agents; (v) one or more catalyst stabilizers; (vi) one or more solvents; and (vii) a mixture of any two or more thereof.

A particularly inventive catalyst is one that can achieve a high selectivity for polymerizing ethylene in the presence of the ($C_3$-$C_{40}$) alpha-olefin in the process for producing an ethylene-based polymer, wherein the high selectivity is characterized by the reactivity ratio $r_1$ described previously. Preferably for the inventive process, the reactivity ratio $r_1$ is greater than 50, more preferably greater than 100, still more preferably greater than 150, still more preferably greater than 200. When the reactivity ratio $r_1$ for the invention process approaches infinity, incorporation of the alpha-olefin into (or onto) the rich polyethylene produced thereby approaches 0 mole percent (mol %).

The inventive catalyst composition comprising the procatalyst and one or more cocatalyst, as described herein, has catalytic efficiency in the rage of from greater than 1000,000 g of polymer per gram of active metal center; for example, from greater than 2000,000 g of polymer per gram of active metal center. The ecatalytic efficiency is measured in terms of amount of polymer produced relative to the amount catalyst used in solution polymerisation process, wherein the ploymersation temperature is at least 130° C., for example in the range of from 170 to 195° C., and ethylene concentration is greater than 5 g/L, for example, greater than 6 g/L, and wherein the ethylene conversion is greater than 70 percent, for example, greater than 80 percent, or in the alternative, greater than 90 percent.

Polyolefins

The catalytic systems described in this disclosure may be utilized in the polymerization of olefins, primarily ethylene, propylene, α-olefins, such as octene, and dienes. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene-based polymers, for example homopolymers and/or interpolymers (including copolymers) of ethylene and optionally one or more co-monomers such as α-olefins, may comprise from at least 50 mole percent (mol %) monomer units derived from ethylene. All individual values and subranges encompassed by "from at least 50 mole percent" are disclosed herein as separate embodiments; for example, the ethylene based polymers, homopolymers and/or interpolymers (including copolymers) of ethylene and optionally one or more co-monomers such as α-olefins may comprise at least 60 mole percent monomer units derived from ethylene; at least 70 mole percent monomer units derived from ethylene; at least 80 mole percent monomer units derived from ethylene; or from 50 to 100 mole percent monomer units derived from ethylene; or from 80 to 100 mole percent monomer units derived from ethylene.

In some embodiments, the catalyst systems may produce ethylene-based polymers that include at least 90 mole percent units derived from ethylene. All individual values and subranges from at least 90 mole percent are included herein and disclosed herein as separate embodiments. For example, the ethylene-based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments, the catalyst system produces ethylene-based polymers having an amount of additional α-olefin that is less than 50 mole percent (mol %); other embodiments the amount of additional α-olefin includes at least 0.01 mol % to 25 mol %; and in further embodiments the amount of additional α-olefin includes at least 0.1 mol % to 10 mol %. In some embodiments, the additional α-olefin is 1-octene.

The ethylene-based polymers may be produced by otherwise conventional polymerization processes that incorporate the catalyst systems according to embodiments of this disclosure. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene-based polymer may be produced via solution polymerization in a dual reactor system, for example a dual loop reactor system, wherein ethylene and, optionally, one or more α-olefins are polymerized in the presence of the catalyst system, as described herein, and optionally one or more co-catalysts. In another embodiment, the ethylene-based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst systems, as described herein, can be used in the first reactor, or second reactor, optionally in combination with one or more other catalysts. In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene-based polymer may be produced via solution polymerization in a single reactor system, for example a single loop reactor system, in which ethylene and optionally one or more α-olefins are polymerized in the presence of the catalyst system, as described within this disclosure, and optionally one or more cocatalysts, as described in the preceding paragraphs.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers may contain any amounts of additives. The ethylene-based polymers may compromise from about 0 to about 10 percent by the combined weight of such additives, based on the weight of the ethylene-based polymers and the one or more additives. The ethylene-based polymers may further comprise fillers, which may include, but are not limited to, organic or inorganic fillers. The ethylene-based polymers may contain from about 0 to about 20 weight percent fillers such as, for example, calcium carbonate, talc, or $Mg(OH)_2$, based on the combined weight of the ethylene-based polymers and all additives or fillers. The ethylene-based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex of formula (I). The polymer resulting from such a catalyst system that incorporates the metal-ligand complex of formula (I) may have a density according to ASTM D792 (incorporated herein by reference in its entirety) from 0.850 g/cm³ to 0.970 g/cm³, from 0.870 g/cm³ to 0.950 g/cm³, from 0.870 g/cm³ to 0.920 g/cm³, or from 0.870 g/cm³ to 0.900 g/cm³, for example.

In embodiments, the polymer resulting from the catalyst system that includes the metal-ligand complex of formula (I) has a melt flow ratio (110/12) from 5 to 15, in which melt index 12 is measured according to ASTM D1238 (incorporated herein by reference in its entirety) at 190° C. and 2.16 kg load, and melt index Iio is measured according to ASTM D1238 at 190° C. and 10 kg load. In other embodiments the melt flow ratio (110/12) is from 5 to 10, and in others, the melt flow ratio is from 5 to 9.

In some embodiments, the polymer resulting from the catalyst system that includes the metal-ligand complex of formula (I) has a melt index (I2) from 0.1 to 100, in which melt index 12 is measured according to ASTM D1238 (incorporated herein by reference in its entirety) at 190° C. and 2.16 kg load.

In some embodiments, the polymer resulting from the catalyst system that includes the metal-ligand complex of formula (I) has a molecular-weight distribution (MWD) from 1.0 to 25, where MWD is defined as Mw/Mn with Mw being a weight-average molecular weight and Mn being a number-average molecular weight. In other embodiments, the polymers resulting from the catalyst system have a MWD from 1.5 to 6. Another embodiment includes a MWD from 1.5 to 3; and other embodiments include MWD from 2 to 2.5.

SymRAD HT-GPC Analysis

The molecular weight data is determined by analysis on a hybrid Robot-Assisted Dilution High-Temperature Gel Permeation Chromatographer (Sym-RAD-GPC) built by Symyx/Dow. The polymer samples are dissolved by heating for 120 minutes at 160° C. in 1,2,4-trichlorobenzene (TCB) at a concentration of 10 mg/mL stabilized by 300 parts per million (ppm) of butylated hydroxyl toluene (BHT). Each sample was diluted to 1 mg/mL immediately before the injection of a 250 μL aliquot of the sample. The GPC is equipped with two Polymer Labs PLgel 10 μm MIXED-B columns (300×10 mm) at a flow rate of 2.0 mL/minute at 160° C. Sample detection is performed using a PolyChar IR4 detector in concentration mode. A conventional calibration of narrow polystyrene (PS) standards is utilized with apparent units adjusted to homo-polyethylene (PE) using known Mark-Houwink coefficients for PS and PE in TCB at this temperature.

1-Octene Incorporation IR Analysis

The running of samples for the HT-GPC analysis precedes the IR analysis. For the IR analysis, a 48-well HT silicon wafer is utilized for deposition and analysis of 1-octene incorporation of samples. For the analysis, the samples are heated to 160° C. for less than or equal to 210 minutes; the samples are reheated to remove magnetic GPC stir bars and are shaken with glass-rod stir bars on a J-KEM Scientific heated robotic shaker. Samples are deposited while being heated using a Tecan MiniPrep 75 deposition station, and the 1,2,4-trichlorobenzene is evaporated off the deposited wells of the wafer at 160° C. under nitrogen purge. The analysis of 1-octene is performed on the HT silicon wafer using a NEXUS 670 E.S.P. FT-IR.

EXAMPLES

Examples 1 to 22 are synthetic procedures for intermediates of ligands, for ligands themselves, and for isolated metal-ligand complexes including the ligands. Example 24 describes polymerization results obtained from metal-ligand complexes prepared according to Examples 1-23. It should be understood that Examples 1-23 are provided to illustrate embodiments described in this disclosure and are not intended to limit the scope of this disclosure or its appended claims.

Example 1 Synthesis of Inventive Metal-Ligand Complex 1 (IMLC-1)

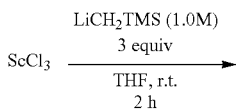

-continued

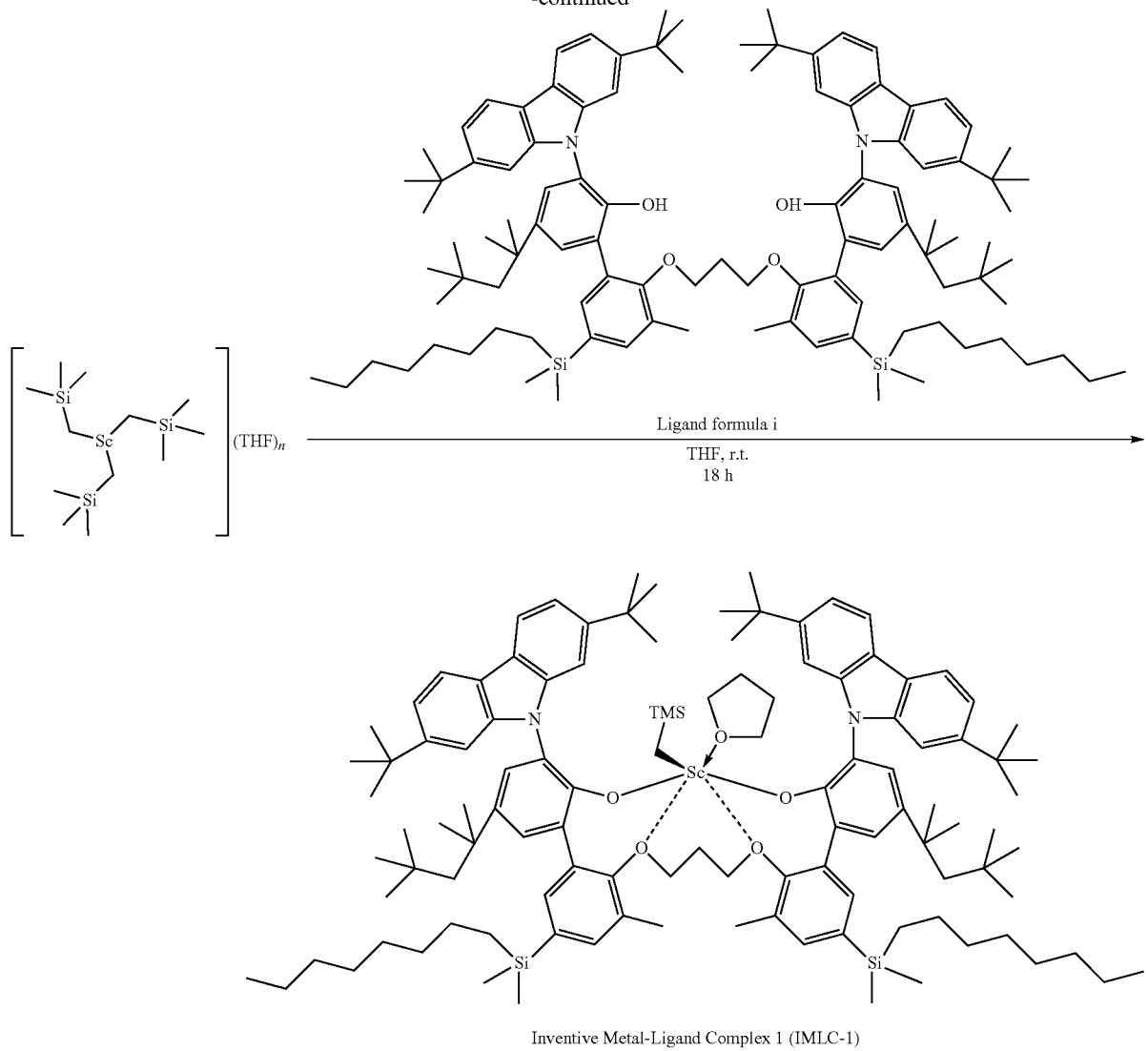

Inventive Metal-Ligand Complex 1 (IMLC-1)

In a nitrogen glove box, an oven-dried vial was charged with ScCl₃ (0.016 g, 0.106 mmol), THF (ca. 50 mL), and a magnetic stir bar. The mixture was cooled at −30° C. and then LiCH$_2$TMS (1.0 M in pentane, 0.35 mL, 0.35 mmol) was added dropwise and then the mixture was stirred at room temperature for 1.5 h. To this mixture, 1 equiv of ligand formula i (0.168 g, 0.106 mmol) in THF (ca. 10 mL) was slowly added and the reaction mixture was allowed to be stirred at room temperature for 18 h. Solvent was then removed in vacuo to afford IMLC-1 as a white solid (0.154 g, 83%).

$^1$H NMR (400 MHz, Benzene-d$_6$) δ 8.18 (dd, J=10.3, 8.2 Hz, 2H), 8.08 (dd, J=11.9, 8.3 Hz, 2H), 7.93 (d, J=1.7 Hz, 1H), 7.71 (dd, J=7.7, 1.7 Hz, 2H), 7.66 (d, J=2.8 Hz, 1H), 7.61 (d, J=2.7 Hz, 1H), 7.57 (dd, J=8.8, 1.7 Hz, 2H), 7.54-7.44 (m, 3H), 7.40-7.29 (m, 4H), 7.21 (dd, J=1.8, 0.8 Hz, 1H), 7.05 (dd, J=1.8, 0.8 Hz, 1H), 4.07 (s, 1H), 3.74-3.61 (m, 3H), 3.61-3.52 (m, 2H), 3.21-3.10 (m, 2H), 1.74 (s, 3H), 1.70-1.63 (m, 2H), 1.62 (s, 9H), 1.60-1.53 (m, 2H), 1.51 (s, 9H), 1.48 (s, 3H), 1.39-1.23 (m, 34H), 1.37 (s, 3H), 1.30 (s, 9H), 1.21 (s, 9H), 1.16-1.02 (m, 5H), 0.96-0.84 (m, 6H), 0.90 (s, 9H), 0.89 (s, 9H), 0.77 (dt, J=9.4, 6.9 Hz, 2H), 0.66 (d, J=6.8 Hz, 2H), 0.26 (s, 3H), 0.24 (s, 3H), 0.15 (s, 3H), 0.12 (s, 3H), −0.32 (s, 9H), −0.66 (d, J=12.3 Hz, 1H), −1.37 (d, J=12.3 Hz, 1H).

Preparation of ligand formula i detailed in WO2017058981 A1.

Example 2—Synthesis of Inventive Metal-Ligand Complex 2 (IMLC-2)

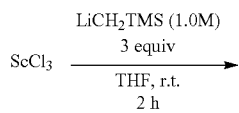

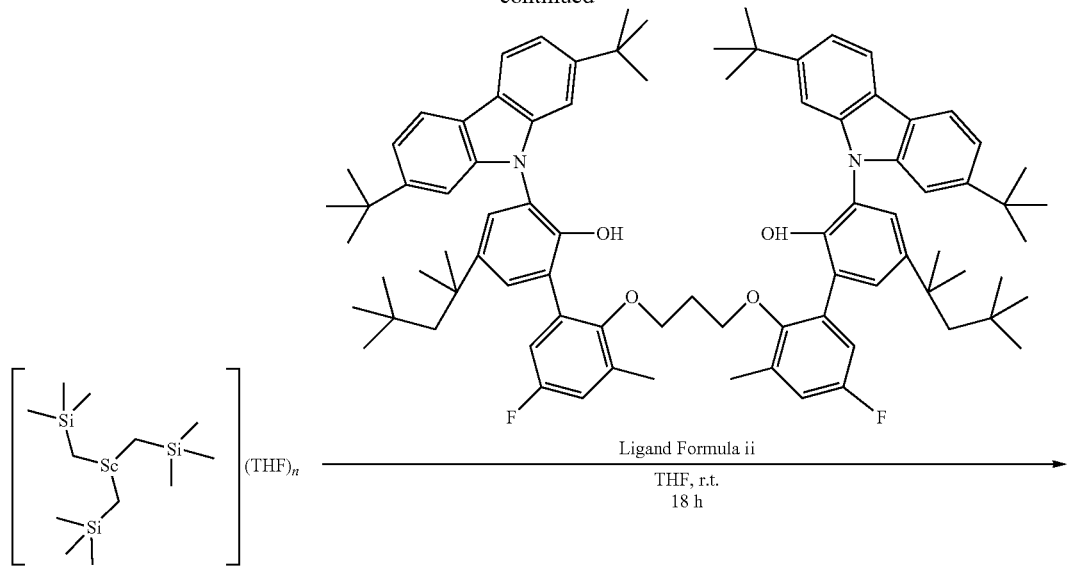

Ligand Formula ii
THF, r.t.
18 h

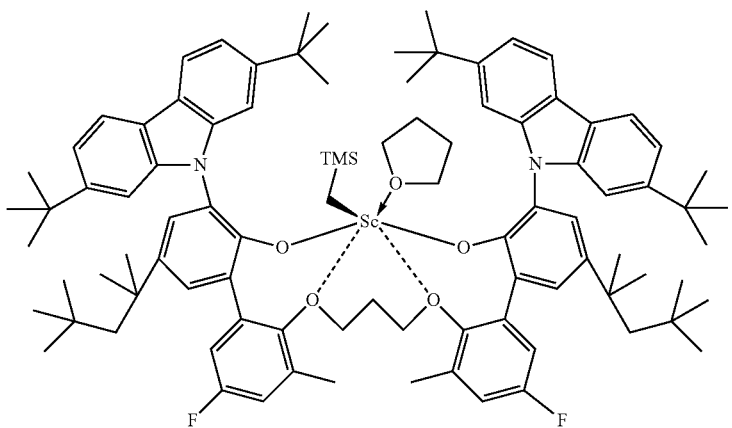

Inventive Metal-Ligand Complex 2 (IMLC-2)

In a glove box a vial is charged with ScCl$_3$ (0.027 g), THF (ca. 10 mL), and a magnetic stir bar. The mixture was cooled at −30° C. before LiCH$_2$TMS (~0.55 mL) was added dropwise at room temperature. After being stirred for 2 h, 1 equiv of ligand formula ii (0.226 g) in THF (ca. 5 mL) was added and the reaction mixture was stirred at room temperature for 18 h. The solvent was then removed in vacuo to afford IMLC-2 as a white solid (0.074 mg, 28% yield).

$^1$H NMR (400 MHz, Benzene-d$_6$) (Select Peaks) δ 8.20 (d, J=8.2 Hz, 1H), 8.16 (d, J=8.2 Hz, 1H), 8.14-8.09 (m, 1H), 8.06 (d, J=8.3 Hz, 2H), 7.81 (d, J=1.7 Hz, 1H), 7.61 (d, J=1.6 Hz, 1H), 7.57 (d, J=2.7 Hz, 1H), 7.51-7.40 (m, 4H), 7.35-7.26 (m, 6H), 7.22-7.17 (m, 1H), 7.03 (dd, J=9.0, 3.2 Hz, 1H), 6.43-6.35 (m, 1H), 6.26-6.18 (m, 1H), 3.97-3.85 (m, 1H), 3.58-3.40 (m, 5H), 3.20-3.11 (m, 2H), 1.59 (s, 9H), 1.50 (s, 9H), 1.27 (s, 9H), 1.19 (s, 9H), 0.85 (s, 9H), 0.83 (s, 9H), −0.31 (s, 9H), −0.70 (d, J=12.3 Hz, 1H), −1.42 (d, J=12.3 Hz, 1H).

$^{19}$F NMR (376 MHz, Benzene-d$_6$) δ −115.55, −116.83.

Preparation of ligand formula ii detailed in WO2014105411 A1.

Example 3—Synthesis of Inventive Metal-Ligand Complex 3 (IMLC-3)

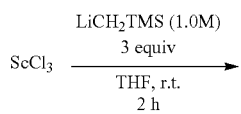

-continued

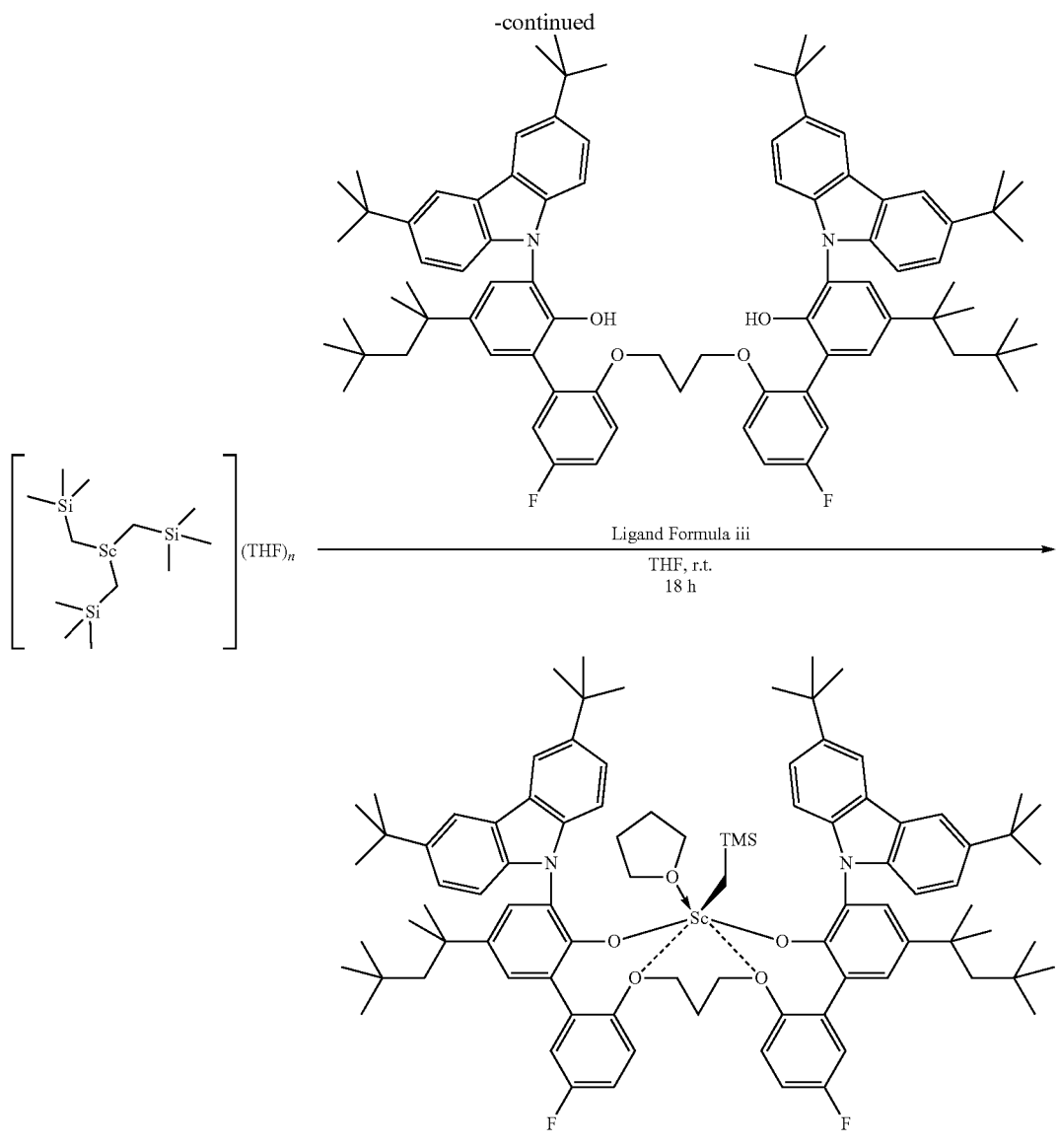

Inventive Metal-Ligand Complex 3 (IMLC-3)

In a glove box a 250 mL glass jar was charged with ScCl₃ (0.200 g), THF (ca. 25 mL), and a magnetic stir bar. To this was slowly added LiCH₂TMS (1.0 M in hexanes, 4 mL), and this mixture was allowed to stir at room temperature for 4 h. To this colorless, mostly clear mixture was added ligand formula iii (1.62 g) and an immediate darkening of the reaction mixture was observed (clear dark grey color). The reaction mixture was allowed to stir for 1 hour at room temperature after which the mixture was filtered and then the filtrate was dried in vacuo to provide IMLC-3 as an off-white solid (1.08 g, 57% yield).

$^1$H NMR (400 MHz, Benzene-d$_6$) (Select Peaks for major product) δ 8.58 (s, 1H), 8.48 (d, J=6.9 Hz, 2H), 8.43 (s, 1H), 8.26 (s, 1H), 7.77-6.95 (m, 12H), 6.85 (s, 1H), 6.51 (d, J=4.9 Hz, 1H), 6.45-6.34 (m, 1H), 5.54 (s, 1H), 5.23 (s, 1H), 4.51 (s, 1H), 3.63 (s, 2H), 3.44 (s, 1H), 3.36 (m, 2H), 2.86 (m, 2H), 1.51 (s, 9H), 1.499 (s, 9H), 1.497 (s, 9H), 1.44 (s, 9H), 0.84 (m, 18H), −0.24 (s, 9H), −1.39-1.45 (m, 2H), −2.00 (d, J=12.7 Hz, 1H).

$^{19}$F NMR (376 MHz, Benzene-d$_6$) δ −115.52, −118.51.

Preparation of ligand formula iii detailed in WO2012027448 A1.

Example 4—Synthesis of Inventive Metal-Ligand Complex 4 (IMLC-4)

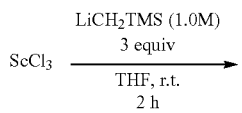

-continued

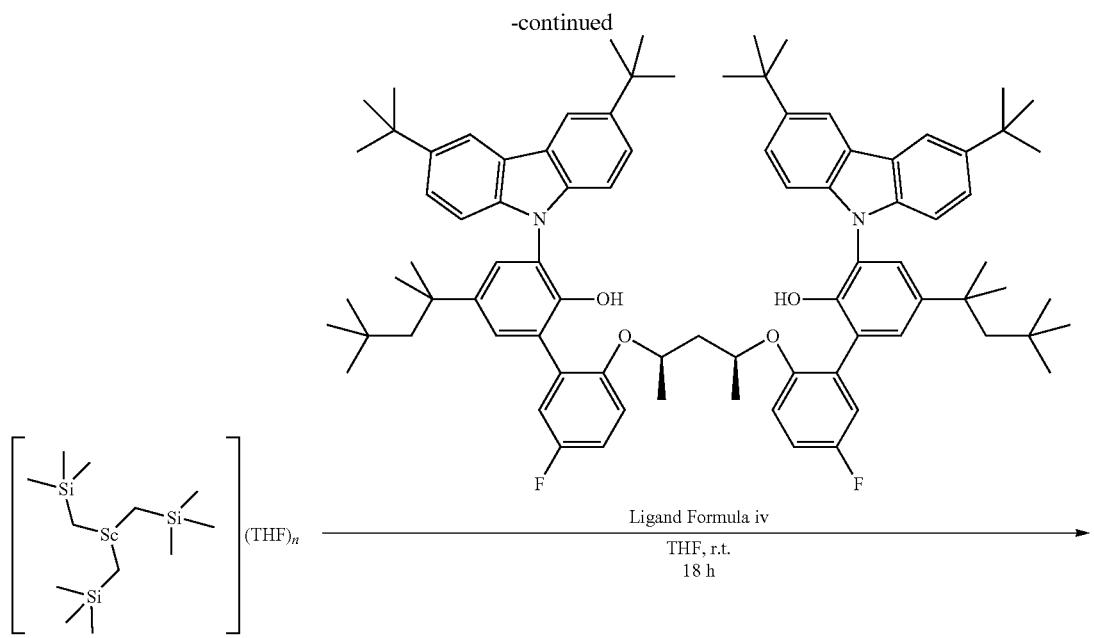

Ligand Formula iv
THF, r.t.
18 h

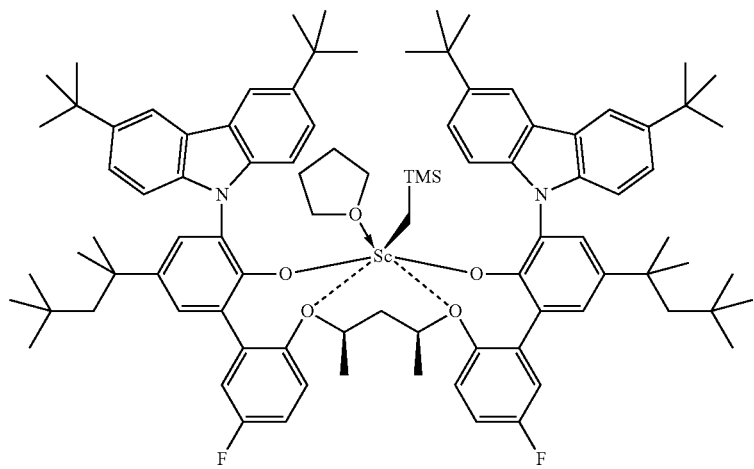

Inventive Metal-Ligand Complex 4 (IMLC-4)

In a glovebox a 250 mL glass jar was charged with ScCl₃ (0.030 g, 0.20 mmol), THF (ca. 50 mL), and a magnetic stir bar. LiCH₂TMS (1.0 M in pentane, 0.60 mL, 0.60 mmol) was added slowly and then the mixture was allowed to stir at room temperature for 2 hours. Ligand formula iv (0.249 g, 0.199 mmol) was dissolved in THF and then slowly added to the jar and the contents were stirred at room temperature for 18 h. The solvent was then removed in vacuo and the product was extracted in pentane and passed over a fritted funnel. The filtrate was concentrated under reduced pressure to afford IMLC-4 as a white solid (0.213 g, 74% yield).

$^{19}$F NMR (376 MHz, Benzene-d₆) δ −115.54, −117.69.

Preparation of ligand formula iv detailed in WO2016003878A1.

Example 5—Synthesis of Inventive Metal-Ligand Complex 5 (IMLC-5)

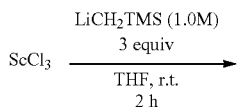

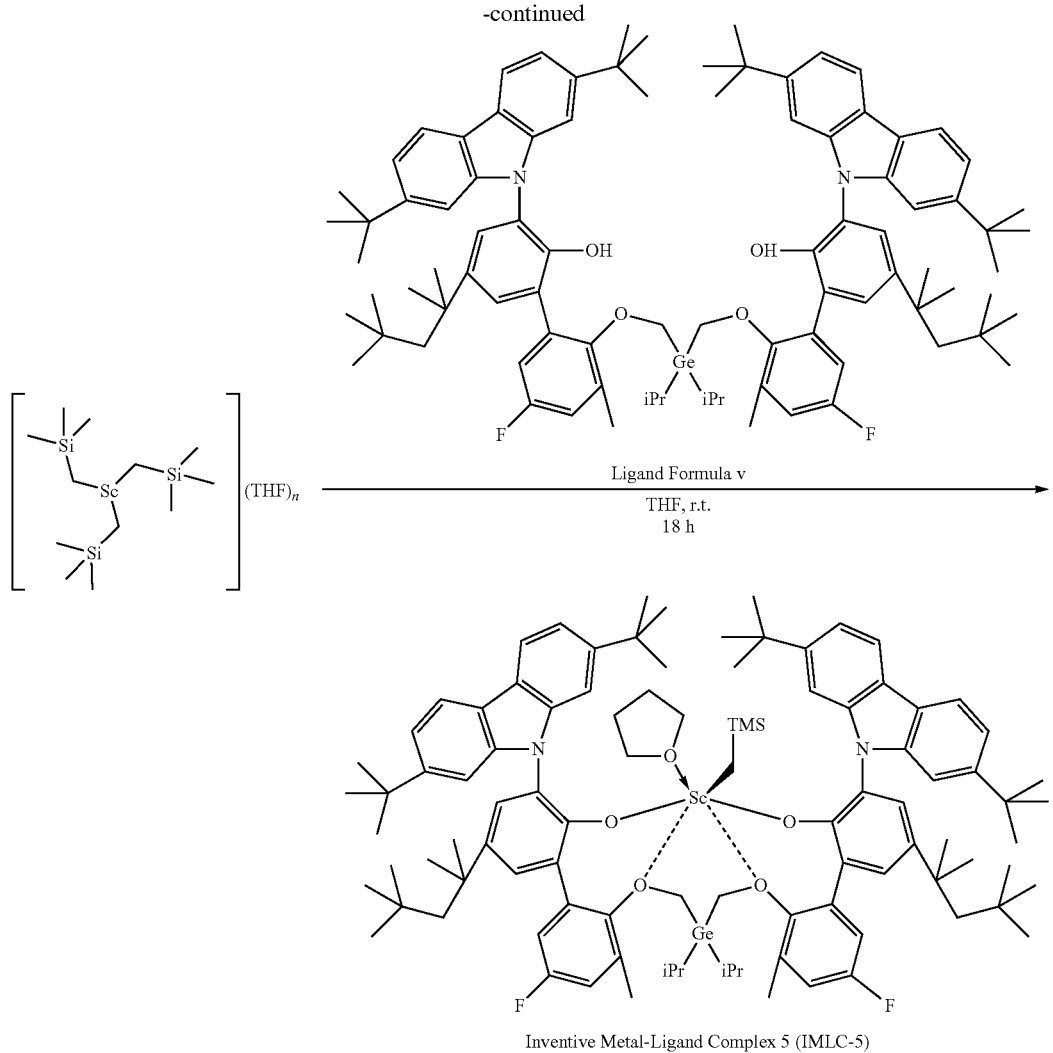

Inventive Metal-Ligand Complex 5 (IMLC-5)

In a glovebox a 250 mL glass jar was charged with ScCl$_3$ (0.029 g, 0.19 mmol), THF (ca. 50 mL), and a magnetic stir bar. LiCH$_2$TMS (1.0 M in pentane, 0.58 mL, 0.58 mmol) was added slowly and then the mixture was allowed to stir at room temperature for 2 hours. Ligand formula v (0.269 g, 0.192 mmol) was dissolved in THF and then slowly added to the jar and the contents were stirred at room temperature for 18 h. The solvent was then removed in vacuo and the product was extracted in pentane and passed over a fritten funnel. The filtrate was concentrated under reduced pressure to afford IMLC-5 as a white solid (0.075 g, 24% yield).

$^1$H NMR (400 MHz, Benzene-d$_6$) (Select peaks of major product) δ 8.21-8.10 (m, 3H), 8.07 (d, J=8.3, 1H), 7.69 (d, J=1.7 Hz, 1H), 7.54 (d, J=3.0, 1H), 7.51-7.30 (m, 10H), 7.26 (q, J=3.0 Hz, 1H), 7.04 (d, J=5.6 Hz, 1H), 6.41-6.34 (m, 1H), 6.26-6.16 (m, 1H), 5.20 (d, J=12.6 Hz, 1H), 4.76 (d, J=12.1 Hz, 1H), 4.03 (d, J=12.5 Hz, 1H), 3.78 (d, J=12.0 Hz, 1H), 3.62-3.46 (m, 2H), 3.06 (m, 2H), 1.51 (s, 9H), 1.46 (s, 9H), 1.34 (s, 9H), 1.28 (s, 9H), 0.72 (s, 9H), 0.68 (s, 9H), 0.34 (s, 3H), −0.31 (s, 9H), −0.60 (d, J=12.7 Hz, 1H), −1.17 (d, J=12.6 Hz, 1H).

$^{19}$F NMR (376 MHz, Benzene-d$_6$) δ −116.68, −117.55.

Example 6—Synthesis of 2-bromo-4-fluoro-6-methyl-phenol—Preparation of Ligand Formula (v)

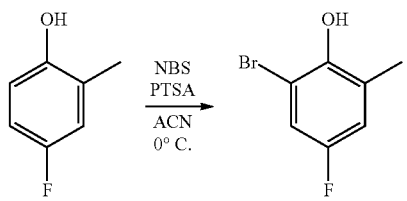

A one liter glass bottle was charged with acetonitrile (ACN) (400 mL), 4-fluoro-6-methyl-phenol (50 g, 396 mmol), and p-toluenesulfonic acid (monohydrate) (PTSA) (75.6 g, 396 mmol), making sure everything was in solution. The solution was cooled to 0° C. with ice for 25 min (a precipitate formed). The cooled solution, was slowly treated with N-bromosuccinimide (NBS) (70.6 g, 396 mmol) (over the course of approx. 5 min), and was allowed reach room temperature while stirring overnight. The volatiles were removed under vacuum, and the resulting solid was treated with CH$_2$Cl$_2$ (600 mL), cooled in the freezer (0° C.), and filtered through a large plug of silica gel. The silica gel was washed several times with cold CH$_2$Cl$_2$. The volatiles were removed under vacuum to provide the product (46 g, 56%).

$^1$H NMR (400 MHz, CDCl$_3$) δ 7.05 (ddd, J=7.7, 3.0, 0.7 Hz, 1H), 6.83 (ddt, J=8.7, 3.0, 0.8 Hz, 1H), 5.35 (s, 1H), 2.29 (d, J=0.7 Hz, 3H); $^{19}$F NMR (376 MHz, CDCl$_3$) δ −122.84.

Example 7—Synthesis of bis((2-bromo-4-fluoro-6-methylphenoxy)methyl) diisopropylgermane phenol—Preparation of Ligand Formula (v)

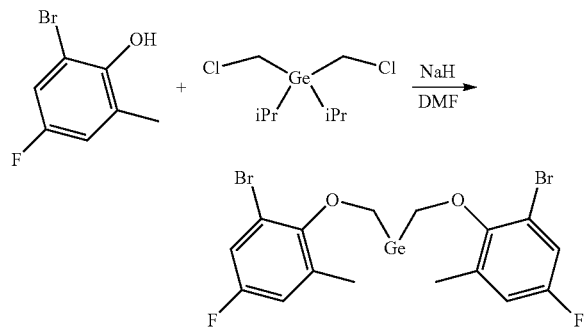

In the glove box, in a 250 mL flask equipped with a magnetic stir bar, sodium hydride (NaH) (1.756 g) (Caution H$_2$ gas is generated) was slowly added to a solution of 2-bromo-4-fluoro-6-methyl-phenol (15 g, 73.16 mmol) in DMF (35 mL) until hydrogen evolution ceased. This mixture was stirred for 30 minutes at room temperature. After this time, the diisopropyl germyl dichloride (6.286 g, 24.4 mmol) was added. The mixture was warmed to 55° C. and held at this temperature for 18 h. The reaction was removed from the glove box and quenched with saturated aqueous NH$_4$Cl (20 mL) and H$_2$O (8 mL). Et$_2$O (30 mL) was added and the phases were transferred to a separatory funnel and separated. The aqueous phase was further extracted with Et$_2$O (20 mL), and the combined organic extracts were washed with brine (10 mL). The organic layer was then dried (MgSO$_4$), filtered, and concentrated to dryness. The crude residue was dry loaded onto silica gel and then purified using flash chromatography (100 mL/min, pure hexanes with ethyl acetate ramping to 10% over 20 minutes) to afford a pale yellow oil as product. All clean fractions (some factions contained <10% of starting phenol) were combined, and the final product was left under vacuum on the Schlenk line overnight (Yield: 9 g, 62%).

$^1$H NMR (400 MHz, CDCl$_3$) δ 7.10 (dd, J=7.7, 3.0 Hz, 2H), 6.84 (ddd, J=8.8, 3.1, 0.8 Hz, 2H), 4.14 (s, 4H), 2.33 (s, 6H), 1.74 (hept, J=7.4 Hz, 2H), 1.35 (d, J=7.4 Hz, 12H); $^{19}$F NMR (376 MHz, CDCl$_3$) δ −118.03.

Example 8—Synthesis of Ligand Formula (v)

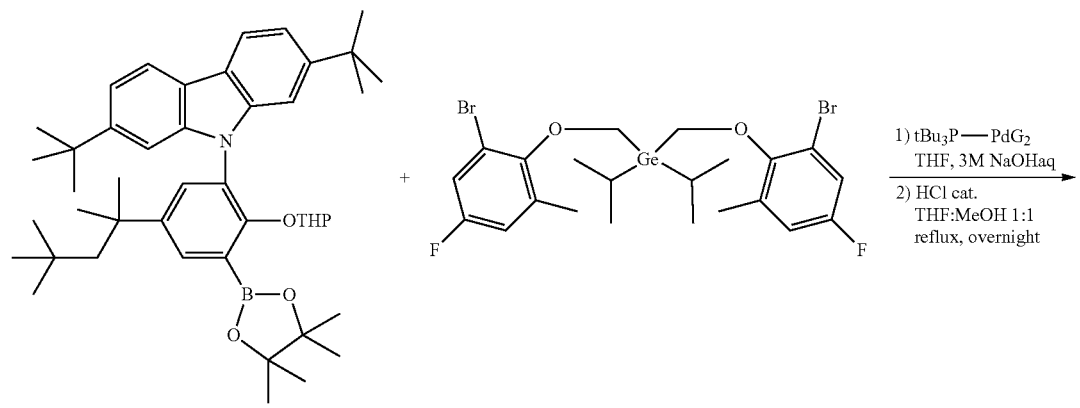

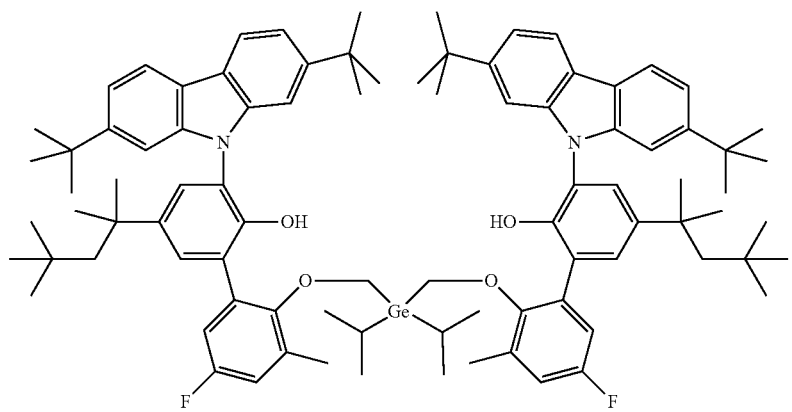

A 500 mL glass-bottle, equipped with a stir bar, was charged with 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole ( ) (29.0 g, 41.9 mmol), bis((2-bromo-4-fluoro-6-methylphenoxy)methyl)diisopropylgermane (6.00 g, 8.65 mmol, contains 10% 2-bromo-4-fluoro-2-methyl-phenol), and THF (80 mL). The solution was heated to 55° C. and, while stirring, was treated with chloro[(tri-tert-butylphosphine)-2-(2-aminobiphenyl)] palladium(II) (tBu$_3$P-PdG2) (199 mg, 0.346 mmol, 4 mol %). An aqueous solution of NaOH (17.3 mL, 51.9 mmol, 3M) was purged with nitrogen for 20 min, and then added to the THF solution. The reaction was stirred overnight at 55° C. The aqueous phase was separated and discarded and the remaining organic phase was diluted with diethyl ether and washed with brine twice. The solution was passed through a short plug of silica gel. The filtrate was dried on a rotary evaporator, dissolved in THF/MeOH (40 mL/40 mL), treated with HCl (2 mL), and stirred overnight at 70° C. The solution was dried under vacuum, and purified by C18 reverse-phase column chromatography (Yield: 6.5 g, 54%).

$^1$H NMR (400 MHz, CDCl$_3$) δ 8.01 (d, J=8.2 Hz, 4H), 7.42 (dd, J=25.5, 2.4 Hz, 4H), 7.32 (dd, J=8.2, 1.6 Hz, 4H), 7.17 (s, 4H), 6.87 (ddd, J=16.4, 8.8, 3.0 Hz, 4H), 6.18 (s, 2H), 3.79 (s, 4H), 2.12 (s, 6H), 1.71 (s, 6H), 1.56 (s, 4H), 1.38 (s, 12H), 1.31 (s, 36H), 0.83-0.73 (m, 30H); $^{19}$F NMR (376 MHz, CDCl$_3$) δ −119.02.

Example 9—Synthesis of Inventive Metal-Ligand Complex 6 (IMLC-6)

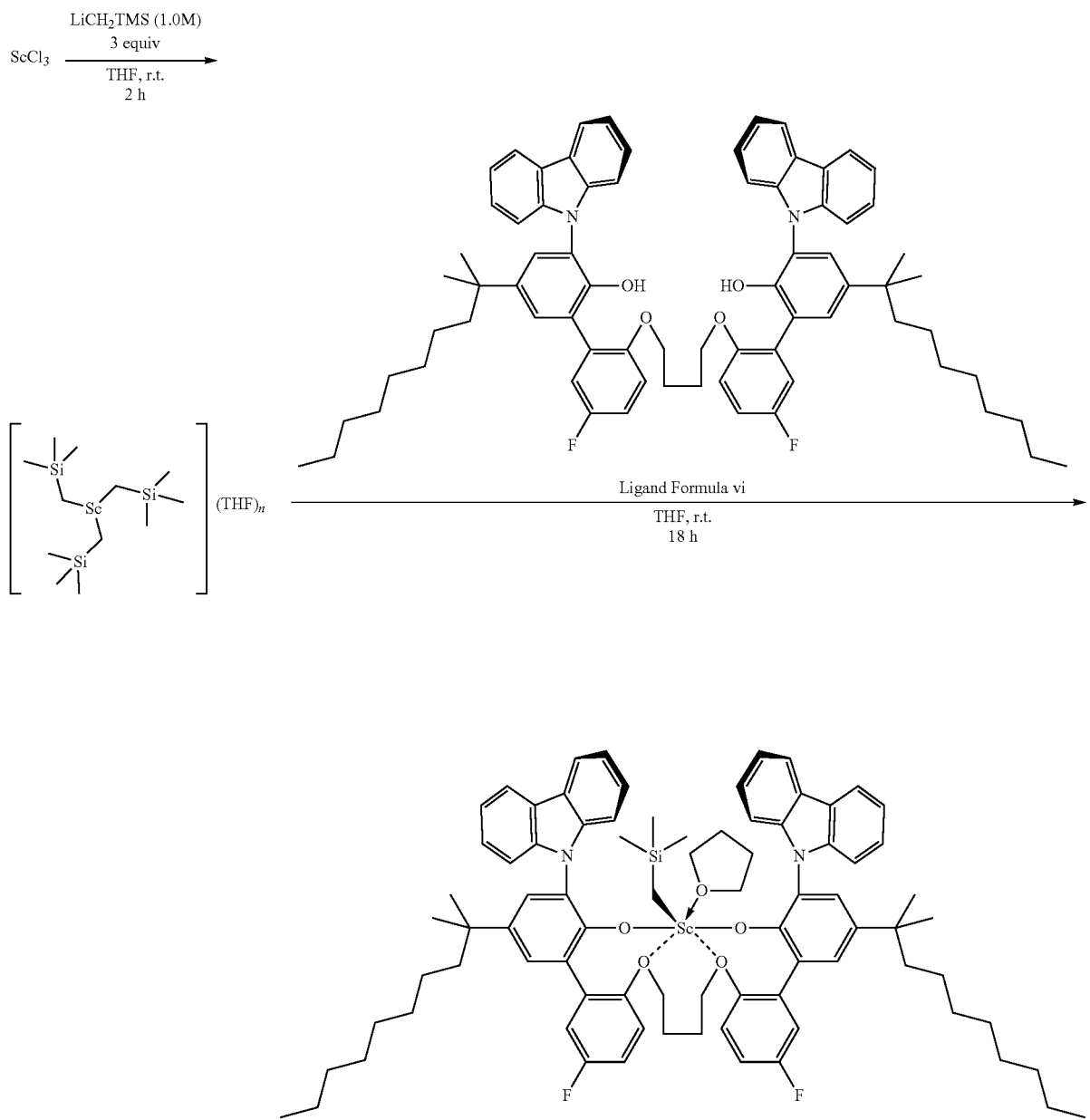

Inventive Metal-Ligand Complex 6 (IMLC-6)

Preparation of ligand formula vi detailed in WO2018170138A1. In a glovebox a 250 mL glass jar was charged with ScCl₃ (0.217 g, 1.44 mmol), THF (ca. 100 mL), and a magnetic stir bar. LiCH₂TMS (1.0 M in pentane, 4.4 mL, 4.4 mmol) was added slowly and then the mixture was allowed to stir at room temperature for 2 hours. Ligand formula vi (1.58 g, 1.44 mmol) was dissolved in THF and then slowly added to the jar and the contents were stirred at room temperature for 18 h. The solvent was then removed in vacuo and the product was extracted in pentane and passed over a fritten funnel. The filtrate was concentrated under reduced pressure to afford IMLC-6 as an off-white solid (1.28 g, 68% yield).

$^1$H NMR (400 MHz, Benzene-$d_6$) δ (Select peaks major product) 8.22 (d, J=7.6 Hz, 1H), 8.19 (d, J=7.7 Hz, 1H), 8.09 (d, J=8.2 Hz, 1H), 8.04 (d, J=8.2 Hz, 1H), 7.93 (d, J=7.9 Hz, 1H), 7.63 (d, J=7.9 Hz, 1H), 7.60-7.02 (overlapping, 18H), 6.75 (ddd, J=9.0, 7.3, 3.2 Hz, 1H), 6.45-6.38 (m, 1H), 5.59 (ddd, J=8.7, 4.9, 3.7 Hz, 1H), 4.92 (dd, J=8.9, 5.1 Hz, 1H), 4.85 (dd, J=9.1, 5.0 Hz, 1H), 4.42 (t, J=12.2 Hz, 1H), 3.73-3.61 (m, 2H), 3.30-3.17 (m, 2H), −0.27 (s, 10H), −1.72 (d, J=12.7 Hz, 1H), −2.23 (d, J=12.6 Hz, 1H).

$^{19}$F NMR (376 MHz, Benzene-$d_6$) δ −116.55, −118.23.

Example 10—Preparation of Ligand Formula (vii)—Synthesis of 4-(octyloxy) phenol (2)

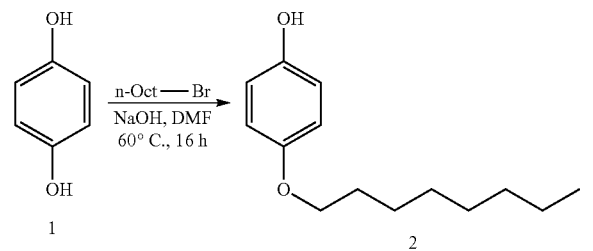

To a stirred solution of hydroquinone (1) (20 g, 0.181 mol) in DMF (100 mL) was added NaOH (6.67 g, 0.167 mol). 1-Bromooctane (n-Oct-Br) (26.1 mL, 0.150 mol) was then added dropwise to the flask at rt, and subsequently the reaction mixture was heated to 60° C., and stirred at this temperature for 12 h. After cooling to room temperature, the reaction mixture was poured into water (300 mL), and the aqueous phase was extracted with EtOAc (300 mL). The organic layer was washed with water (3×100 mL), dried over anhydrous Na₂SO₄, filtered then concentrated to dryness. The residue was purified by SiO₂ gel column chromatography. The product was eluted using 10% EtOAc in petroleum (pet) ether, which provided 15.5 g (46%) of 4-(octyloxy)phenol (2): $^1$H NMR (400 MHz, CDCl₃) δ 0.91 (t, J=6.92 Hz, 3H), 1.31-1.48 (m, 10H), 1.74-1.81 (m, 2H), 3.92 (t, J=6.60 Hz, 2H), 6.76-6.82 (m, 4H).

Example 11—Preparation of Ligand Formula (vii)—Synthesis of 2-iodo-4-(octyloxy) phenol (3)

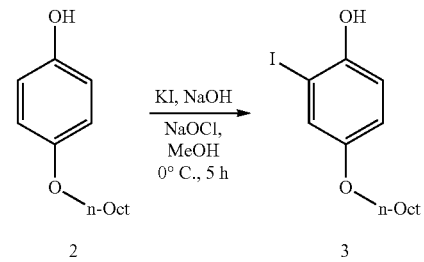

To a solution of 4-(octyloxy)phenol (2) (15.5 g, 0.069 mol) in MeOH (200 mL) was added potassium iodide (KI) (12.6 g, 0.076 mol). The reaction mixture was cooled to 0° C. NaOH (3.28 g, 0.082 mol) and 13% aqueous sodium hypochlorite (NaOCl) (39.9 mL, 0.069 mol) were added dropwise over a period of 3 h while maintaining a temperature of 0-3° C. The resulting mixture was stirred at 0-3° C. for 8 h. The mixture was neutralized using aqueous 1.5 normal (N) HCl, and the MeOH was removed under reduced pressure at 35° C. The aqueous layer was extracted with EtOAc (2×200 mL), and the combined organic layer was dried over anhydrous Na₂SO₄, filtered then concentrated to dryness. The resulting residue was purified by SiO₂ gel column chromatography using 10% EtOAc in pet ether to provide 5.2 g (22%) of 2-iodo-4-(octyloxy) phenol (3).

$^1$H NMR (400 MHz, CDCl₃) δ 0.90 (t, J=7.20 Hz, 3H), 1.27-1.46 (m, 10H), 1.71-1.77 (m, 2H), 3.88 (t, J=6.40 Hz, 2H), 4.90 (s, 1H), 6.83 (dd, J=2.80, 8.80 Hz, 1H), 6.91 (d, J=8.80 Hz, 1H), 7.19 (d, J=2.80 Hz, 1H);

LCMS: 347 (M−1).

Example 12—Preparation of Ligand Formula (vii)—Synthesis of 2-(2-iodo-4-(octyloxy)phenoxy) tetrahydro-2H-pyran (4)

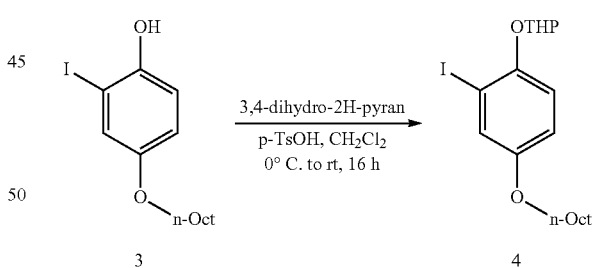

To a solution of 2-iodo-4-(octyloxy) phenol (3) (5.2 g, 0.014 mol) in methylene chloride (CH₂Cl₂) (50 mL) was added para-toluenesulfonic acid (p-TsOH) (0.026 g, 0.00014 mol). The stirred solution was cooled to 0° C. then 3,4-dihydro-2H-pyran (3.8 mL, 0.042 mol) was added drop wise. The resulting mixture warmed to rt then was stirred for 16 h. The reaction mixture was concentrated to dryness under reduced pressure. The residue was purified by neutral alumina column chromatography eluting with 2-3% EtOAc in pet ether to provide 5.1 g (84%) of 2-(2-iodo-4-(octyloxy) phenoxy)tetrahydro-2H-pyran (4).

$^1$H NMR (400 MHz, CDCl₃) δ 0.90 (t, J=7.20 Hz, 3H), 1.30-1.63 (m, 11H), 1.68-1.78 (m, 4H), 1.84-1.91 (m, 1H), 1.97-2.01 (m, 1H), 2.13-2.17 (m, 1H), 3.59-3.64 (m, 1H), 3.87-3.96 (m, 3H), 5.38 (s, 1H), 6.83 (dd, J=2.80, 8.80 Hz, 1H), 7.00 (d, J=8.80 Hz, 1H), 7.32 (d, J=2.80 Hz, 1H);

$^{13}$C NMR (100 MHz, CDCl$_3$) δ 14.1, 18.4, 22.7, 25.3, 26.0, 29.2, 29.3, 30.3, 31.8, 61.8, 68.7, 87.8, 97.5, 115.5, 116.3, 124.9, 149.9, 154.2.

Example 13—Preparation of Ligand Formula (vii)—Synthesis of 2,7-di-tert-butyl-9-(5-(octyloxy)-2-((tetrahydro-2H-pyran-2-yl)oxy)phenyl)-9H-carbazole (6)

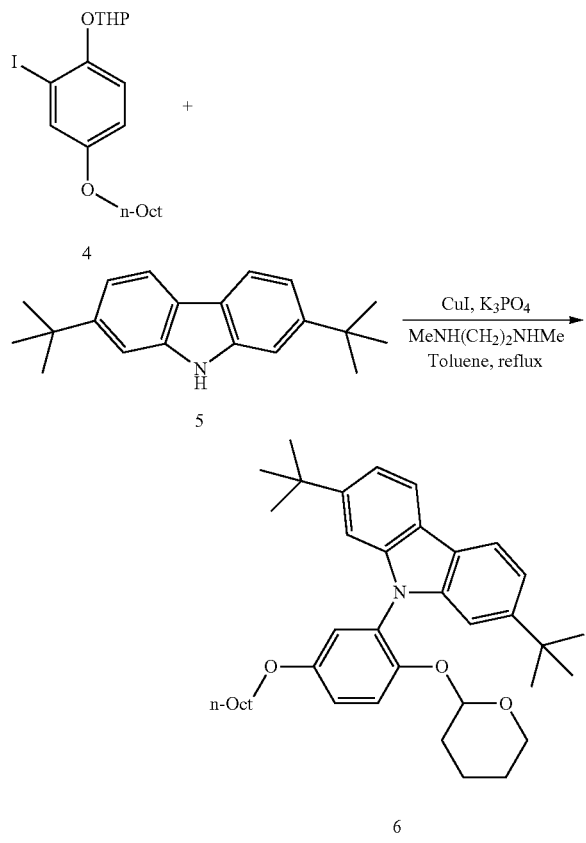

A 100 mL flask was charged with 2-(2-iodo-4-octoxy-phenoxy)tetrahydropyran (4) (2.45 g, 5.67 mmol), 2,7-ditert-butyl-9H-carbazole (5) (2.06 g, 7.37 mmol), copper iodide (CuI) (0.03 g, 0.17 mmol), diamine (0.12 ml, 1.19 mmol), and tribasic potassium phosphate (K$_3$PO$_4$) (3.01 g, 14.17 mmol), then toluene (22 mL) was added. The flask was fitted with a condenser, and the solution was stirred for 18 h at 135° C. (external temperature, reaction must be refluxing). There appeared to still be about 50% starting material remaining. Added additional CuI and diamine (same amounts as above), and continued reaction overnight. The reaction was still progressing. Added additional CuI (32 mg) and continued reaction overnight. The reaction was still progressing. Added additional CuI (32 mg) and continued reaction overnight.

The reaction was cooled to room temperature then filtered through a SiO$_2$ gel plug. The plug was washed with Et$_2$O (65 mL). The solvent was removed under reduced pressure. The residue was purified directly using SiO$_2$ gel column chromatography (15 g CELITE load cartridge, 80 g SiO$_2$, 60 mL/min, 0% hexanes to 20% hexanes/acetone). Material was not clean, so a second column was run. The residue was purified directly using reverse phase column chromatography (15 g CELITE load cartridge, 50 g C18, 0% THF to 10% THF/CH$_3$CN, then ramped to 95% THF/CH$_3$CN and hold for 5 minutes). The product 2,7-ditert-butyl-9-(5-octoxy-2-tetrahydropyran-2-yloxy-phenyl)carbazole (6) was obtained as an off white solid in 73% yield (2.4 g).

$^1$H NMR (400 MHz, CDCl$_3$) δ 7.97 (ddd, J=8.2, 1.6, 0.6 Hz, 2H), 7.39 (d, J=9.0 Hz, 1H), 7.29 (dd, J=8.2, 1.7 Hz, 2H), 7.24 (dd, J=1.7, 0.6 Hz, 1H), 7.17 (dd, J=1.7, 0.6 Hz, 1H), 7.04 (d, J=3.0 Hz, 1H), 7.00 (dd, J=9.0, 3.1 Hz, 1H), 5.08-4.94 (m, 1H), 3.94 (t, J=6.6 Hz, 2H), 3.69 (td, J=10.9, 2.9 Hz, 1H), 3.42 (dt, J=11.3, 3.7 Hz, 1H), 1.79 (p, J=6.7 Hz, 2H), 1.54-1.00 (m, 34H), 0.92-0.82 (m, 3H).

Example 14—Preparation of Ligand Formula (vii)—Synthesis of 2',2'''-(propane-1,3-diylbis(oxy))bis(3-(2,7-di-tert-butyl-9H-carbazol-9-yl)-5'-fluoro-3'-methyl-5-(octyloxy)-[1,1'-biphenyl]-2-ol) (8) (Ligand of Formula (vii))

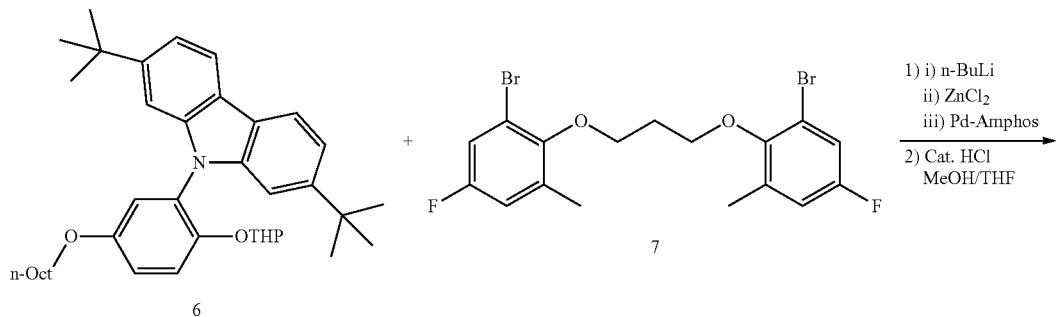

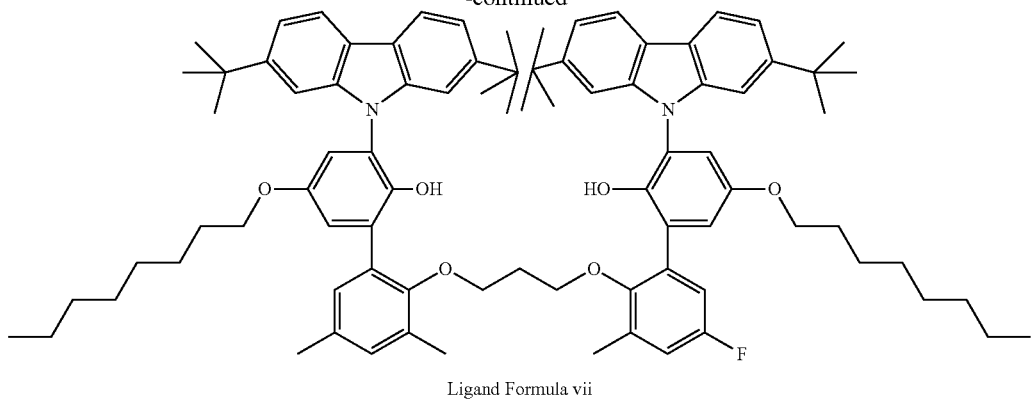

Ligand Formula vii

Preparation of ArZnX Solution from 6:

2.4M n-Butyllithium (n-BuLi) in hexanes (0.76 mL, 1.82 mmol) was added to a −35° C. THF (7 mL, dry and degassed) solution of 2,7-ditert-butyl-9-(5-octoxy-2-tetrahydropyran-2-yloxy-phenyl)carbazole (6) (1.01 g, 1.74 mmol) in a 40 mL vial in the glovebox. The solution was stirred for 1.5 h then recooled to −35° C. A solution of dichlorozinc (ZnCl$_2$) (0.23 g, 1.70 mmol) in THF (3 mL) was then added, and the resulting solution was stirred for 1 hour at rt.

Cross-Coupling:

A THF (3 mL) solution of dibromide 7 (0.34 g, 0.76 mmol) and Pd-Amphos (0.01 g, 0.03 mmol) was added to the above ArZnX solution prepared from 6. The reaction was warmed to 50° C., and held at this temperature for 18 hours. After this time the vial was removed from the glove box, and MeOH (5 mL) and conc. HCl (5 drops from a glass pipet) were added to the reaction mixture. This solution was stirred at room temperature for 6 hours. The solvent was removed under reduced pressure. The remaining crude residue was evaporated from MeOH (4×5 mL) to provide a brown solid. This solid was triturated with MeOH (10 mL), and the insoluble product was collected by filtration. The filter cake was washed with MeOH (2×4 mL). The solid in the filter cake was collected and dried under vacuum to provide 2-(2,7-ditert-butylcarbazol-9-yl)-6-[2-[3-[2-[3-(2,7-ditert-butylcarbazol-9-yl)-2-hydroxy-5-octoxy-phenyl]-4-fluoro-6-methyl-phenoxy]propoxy]-5-fluoro-3-methyl-phenyl]-4-octoxy-phenol (8) (0.675 g, yield: 69%) as a tan solid.

$^1$H NMR (400 MHz, CDCl$_3$) δ 7.99 (d, J=8.2 Hz, 4H), 7.29 (dd, J=8.2, 1.7 Hz, 4H), 7.08 (d, J=1.5 Hz, 4H), 7.04-6.95 (m, 6H), 6.87-6.80 (m, 2H), 6.06 (s, 2H), 3.88 (t, J=6.6 Hz, 4H), 3.65 (t, J=6.2 Hz, 4H), 2.03 (s, 6H), 1.83-1.64 (m, 6H), 1.48-1.22 (m, 56H), 0.94-0.79 (m, 6H); $^{19}$F NMR (376 MHz, CDCl$_3$) δ −118.36.

Example 15—Synthesis of Inventive Metal-Ligand Complex 7 (IMLC-7)

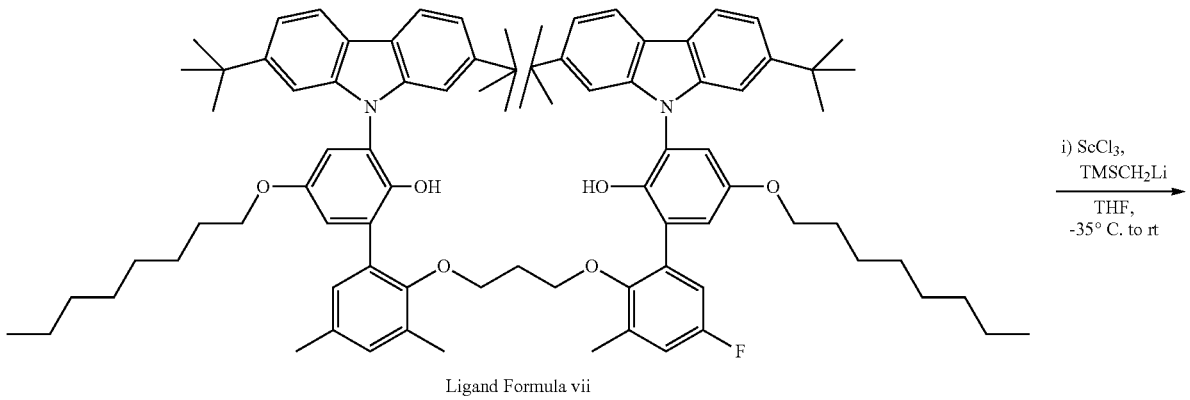

Ligand Formula vii i) ScCl$_3$,
TMSCH$_2$Li

THF,
−35° C. to rt

-continued

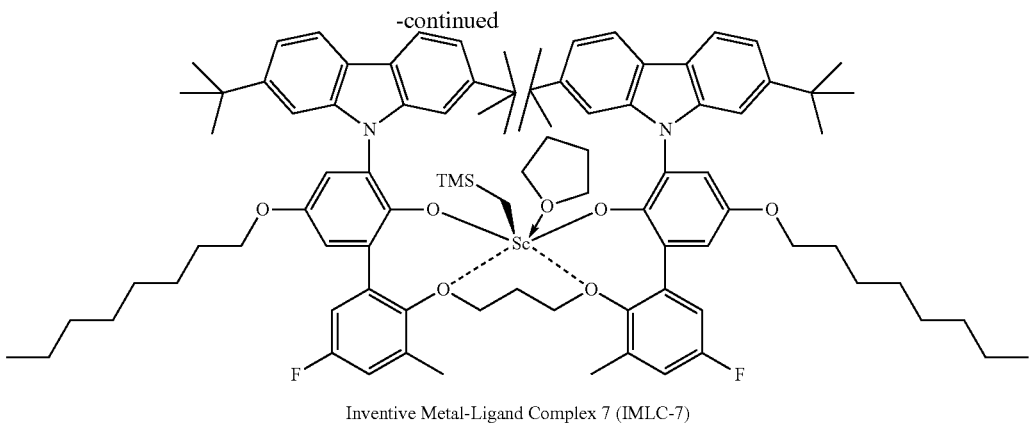

Inventive Metal-Ligand Complex 7 (IMLC-7)

A THF (6 mL) solution of ScCl₃ (0.02 g, 0.16 mmol) was cooled to −35° C. 1M TMSCH₂Li in pentane (1 M, 0.5 mL, 0.497 mmol) was added to the cold solution, which was then stirred at room temperature for 4 h then the slightly cloudy solution was cooled in a freezer (−35° C.) for 5 minutes. Ligand formula vii (0.2 g, 0.16 mmol) in THF (1 mL) was added dropwise. The solution was stirred overnight at rt. The solvent was removed by vacuum, then pentane (4 mL) was added to the residue. The mixture was stirred for 1 min, then the solvent was removed by vacuum. Pentane (5 mL) was added to the residue, and the mixture was filtered through a pad of CELITE. The CELITE pad was further extracted with pentane (5 mL). The combined pentane extracts were dried under vacuum to provide (IMLC-7) as an off-white solid (65%, 0.150 g).

¹H NMR (400 MHz, C₆D₆) (Select peaks) δ 8.20 (d, J=8.2 Hz, 1H), 8.15 (dd, J=8.2, 5.5 Hz, 2H), 8.07 (d, J=8.2 Hz, 1H), 7.82 (d, J=1.6 Hz, 1H), 7.65 (d, J=1.6 Hz, 1H), 7.60 (d, J=1.6 Hz, 1H), 7.50-7.40 (m, 3H), 7.35 (ddd, J=13.0, 8.3, 1.7 Hz, 2H), 7.14 (d, J=3.5 Hz, 1H), 7.10 (d, J=3.4 Hz, 1H), 7.02 (d, J=3.4 Hz, 1H), 6.99 (dd, J=9.3, 3.2 Hz, 1H), 6.95 (d, J=3.4 Hz, 1H), 6.81 (dd, J=9.0, 3.3 Hz, 1H), 6.29 (dd, J=8.2, 3.1 Hz, 1H), 6.14 (dd, J=8.3, 3.1 Hz, 1H), 3.91 (dd, J=10.7, 8.2 Hz, 1H), 3.68 (dt, J=9.1, 6.4 Hz, 1H), 3.55 (ddt, J=21.5, 9.1, 6.3 Hz, 2H), 3.49-3.33 (m, 4H), 3.31-3.24 (m, 1H), 3.23-3.12 (m, 3H), 1.50 (s, 9H), 1.42 (s, 9H), 1.31 (s, 9H), 1.26 (s, 9H), −0.30 (s, 9H), −0.70 (d, J=12.2 Hz, 1H), −1.33 (d, J=12.2 Hz, 1H).

¹⁹F NMR (376 MHz, C₆D₆) δ −115.84, −117.09.

Example 16—Synthesis of Inventive Metal-Ligand Complex 8 (IMLC-8)

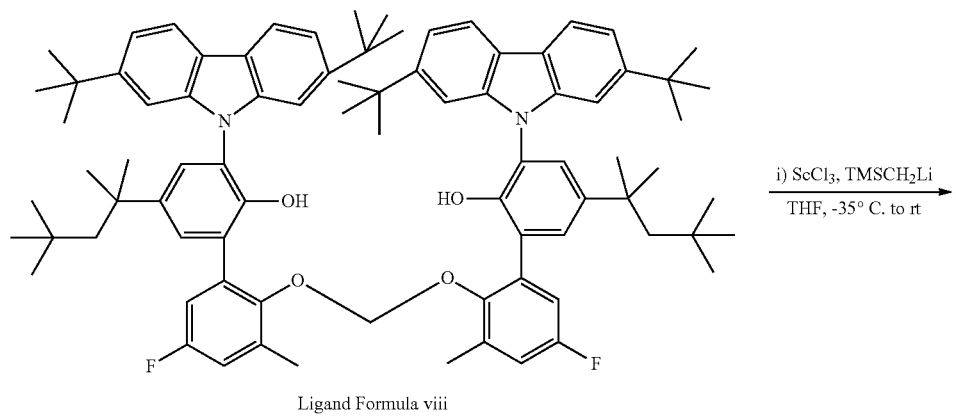

Ligand Formula viii

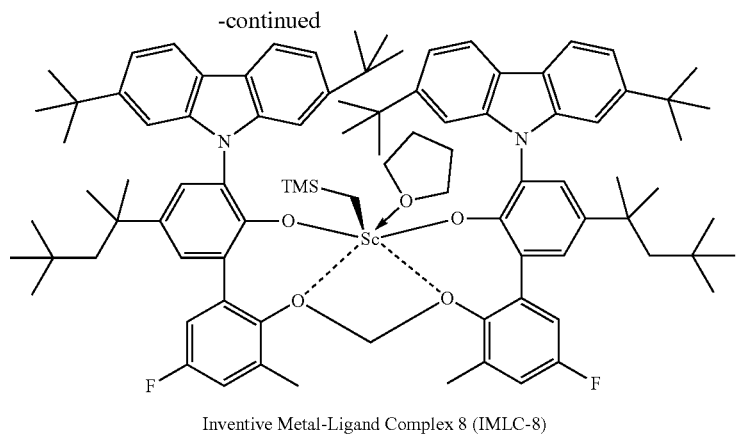

Inventive Metal-Ligand Complex 8 (IMLC-8)

Ligand formula viii prepared according to the procedures cited in WO2016089935A1.

A THF (6 mL) solution of ScCl$_3$ (0.0356 g, 0.235 mmol) was cooled to −35° C. TMSCH$_2$Li (1 M, 0.739 mL, 0.739 mmol) in pentane was added to the cold solution, which was stirred at rt for 4 h, then the slightly cloudy solution was cooled in a freezer (−35° C.) for 5 minutes. Ligand formula viii (0.275 g, 0.224 mmol) in THF (1 mL) was added dropwise to the cold solution. The reaction mixture was stirred overnight at rt. The solvent was removed by vacuum, then pentane (4 mL) was added to the residue. The mixture was stirred for 1 min, then the solvent was removed by vacuum. Pentane (10 mL) was added to the residue, and the mixture was filtered through a pad of CELITE. The CELITE pad was further extracted with pentane (2×8 mL). The combined pentane extracts were dried under vacuum to provide an off-white solid. Pentane (5 mL) was added to the solid, and the solution was placed in a freezer (−35° C.). After a time of 72 h, the pentane layer was removed using a pipet. The remaining white solid was dried under vacuum to provide (IMLC-8) as a white solid (55%, 0.175 g).

$^1$H NMR (400 MHz, C$_6$D6) (Select peaks) δ 8.01 (d, J=8.2 Hz, 1H), 7.93 (dd, J=8.2, 4.7 Hz, 2H), 7.86 (d, J=8.2 Hz, 1H), 7.73 (d, J=1.6 Hz, 1H), 7.47 (d, J=2.6 Hz, 1H), 7.40 (d, J=2.6 Hz, 1H), 7.37 (dd, J=8.2, 1.6 Hz, 1H), 7.32-7.17 (m, 7H), 7.13-7.04 (m, 3H), 6.76 (dd, J=8.6, 3.1 Hz, 1H), 6.68 (dd, J=8.2, 3.1 Hz, 1H), 5.37 (d, J=2.0 Hz, 1H), 4.60 (d, J=2.0 Hz, 1H), 2.64 (s, 2H), 2.48 (s, 2H), 2.28 (s, 3H), 1.86 (s, 3H), 1.59 (s, 9H), 1.34 (s, 3H), 1.29 (s, 9H), 1.23 (s, 9H), 1.17 (s, 3H), 1.09 (d, J=1.2 Hz, 9H), 0.92 (s, 9H), 0.84 (s, 9H), −0.51 (d, J=1.1 Hz, 9H), −1.17 (d, J=12.4 Hz, 1H), −1.44 (d, J=12.4 Hz, 1H).

$^{19}$F NMR (376 MHz, C$_6$D$_6$) δ −114.87, −117.57.

Example 17—Synthesis of Inventive Metal-Ligand Complex 9 (IMLC-9)

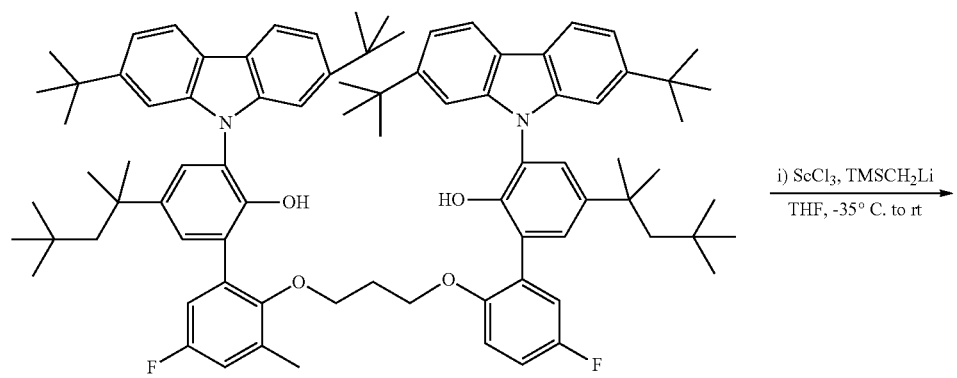

Ligand Formula ix

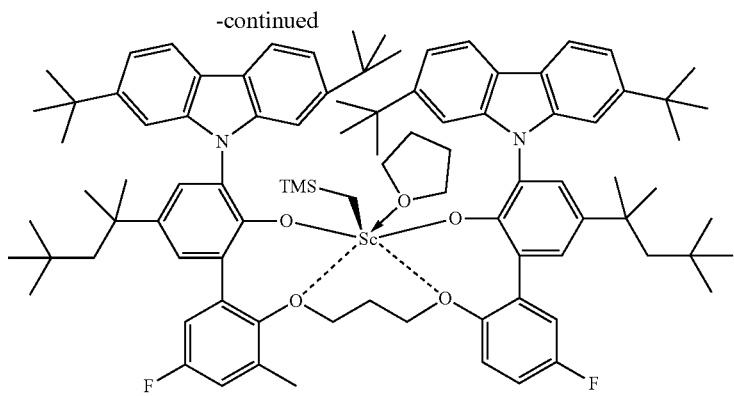

Inventive Metal-Ligand Complex 9 (IMLC-9)

Preparation of ligand formula ix detailed in WO2014105411 A1.

A THF (8 mL) solution of ScCl₃ (0.0448 g, 0.296 mmol) was cooled to −35° C. TMSCH₂Li (1 M, 0.902 mL, 0.902 mmol) in pentane was added to the cold solution, which was stirred at room temperature for 4 h, then the slightly cloudy solution was cooled in a freezer (−35° C.) for 5 minutes. Ligand formula ix (0.350 g, 0.282 mmol) in THF (1 mL) was added dropwise to the cold solution. The reaction mixture was stirred overnight at rt. The solvent was removed by vacuum, then pentane (10 mL) was added, and the mixture was filtered through a pad of CELITE. The CELITE pad was further extracted with pentane (2×4 mL). A new vial was used then the CELITE pad was extracted with toluene (2×8 mL). The combined toluene extracts were dried under vacuum to provide an off-white semi-solid. Pentane (6 mL) was added to the semi-solid, and the material was triturated to provide a white powder. The pentane layer was removed using a pipet. The solid was dried under vacuum to provide (IMLC-9) as a white solid (57%, 0.230 g).

¹H NMR (400 MHz, C₆D₆) (Select peaks) δ 8.22 (d, J=8.2 Hz, 1H), 8.17 (d, J=8.2 Hz, 1H), 8.13 (d, J=8.2 Hz, 1H), 8.02 (d, J=8.2 Hz, 1H), 7.68 (d, J=1.6 Hz, 1H), 7.59 (d, J=1.6 Hz, 1H), 7.46-7.29 (m, 10H), 7.21 (dt, J=9.1, 2.8 Hz, 2H), 6.37 (dd, J=8.5, 3.1 Hz, 1H), 6.28 (ddd, J=8.8, 7.3, 3.2 Hz, 1H), 5.80 (dd, J=8.8, 5.2 Hz, 1H), 4.13 (t, J=9.6 Hz, 1H), 3.76 (ddd, J=9.5, 6.4, 3.3 Hz, 1H), 3.65 (td, J=8.7, 3.3 Hz, 1H), 3.60-3.51 (m, 1H), 3.12 (d, J=7.6 Hz, 2H), 3.03 (d, J=7.9 Hz, 2H), 1.47 (s, 9H), 1.37 (s, 9H), 1.26 (s, 9H), 1.25 (s, 9H), 1.16 (d, J=5.4 Hz, 12H), 0.84 (s, 9H), 0.79 (s, 9H), −0.26 (s, 9H), −0.64 (d, J=12.7 Hz, 1H), −1.60 (d, J=12.7 Hz, 1H).

¹⁹F NMR (376 MHz, C₆D₆) δ −115.93, −116.71.

Example 18—Synthesis of Inventive Metal-Ligand Complex 10 (IMLC-10)

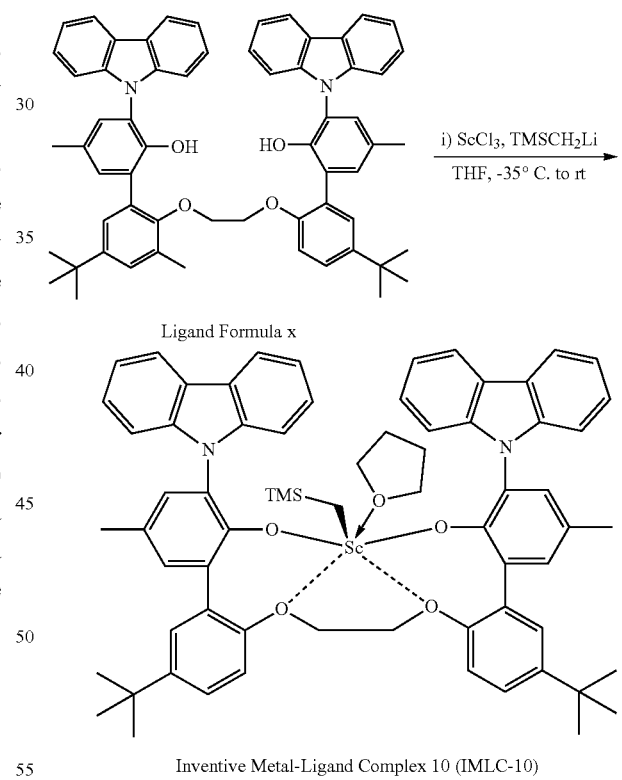

Ligand Formula x

Inventive Metal-Ligand Complex 10 (IMLC-10)

Ligand formula x prepared according to the procedures cited in U.S. Pat. No. 9,522,855B2.

A THF (8 mL) solution of ScCl₃ (0.0640 g, 0.423 mmol) was cooled to −35° C. TMSCH₂Li (1 M, 1.29 mL, 1.29 mmol) in pentane was added to the cold solution, which was then stirred at rt for 4 h, then the slightly cloudy solution was cooled in a freezer (−35° C.) for 5 minutes. Ligand formula x (0.350 g, 0.403 mmol) in THF (1 mL) was added dropwise. The solution was stirred overnight at room temperature. The solvent was removed by vacuum, and then pentane (4 mL) was added to the residue. The mixture was stirred for 1 min, and then the solvent was removed by vacuum. Pentane (10 mL) was added to the residue, and the mixture was filtered through a pad of CELITE. The CELITE pad was further extracted with pentane (2×8 mL). A new vial was used, and the CELITE pad was then extracted with toluene (2×10 mL). The combined toluene extracts were dried under vacuum to provide a slightly yellow oil. Pentane (6 mL) was added and the oil was triturated to provide a white powder. The pentane layer was removed using a pipet. Again, pentane (6 mL) was added to the white powder then the pentane layer was removed using a pipet. The solid was dissolved in a minimal amount of toluene (about 1.5 mL) then this was layered with pentane (about 5 mL). The solution was placed in a freezer (−35° C.) for 24 h. The solvent was removed from the precipitate using a pipet, leaving behind the (IMLC-10) (630%, 0.270 g) as a white solid.

$^1$H NMR (400 MHz, $C_6D6$) (Select peaks for major product) δ 8.39-8.28 (m, 1H), 8.15 (ddt, J=8.6, 7.7, 1.0 Hz, 2H), 7.93 (dt, J=7.8, 1.0 Hz, 1H), 7.42 (d, J=2.6 Hz, 1H), 6.60 (dd, J=8.4, 2.6 Hz, 1H), 5.90 (d, J=8.4 Hz, 1H), 5.45 (d, J=8.5 Hz, 1H), 4.12 (ddd, J=10.7, 8.9, 3.4 Hz, 1H), 4.04 (ddd, J=10.7, 9.0, 3.3 Hz, 1H), 3.01 (ddd, J=8.8, 3.4, 1.7 Hz, 1H), 2.76 (ddd, J=9.1, 3.4, 1.7 Hz, 1H), 2.73-2.56 (m, 4H), 2.27 (s, 3H), 2.17 (s, 3H), 1.32 (s, 9H), 1.17 (s, 9H), 0.73-0.62 (m, 4H), −0.25 (s, 9H), −1.84 (d, J=12.4 Hz, 1H), −2.36 (d, J=12.4 Hz, 1H).

Example 19—Synthesis of Inventive Metal-Ligand Complex 11 (IMLC-11)

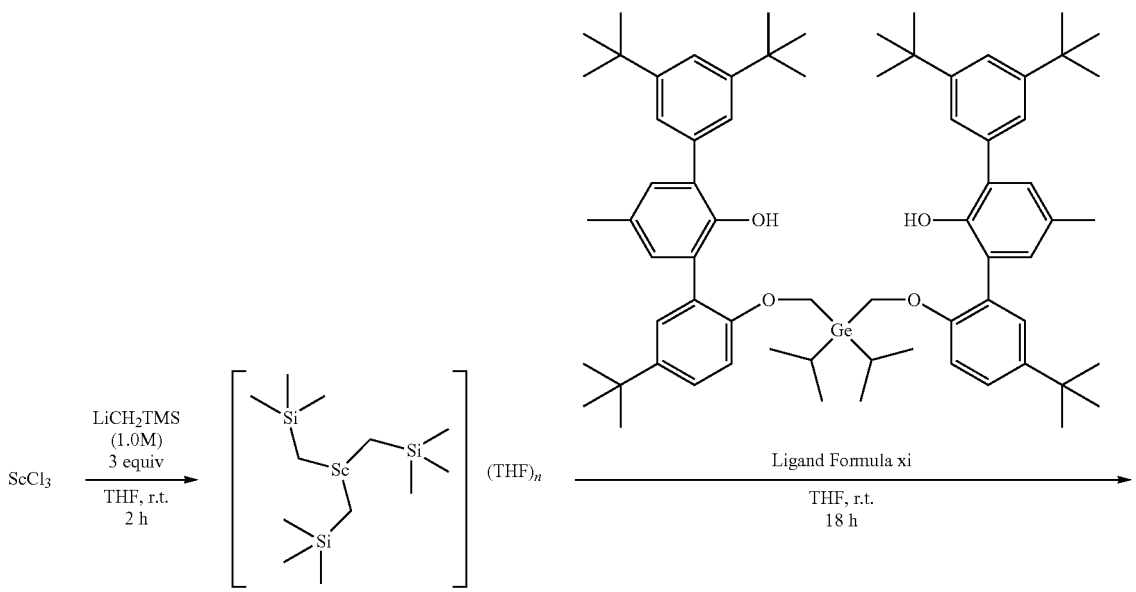

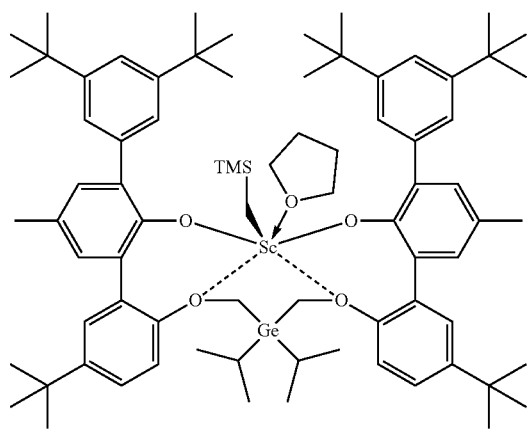

Inventive Metal-Ligand Complex 11 (IMLC-11)

Preparation of ligand formula xi detailed in WO2018183056 A1.

In a glovebox, a glass jar was charged with $ScCl_3$ (0.101 g, 0.669 mmol), THF (ca. 100 mL), and a magnetic stir bar. To this $LiCH_2TMS$ (1.0 M in pentane, 2.0 mL, 2.0 mmol) was slowly added and the resulting mixture was allowed to stir at room temperature for 2 hours. Ligand formula xi (0.718 g, 0.669 mmol) was dissolved in THF and then added and the mixture continued to be stirred for 18 h. The solvent was removed in vacuo and then the product was extracted in hexanes and passed over a fritten funnel. The filtrate was dried in vacuo to afford IMLC-11 as a white solid (0.682 g, 80%).

g, 79.9%).

Example 20—Synthesis of Inventive Metal-Ligand Complex 12 (IMLC-12)

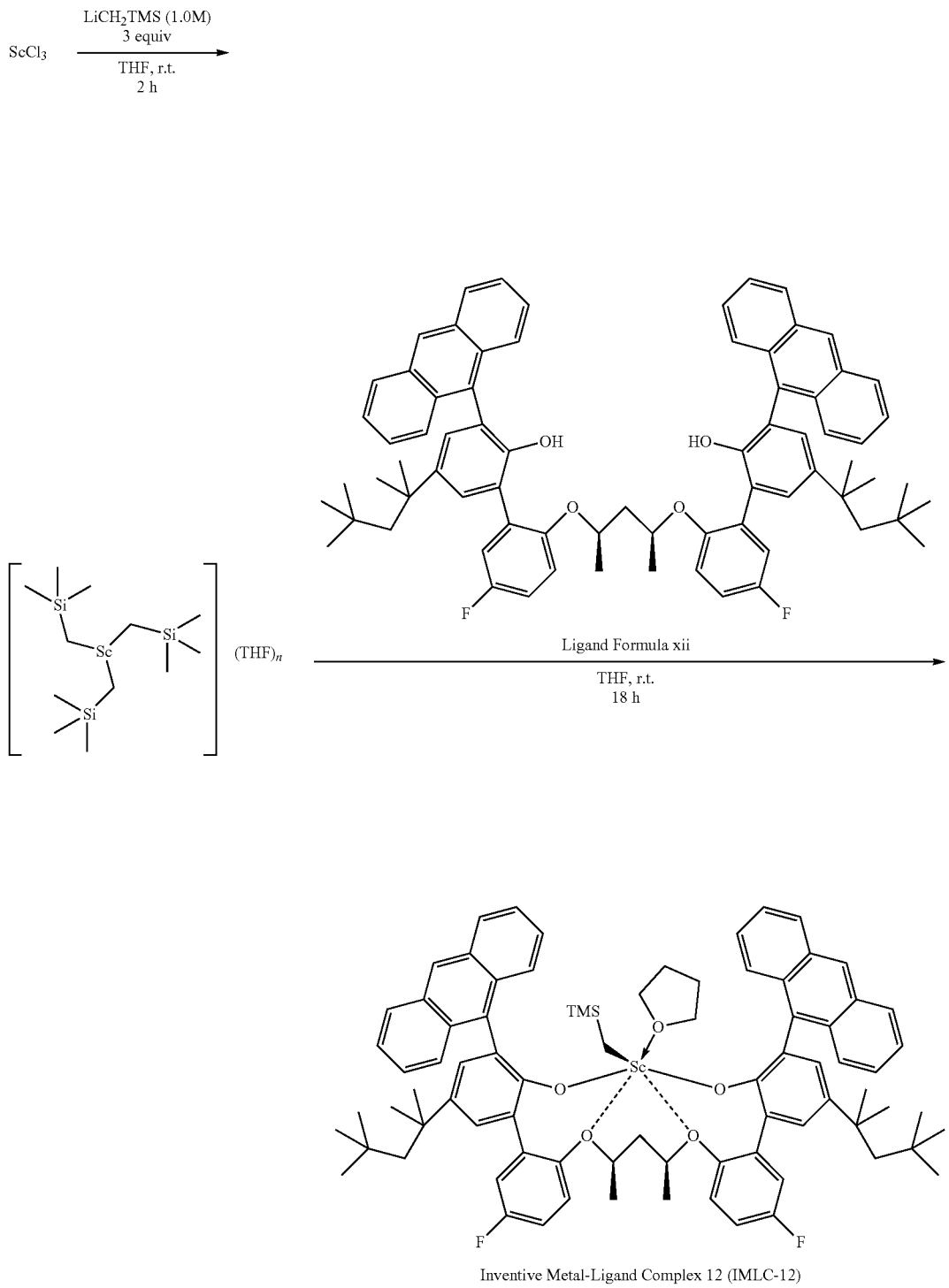

Inventive Metal-Ligand Complex 12 (IMLC-12)

Preparation of ligand formula xii detailed in WO2017058858 A1.

A 40 mL oven-dried vial charged with ScCl$_3$ (22 mg, 0.14 mmol), THF (5 mL), and a stir bar was placed in the freezer (−30° C.) for 20 min. While stirring, the solution was treated with LiCH$_2$TMS (460 μL, 0.46 mmol, 1 M) and allowed to stir for 4 hrs. Once complete, the reaction was treated (dropwise) with a cooled (−30° C.) solution of Ligand formula xii (150 mg, 0.14 mmol), and THF (2 mL), and stirred for 18 h. The volatiles were removed under vacuum, and the solution was treated with pentane (10 mL), the solution was filtered through Celite, and the volatiles were removed under vacuum to provide IMLC-12 (Yield: 100 mg, 59%).

Example 21—Synthesis of Inventive Metal-Ligand Complex 13 (IMLC-13)

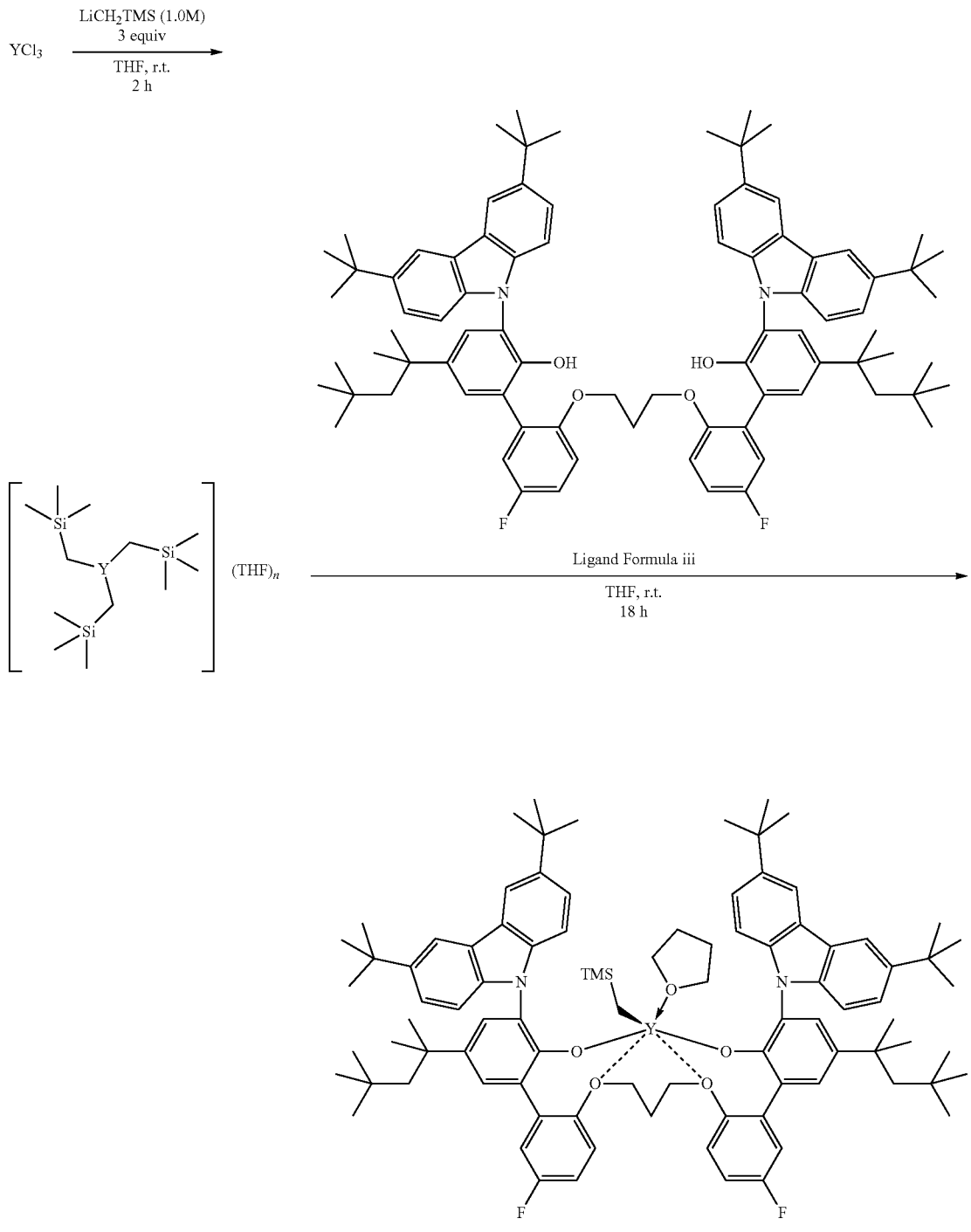

Inventive Metal-Ligand Complex 13 (IMLC-13)

In a glove box, a 250 mL glass jar was charged with YCl$_3$ (0.069 g, 0.35 mmol) and THF (ca. 50 mL). To this stirring mixture LiCH$_2$TMS (1.0 M in hexanes, 1.1 mL, 1.1 mmol) was added and the mixture was stirred for 2 h. Ligand formula iii (0.434 g, 0.353 mmol) was dissolved in THF and then slowly added to the mixture, producing a yellow-colored mixture. The mixture was allowed to stir at room temperature for 18 h and then the solvent was removed in vacuo, affording a yellow solid. The product was extracted in hexanes and then passed through a fritten funnel. The yellow eluent was collected and dried in vacuo to afford IMLC-13 as a yellow solid (0.122 g, 23% yield).

$^1$H NMR (400 MHz, Benzene-d$_6$) (Select peaks) δ 8.57 (dd, J=23.0, 1.9 Hz, 2H), 8.48 (m, 1H), 8.24 (d, J=1.7 Hz, 1H), 7.69 (m, 1H), 7.60 (m, 1H), 7.54-7.49 (m, 2H), 7.33 (d, J=8.6 Hz, 1H), 7.12 (dd, J=9.0, 3.1 Hz, 2H), 6.88-6.77 (m, 1H), 6.46-6.42 (m, 1H), 3.99 (ddd, J=10.0, 6.5, 3.0 Hz, 1H), 3.69-3.65 (m, 1H), 1.52 (s, 9H), 1.485 (s, 9H), 1.479 (s, 9H), 0.86 (s, 9H), 0.83 (s, 9H), −0.15 (s, 9H), −1.88 (dd, J=12.1, 3.6 Hz, 1H), −2.32 (dd, J=12.1, 3.9 Hz, 1H).

$^{19}$F NMR (376 MHz, Benzene-d$_6$) δ −114.42, −116.71.

Example 22—Synthesis of Inventive Metal-Ligand Complex 14 (IMLC-14)

In a glove box, a 250 mL glass jar was charged with YCl$_3$ (0.159 g, 0.814 mmol) and THF (ca. 50 mL). To this stirring mixture LiCH$_2$TMS (1.0 M in hexanes, 2.5 mL, 2.5 mmol) was added and the mixture was stirred for 2 h. Ligand formula ii (1.02 g, 0.814 mmol) was dissolved in THF and then slowly added to the mixture, producing a yellow-colored mixture. The mixture was allowed to stir at room temperature for 18 h and then the solvent was removed in vacuo, affording a yellow solid. The product was extracted in hexanes and then passed through a fritten funnel. The yellow eluent was collected and dried in vacuo to afford IMLC-14 as a yellow solid (0.877 g, 78% yield).

$^1$H NMR (400 MHz, Benzene-d$_6$) (Select peaks or major product) δ 8.24 (d, J=8.3 Hz, 1H), 8.18 (d, J=8.3 Hz, 1H), 8.17 (d, J=8.8 Hz, 1H), 8.05 (d, J=8.2 Hz, 1H), 8.03 (d, J=8.2 Hz, 1H), 7.90 (d, J=8.2 Hz, 1H), 7.74 (dd, J=12.1, 1.6 Hz, 1H), 7.71 (d, J=1.7 Hz, 1H), 7.55-6.98 (m, 8H), 6.94 (dd, J=8.9, 3.2 Hz, 1H), 6.68 (dd, J=8.7, 3.1 Hz, 1H), 6.37 (dd, J=8.5, 3.1 Hz, 1H), 6.21 (dd, J=8.5, 3.2 Hz, 1H), 1.57 (s, 9H), 1.54 (s, 9H), 1.25 (s, 9H), 1.24 (s, 9H), 0.87 (s, 9H), 0.83 (s, 9H), −0.31 (s, 9H), −1.47 (dd, J=11.4, 3.5 Hz, 1H), −1.72 (dd, J=11.3, 3.7 Hz, 1H).

$^{19}$F NMR (376 MHz, Benzene-d$_6$) δ −114.37, −116.13.

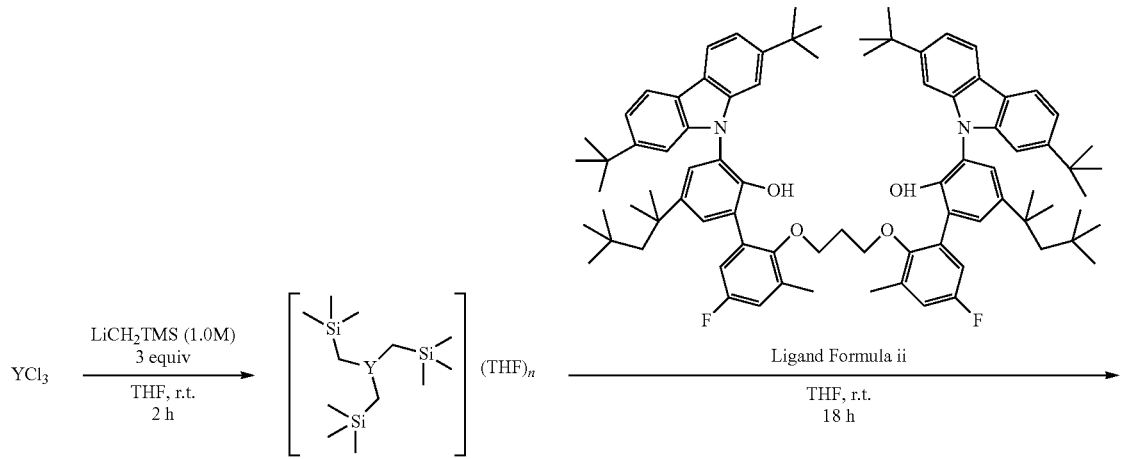

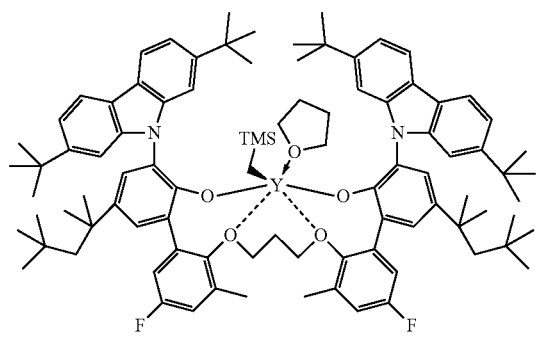

Inventive Metal-Ligand Complex 14 (IMLC-14)

Example 23—Synthesis of Inventive Metal-Ligand Complex 15 (IMLC-15)

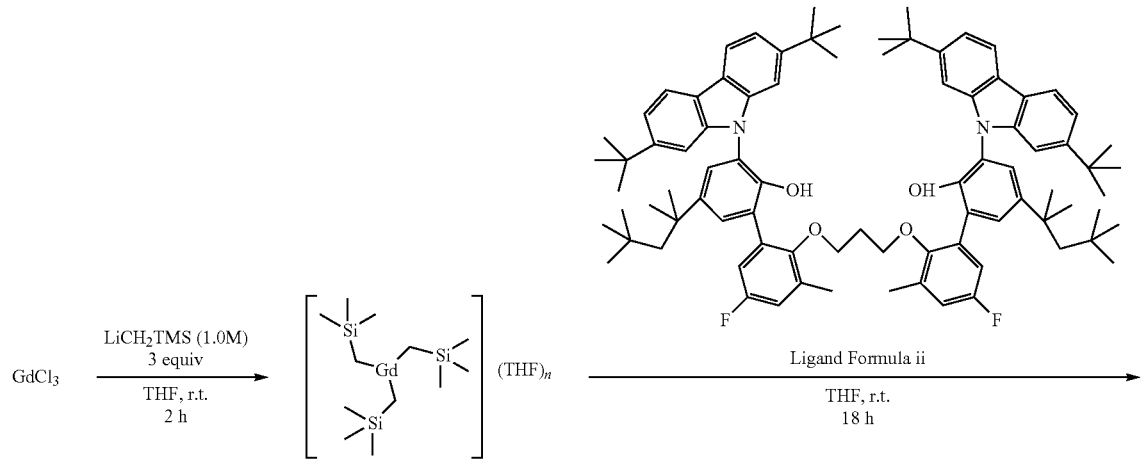

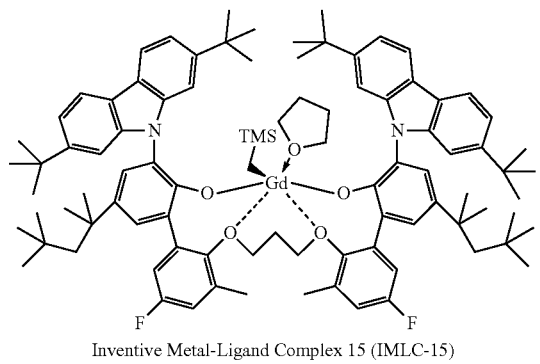

Inventive Metal-Ligand Complex 15 (IMLC-15)

In a glove box, a 250 mL glass jar was charged with GdCl₃ (0.428 g, 1.62 mmol) and THF (ca. 100 mL). To this suspension was added LiCH₂TMS (1.0 M in hexanes, 5.0 mL, 5.0 mmol). The mixture was stirred for 2 h at room temperature. Then ligand formula ii (2.02 g, 1.62 mmol) was added to give a yellow mixture, which was then allowed to stir at room temperature for 18 h. The solvent was then removed under reduced pressure and then the resulting solid was taken up in hexanes and filtered. The filtrate was concentrated in vacuo to afford IMLC-15 as a yellow solid (0.526 g, 210%). IMLC-15 is a paramagnetic compound and the signals of the $^1$H and $^{19}$F NMR spectra are broad and unresolved.

Example 24—Synthesis of Inventive Metal-Ligand Complex 16 (IMLC-16)

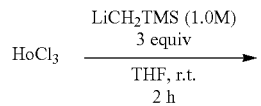

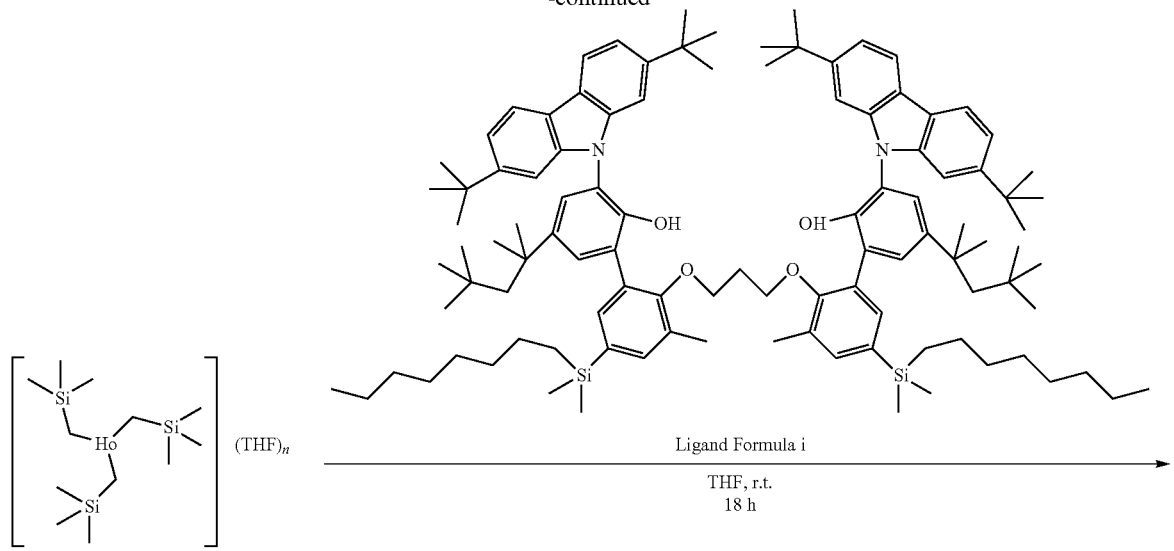

Ligand Formula i

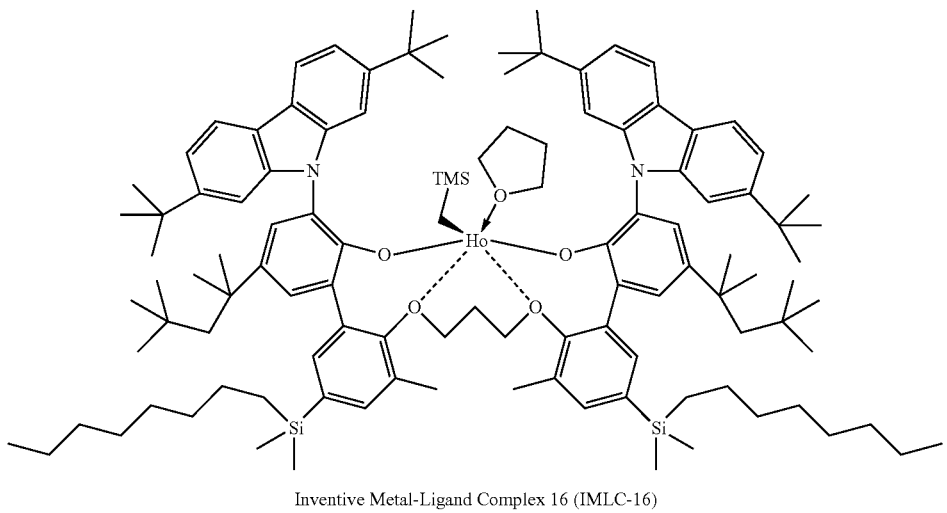

Inventive Metal-Ligand Complex 16 (IMLC-16)

In a glove box, a 250 mL glass jar was charged with HoCl₃ (0.394 g, 1.45 mmol) and THF (ca. 100 mL). The HoCl₃ dissolved in the THF to afford a light-yellow solution. Then LiCH₂TMS (1.0 M in hexanes, 4.5 mL, 4.5 mmol) was added and the mixture and allowed to stir for 2 h before ligand formula i (2.26 g, 1.45 mmol), which had been dissolved in THF, was slowly added. The resulting mixture was allowed to stir at room temperature for 18 h and then the THF was removed in vacuo. The residue was taken up in hexanes and filtered. The filtrate was collected and dried in vacuo to give IMLC-16 as a yellow solid (1.32 g, 66%). IMLC-16 is a paramagnetic compound and the signals of the $^1$H and $^{19}$F NMR spectra are broad and unresolved.

Example 25 Synthesis of Inventive Metal-Ligand Complex 17 (IMLC-17)

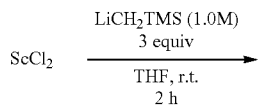

-continued

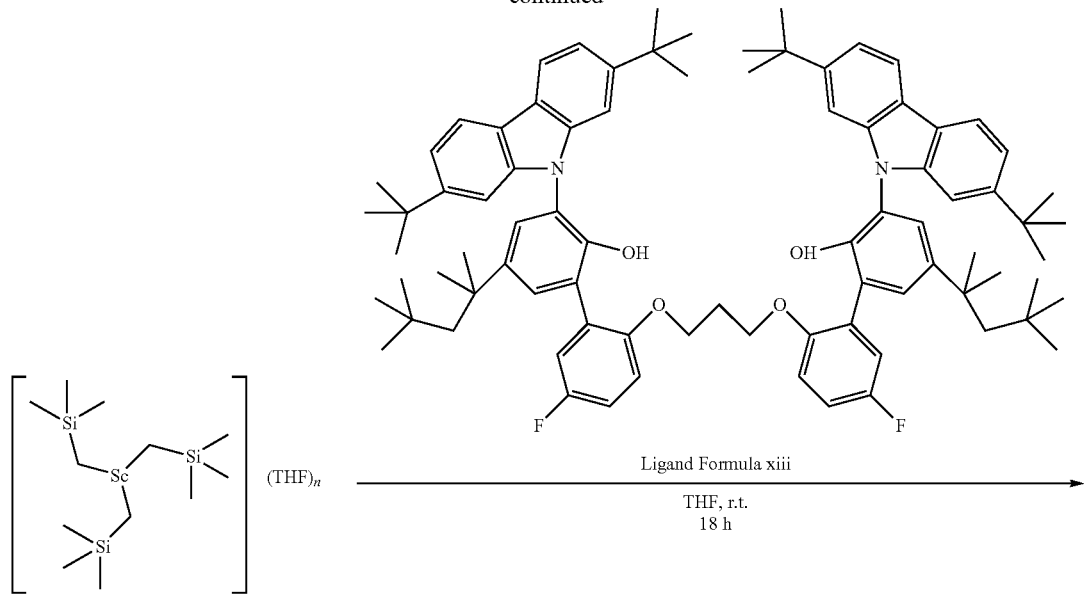

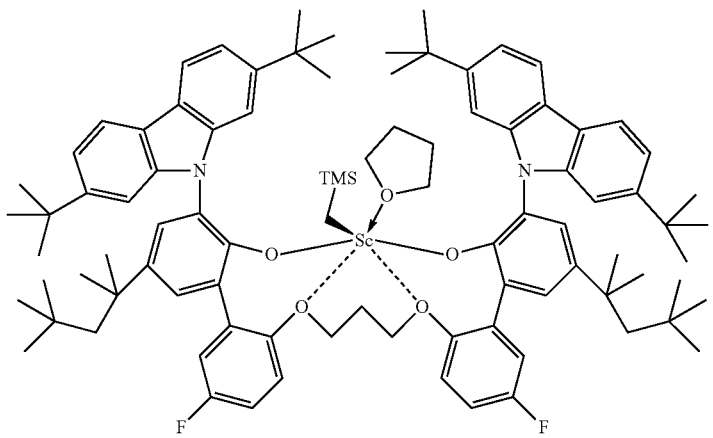

Inventive Metal-Ligand Complex 17 (IMLC-17)

In a glove box, a 40 mL glass vial was charged with ScCl$_3$ (0.17 g, 0.11 mmol) and THF (ca. 10 mL). Then LiCH$_2$TMS (1.0 M in hexanes, 0.34 mL, 0.34 mmol) was added and the mixture and allowed to stir for 2 h before ligand formula xiii (1.38 g, 0.113 mmol), which had been dissolved in THF, was slowly added. The resulting mixture was allowed to stir at room temperature for 18 h and then the THF was removed in vacuo. The residue was taken up in hexanes and filtered. The filtrate was collected and dried in vacuo to give IMLC-17 as a solid (0.100 g, 62%).

$^1$H NMR (400 MHz, Benzene-d$_6$) δ (major species, selected signals) 8.24-7.98 (m, 8H), 7.65 (d, J=1.7 Hz, 1H), 7.60 (d, J=1.8 Hz, 1H), 7.57 (d, J=2.7 Hz, 1H), 7.54-7.23 (m, 5H), 7.19-7.04 (m, 1H), 6.97-6.93 (m, 1H), 5.03 (dd, J=8.9, 5.1 Hz, 1H), 4.82 (dd, J=8.9, 5.1 Hz, 1H), 4.37 (t, J=9.9 Hz, 1H), 3.89-3.81 (m, 1H), 3.80-3.72 (m, 1H), 3.73-3.65 (m, 1H), 3.65-3.54 (m, 2H), 2.85 (t, J=6.1 Hz, 2H), 1.35 (s, 9H), 1.30 (s, 9H), 1.27 (s, 9H), 1.20 (s, 9H), 0.84 (s, 9H), 0.81 (s, 9H), −0.27 (s, 9H), −1.47 (d, J=12.9 Hz, 1H), −2.21 (d, J=13.0 Hz, 1H); (minor species, selected signals) 6.57-6.46 (m, 2H), 6.29 (td, J=8.3, 3.2 Hz, 1H), 6.06 (dd, J=8.9, 4.9 Hz, 1H), 5.90 (dd, J=9.0, 4.7 Hz, 1H), 1.55 (s, 9H), 1.48 (s, 9H), 1.46 (s, 9H), 1.17 (s, 9H), 0.85 (s, 9H), 0.74 (s, 9H), −0.21 (s, 6H), −1.11 (d, J=11.5 Hz, 1H), −1.37 (d, J=11.5 Hz, 1H).

$^{19}$F{$^1$H} NMR (376 MHz, Benzene-d$_6$) δ (major species) −115.43 (s, 1F), −116.90 (s, 1F); (minor species) −116.33 (s, 1F), −119.99 (s, 1F).

Example 26—Preparation of 3'-(2,7-di-tert-butyl-9H-carbazol-9-yl)-5-fluoro-2'-((tetrahydro-2H-pyran-2-yl)oxy)-5'-(2,4,4-trimethylpentan-2-yl)-[1,1'-biphenyl]-2-ol (xiii-c)

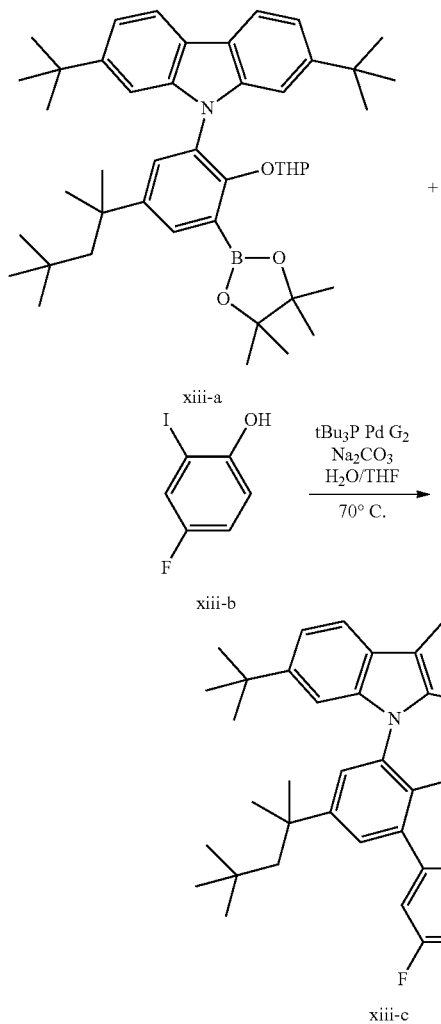

A three-necked round bottom flask was charged with 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (xiii-a) (3.0612 g, 4.4121 mmol), 2-iodo-4-fluorophenol (xiii-b) (1.0001 g, 4.2021 mmol), sodium carbonate (1.3368 g, 12.6125 mmol), water (4.4 mL), and THF (6.8 mL). The reaction mixture was placed under a nitrogen atmosphere, then a solution of chloro(tri-tert-butylphosphine)(2'-amino-1,1'-biphenyl-2-yl)palladium (II) (tBu₃P Pd G2) (0.0470 g, 0.0917 mmol) in THF (2.3 mL) was added via syringe. The reaction was heated at reflux (70° C.) for 1.5 h, after which point the contents of the flask were allowed to cool and water was added to dissolve the remaining solids. An extraction with ethyl acetate was performed and then the organic phase was washed with brine, dried over magnesium sulfate, and filtered. Solvent was removed under reduced pressure to afford a brown solid, which was taken up in chloroform and loaded into an ISCO CombiFlash system using a 300 g Gold RediSep High Performance Column. Product was eluted using a gradient of 1-5% ethyl acetate in hexanes and the eluate was dried in vacuo to afford xiii-c as a white crystalline solid (1.6108 g, 57% yield).

$^1$H NMR (400 MHz, Chloroform-d) δ 8.06 (dd, J=8.3, 4.3 Hz, 2H), 7.68 (d, J=2.4 Hz, 1H), 7.56 (d, J=2.4 Hz, 1H), 7.41 (ddd, J=7.8, 6.2, 1.6 Hz, 3H), 7.27 (dd, J=9.1, 3.0 Hz, 1H), 7.18-7.02 (m, 2H), 7.00 (s, 1H), 4.44 (s, 1H), 3.32-2.20 (b, 2H), 1.83 (d, J=14.8 Hz, 1H), 1.77, (d, J=14.8 Hz, 1H), 1.53 (s, 3H), 1.51 (s, 3H), 1.47 (s, 18H), 1.33-0.95 (m, 6H), 0.91 (s, 9H).

$^{19}$F NMR (376 MHz, Chloroform-d) δ −123.49.

Example 27—Preparation of 3-((3'-(2,7-di-tert-butyl-9H-carbazol-9-yl)-5-fluoro-2'-((tetrahydro-2H-pyran-2-yl)oxy)-5'-(2,4,4-trimethylpentan-2-yl)-[1,1'-biphenyl]-2-yl)oxy)propyl 4-methylbenzenesulfonate (xiii-d) and 1,3-bis((3'-(2,7-di-tert-butyl-9H-carbazol-9-yl)-5-fluoro-2'-((tetrahydro-2H-pyran-2-yl)oxy)-5'-(2,4,4-trimethylpentan-2-yl)-[1,1'-biphenyl]-2-yl)oxy)propane (xiii-e)

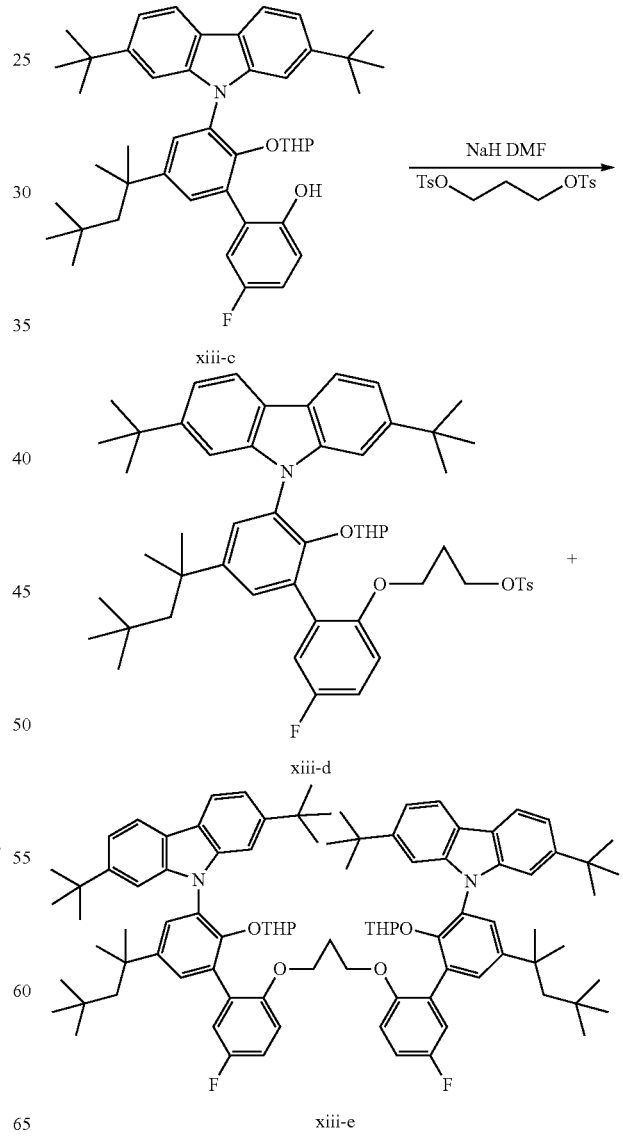

Glassware was oven dried. In a nitrogen filled glovebox, a three-necked round bottom flask equipped with a stir bar and sept was charged with 95% sodium hydride (0.077 g, 3.06 mmol) and anhydrous N,N-dimethylformamide (17.5 mL). The flask was sealed and taken to the hood. The flask was equipped with a nitrogen gas inlet and was placed under nitrogen atmosphere. The stirred white slurry was cooled to 0° C. (ice water bath). A solution of 3'-(2,7-di-tert-butyl-9H-carbazol-9-yl)-5-fluoro-2'-((tetrahydro-2H-pyran-2-yl)oxy)-5'-(2,4,4-trimethylpentan-2-yl)-[1,1'-biphenyl]-2-ol xiii-c (1.50 g, 2.21 mmol) in anhydrous N,N-dimethylformamide (10 mL) was added slowly via syringe at room temperature. A solution of 1,3-propandiol di-para tosylate (0.2519 g, 0.3716 mmol) in anhydrous N,N-dimethylformamide (1.75 mL) was added slowly via syringe at 0° C. (ice water bath). The yellow murky solution was stirred at room temperature for 1 hour. After 1 hour, the reaction was determined to be complete. The reaction was cooled to 0° C. (ice water bath). Water (23 mL) was added to the reaction which cause solids to precipitate out of solution. Ethyl acetate was added until solids dissolved. The phases were separated. The aqueous phase was extracted with ethyl acetate (3×25 mL portions). The combined organic phase was washed with water (40 mL), brine (40 mL), and then 1M sodium hydroxide (40 mL). The organic phase was dried over magnesium sulfate, filtered, and concentrated by rotary evaporation to afford a sticky yellow solid. The solid was purified by column chromatography (Silica Gel Column, 15-70% dichloromethane in hexanes) to afford xiii-d as a white crystalline solid and xiii-e as a white crystalline solid. The solid, xiii-d, was dried under high vacuum to afford 0.77 g (39.2%) as a white crystalline. The white crystalline solid, xiii-e, was dried under high vacuum to afford 0.47 g as a white crystalline.

$^1$H NMR (400 MHz, CDCl$_3$) δ 8.02-7.96 (m, 4H), 7.48 (d, J=2.5 Hz, 2H), 7.39 (t, J=2.3 Hz, 2H), 7.34 (s, 3H), 7.33-7.28 (m, 5H), 7.14 (ddd, J=8.9, 3.1, 1.3 Hz, 2H), 6.81-6.74 (m, 2H), 6.71 (d, J=4.8 Hz, 1H), 6.69 (d, J=4.7 Hz, 1H), 4.35 (s, 2H), 4.02 (dt, J=9.8, 5.5 Hz, 4H), 2.59 (d, J=11.3 Hz, 2H), 2.37 (t, J=10.9 Hz, 2H), 2.13-2.02 (m, 2H), 1.81-1.67 (m, 4H), 1.38 (s, 27H), 1.37 (s, 9H), 1.36 (s, 12H), 1.04 (d, J=9.8 Hz, 4H), 0.83 (s, 18H), 0.79-0.69 (m, 2H), 0.44 (d, J=13.3 Hz, 2H).

Example 28—Preparation of 6',6'''-(propane-1,3-diylbis(oxy))bis(3-(2,7-di-tert-butyl-9H-carbazol-9-yl)-3'-fluoro-5-(2,4,4-trimethylpentan-2-yl)-[1,1'-biphenyl]-2-ol) (Ligand Formula xiii)

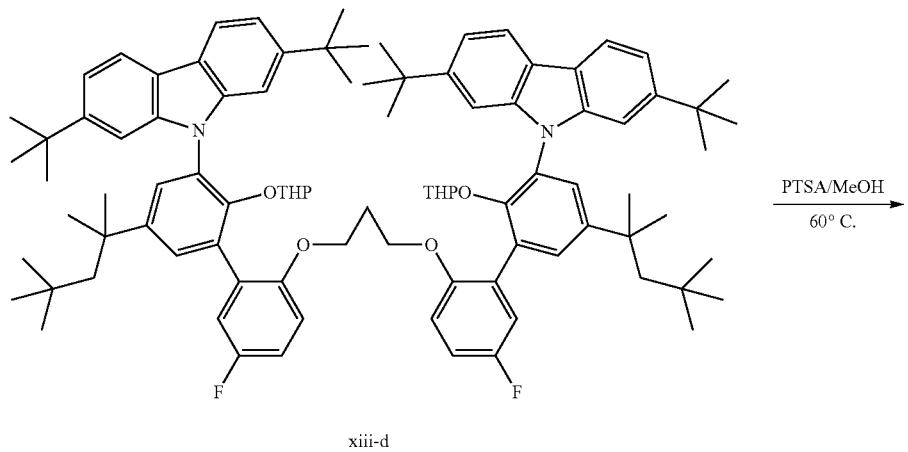

xiii-d

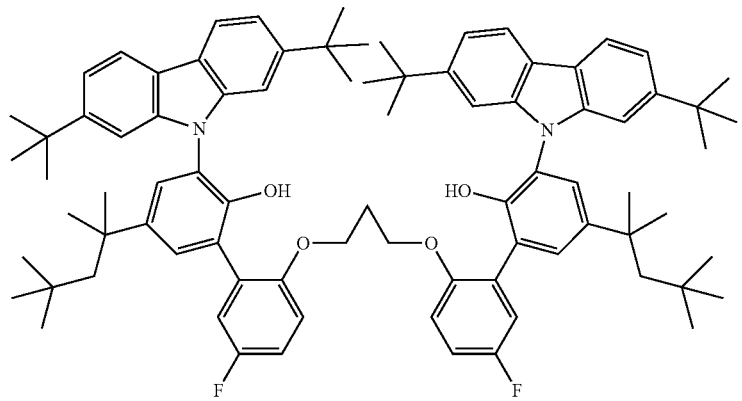

Ligand formula xiii

A three-necked round bottom flask equipped with a stir bar, septa, a condenser, and a nitrogen gas was charged with 1,3-bis((3'-(2,7-di-tert-butyl-9H-carbazol-9-yl)-5-fluoro-2'-((tetrahydro-2H-pyran-2-yl)oxy)-5'-(2,4,4-trimethylpentan-2-yl)-[1,1'-biphenyl]-2-yl)oxy)propane (xiii-e) (0.47 g, 0.52 mmol). A mixture of chloroform (2.5 mL) and methanol (2.5 mL) was added and the reaction was placed under nitrogen atmosphere. The reaction was heated at reflux 60° C. (heating mantle temperature) and p-toluenesulfonic acid monohydrate was added (0.013 g, 0.066 mmol) was added. Within 10 minutes, solids precipitated out of solution. After 3 hours, the reaction was determined to be complete and was allowed to cool to room temperature. To quench any remaining acid, sodium bicarbonate (2.5 mL) was added to the reaction. The phases were separated. The organic phase was dried over magnesium sulfate, filtered, and concentrated by rotary evaporation to afford a crude white solid. The solid was placed under high vacuum to afford 0.42 g (64.6%) of the product as a white solid.

$^1$H NMR (400 MHz, CDCl$_3$) δ 8.08 (d, J=8.2 Hz, 4H), 7.36 (dd, J=8.3, 1.7 Hz, 4H), 7.33 (d, J=2.3 Hz, 2H), 7.26 (d, J=2.4 Hz, 2H), 7.03 (d, J=1.6 Hz, 4H), 6.95 (dd, J=8.7, 3.2 Hz, 2H), 6.28 (td, J=8.5, 3.2 Hz, 2H), 5.74 (dd, J=9.0, 4.4 Hz, 2H), 5.15 (s, 2H), 3.71 (t, J=5.5 Hz, 4H), 1.84 (p, J=5.5 Hz, 2H), 1.69 (s, 4H), 1.35 (s, 12H), 1.31 (s, 36H), 0.78 (s, 18H).

$^{13}$C NMR (101 MHz, CDCl$_3$) δ 149.41, 148.32, 142.63, 142.12, 129.66, 127.55, 123.76, 121.15, 119.71, 118.27, 118.15, 118.04, 115.43, 112.72, 112.64, 106.21, 64.64, 57.40, 38.31, 35.28, 32.64, 32.02, 31.94, 31.75, 29.03.

Example 29—Synthesis of Inventive Metal-Ligand Complex 18 (IMLC-18)

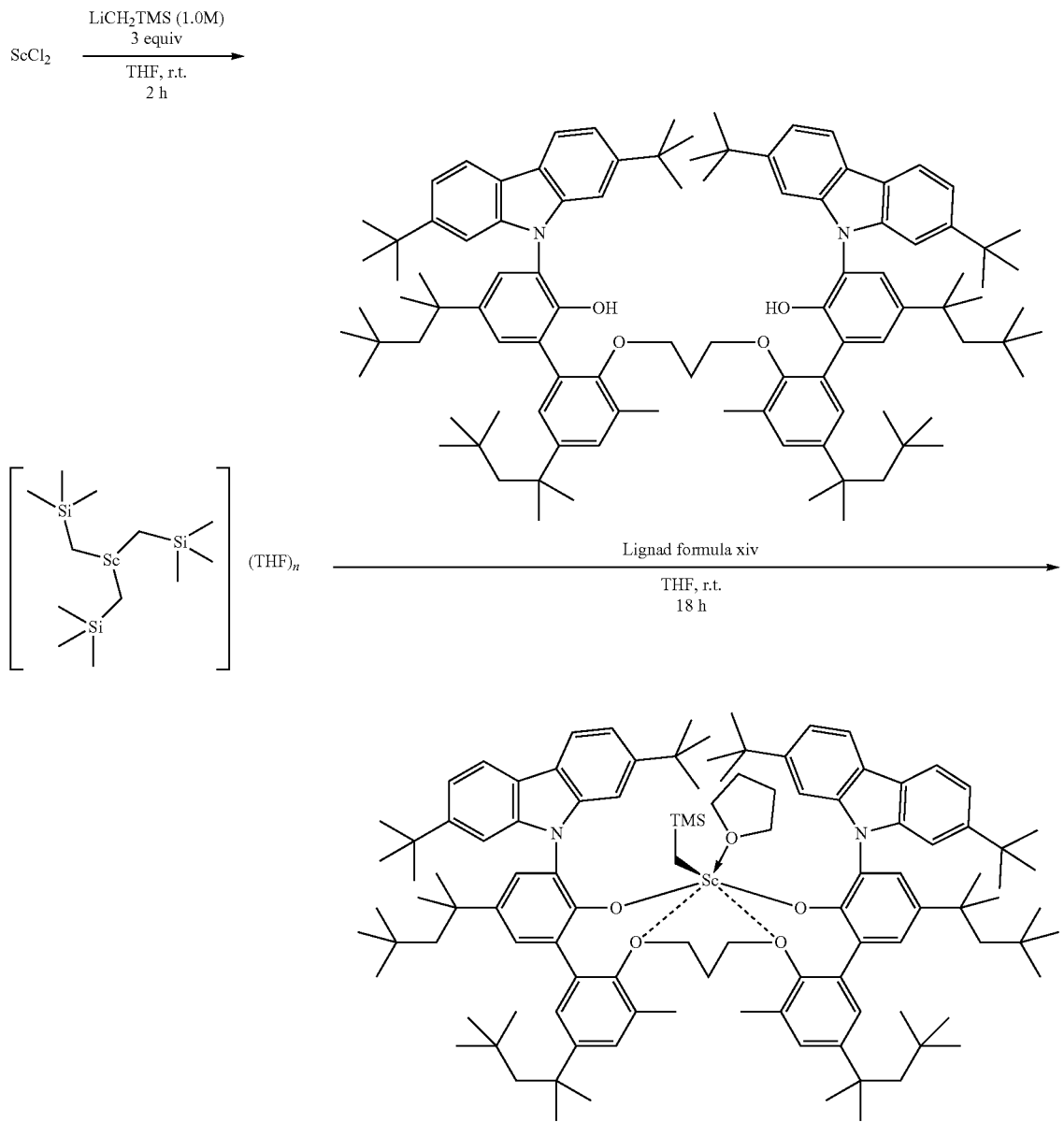

Inventive Metal-Ligand Complex 18 (IMLC-18)

In a glove box, a 40 mL glass vial was charged with $ScCl_3$ (0.15 g, 0.099 mmol) and THF (ca. 10 mL). Then $LiCH_2TMS$ (1.0 M in hexanes, 0.30 mL, 0.30 mmol) was added and the mixture and allowed to stir for 2 h before ligand formula xiii (1.43 g, 0.0993 mmol), which had been dissolved in THF, was slowly added. The resulting mixture was allowed to stir at room temperature for 18 h and then the THF was removed in vacuo. The residue was taken up in hexanes and filtered. The filtrate was collected and dried in vacuo to give IMLC-18 as a solid (0.106 g, 65%).

$^1$H NMR (400 MHz, Benzene-$d_6$) δ 8.19 (dd, J=8.1, 1.2 Hz, 2H), 8.09 (dd, J=8.2, 2.8 Hz, 2H), 8.02 (s, 1H), 7.98 (d, J=1.7 Hz, 1H), 7.94 (s, 1H), 7.91 (d, J=8.1 Hz, 2H), 7.74 (d, J=1.7 Hz, 1H), 7.64-7.20 (6H), 7.03-6.93 (m, 3H), 6.81 (d, J=2.5 Hz, 1H), 4.11 (m, 1H), 3.81-3.74 (m, 1H), 3.74-3.66 (m, 2H), 3.65-3.51 (m, 2H), 3.14-3.04 (2H), 2.16 (s, 3H), 1.90 (s, 2H), 1.78-1.06 (m, 27H) 1.69 (s, 16H), 1.64 (s, 9H), 1.51 (s, 9H), 1.31 (s, 9H), 1.20 (s, 9H), 0.93 (s, 9H), 0.90 (s, 6H), 0.88 (s, 6H), 0.86 (s, 9H), 0.79 (s, 9H), 0.71 (s, 9H), −0.32 (s, 9H), −0.76 (d, J=12.4 Hz, 1H), −1.36 (d, J=12.3 Hz, 1H).

Example 30—Preparation of 2-methyl-4-(2,4,4-trimethylpentan-2-yl)phenol (xiv-b)

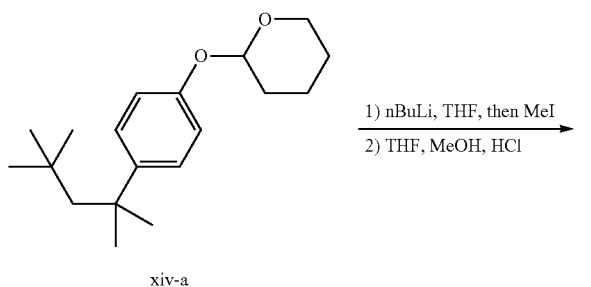

Under a $N_2$ atmosphere, a solution of 2-(4-(2,4,4-trimethylpentan-2-yl)phenoxy)tetrahydro-2H-pyran (xiv-a) (20.00 g) in THF (60 mL) was added in a dropwise fashion to a solution of nBuLi (39.251 mL, 2.5 M) in THF (40 mL). The reaction vessel was then placed in an acetone/dry ice bath and MeI (20.363 mL) was added via syringe. The reactor mixture was then stirred at room temperature overnight, after which the mixture was quenched water, and then extracted into methylene chloride. The solvent was removed to afford a yellow oil, that was then added to the top of a 300 g ISCO column and eluted with a gradient of 0-70& ethyl acetate in hexanes. The eluate was dried to afford a colorless oil, which was then taken up in a mixture of MeOH (50 mL) and THF (50 mL). Concentrated HCl (4-5 drops) was then added until the mixture was acidic (tested with pH paper), and then the mixture was heated at 55° C. for 6 h, and then cooled to room temperature at which the mixture was stirred overnight. The solvents were removed under reduced pressure and the residue was taken up in methylene chloride, washed with brine (that had been acidified with HCl), and then extracted in methylene chloride. The organic layer was then dried over magnesium sulfate and dried under reduced pressure to afford a xiv-b as a slightly yellow oil (9.22 g, 64% yield).

$^1$H NMR (400 MHz, Chloroform-d) δ 7.12 (d, J=2.5, Hz, 1H), 7.07 (dd, J=8.2, 2.5 Hz, 1H), 6.70 (d, J=8.3 Hz, 1H), 5.18 (s, 1H), 2.27 (s, 3H), 1.71 (s, 2H), 1.36 (s, 6H), 0.76 (s, 9H).

Example 31—Preparation of 2-iodo-6-methyl-4-(2,4,4-trimethylpentan-2-yl)phenol (xiv-c)

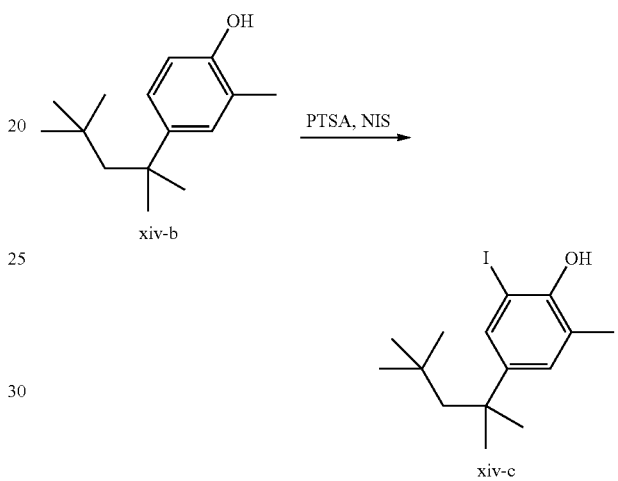

In a glass vessel 8.760 g of 2-methyl-4-(2,4,4-trimethylpentan-2-yl)phenol (xiv) and 6.805 g of p-toluenesulfonic acid (PTSA), were dissolved in acetonitrile (200 mL) and cooled to 0° C. Once cooled, an excess of N-iodosuccinimide (NIS) (21 g) was added until all xiv-b was consumed (ca. 4 h). The mixture was then evaporated to dryness, dissolved in chloroform, and washed twice with saturated sodium thiosulfate and then twice with water. The organic layer was dried, filtered, and stripped to reveal a brown oil, which was then run though a 330 g ISCO column to afford xiv-c as a dark brown oil (7.43 g, 90% yield).

$^1$H NMR (500 MHz, Chloroform-d) δ 7.47 (d, J=2.3 Hz, 1H), 7.11 (m, 1H), 5.17 (s, 1H), 2.34 (s, 3H), 1.71 (s, 2H), 1.35 (s, 6H), 0.79 (s, 9H).

Example 32—Preparation of 1,3-bis(2-iodo-6-methyl-4-(2,4,4-trimethylpentan-2-yl)phenoxy)propane (xiv-e)

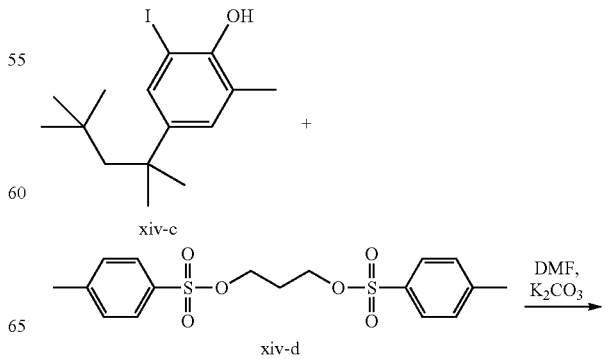

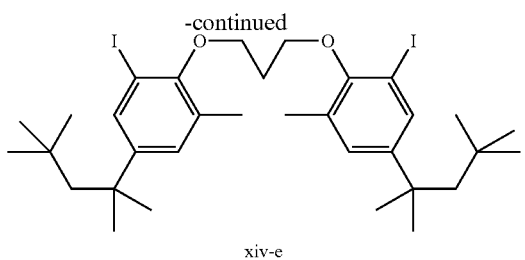

xiv-e

Under a nitrogen atmosphere, a glass round bottom flask was charged with 7.430 g of 2-iodo-6-methyl-4-(2,4,4-trimethylpentan-2-yl)phenol (xiv-c), potassium carbonate (5.338 g), 3.713 g of propane-1,3-diyl bis(4-methylbenzenesulfonate) (xiv-d), and DMF (150 mL). The mixture was heated at 120° C. for 60 min, after which time the contents of the flask were cooled, and then concentrated to dryness. The residue was taken up in 50/50 methylene chloride/water and extracted into methylene chloride. The organic phases were combined and washed with 2N NaOH (400 mL), brine, and then water, and then dried over magnesium sulfate, filtered and concentrated to afford a dark brown oil. The residue was taken up in hexanes and added to the top of a 330 g silica (ISCO) column, and eluted with 5% ethyl acetate in hexanes. The eluate was dried in vacuo to afford a dark red oil (5.63 g, 80%).

$^1$H NMR (400 MHz, Chloroform-d) δ 7.56 (d, J=2.3 Hz, 2H), 7.11 (d, J=2.3, Hz, 2H), 4.11 (t, J=6.4 Hz, 4H), 2.44 (p, J=6.4 Hz, 2H), 2.34 (s, 6H), 1.67 (s, 4H), 1.31 (s, 12H), 0.73 (s, 18H).

Preparation of is propane-1,3-diyl bis(4-methylbenzenesulfonate) (xiv-d) is detailed in WO2014105411A1.

Example 33—Preparation of 2',2'''-(propane-1,3-diylbis(oxy))bis(3-(2,7-di-tert-butyl-9H-carbazol-9-yl)-3'-methyl-5,5'-bis(2,4,4-trimethylpentan-2-yl)-[1,1'-biphenyl]-2-ol) (Ligand Formula xiv)

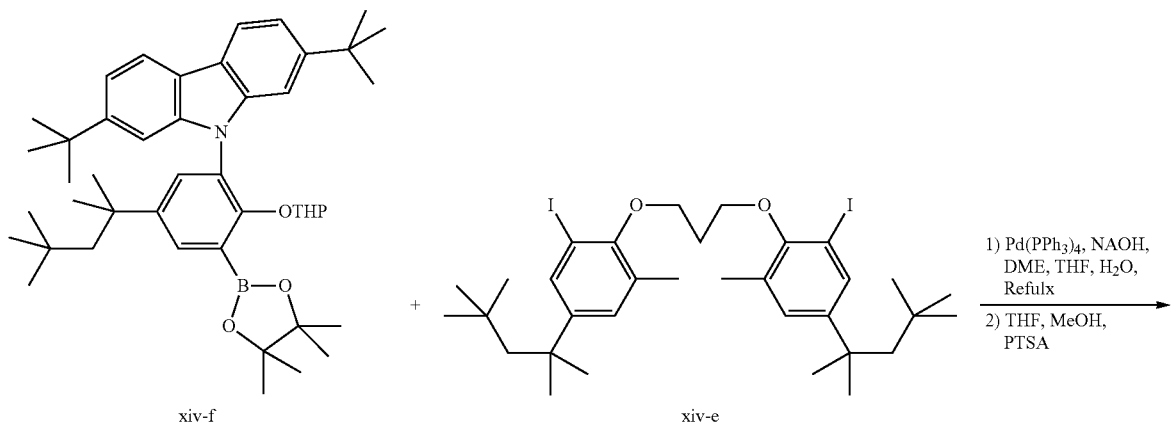

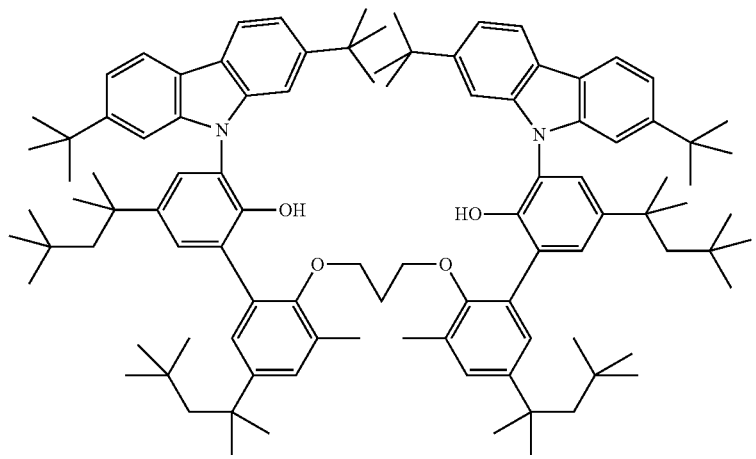

Ligand formula xiv

A three-neck glass round bottom flask was charged with 1,2-dimethoxyethane (60 mL), and then 4.00 g of 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (xiv-f), 1,3-bis(2-iodo-6-methyl-4-(2,4,4-trimethylpentan-2-yl)phenoxy)propane (xiv-e) (2.032 g), and THF (35 mL) was added. Additional THF was added until all components were fully dissolved, then a solution of NaOH (0.6586 g) in water (15 mL). The contents of the flask were then sparged with N2 for 15 min, and then Pd(PPh$_3$)$_4$ was added and the contents of the vessel were heated at 85° C. for 48 h. Following this the contents of the flask were cooled and a precipitate form, which was isolated by vacuum filtration and then dried under high vacuum for 2 h. The resulting solid was then dissolved in THF (50 mL), MeOH (50 mL), and approximately 100 mg of p-toluenesulfonic acid (PTSA), which was added until the solution was acidic (as tested by pH paper). The solution was heated to 60° C. overnight and then the contents were cooled and concentrated. The residue was taken up in methylene chloride (100 mL), washed with brine (100 mL), dried over magnesium sulfate, filtered over a pad of silica gel, and then dried to afford Ligand formula (xiv) as an off white crystalline solid (1.4 g, 37% yield).

$^1$H NMR (400 MHz, Chloroform-d) δ 8.03 (dd, J=8.2, 0.6 Hz, 4H), 7.45-7.42 (m, 4H), 7.31 (dd, J=8.2, 1.7 Hz, 4H), 7.23 (d, J=2.4 Hz, 2H), 7.15 (dd, J=1.8, 0.7 Hz, 4H), 7.12 (dd, J=2.5, 0.8 Hz, 2H), 6.74-5.94 (br, 2H), 3.70 (t, J=6.4 Hz, 4H), 2.00 (s, 6H), 1.80-1.74 (m, 2H), 1.76 (s, 4H), 1.74 (s, 4H), 1.41 (s, 24H), 1.30 (s, 36H), 0.83 (s, 18H), 0.75 (s, 18H).

Preparation of 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole is detailed in WO2014105411A1.

Example 34—Synthesis of Inventive Metal-Ligand Complex 19 (IMLC-19)

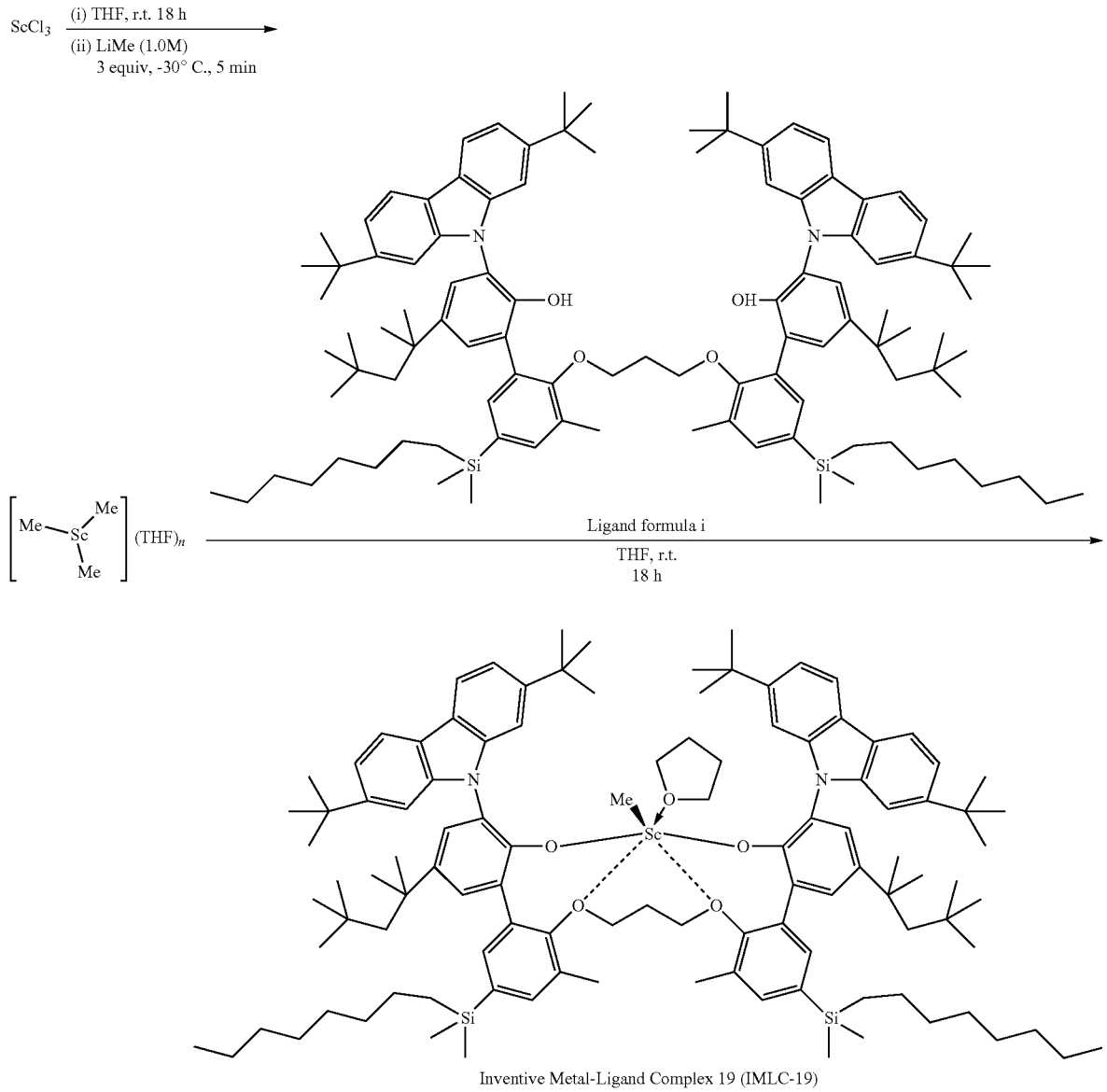

Inventive Metal-Ligand Complex 19 (IMLC-19)

In a glove box, vial was charged with ScCl₃ (0.145 g, 0.96 mmol) and THF (ca. 30 mL). This mixture was allowed to stir at room temperature for 3.5 h, then cooled to −35° C. and LiMe (1.6 M solution in Et₂O, 1.825 mL, 2.88 mmol) was then added to the vial and the resulting mixture was stirred for 10 minutes. Ligand formula I (1.500 g, 0.96 mmol) was added as a solid and the reaction mixture as then stirred overnight at room temperature. The THF was then removed in vacuo and the resulting residue was taken up in pentane and filtered. The filtrate was collected and dried in vacuo to give IMLC-19 as a white solid (1.614 g, 99%).

¹H NMR (400 MHz, Benzene-d₆) δ 8.26 (d, J=8.2 Hz, 1H), 8.19 (d, J=8.3 Hz, 1H), 8.17 (d, J=1.3 Hz, 1H), 8.09 (d, J=8.2 Hz, 1H), 7.96 (d, J=8.2 Hz, 1H), 7.81 (d, J=2.5 Hz, 1H), 7.71-7.67 (m, 2H), 7.62-7.57 (m, 2H), 7.54 (dd, J=4.8, 2.0 Hz, 2H), 7.49-7.45 (m, 2H), 7.45-7.41 (m, 2H), 7.35 (dd, J=8.3, 1.6 Hz, 1H), 7.23 (dd, J=8.2, 1.6 Hz, 1H), 7.02 (s, 1H), 4.34-4.15 (m, 1H), 3.88-3.77 (m, 1H), 3.68-3.57 (m, 1H), 3.48 (m, 1H), 3.21 (m, 2H), 2.84 (q, J=6.5, 6.0 Hz, 2H), 2.14 (s, 2H), 1.81-1.72 (m, 4H), 1.68 (s, 9H), 1.58 (m, 2H), 1.50 (s, 3H), 1.49 (s, 9H), 1.40-1.21 (m, 37H), 1.183 (s, 9H), 1.180 (s, 9H), 1.02 (q, J=6.4, 5.9 Hz, 4H), 0.97 (s, 9H), 0.96-0.91 (m, 6H), 0.90 (s, 9H), 0.71 (m, 4H), 0.19-0.17 (m, 6H), 0.17 (s, 3H), 0.14 (s, 3H), −1.13 (s, 3H).

Example 35—Synthesis of Inventive Metal-Ligand Complex 20 (IMLC-20)

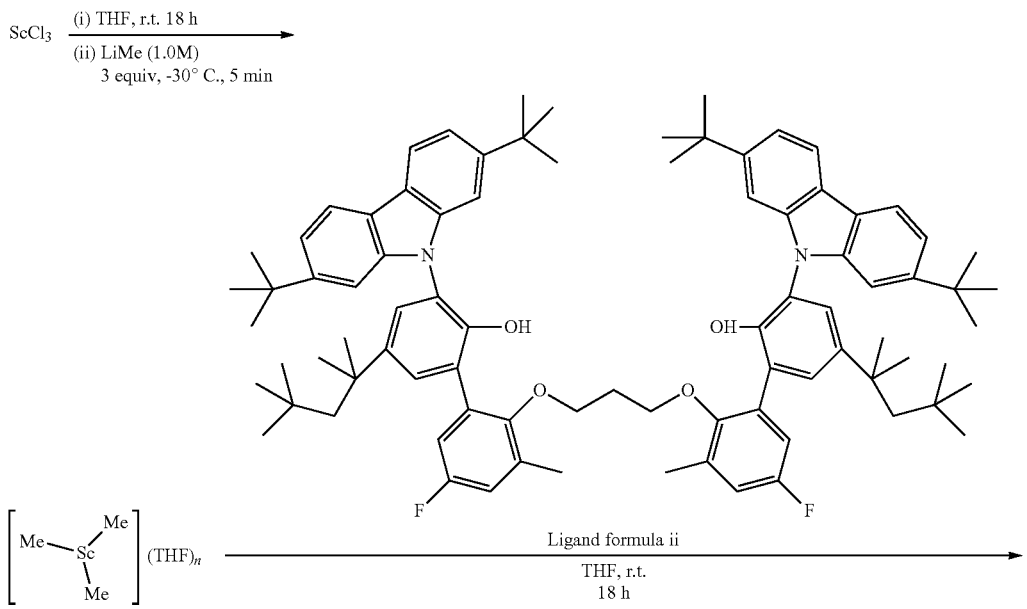

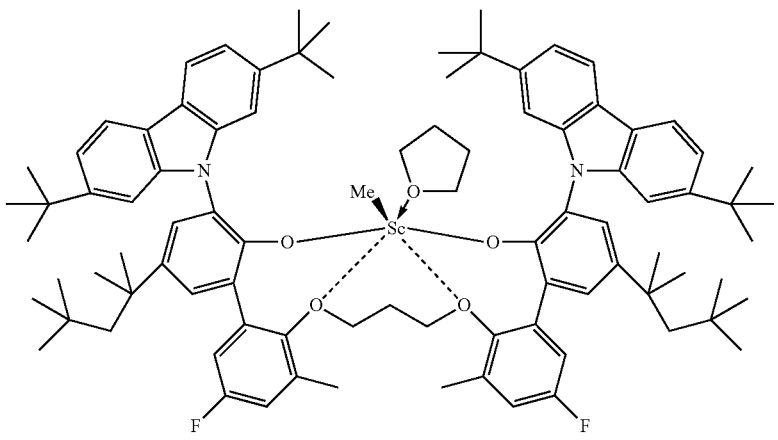

Inventive Metal-Ligand Complex 20 (IMLC-20)

In a glove box, a 40 mL glass vial was charged with ScCl$_3$ (0.021 g, 0.14 mmol) and THF (ca. 10 mL). This mixture was allowed to stir at room temperature overnight (18 h), after which time the contents of the vial were cooled to −30° C. for 20 min. LiMe (1.6 M solution in Et$_2$O, 0.27 mL, 0.43 mmol) was then added to the vial and the resulting mixture was stirred for 5 minutes. A solution of Ligand formula II (0.175 g, 0.139 mmol) in THF (ca. 10 mL) was added to the vial. The contents of the vial were stirred at room temperature for 18 h, after which time the solvent was removed in vacuo. The residue was taken up in pentane and filtered over a fritted column. The filtrate was collected and dried in vacuo to give IMLC-20 as a white solid in quantitative yield.

$^1$H NMR (400 MHz, Benzene-d$_6$) δ 8.23 (dd, J=8.2, 1.6 Hz, 2H), 8.13 (d, J=8.2 Hz, 1H), 8.04 (d, J=1.7 Hz, 1H), 7.94 (d, J=8.2 Hz, 1H), 7.76 (d, J=2.6 Hz, 1H), 7.64 (d, J=1.6 Hz, 1H), 7.51 (d, J=1.2 Hz, 2H), 7.47 (dd, J=8.2, 1.7 Hz, 2H), 7.42 (dd, J=8.3, 1.7 Hz, 1H), 7.39 (d, J=1.6 Hz, 1H), 7.33 (dd, J=9.0, 2.7 Hz, 2H), 7.21 (dd, J=8.2, 1.7 Hz, 1H), 7.12-7.07 (m, 1H), 6.93 (dd, J=9.0, 3.2 Hz, 1H), 6.35 (s, 1H), 6.22-6.02 (m, 1H), 4.16 (d, J=2.2 Hz, 1H), 3.68 (s, 1H), 3.46 (d, J=3.0 Hz, 1H), 3.35 (s, 1H), 3.13 (s, 2H), 2.83 (d, J=8.9 Hz, 2H), 2.11 (s, 2H), 1.90 (s, 3H), 1.75-1.65 (m, 4H), 1.63 (s, 9H), 1.59-1.51 (m, 3H), 1.49 (s, 9H), 1.46-1.43 (m, 1H), 1.31 (s, 3H), 1.25 (s, 3H), 1.22 (s, 9H), 1.19 (s, 3H), 1.19 (s, 3H), 1.13 (s, 9H), 1.00 (s, 3H), 0.93 (s, 9H), 0.86 (s, 9H), −1.13 (s, 3H).

$^{19}$F NMR (376 MHz, Benzene-d$_6$) δ −116.50, −116.53.

Example 36—Synthesis of Inventive Metal-Ligand Complex 21 (IMLC-21)

Ligand prepared according to the procedures cited in WO 2017/004456 A1

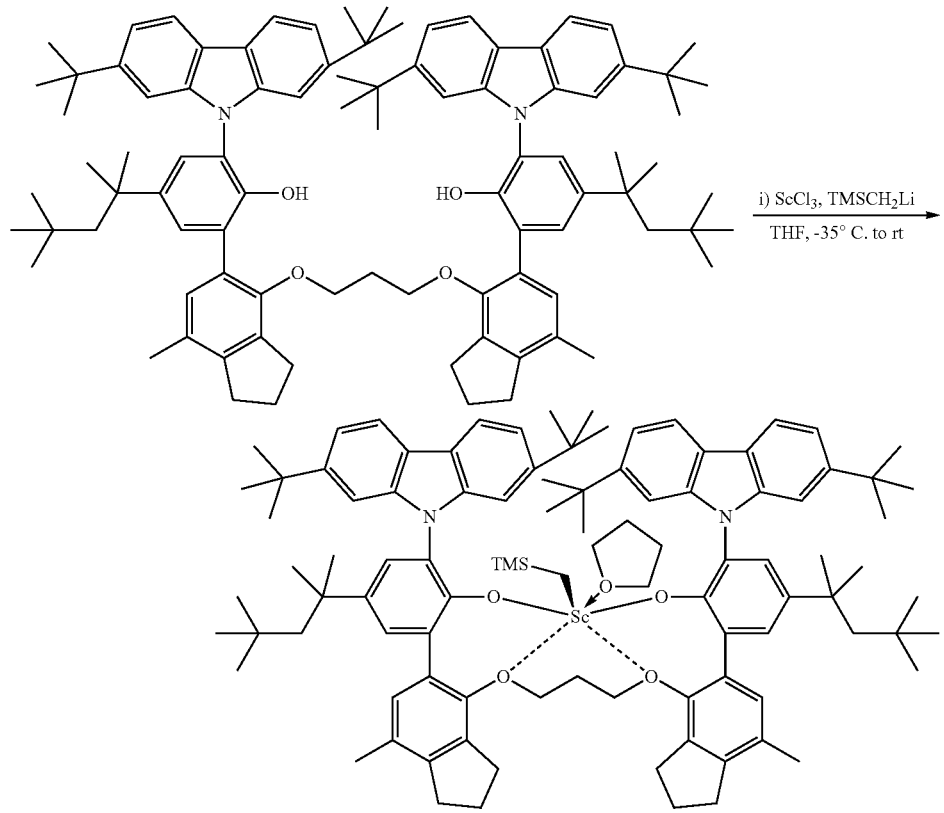

Inventive Metal-Ligand Complex 21 (IMLC-21)

A THF (8 mL) suspension of trichloroscandium (0.037 g, 0.242 mmol) was cooled to −35° C. Trimethylsilylmethyllithium (1.00 M, 0.739 mL, 0.739 mmol) in pentane was added to the cold suspension, which was stirred at room temperature for 4 hours, then the slightly cloudy solution was cooled in a −35° C. freezer for 5 minutes. 2-(2,7-ditert-butylcarbazol-9-yl)-6-[4-[3-[5-[3-(2,7-ditert-butylcarbazol-9-yl)-2-hydroxy-5-(1,1,3,3-tetramethylbutyl)phenyl]-7-methyl-indan-4-yl]oxypropoxy]-7-methyl-indan-5-yl]-4-(1,1,3,3-tetramethylbutyl)phenol (0.300 g, 0.231 mmol) in THF (1 mL) was added dropwise. The reaction mixture was stirred overnight at room temperature. The solvent was removed by vacuum, then pentane (5 mL) was added and the volatiles were removed under vacuum. Pentane (10 mL) was added and the mixture was filtered through a pad of CELITE. The CELITE pad was further extracted with pentane (10 mL). The combined pentane extracts were dried under vacuum to provide a slightly green solid. This material was evaporated from pentane (2×3 mL). Pentane (2 mL) was added and the mixture was placed in a freezer (−35° C.) for 18 hours. The pentane layer was removed using a pipet, and the remaining solid was dried under vacuum to provide IMLC-21 (165 mg, yield: 48%) as a white solid.

$^1$H NMR (400 MHz, C$_6$D$_6$ (select peaks)) δ 8.19 (d, J=8.2 Hz, 1H), 8.13 (app t, J=8.4 Hz, 2H), 8.07 (d, J=8.3 Hz, 1H), 7.95 (d, J=1.7 Hz, 1H), 7.73 (d, J=1.7 Hz, 1H), 7.66 (d, J=1.6 Hz, 1H), 7.58 (dd, J=3.9, 2.2 Hz, 2H), 7.54 (d, J=2.8 Hz, 1H), 7.50-7.41 (m, 3H), 7.36 (ddd, J=8.4, 6.8, 1.7 Hz, 2H), 7.27 (d, J=3.1 Hz, 2H), 7.11 (s, 1H), 4.30 (dd, J=10.6, 8.3 Hz, 1H), 3.87 (ddd, J=9.2, 5.6, 3.0 Hz, 1H), 3.81-3.61 (m, 3H), 3.48-3.22 (m, 3H), 2.07 (s, 3H), 1.93 (s, 3H), 1.60 (s, 9H), 1.51 (s, 9H), 1.32 (s, 9H), 1.26 (s, 9H), 1.20 (s, 6H), 0.88 (d, J=3.3 Hz, 18H), −0.27 (s, 9H), −0.34-−0.41 (m, 1H), −1.23 (d, J=12.3 Hz, 1H).

Example 37-Synthesis of Inventive Metal-Ligand Complex 22 (IMLC-22)

Ligand prepared in a manner analogous to IMLC-2 Ligand

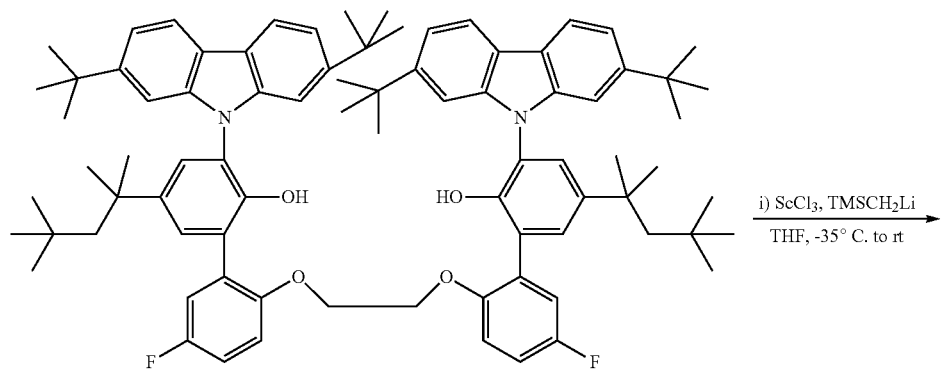

A THF (8 mL) suspension of trichloroscandium (0.042 g, 0.275 mmol) was cooled to −35° C. Trimethylsilylmethyllithium (1.00 M, 0.838 mL, 0.838 mmol) in pentane was added to the cold suspension, which was stirred at room temperature for 4 hours, then the slightly cloudy suspension was cooled in a −35° C. freezer for 5 minutes. 2-(2,7-ditert-butylcarbazol-9-yl)-6-[2-[2-[2-[3-(2,7-ditert-butylcarbazol-9-yl)-2-hydroxy-5-(1,1,3,3-tetramethylbutyl)phenyl]-4-fluoro-6-methyl-phenoxy]ethoxy]-5-fluoro-3-methyl-phenyl]-4-(1,1,3,3-tetramethylbutyl)phenol (0.325 g, 0.262 mmol) in THF (1 mL) was added dropwise. The reaction mixture was stirred overnight at room temperature. The solvent was removed by vacuum, then pentane (8 mL) was added and the mixture was filtered through a pad of CELITE. The CELITE pad was further extracted with pentane (4 mL). The combined pentane extracts were dried under vacuum to provide IMLC-22 as an off-white solid (210 mg, 56%).

$^1$H NMR (400 MHz, $C_6D_6$) δ 8.18 (d, J=8.2 Hz, 1H), 8.11 (dd, J=8.2, 5.5 Hz, 2H), 7.98 (d, J=8.2 Hz, 1H), 7.74 (d, J=1.6 Hz, 1H), 7.62 (d, J=1.6 Hz, 1H), 7.57 (d, J=2.6 Hz, 1H), 7.49 (d, J=1.6 Hz, 1H), 7.46 (q, J=1.2 Hz, 2H), 7.38 (t, J=2.7 Hz, 2H), 7.26 (d, J=1.9 Hz, 2H), 6.53 (dd, J=8.1, 3.1 Hz, 1H), 6.39 (dd, J=8.0, 3.1 Hz, 1H), 4.29-4.12 (m, 2H), 3.29 (dt, J=7.7, 5.8 Hz, 2H), 3.01 (dt, J=8.1, 6.1 Hz, 2H), 2.88 (dd, J=8.7, 2.4 Hz, 1H), 2.78-2.70 (m, 1H), 1.75 (s, 3H), 1.61 (s, 9H), 1.59 (s, 2H), 1.56 (s, 9H), 1.30 (s, 9H), 1.16 (s, 9H), 0.87 (d, J=1.6 Hz, 12H), 0.84 (s, 9H), −0.42 (s, 9H), −0.91 (d, J=11.0 Hz, 1H), −0.99 (d, J=11.0 Hz, 1H); $^{19}$F NMR (376 MHz, $C_6D_6$) δ −115.26, −116.51.

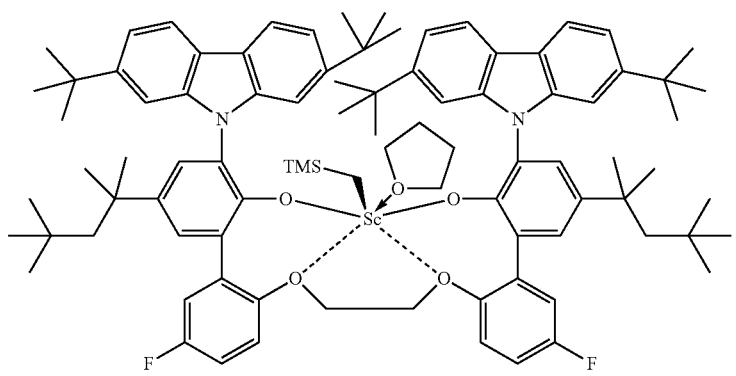

Inventive Metal-Ligand Complex22 (IMLC-22)

Example 38—Synthesis of Inventive Metal-Ligand Complex 23 (IMLC-23)

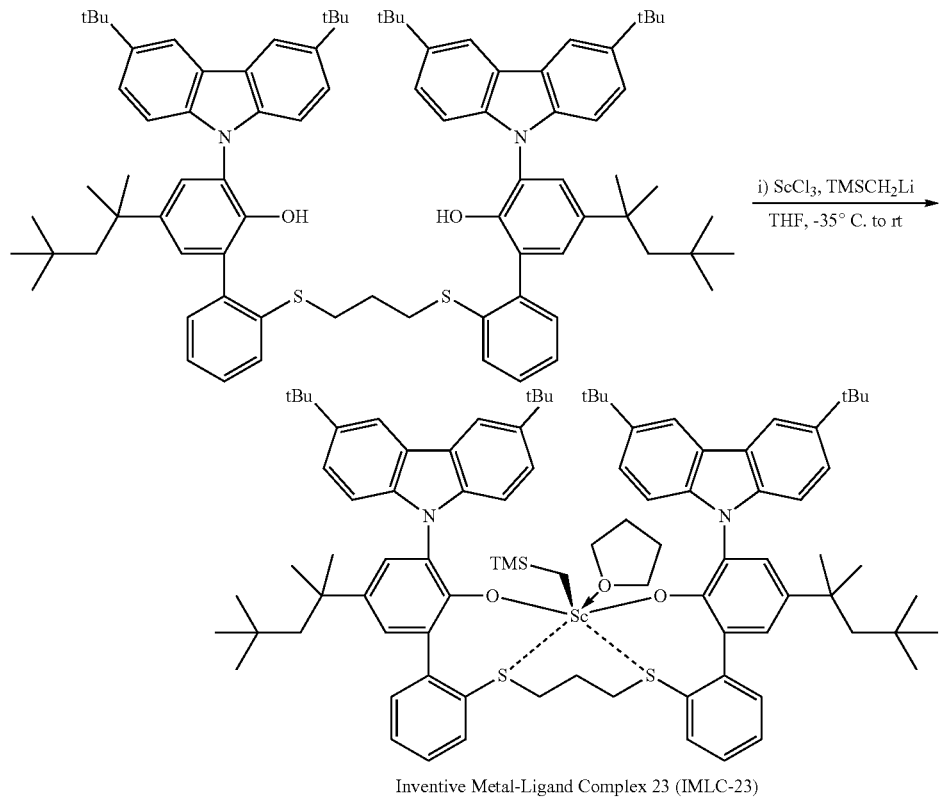

Inventive Metal-Ligand Complex 23 (IMLC-23)

A THF (6 mL) suspension of trichloroscandium (0.020 g, 0.129 mmol) was cooled to −35° C. Trimethylsilylmethyllithium (1.00 M, 0.404 mL, 0.404 mmol) in pentane was added to the cold suspension, which was stirred at room temperature for 4 hours, then the slightly cloudy solution was cooled in a −35° C. freezer for 5 minutes. 2-(3,6-ditert-butylcarbazol-9-yl)-6-[2-[3-[2-[3-(3,6-ditert-butylcarbazol-9-yl)-2-hydroxy-5-(1,1,3,3-tetramethylbutyl)phenyl]phenyl]sulfanylpropylsulfanyl]phenyl]-4-(1,1,3,3-tetramethylbutyl)phenol (0.150 g, 0.123 mmol) in THF (1 mL) was added dropwise. The reaction mixture was stirred overnight at room temperature. The solvent was removed by vacuum, then pentane (10 mL) was added and the mixture was filtered through a pad of CELITE. The CELITE pad was further extracted with pentane (2×4 mL). The combined pentane extracts were dried under vacuum to provide IMLC-23 (150 mg, 85%) as a white solid:

$^1$H NMR (400 MHz, $C_6D_6$ (select peaks)) δ 8.54 (dd, J=1.8, 0.8 Hz, 1H), 8.41 (d, J=1.8 Hz, 1H), 8.24 (d, J=1.7 Hz, 1H), 7.92 (d, J=8.6 Hz, 1H), 6.27 (dd, J=6.0, 3.3 Hz, 1H), 6.07 (dd, J=7.8, 1.4 Hz, 1H), 2.69 (d, J=7.0 Hz, 2H), 2.60 (d, J=7.1 Hz, 2H), 1.52 (s, 9H), 1.45 (s, 9H), 0.91 (s, 9H), 0.86 (s, 9H), −0.26 (s, 9H), −1.35 (d, J=12.1 Hz, 1H), −2.21 (d, J=12.1 Hz, 1H).

Example 39—Synthesis of Compound 14

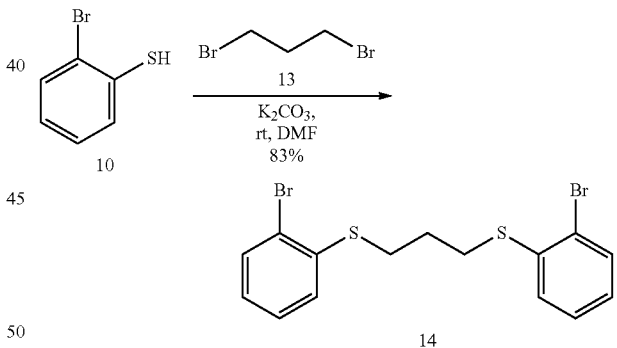

N,N-Dimethylformamide (DMF) (4 mL) and 2-bromothiophenol (10) (0.245 mL, 2.03 mmol) were sequentially added to a 40 mL vial charged with potassium carbonate ($K_2CO_3$) (0.411 g, 2.97 mmol). The 1,3-dibromopropane (13) (0.101 mL, 0.991 mmol) was added and the mixture was stirred at room temperature. After stirring at this temperature for 18 hours the reaction was diluted with diethyl ether (10 mL) then filtered through a plug of CELITE. The filtrate was washed with water (5 mL), saturated aqueous sodium bicarbonate (5 mL), dried over anhydrous $Na_2SO_4$, filtered, and concentrated to dryness. The resulting residue was directly loaded onto a silica gel ($SiO_2$) cartridge and purified using flash column chromatography (40 g $SiO_2$, 40 mL/min, 0% ethyl acetate (EtOAc) to 20% EtOAc/hexanes) to afford 0.35 g (83%) of the desired product 14 as a white solid: $^1$H NMR (400 MHz, CDCl$_3$) δ 7.59-7.50 (m, 2H), 7.29-7.21 (m, 4H), 7.03 (ddd, J=7.9, 5.2, 3.7 Hz, 2H), 3.11 (t, J=7.0 Hz, 4H), 2.05 (p, J=7.0 Hz, 2H); $^{13}$C NMR (101 MHz, CDCl$_3$) δ 137.35, 133.09, 128.33, 127.77, 126.77, 123.85, 31.79, 27.30.

Example 40—Synthesis of Compound 16

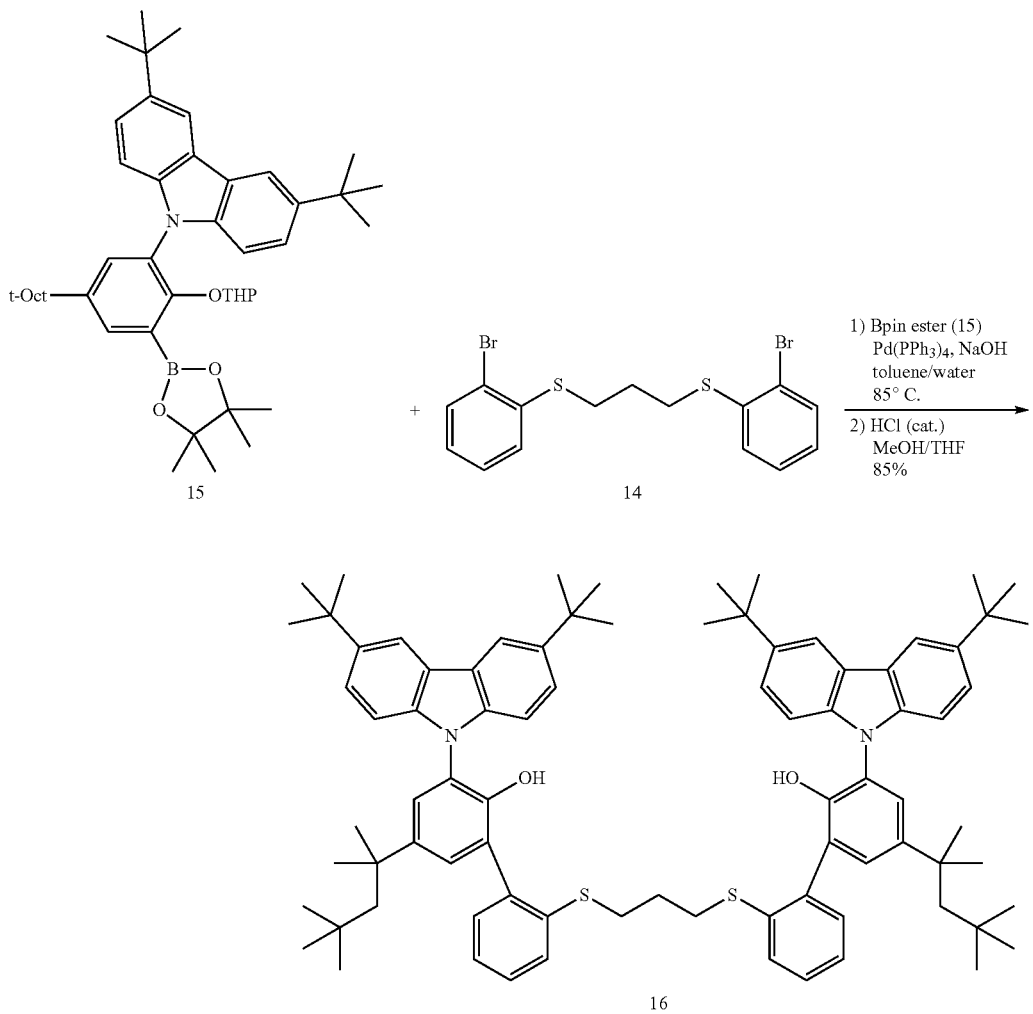

Degassed toluene (8 mL) and degassed water (2 mL) were added to a 40 mL vial charged with the BPin ester 15 (1.27 g, 1.83 mmol), the dibromide 14 (0.340 g, 0.813 mmol), and NaOH (0.195 g, 4.88 mmol). The mixture was sparged with nitrogen for 5 minutes then solid tetrakis(triphenylphosphine)palladium(0) (Pd(PPh$_3$)$_4$) (0.047 g, 0.041 mmol) was added. The reaction was then heated to 95° C. (external temperature) and maintained at this temperature for 17 hours. After this time, the reaction was cooled to room temperature. The mixture was transferred to a separatory funnel, the toluene layer was isolated then washed with water (2×8 mL).

MeOH (10 mL) was added to the toluene solution from above then concentrated hydrochloric acid (conc. HCl) (8 drops from a glass pipet) was added. The flask was fitted with a condenser then the mixture was heated to 75° C. (external temperature) and maintained at this temperature for 3 h. After this time, the reaction was cooled to room temperature, and the volatiles were removed under reduced pressure. Water (10 mL) and CH$_2$Cl$_2$ (15 mL) were added to the crude residue, then the phases were transferred to a separatory funnel and separated. The aqueous phase was further extracted with CH$_2$Cl$_2$ (15 mL) and the combined organic extracts were washed with brine (10 mL), dried (Na$_2$SO$_4$) then passed through a silica gel plug. The plug was washed with CH$_2$Cl$_2$ (65 mL) to ensure all material was collected (monitored by thin layer chromatography (TLC)). The crude residue was purified directly using flash column chromatography (12 g CELITE load cartridge, 40 g SiO$_2$, 40 mL/min, 0% EtOAc to 15% EtOAc/hexanes) to afford 0.85 g (85%) of the ligand 16 as a white powder.

$^1$H NMR (400 MHz, CDCl$_3$) δ 8.18-8.13 (m, 4H), 7.47 (app dd, J=8.6, 1.9 Hz, 4H), 7.39-7.26 (m, 8H), 7.23-7.15 (m, 8H), 4.88 (s, 2H), 2.92 (app t, J=7.0 Hz, 4H), 1.89 (p, J=7.0 Hz, 2H), 1.70 (s, 4H), 1.45 (s, 36H), 1.34 (s, 12H), 0.81 (s, 18H); $^{13}$C NMR (101 MHz, CDCl$_3$) δ 147.05, 142.96, 142.51, 139.46, 138.07, 136.30, 130.89, 129.03, 128.48, 128.45, 128.24, 126.35, 125.80, 123.85, 123.63, 123.54, 116.31, 109.59, 57.05, 38.21, 34.75, 32.42, 32.08, 32.04, 31.95, 27.88; LCMS (ES/APCIMS m/z 1247 [(M+Na)$^+$]).

Example 41—Synthesis of Inventive Metal-Ligand Complex 24 (IMLC-24)

Ligand prepared according to the procedures cited in WO 2017/004462 A1

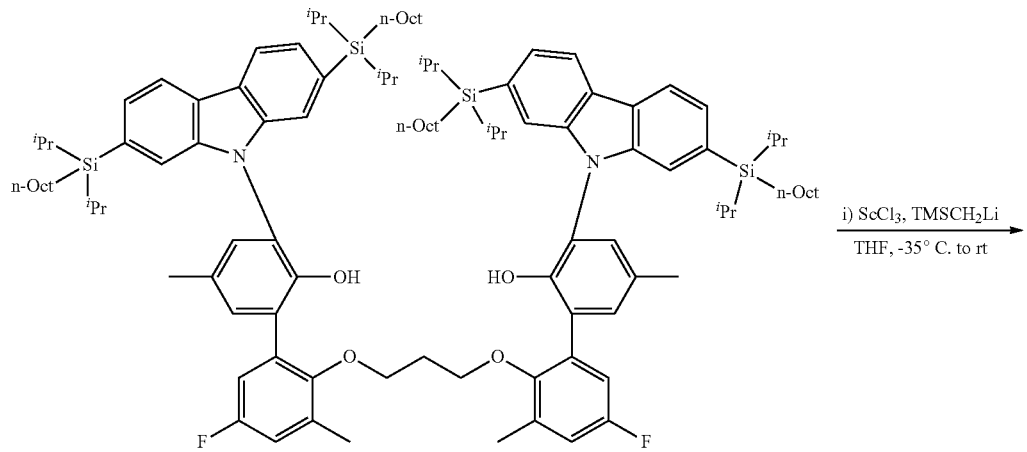

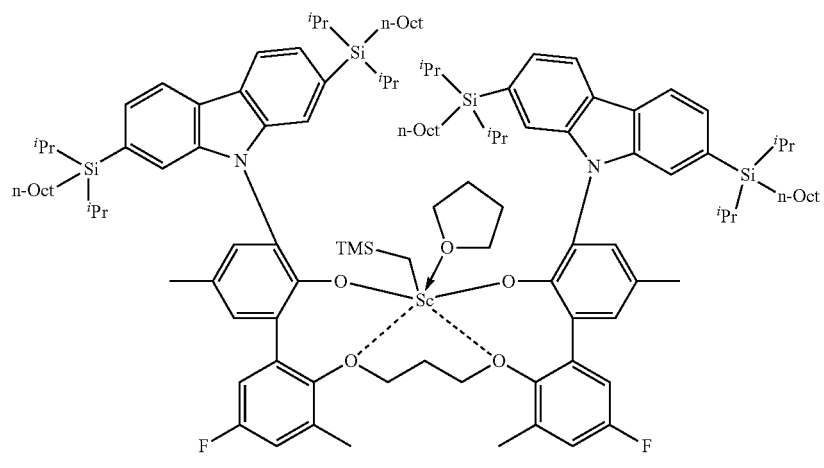

Inventive Metal-Ligand Complex 24 (IMLC-24)

A THF (8 mL) suspension of trichloroscandium (0.027 g, 0.181 mmol) was cooled to −35° C. Trimethylsilylmethyllithium (1.00 M, 0.551 mL, 0.551 mmol) in pentane was added to the cold suspension, which was stirred at room temperature for 4 hours, then the slightly cloudy suspension was cooled in a −35° C. freezer for 5 minutes. 2-[2,7-bis[diisopropyl(octyl)silyl]carbazol-9-yl]-6-[2-[3-[2-[3-[2,7-bis[diisopropyl(octyl)silyl]carbazol-9-yl]-2-hydroxy-5-methyl-phenyl]-4-fluoro-6-methyl-phenoxy]propoxy]-5-fluoro-3-methyl-phenyl]-4-methyl-phenol (0.300 g, 0.172 mmol) in THF (1 mL) was added dropwise. The solution was stirred overnight at room temperature. The solvent was removed by vacuum, then pentane (10 mL) was added and the mixture was filtered through a pad of CELITE. The CELITE pad was further extracted with pentane (2×4 mL). The combined pentane extracts were dried under vacuum to provide an oil. This oil was taken up in pentane (10 mL) then filtered through a CELITE plug. The plug was further extracted with pentane (5 mL). The combined pentane extracts were dried under vacuum to provide IMLC-24 (290 mg, yield: 86%) as an off-white solid.

$^1$H NMR (400 MHz, $C_6D_6$) (Select peaks) δ 8.27 (dd, J=7.6, 2.5 Hz, 2H), 8.18 (t, J=8.3 Hz, 3H), 7.99 (d, J=2.1 Hz, 1H), 7.75 (s, 1H), 6.63 (d, J=2.5 Hz, 1H), 6.39 (dd, J=8.1, 3.1 Hz, 1H), 6.18 (dd, J=8.3, 3.2 Hz, 1H), −0.25 (s, 9H), −0.70 (d, J=12.5 Hz, 1H), −1.38 (d, J=12.4 Hz, 1H); $^{19}$F NMR (376 MHz, $C_6D_6$) δ −115.61, −117.20.

Example 42—Synthesis of Inventive Metal-Ligand Complex 25 (IMLC-25)

Ligand prepared according to the procedures cited in WO 2017/004462 A1

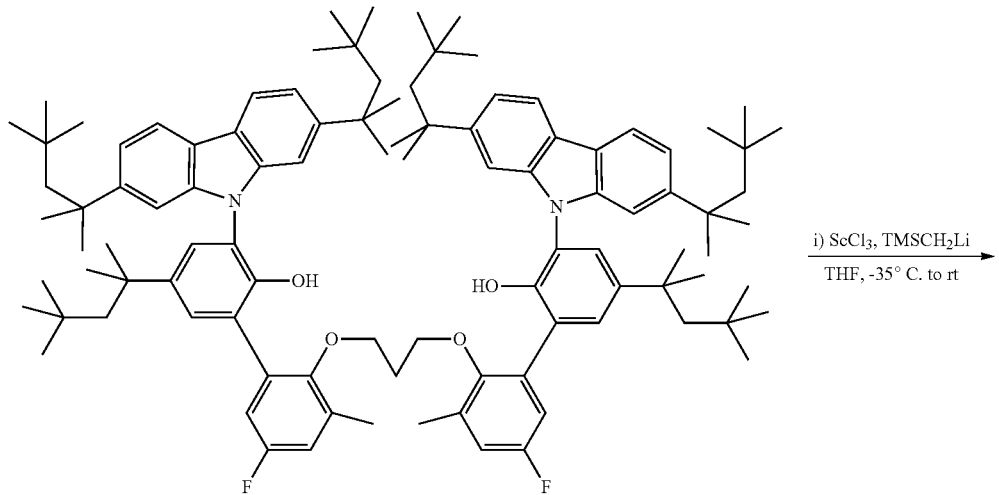

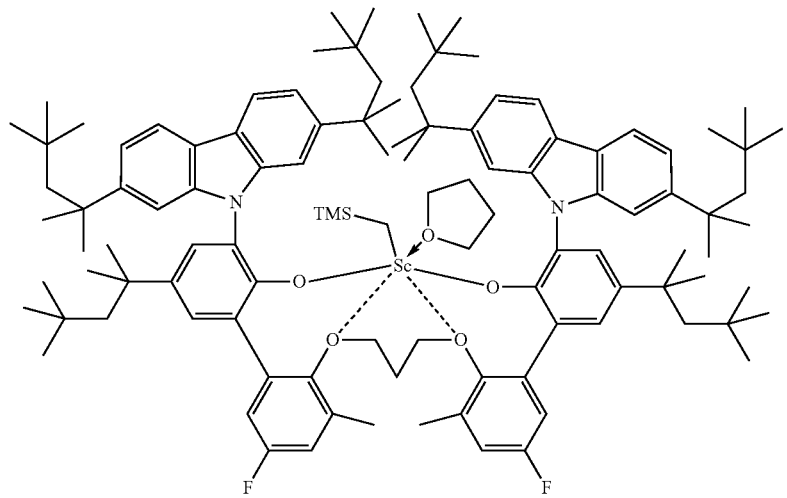

Inventive Metal-Ligand Complex 25 (IMLC-25)

A THF (8 mL) suspension of trichloroscandium (0.038 g, 0.248 mmol) was cooled to −35° C. Trimethylsilylmethyllithium (1.00 M, 0.757 mL, 0.757 mmol) in pentane was added to the cold suspension, which was stirred at room temperature for 4 hours, then the slightly cloudy solution was cooled in a −35° C. freezer for 5 minutes. 2-[2,7-bis(1,1,3,3-tetramethylbutyl)carbazol-9-yl]-6-[2-[3-[2-[3-[2,7-bis(1,1,3,3-tetramethylbutyl)carbazol-9-yl]-2-hydroxy-5-(1,1,3,3-tetramethylbutyl)phenyl]-4-fluoro-6-methyl-phenoxy]propoxy]-5-fluoro-3-methyl-phenyl]-4-(1,1,3,3-tetramethylbutyl)phenol (0.350 g, 0.236 mmol) in THF (2 mL) was added dropwise. The reaction mixture was stirred overnight at room temperature. The solvent was removed by vacuum, then pentane (5 mL) was added and the volatiles were removed under vacuum (trying to remove residual THF). Pentane (10 mL) was added and the mixture was filtered through a pad of CELITE. The CELITE pad was further extracted with pentane (10 mL).

The combined pentane extracts were dried under vacuum to provide a slightly green solid. This material was evaporated from pentane (2×3 mL). Pentane (2 mL) was added and the mixture was placed in a freezer (−35° C.) for 18 hours. The pentane layer was removed using a pipet, and the remaining solid was dried under vacuum to provide IMLC-25 (325 mg, 82%) as a white solid:

$^1$H NMR (400 MHz, $C_6D_6$ (select peaks)) δ 8.15 (dd, J=10.3, 8.2 Hz, 2H), 8.06 (dd, J=13.0, 8.2 Hz, 2H), 7.76 (d, J=1.5 Hz, 1H), 7.55 (dd, J=6.0, 2.1 Hz, 2H), 7.50 (d, J=1.5 Hz, 1H), 7.44 (tt, J=6.8, 3.4 Hz, 3H), 7.36-7.27 (m, 5H), 7.20 (dd, J=9.2, 3.2 Hz, 1H), 7.04 (dd, J=9.0, 3.2 Hz, 1H), 6.40 (dd, J=8.1, 3.1 Hz, 1H), 6.21 (dd, J=8.2, 3.2 Hz, 1H), 3.94 (t, J=9.3 Hz, 1H), 3.63-3.48 (m, 5H), 3.19 (d, J=6.9 Hz, 2H), 1.63 (s, 6H), 1.54 (s, 3H), 1.51 (d, J=2.5 Hz, 6H), 1.41 (d, J=2.5 Hz, 6H), 1.28 (s, 6H), 1.26 (s, 6H), 1.23 (s, 8H), 1.16 (s, 2H), 0.96 (s, 9H), 0.92 (s, 9H), 0.85-0.81 (m, 18H), 0.70 (s, 9H), 0.66 (s, 9H), −0.27 (s, 9H), −0.63 (d, J=12.3 Hz, 1H), −1.34 (d, J=12.3 Hz, 1H);

$^{19}$F NMR (376 MHz, $C_6D_6$) δ −115.40, −116.76.

Example 43—Synthesis of Inventive Metal-Ligand Complex 26 (IMLC-26)

Ligand prepared according to the procedures cited in WO 2017/004462 A1

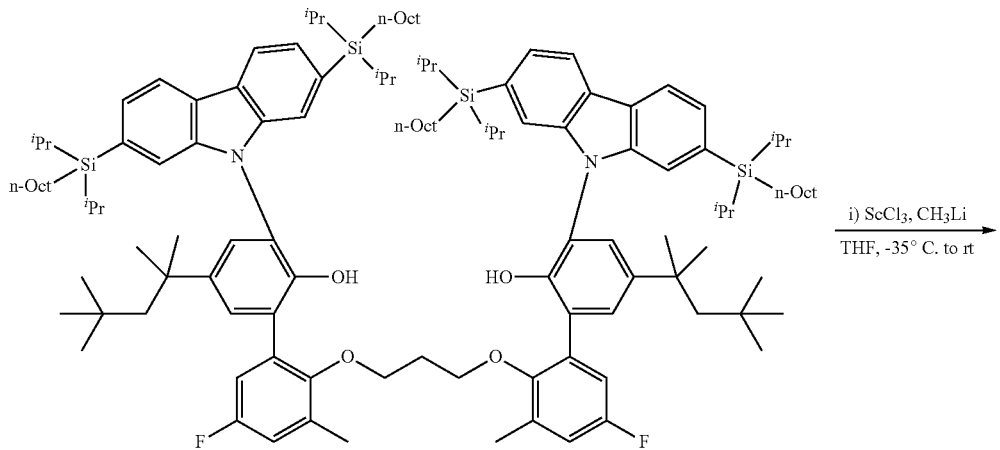

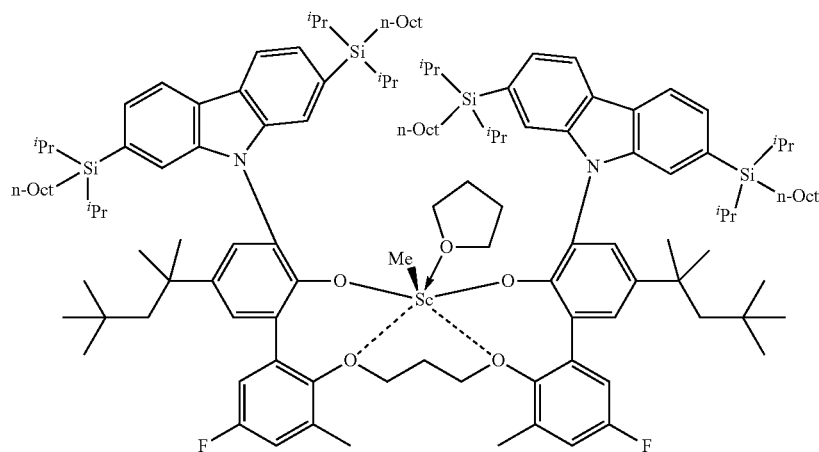

Inventive Metal-Ligand Complex 26 (IMLC-26)

A THF (8 mL) suspension of trichloroscandium (0.030 g, 0.200 mmol) was stirred at room temperature for 6 hours. The mixture was cooled to −35° C. then methyllithium (1.60 M, 0.378 mL, 0.604 mmol) in $Et_2O$ was added to the cold suspension, which was stirred at room temperature for 10 minutes. After this time the ligand 2-[2,7-bis[diisopropyl(octyl)silyl]carbazol-9-yl]-6-[2-[3-[2-[3-[2,7-bis[diisopropyl(octyl)silyl]carbazol-9-yl]-2-hydroxy-5-(1,1,3,3-tetramethylbutyl)phenyl]-4-fluoro-6-methyl-phenoxy]propoxy]-5-fluoro-3-methyl-phenyl]-4-(1,1,3,3-tetramethylbutyl)phenol (0.380 g, 0.196 mmol) in THF (2 mL) was added dropwise. The reaction mixture was stirred overnight at room temperature. The solvent was removed by vacuum, then hexanes (10 mL) was added, and the mixture was filtered through a pad of CELITE. The CELITE pad was further extracted with hexanes (2×4 mL). The combined hexanes extracts were dried under vacuum to provide an oil. This oil was taken up in hexanes (2 mL), which was then removed under vacuum to provide IMLC-26 as an off-white solid (395 mg, 94%).

$^1$H NMR (400 MHz, $C_6D_6$) (Select peaks of major product) δ 8.30 (d, J=7.7 Hz, 1H), 8.25-8.18 (m, 3H), 8.03 (s, 1H), 7.83 (s, 1H), 7.67-7.62 (m, 4H), 7.52 (d, J=7.8 Hz, 1H), 7.43 (d, J=8.0 Hz, 1H), 7.37-7.31 (m, 3H), 7.16-7.10 (m, 1H), 6.95 (dd, J=8.9, 3.2 Hz, 1H), 6.85 (ddd, J=11.9, 8.6, 3.2 Hz, 1H), 6.41 (dd, J=8.2, 3.2 Hz, 1H), 6.26 (dd, J=8.3, 3.2 Hz, 1H), 4.28 (dt, J=10.2, 4.4 Hz, 1H), 4.04-3.90 (m, 1H), 3.51 (q, J=5.7 Hz, 1H), 3.28-3.13 (m, 3H), 3.06-2.87 (m, 2H), 1.93 (s, 3H), −1.17 (s, 3H).

$^{19}$F NMR (376 MHz, $C_6D_6$) δ −115.88, −116.38.

Example 44—Synthesis of Inventive Metal-Ligand Complex 27 (IMLC-27)

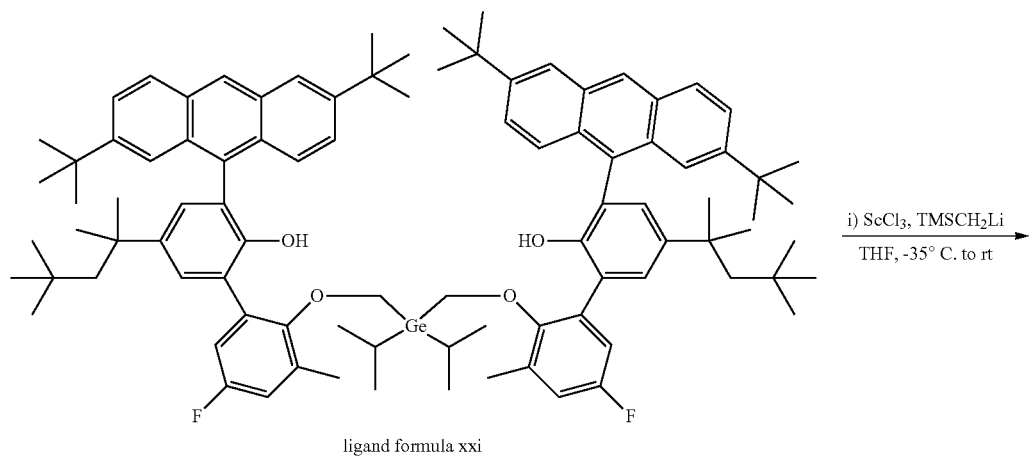

ligand formula xxi

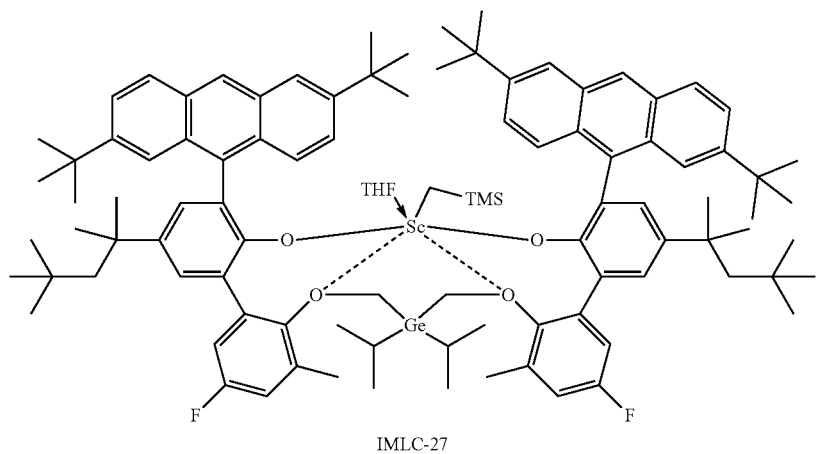

IMLC-27

In a glove box a 40-mL glass vial was charged with $ScCl_3$ (0.018 g, 0.12 mmol), THF (ca. 5 mL), and a magnetic stir bar. The mixture was cooled at −30° C. before $LiCH_2TMS$ (0.371 mL, 0.37 mol, 1.0 M in pentane) was added dropwise at room temperature. After being stirred for 3 h, 2 equiv of ligand formula xxi (0.1 g, 0.335 mmol) in THF (ca. 2 mL) was added and the reaction mixture was allowed to be stirred at room temperature overnight. Solvent was then removed in vacuo, and the residue was taken up in pentane and filtered, then dried in vacuo to afford a yellow solid (120 mg, yield: 64%).

$^1H$ NMR (400 MHz, Benzene-d6) δ 8.73 (d, J=1.8 Hz, 1H), 8.66 (d, J=1.9 Hz, 1H), 8.37 (s, 1H), 8.25 (s, 1H), 8.19 (d, J=9.3 Hz, 1H), 8.08 (dd, J=9.0, 7.3 Hz, 3H), 7.96 (d, J=1.9 Hz, 1H), 7.90 (d, J=9.3 Hz, 1H), 7.85 (d, J=2.0 Hz, 1H), 7.70 (d, J=2.7 Hz, 1H), 7.61 (ddd, J=8.5, 6.0, 1.8 Hz, 2H), 7.55-7.45 (m, 5H), 7.05 (dd, J=9.3, 2.0 Hz, 1H), 6.37 (dd, J=8.2, 3.2 Hz, 1H), 6.21 (dd, J=8.3, 3.3 Hz, 1H), 5.11 (d, J=12.6 Hz, 1H), 4.67 (d, J=12.1 Hz, 1H), 3.98 (d, J=12.7 Hz, 1H), 3.74 (d, J=12.1 Hz, 1H), 2.85 (q, J=7.2, 6.8 Hz, 3H), 2.58-2.44 (m, 2H), 1.48 (s, 9H), 1.44 (s, 9H), 1.35 (s, 9H), 1.31 (s, 9H), 1.14 (d, J=2.6 Hz, 3H), 0.94-0.84 (20H), 0.79 (s, 9H), 0.71 (s, 9H), −0.35 (s, 9H), −1.66 (d, J=12.7 Hz, 1H), −2.14 (d, J=12.6 Hz, 1H).

$^{19}F$ NMR (376 MHz, Benzene-d6) δ −117.45, −118.45. (Yield: 120 mg, 64%)

Example 45—Preparation of Ligand Formula xxi

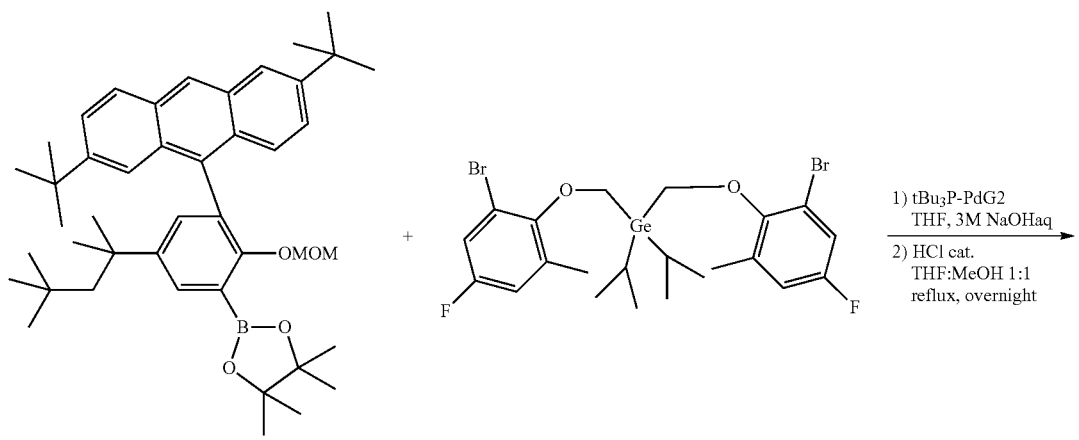

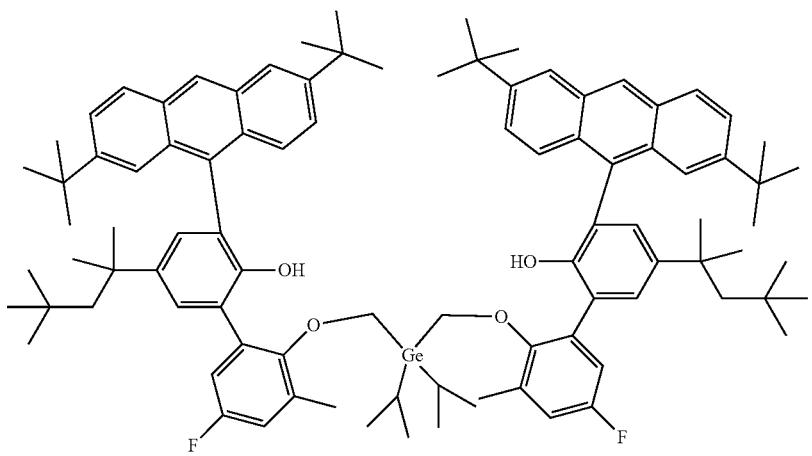
ligand formula xxi

In a nitrogen-filled glove box, a vial equipped with a stir bar was charged with 9-(3-BPin-2-(methoxymethoxy)-5-(2,4,4-trimethylpentan-2-yl)phenyl)-2,6-di-tert-butylanthracene (353 mg, 0.54 mmol), bis((2-bromo-4-fluoro-6-methylphenoxy)methyl)diisopropylgermane (169 mg, 0.25 mmol) and the Pd(PPh$_3$)$_4$ (14 mg, 0.01 mmol). The vial was equipped with a septum cap, removed from the glove box and nitrogen-purged NaOH (0.74 mL, 1.47 mmol, 2M aqueous solution) was added via syringe. The puncture holes on the septum cap were sealed with vacuum grease. The reaction mixture was stirred at 60° C. overnight. Stirring was stopped and the reaction mixture was allowed to cool to 25° C. An aliquot was taken, diluted with THF and analyzed using LC/MS, confirming complete conversion. The aqueous layer of the reaction mixture was removed with a pipette and the organic phase was washed with brine (6 mL). The organic phase was isolated and mixed with 5 mL of methanol, ~0.9 mL of conc HCl, and 5 mL THF (to improve solubility), then heated to 60° C. and stirred for 12 hours. The reaction mixture was allowed to cool to 25° C., the solution was dried under vacuum and purified via reverse-phase column chromatography with 0% to 100% gradient of CH$_3$CN/THF over 10 column volumes. Relevant fractions were combined and dried under vacuum (yield: 270 mg, 78%).

$^1$H NMR (400 MHz, Chloroform-d) δ 8.54 (s, 2H), 8.08 (s, 2H), 8.06-8.01 (m, 2H), 7.86 (d, J=9.0 Hz, 2H), 7.81-7.68 (m, 2H), 7.64 (dd, J=8.9, 1.9 Hz, 2H), 7.57 (s, 2H), 7.52 (d, J=11.2 Hz, 2H), 7.48 (s, 2H), 7.03 (d, J=8.0 Hz, 2H), 6.91 (dd, J=8.7, 3.2 Hz, 2H), 4.06 (d, J=11.4 Hz, 2H), 4.00 (d, J=11.1 Hz, 2H), 2.21 (s, 6H), 2.19 (s, 4H), 1.86 (m, 2H), 1.52 (m, 30H), 1.40 (d, J=1.4 Hz, 18H), 1.13-1.00 (m, 12H), 0.92 (d, J=1.9 Hz, 18H). $^{19}$F NMR (376 MHz, Chloroform-d) δ −119.69

Example 46—Synthesis of Inventive Metal-Ligand Complex 28 (IMLC-28)

Preparation of ligand formula xxii detailed in WO2020047384 A1.

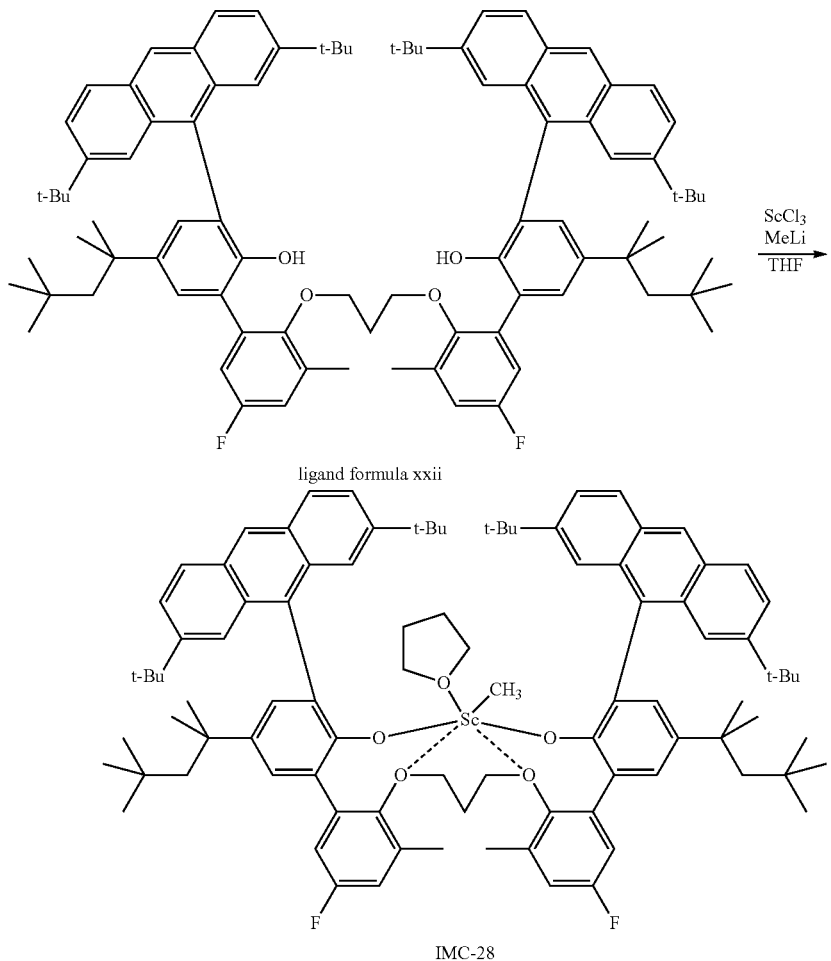

In a glovebox, a 20 mL vial was charged with $ScCl_3$ (44.7 mg, 0.295 mmol, 1.00 equiv) and 4.5 mL dry THF. The mixture was allowed to stir overnight at ambient temperature. After ~16 hours, the slurry was placed in a glovebox freezer for 1 hour. The vial was then removed from the glovebox, and treated with methyl lithium (1.6 M in diethyl ether, 0.554 mL, 0.886 mmol, 3.0 equiv). The mixture became homogeneous within a few minutes. Less than 5 minutes after addition of methyllithium, ligand formula xxii (2',2'''-(propane-1,3-diylbis(oxy))bis(3-(2,7-di-tert-butylanthracen-9-yl)-5'-fluoro-3'-methyl-5-(2,4,4-trimethylpentan-2-yl)-[1,1'-biphenyl]-2-ol)) (377 mg, 0.295 mmol, 1.00 equiv). After 3 hours of stirring, the solvent was removed by vacuum pump, and the solid was suspended in 6 mL of hexane. The solution was filtered through a 0.45 um syringe filter, and the solvent was removed from the filtrate by vacuum pump. 317 mg of solid was isolated (76%).

$^1$H NMR (400 MHz, $CD_2Cl_2$) δ 8.49 (s, 1H), 8.35 (s, 1H), 8.20 (s, 1H), 8.09-7.98 (m, 3H), 7.93 (d, J=8.9 Hz, 1H), 7.74 (d, J=8.9 Hz, 1H), 7.63 (dd, J=8.9, 1.8 Hz, 1H), 7.58 (dd, J=8.9, 1.9 Hz, 1H), 7.55 (s, 1H), 7.47 (s, 1H), 7.45-7.39 (m, 2H), 7.30 (dd, J=8.8, 1.9 Hz, 1H), 7.24 (d, J=2.7 Hz, 1H), 7.23-7.17 (m, 2H), 6.83 (dd, J=9.6, 3.2 Hz, 1H), 6.59 (dd, J=9.7, 3.3 Hz, 1H), 6.42 (dt, J=8.7, 4.9 Hz, 1H), 6.12 (dd, J=8.6, 3.1 Hz, 1H), 4.12-4.03 (m, 1H), 3.97 (ddd, J=10.2, 6.3, 3.7 Hz, 1H), 3.78 (dtd, J=19.5, 9.4, 5.0 Hz, 2H), 2.36 (td, J=7.0, 2.6 Hz, 2H), 2.23 (qd, J=6.5, 3.0 Hz, 2H), 1.99 (p, J=3.0 Hz, 2H), 1.65-1.59 (m, 3H), 1.47 (s, 9H), 1.43 (s, 3H), 1.40-1.37 (m, 6H), 1.35 (s, 3H), 1.31 (s, 9H), 1.27 (s, 3H), 1.07 (s, 9H), 0.93 (s, 9H), 0.85-0.83 (m, 4H), 0.78 (s, 9H), 0.76 (s, 9H), 0.46 (s, 3H), −2.25 (s, 3H).

$^{13}$C NMR (101 MHz, $CD_2Cl_2$) δ 160.67 (d, J=37.6 Hz), 160.58, 158.88, 158.26 (d, J=36.7 Hz), 148.73, 148.71, 148.44, 148.42, 146.74, 146.19, 145.87, 145.64, 137.96, 137.88, 137.81, 137.78, 137.69, 137.62, 135.85, 135.51, 134.94, 134.85, 134.41, 134.32, 132.94, 132.64, 131.51, 130.97, 130.82, 130.36, 130.01, 129.93, 129.89, 129.64, 129.29, 129.25, 128.39, 128.30, 127.57, 127.54, 127.22, 127.14, 126.72, 124.98, 124.31, 124.25 (2), 124.00, 123.79, 123.48, 123.12, 122.99, 122.13, 121.86, 117.67 (d, J=22.7 Hz), 115.85 (d, J=22.4 Hz), 115.26 (d, J=22.7 Hz), 114.08 (d, J=22.5 Hz), 77.54, 73.52, 70.64, 57.07, 55.86, 37.55, 37.51, 35.12, 34.86, 34.62, 34.58, 33.87, 33.31, 32.35, 32.31, 31.71, 31.58, 31.55, 30.88, 30.83, 30.40, 30.21, 30.07, 29.61, 28.64, 26.88, 25.19, 24.16, 20.37, 18.25, 15.43, 11.15. $^{19}$F NMR (376 MHz, $CD_2Cl_2$) δ −118.94 (t, J=9.2 Hz), −119.05 (d, J=8.5 Hz).

Example 47—Synthesis of Inventive Metal-Ligand Complex 29 (IMLC-29)

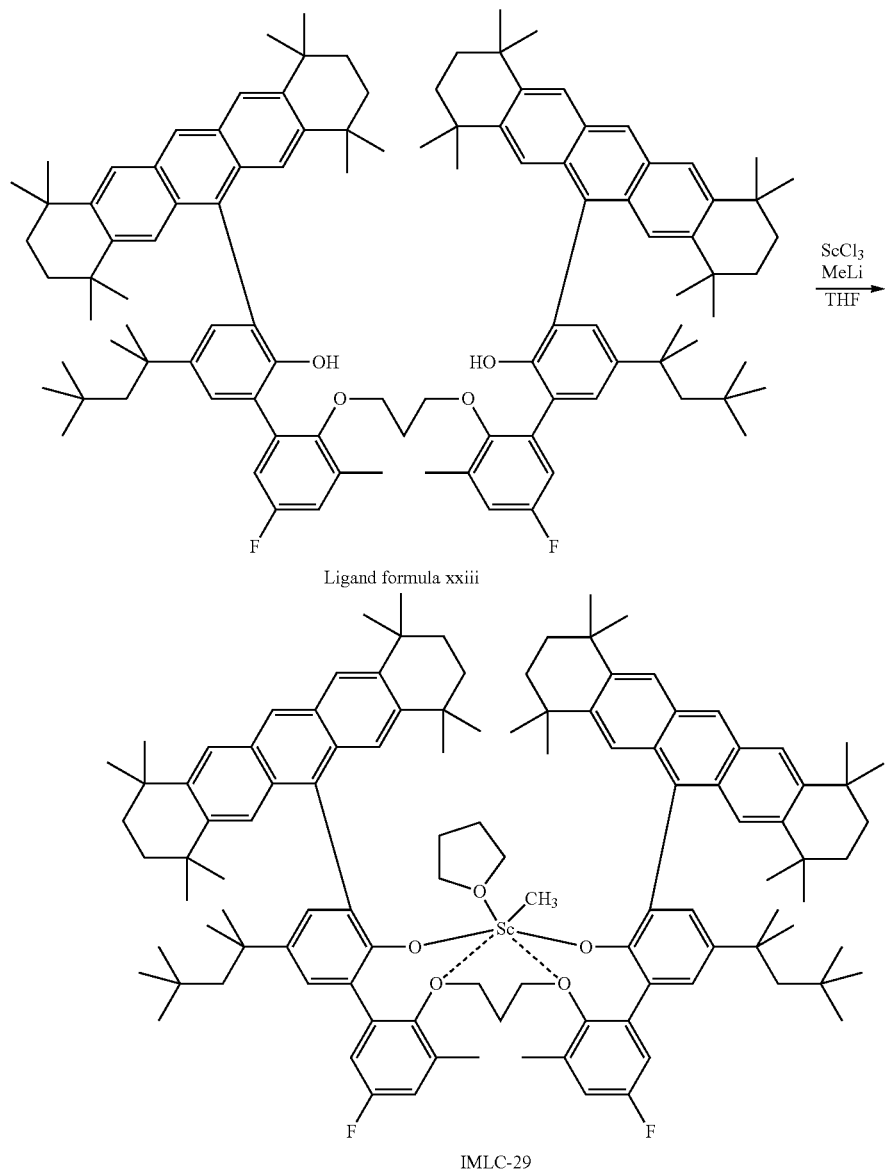

Ligand formula xxiii

IMLC-29

In a glovebox, a 20 mL vial was charged with $ScCl_3$ (20.4 mg, 0.135 mmol, 1.00 equiv) and 4.5 mL dry THF. The mixture was allowed to stir overnight at ambient temperature. After ~16 hours, the slurry was placed in a glovebox freezer for 1 hour. The vial was then removed from the glovebox, and treated with methyl lithium (1.6 M in diethyl ether, 0.253 mL, 0.405 mmol, 3.0 equiv). The mixture became homogeneous within a minute. Less than 2 minutes after addition of methyllithium, ligand formula xxiii was added (2',2'''-(propane-1,3-diylbis(oxy))bis(5'-fluoro-3'-methyl-3-(1,1,4,4,8,8,11,11-octamethyl-1,2,3,4,8,9,10,11-octahydropentacen-6-yl)-5-(2,4,4-trimethylpentan-2-yl)-[1,1'-biphenyl]-2-ol)) (202 mg, 0.135 mmol, 1.00 equiv). After 14 hours of stirring, the solvent was removed by vacuum pump, and the solid was suspended in 6 mL of hexane. The solution was filtered through a 0.45 um syringe filter, and the solvent was removed from the filtrate by vacuum pump. 187 mg of solid was isolated (85%).

$^1$H NMR (400 MHz, $CD_2Cl_2$) δ 8.42 (s, 1H), 8.20 (s, 1H), 8.11 (s, 1H), 8.04 (s, 1H), 8.00 (d, J=2.1 Hz, 2H), 7.85 (s, 1H), 7.72 (s, 1H), 7.52 (d, J=2.0 Hz, 2H), 7.35 (d, J=2.7 Hz, 1H), 7.20 (t, J=2.5 Hz, 2H), 7.15 (d, J=2.7 Hz, 1H), 6.80 (dd, J=9.6, 3.2 Hz, 1H), 6.68 (dd, J=9.6, 3.3 Hz, 1H), 6.35 (dd, J=8.6, 3.2 Hz, 1H), 6.11 (dd, J=8.4, 3.2 Hz, 1H), 4.09 (dt, J=9.9, 4.7 Hz, 1H), 3.99 (dt, J=10.4, 4.9 Hz, 1H), 3.81 (dt, J=10.5, 5.4 Hz, 1H), 3.72 (dt, J=9.7, 4.9 Hz, 1H), 3.53 (bs, 2H), 2.41 (dt, J=8.5, 6.4 Hz, 2H), 2.22 (dt, J=8.9, 6.6 Hz, 2H), 1.99-1.20 (m, 72H), 0.99-0.73 (m, 36H), −2.27 (s, 3H).

$^{13}$C NMR (101 MHz, $CD_2Cl_2$) δ 160.97, 160.54, 160.41, 159.35, 158.55, 158.00, 148.79, 148.76, 148.49, 148.47, 143.26, 143.00, 142.95, 142.78, 142.60, 142.06, 141.92, 141.76, 138.31, 138.23, 138.15, 138.07, 136.02, 135.90, 135.46, 135.33, 135.24, 135.15, 134.61, 134.52, 133.05, 132.81, 131.29, 130.93, 130.62, 130.25, 130.07, 129.83, 129.50, 129.22, 129.12, 128.83, 127.50, 127.20, 126.90, 125.35, 125.31, 125.21, 125.10, 124.94, 124.53, 124.08, 123.87, 123.79, 122.97, 122.56, 117.05, 116.82, 116.11, 115.88, 115.02, 114.80, 114.00, 113.78, 77.22, 73.84, 70.80, 56.90, 56.64, 37.47, 35.35, 35.23, 35.19, 35.10, 35.04, 34.86, 34.82, 34.67, 34.50, 34.49, 34.45, 34.41, 34.30, 34.21, 33.60, 33.15, 32.93, 32.74, 32.71, 32.61, 32.57, 32.40, 32.36, 32.31, 32.14, 32.11, 31.97, 31.92, 31.89, 31.86, 31.75, 31.73, 31.69, 31.63, 31.54, 30.86, 30.58, 30.09, 24.23, 22.61, 17.80, 15.60, 13.83.

$^{19}F$ NMR (470 MHz, $CD_2Cl_2$) δ −118.71 (t, J=9.0 Hz), −119.21 (t, J=9.0 Hz).

Example 48—4,4,5,5-tetramethyl-2-(1,1,4,4,8,8,11,11-octamethyl-1,2,3,4,8,9,10,11-octahydropentacen-6-yl)-1,3,2-dioxaborolane

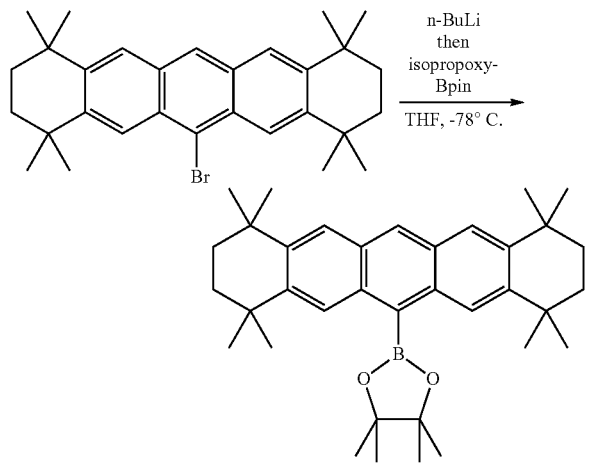

A 50 mL round bottom flask was charged with the 6-bromo-1,1,4,4,8,8,11,11-octamethyl-1,2,3,4,8,9,10,11-octahydropentacene (1.30 g, 2.72 mmol, 1.00 equiv) and 14 mL dry THF. The solution was cooled to −78° C. under a blanket of nitrogen. N-Butyllithium (1.6 M in hexane, 1.87 mL, 3.00 mmol, 1.10 equiv) was injected, and the mixture was allowed to stir for 30 minutes. The solution became heterogeneous. Isopropoxy Bpin (0.666 mL, 3.27 mmol, 1.20 equiv) was injected, and the solution was gradually warmed to 0° C. over 1 hour.

The solution was quenched with aq. Ammonium chloride. The product was extracted with several portions of dichloromethane. Combined organic fractions were concentrated and the residue was purified by chromatography on silica gel (0 to 20% EtOAc in hexane). 1.154 g of boronic ester was isolated as a yellow solid (81% yield).

$^1H$ NMR (400 MHz, $CDCl_3$) δ 8.42 (s, 2H), 8.24 (s, 1H), 7.83 (s, 2H), 1.78 (s, 8H), 1.58 (s, 12H), 1.42 (s, 12H), 1.40 (s, 12H).

$^{13}C$ NMR (101 MHz, $CDCl_3$) δ 143.56, 142.91, 134.95, 129.97, 127.17, 125.26, 124.88, 83.76, 35.21, 34.89, 34.47, 32.74, 32.48, 25.34.

Example 49—2',2'''-(propane-1,3-diylbis(oxy))bis(5'-fluoro-3'-methyl-3-(1,1,4,4,8,8,11,11-octamethyl-1,2,3,4,8,9,10,11-octahydropentacen-6-yl)-5-(2,4,4-trimethylpentan-2-yl)-[1,1'-biphenyl]-2-ol)—Preparation of Ligand Formula (xxiii)

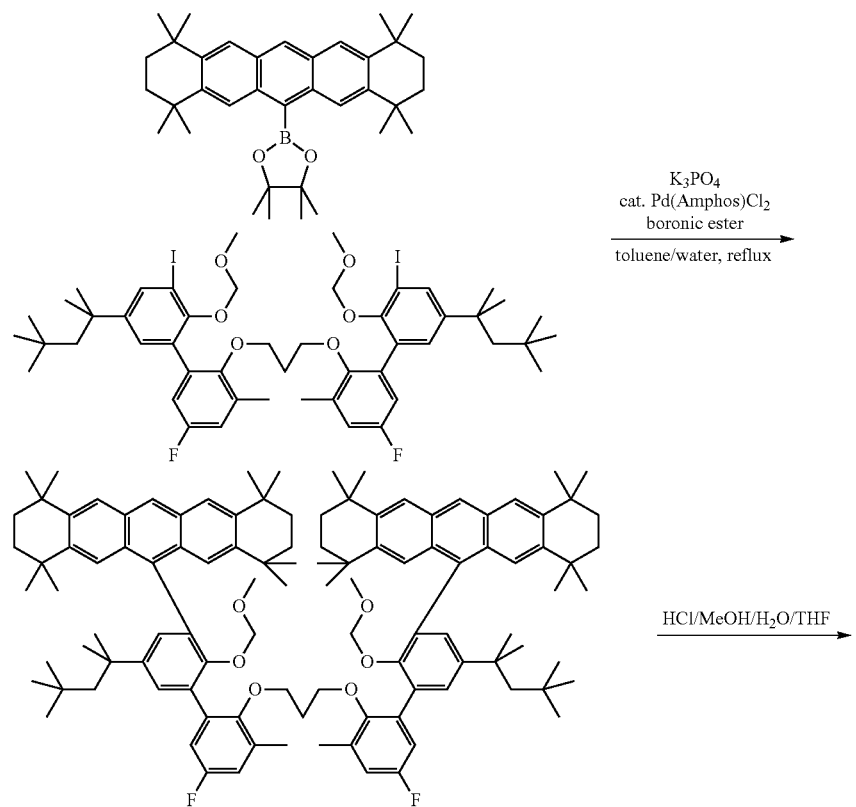

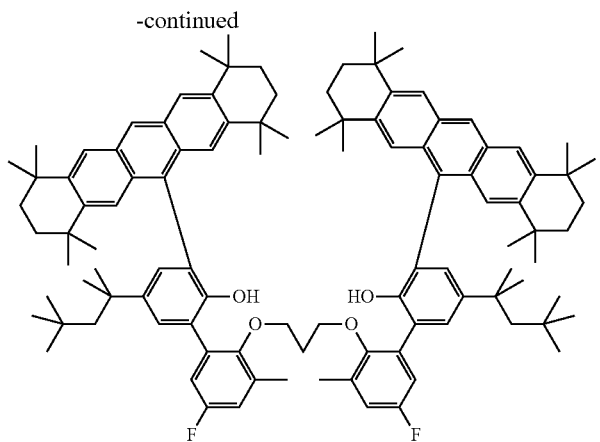

A 100 mL round bottom flask was charged with 1,3-bis ((5-fluoro-3'-iodo-2'-(methoxymethoxy)-3-methyl-5'-(2,4,4-trimethylpentan-2-yl)-[1,1'-biphenyl]-2-yl)oxy)propane (0.951 g, 0.913 mmol, 1.00 equiv), 4,4,5,5-tetramethyl-2-(1,1,4,4,8,8,11,11-octamethyl-1,2,3,4,8,9,10,11-octahydropentacen-6-yl)-1,3,2-dioxaborolane (1.15 g, 2.19 mmol, 2.20 equiv), and Pd(Amphos)Cl$_2$ (65 mg, 0.091 mmol, 10 mol %). A reflux condenser was attached and the unit was placed under a nitrogen atmosphere. Nitrogen-sparged THF (10 mL) was added, followed by nitrogen-sparged K$_3$PO$_4$ (4.57 mL, 9.13 mmol, 10.0 equiv). The mixture was heated to 70° C. and stirred under a blanket of nitrogen for 14 hours.

The solution was cooled, and the phases were separated. The organic phase was concentrated, and the residue purified by chromatography on silica gel (0 to 10% EtOAc in hexane). Three portions were isolated: (1) protodeborylated boronic ester (230 mg), (2) desired MOM-ether intermediate (772 mg), (3) an unidentified material, possibly mono-coupled intermediate (405 mg).

The solid MOM-ether intermediate was dissolved in 10 mL THF and 10 mL methanol. ~3 mL of 6 M HCl was added, and the mixture was allowed to reflux overnight.

The solution was cooled, diluted with water, and the product was extracted with portions of dichloromethane. Combined organic fractions were concentrated, and the residue purified by chromatography on silica gel (0 to 10% EtOAc in hexane). A second column purification was performed (0 to 10% dichloromethane in hexane) to give 529 mg of final ligand as a yellow solid (39%).

$^1$H NMR (400 MHz, CDCl$_3$) δ 8.30 (s, 2H), 7.92 (s, 4H), 7.59 (s, 4H), 7.45 (d, J=2.4 Hz, 2H), 7.31 (d, J=2.4 Hz, 2H), 6.95 (dd, J=9.1, 3.2 Hz, 2H), 6.78 (dd, J=8.9, 3.1 Hz, 2H), 5.45 (s, 2H), 3.71 (t, J=6.2 Hz, 4H), 1.97 (s, 6H), 1.76-1.62 (m, 22H), 1.43 (d, J=2.8 Hz, 12H), 1.39 (d, J=2.3 Hz, 24H), 1.15 (s, 12H), 1.09 (s, 12H), 0.78 (s, 18H).

$^{13}$C NMR (101 MHz, CDCl$_3$) δ 159.56, 157.15, 150.75, 150.73, 148.78, 144.10, 143.54, 141.50, 133.36, 133.28, 133.20, 133.11, 130.49, 130.33, 129.05, 128.99, 128.50, 125.46, 124.90, 124.47, 124.46, 122.76, 116.54, 116.32, 116.23, 116.01, 70.17, 56.73, 38.12, 35.03, 34.87, 34.66, 34.52, 32.62, 32.50, 32.41, 32.14, 32.02, 31.57, 26.90, 25.26, 20.69, 16.68.

$^{19}$F NMR (470 MHz, CDCl$_3$) δ -119.92 (t, J=8.9 Hz).

Preparation of 1,3-bis((5-fluoro-3'-iodo-2'-(methoxymethoxy)-3-methyl-5'-(2,4,4-trimethylpentan-2-yl)-[1,1'-biphenyl]-2-yl)oxy)propane detailed in WO2020047384 A1.

Example 50—Synthesis of Inventive Metal-Ligand Complex 30 (IMLC-30)

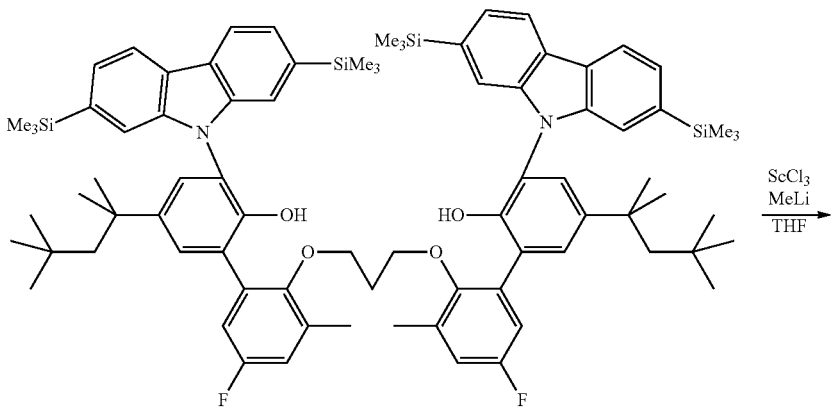

Ligand formula xxiv

-continued

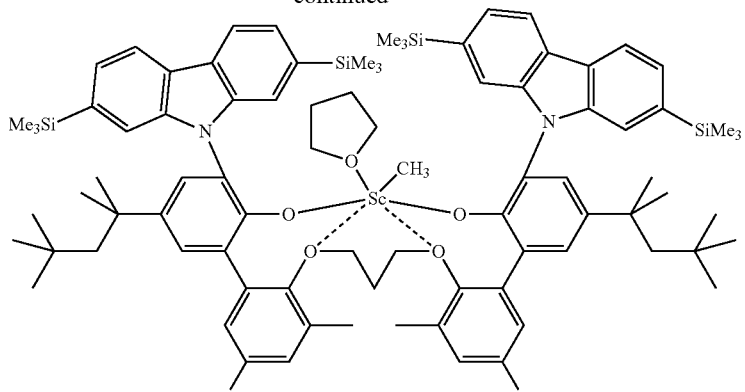

IMLC-30

In a glovebox, a 20 mL vial was charged with ScCl₃ (14.9 mg, 0.0985 mmol, 1.00 equiv) and 4.5 mL dry THF. The mixture was allowed to stir overnight at ambient temperature. After ~16 hours, the slurry was placed in a glovebox freezer for 1 hour. The vial was then removed from the glovebox and then treated with methyl lithium (1.6 M in diethyl ether, 0.191 mL, 0.306 mmol, 3.1 equiv). The mixture became homogeneous within a minute. Less than 2 minutes after addition of methyllithium, ligand formula xxiv was added (2',2'''-(propane-1,3-diylbis(oxy))bis(3-(2,7-bis (trimethylsilyl)-9H-carbazol-9-yl)-5'-fluoro-3'-methyl-5-(2, 4,4-trimethylpentan-2-yl)-[1,1'-biphenyl]-2-ol)) (136 mg, 0.0985 mmol, 1.00 equiv). After 14 hours of stirring, the solvent was removed by vacuum pump, and the solid was suspended in 3 mL of hexane. The solution was filtered through a 0.45 um syringe filter, and the solvent was removed from the filtrate by vacuum pump. The solid was dissolved in ~1 mL pentane and then was allowed to chill in the glovebox freezer overnight. White solids had formed and then were separated by decantation. 57.4 mg of solid was isolated (40%).

¹H NMR (500 MHz, CD₂Cl₂) δ 8.20 (dd, J=7.6, 0.8 Hz, 1H), 8.16 (dd, J=7.6, 0.8 Hz, 1H), 8.13 (dd, J=7.6, 0.8 Hz, 1H), 7.97 (dd, J=7.6, 0.7 Hz, 1H), 7.95 (q, J=1.2 Hz, 1H), 7.60 (s, 1H), 7.54 (dd, J=11.3, 2.7 Hz, 1H), 7.51-7.43 (m, 2H), 7.43-7.27 (m, 3H), 7.27-7.18 (m, 3H), 7.14 (d, J=0.9 Hz, 1H), 6.92 (dd, J=9.3, 3.2 Hz, 1H), 6.58 (dd, J=9.2, 3.2 Hz, 1H), 6.49 (dd, J=8.6, 3.2 Hz, 1H), 6.28 (dd, J=8.7, 3.2 Hz, 1H), 4.20-4.05 (m, 1H), 3.96-3.83 (m, 1H), 3.79-3.69 (m, 1H), 3.69-3.59 (m, 1H), 2.87-2.71 (m, 2H), 2.62-2.45 (m, 2H), 1.96 (m, 1H), 1.86 (m, 1H), 1.81-1.74 (m, 2H), 1.70-1.55 (m, 5H), 1.41 (s, 3H), 1.39-1.32 (m, 9H), 0.97-0.90 (m, 4H), 0.82 (s, 9H), 0.79 (s, 9H), 0.66 (s, 3H), 0.42 (s, 9H), 0.28 (s, 9H), 0.11 (s, 9H), −0.04 (s, 9H), −1.84 (s, 3H).

¹⁹F NMR (470 MHz, CD₂Cl₂) δ −118.26 (t, J=8.8 Hz), −118.32 (t, J=9.1 Hz).

Example 51—1-(ethoxymethoxy)-4-(2,4,4-trimethylpentan-2-yl)benzene

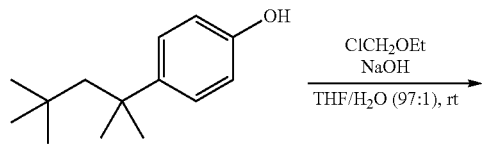

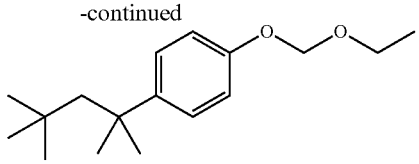

A clear, colorless solution of the 4-(2,4,4-trimethylpentan-2-yl)phenol (10.091 g, 48.909 mmol, 1.00 eq) in THF (300 mL) and H₂O (3 mL) was sparged under positive flow of nitrogen for 1 hr upon which an aqueous solution of NaOH (7.8 mL, 97.818 mmol, 2.00 eq, 50% w/w) was added via syringe in a quick dropwise manner. After stirring (500 rpm) for 20 mins at 23° C., neat chloromethyl ethyl ether (13.6 mL, 146.73 mmol, 3.00 eq) was added via syringe in a quick dropwise manner to the clear colorless solution. After stirring for 2 hrs at 23° C., the now white heterogeneous mixture was diluted with aqueous NaOH (150 mL, 1 N), THF was removed via rotary evaporation, the resultant white biphasic mixture was diluted with CH₂Cl₂ (100 mL), poured into a separatory funnel, partitioned, organics were washed with aqueous NaOH (2×50 mL, 1 N), residual organics were extracted from the aqueous (2×25 mL), combined, dried over solid Na₂SO₄, decanted, and concentrated. The resultant pale yellow oil was diluted in CH₂Cl₂ (20 mL), suction filtered through a silica gel pad, rinsed with CH₂Cl₂ (4×50 mL), and the filtrate was concentrated to afford the phenolic methyl ethyl ether as a clear colorless oil (12.800 g, 48.420 mmol, 99%).

¹H NMR (400 MHz, CDCl₃) δ 7.29-7.22 (m, 2H), 6.98-6.90 (m, 2H), 5.19 (d, J=1.1 Hz, 2H), 3.72 (q, J=7.1 Hz, 2H), 1.69 (s, 2H), 1.33 (s, 6H), 1.21 (t, J=7.1 Hz, 3H), 0.71 (s, 9H).

¹³C NMR (101 MHz, CDCl₃) δ 155.01, 143.38, 127.01, 115.44, 93.30, 64.08, 56.99, 37.99, 32.30, 31.75, 31.59, 15.10.

131

Example 52—(2-(ethoxymethoxy)-5-(2,4,4-trimethylpentan-2-yl)phenyl)trimethylsilane

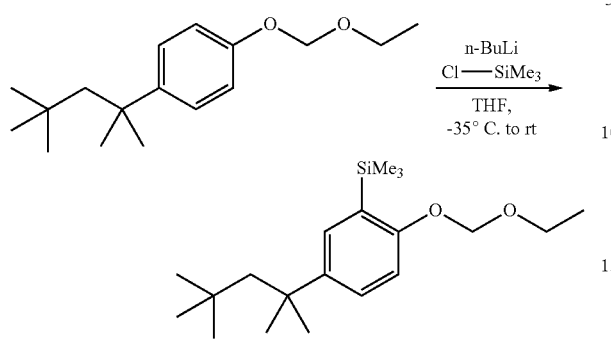

In a continuous purge, nitrogen filled glovebox, a clear, colorless solution of the protected phenol (5.000 g, 18.910 mmol, 1.00 eq) in anhydrous deoxygenated THF (100 mL) was placed in a freezer cooled to −35° C. for 2 hrs upon which a solution of n-BuLi (15.4 mL, 24.583 mmol, 1.30 eq, 2.6 M in hexanes) was added via syringe in a quick dropwise manner. The now golden yellow solution was allowed to sit in the freezer for 45 mins, removed, stirred (300 rpm) at 23° C. for 2 hrs, the now dark golden yellow solution was placed back in the freezer cooled to −35° C. for 1 hr, neat chlorotrimethylsilane (3.60 mL, 28.365 mmol, 1.50 eq) was then added neat via syringe in a quick dropwise manner, after 20 mins the now white mixture was removed from the freezer, and stirred (300 rpm) at 23° C. for 2 hrs. The resultant clear colorless solution was removed from the glovebox, neutralized with a saturated aqueous NaHCO$_3$ mixture, diluted with CH$_2$Cl$_2$ (100 mL), poured into a separatory funnel, partitioned, organics were washed with saturated aqueous NaHCO$_3$ mixture (1×50 mL), residual organics were extracted from the aqueous (2×25 mL), combined, dried over solid Na$_2$SO$_4$, decanted, and concentrated. The resultant pale yellow oil was diluted in CH$_2$Cl$_2$ (10 mL), suction filtered through a silica gel pad, rinsed with CH$_2$Cl$_2$ (4×25 mL), and the filtrate was concentrated to afford the protected phenol as a clear pale yellow oil (5.365 g, 15.939 mmol, 84%).

$^1$H NMR (400 MHz, CDCl$_3$) δ 7.36 (d, J=2.6 Hz, 1H), 7.29-7.24 (m, 1H), 6.96 (d, J=8.6 Hz, 1H), 5.20 (s, 2H), 3.71 (q, J=7.0 Hz, 2H), 1.69 (s, 2H), 1.35 (s, 6H), 1.22 (t, J=7.1 Hz, 3H), 0.71 (s, 9H), 0.27 (s, 9H).

$^{13}$C NMR (101 MHz, CDCl$_3$) δ 159.89, 142.26, 132.63, 128.10, 126.78, 111.69, 92.67, 64.02, 57.10, 38.03, 32.31, 31.76, 31.53, 15.10, −0.77.

132

Example 53—(2-(ethoxymethoxy)-3-(4,4,5,5-tetramethyl-1,3,2-dioxaborolan-2-yl)-5-(2,4,4-trimethylpentan-2-yl)phenyl)trimethylsilane

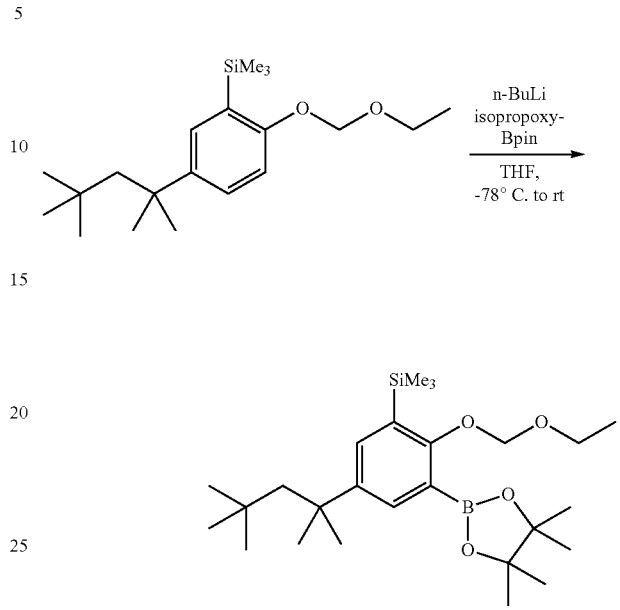

A 500 mL round bottom flask was charged with (2-(ethoxymethoxy)-5-(2,4,4-trimethylpentan-2-yl)phenyl) trimethylsilane (16.9 g, 50.2 mmol. 1.00 equiv) and 148 mL dry THF. The solution was cooled to −78° C. under a blanket of nitrogen. N-butyllithium (2.5 M in hexane, 22.1 mL, 55.2 mmol, 1.10 equiv) was added dropwise. The mixture was stirred at −78° C., and was allowed to warm to room temperature over 2 hours.

The flask was returned to the −78° C. bath, and isopropoxy-Bpin (12.3 mL, 60.3 mmol, 1.20 equiv) was injected. The mixture was allowed to gradually warm to ambient temperature over 3 hours.

The solution was quenched with sat. aq. Ammonium chloride. Phases were separated, and the aqueous phase was extracted with a few portions of dichloromethane. Combined organic fractions were concentrated and the residue purified by chromatography on silica gel (0 to 10% EtOAc in hexane). 11.434 g of product was isolated as a colorless oil (49%).

$^1$H NMR (500 MHz, CDCl$_3$) δ 7.66 (d, J=2.7 Hz, 1H), 7.51 (d, J=2.8 Hz, 1H), 5.17 (s, 2H), 3.68 (q, J=7.1 Hz, 2H), 1.71 (s, 2H), 1.36 (d, J=5.8 Hz, 18H), 1.19 (t, J=7.1 Hz, 3H), 0.69 (s, 9H), 0.31 (s, 9H).

$^{13}$C NMR (126 MHz, CDCl$_3$) δ 165.13, 143.13, 136.57, 135.41, 130.36, 98.70, 83.56, 65.55, 56.97, 38.11, 32.33, 31.81, 31.57, 24.82, 15.16, −0.13.

Example 54—1,3-bis((2'-(ethoxymethoxy)-5-fluoro-3-methyl-5'-(2,4,4-trimethylpentan-2-yl)-3'-(trimethylsilyl)-[11'-biphenyl]-2-yl)oxy)propane

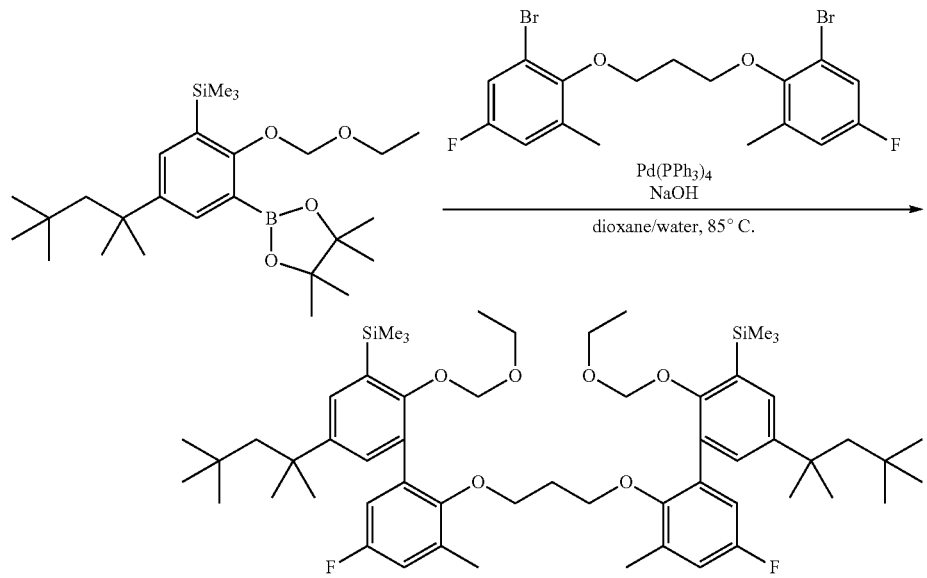

A 500 mL round bottom flask was charged with (2-(ethoxymethoxy)-3-(4,4,5,5-tetramethyl-1,3,2-dioxaborolan-2-yl)-5-(2,4,4-trimethylpentan-2-yl)phenyl)trimethylsilane (11.4 g, 24.6 mmol, 2.20 equiv), 1,3-bis(2-bromo-4-fluoro-6-methylphenoxy)propane (5.04 g, 11.2 mmol, 1.00 equiv), sodium hydroxide (4.03 g, 101 mmol, 9.00 equiv), and Pd(PPh$_3$)$_4$ (1.29 g, 1.12 mmol, 10 mol %). A reflux condenser was attached, and the unit was placed under a nitrogen atmosphere. 130 mL of nitrogen-sparged 6:1 dioxane:water was added, and the mixture was stirred at 85° C. under nitrogen.

After 14 hours, the solution was cooled and quenched with brine. The phases were separated and the aqueous phase extracted with two portions of dichloromethane. Combined organic fractions were concentrated and the residue was purified by chromatography on silica gel (0 to 10% EtOAc in hexane). 9.33 g of product was isolated as a clear, colorless oil (86%).

$^1$H NMR (400 MHz, CDCl$_3$) δ 7.39 (d, J=2.5 Hz, 2H), 7.23 (d, J=2.5 Hz, 2H), 6.88 (dd, J=8.9, 3.2 Hz, 2H), 6.82 (dd, J=8.9, 3.1 Hz, 2H), 4.59 (s, 4H), 3.61-3.02 (m, 8H), 2.20 (s, 6H), 1.69 (s, 4H), 1.40 (t, J=6.5 Hz, 2H), 1.31 (s, 12H), 0.97 (t, J=7.1 Hz, 6H), 0.68 (s, 18H), 0.29 (s, 18H).

$^{13}$C NMR (101 MHz, CDCl$_3$) δ 159.32, 157.12, 156.92, 151.31, 151.29, 144.35, 134.86, 134.77, 133.04, 132.96, 132.92, 131.98, 130.61, 129.36, 129.35, 116.22, 116.00, 115.74, 115.52, 97.55, 69.38, 64.88, 56.85, 38.16, 32.31, 31.82, 30.91, 16.77, 16.76, 14.86, −0.16.

$^{19}$F NMR (470 MHz, CDCl$_3$) δ −120.59 (t, J=8.8 Hz).

Preparation of 1,3-bis(2-bromo-4-fluoro-6-methylphenoxy)propane detailed in WO2020047384 A1.

Example 55—1,3-bis((2'-(ethoxymethoxy)-5-fluoro-3'-iodo-3-methyl-5'-(2,4,4-trimethylpentan-2-yl)-[1,1'-biphenyl]-2-yl)oxy)propane

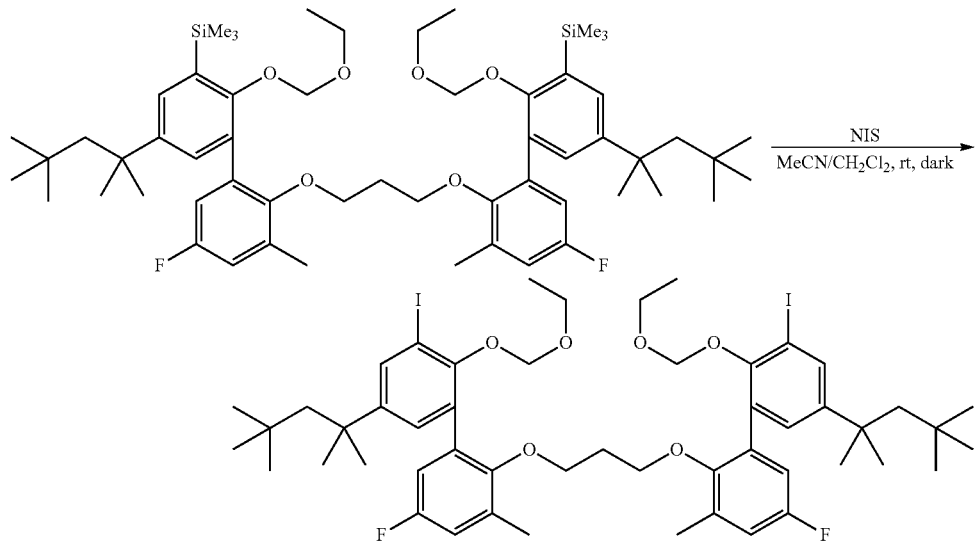

A 500 mL round bottom flask was charged with 1,3-bis((2'-(ethoxymethoxy)-5-fluoro-3-methyl-5'-(2,4,4-trimethylpentan-2-yl)-3'-(trimethylsilyl)-[1,1'-biphenyl]-2-yl)oxy)propane (9.00 g, 9.36 mmol, 1.00 equiv). The solid was dissolved in 130 mL acetonitrile and 100 mL dichloromethane. The mixture was protected from light and treated with n-iodosuccinimide (14.7 g, 65.5 mmol, 7.00 equiv). The mixture stirred for 24 hours.

Only partial conversion was observed by TLC, and an additional 7.00 g of NIS was added. The mixture stirred for 6 days. TLC showed near-completion. A final 5.00 g of NIS was added, and the mixture stirred for an additional 24 hours.

The reaction was quenched with aq. Sodium thiosulfate solution. Product was extracted with several portions of dichloromethane. Combined organic fractions were washed with 5% NaOH. The organic phase was concentrated, and the residue purified by chromatography on silica gel (0 to 10% EtOAc in hexane). 8.314 g of product was isolated as a clear, colorless oil (83%).

$^1$H NMR (400 MHz, CDCl$_3$) δ 7.74 (d, J=2.3 Hz, 2H), 7.25 (d, J=2.4 Hz, 2H), 6.91-6.78 (m, 4H), 4.77 (s, 4H), 3.40 (s, 4H), 3.29 (q, J=7.1 Hz, 4H), 2.22 (s, 6H), 1.68 (s, 4H), 1.47 (p, J=6.6 Hz, 2H), 1.30 (s, 12H), 0.94 (t, J=7.1 Hz, 6H), 0.73 (s, 18H).

$^{13}$C NMR (101 MHz, CDCl$_3$) δ 159.26, 156.86, 152.18, 151.21, 151.18, 147.89, 136.98, 133.50, 133.41, 133.27, 133.18, 131.66, 131.64, 129.66, 116.78, 116.56, 115.66, 115.43, 98.00, 92.56, 69.88, 65.32, 56.65, 38.18, 32.39, 31.88, 30.76, 16.82, 14.76.

$^{19}$F NMR (376 MHz, CDCl$_3$) δ −120.29 (t, J=8.7 Hz).

Example 56—Preparation of Ligand Formula (xxiv)

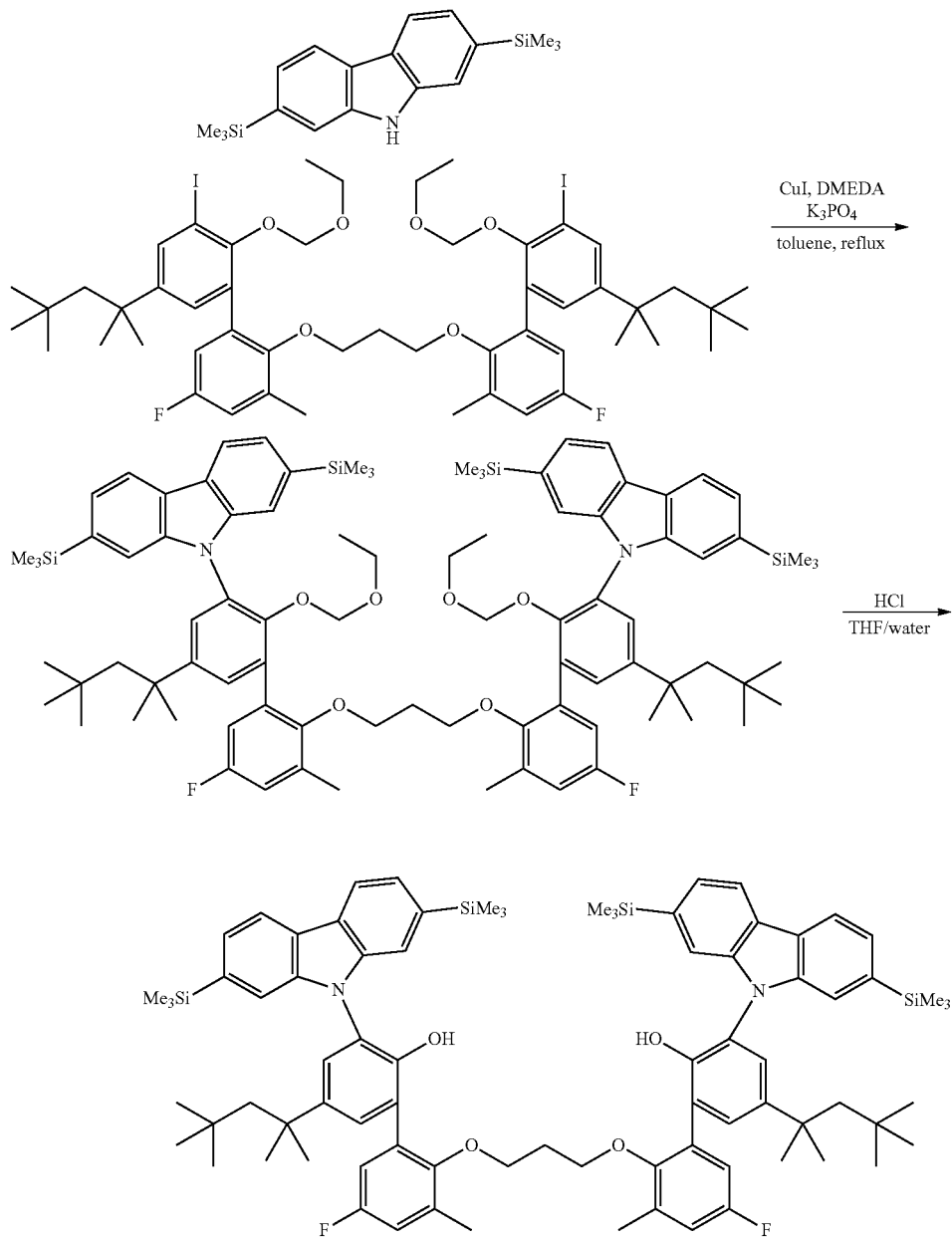

In a glovebox, a 50 mL round bottom flask was charged with 1,3-bis((2'-(ethoxymethoxy)-5-fluoro-3'-iodo-3-methyl-5'-(2,4,4-trimethylpentan-2-yl)-[1,1'-biphenyl]-2-yl)oxy)propane (0.500 g, 0.468 mmol, 1.00 equiv), 2,7-bis(trimethylsilyl)-9H-carbazole (0.364 g, 1.17 mmol, 2.50 equiv), K$_3$PO$_4$ (0.596 g, 2.81 mmol, 6.00 equiv), CuI (89 mg, 0.47 mmol, 1.0 equiv), N,N'-dimethylethylenediamine (0.081 mL, 0.75 mmol, 1.6 equiv), and 6 mL toluene. A reflux condenser was attached, the unit was sealed with a rubber septum, and was transferred to a fume hood. The mixture was allowed to stir at 120° C. under a blanket of nitrogen for 24 hours. The heterogeneous mixture was cooled and diluted with dichloromethane. The slurry was filtered through a plug of silica and the filtrate was concentrated. The residue was purified by chromatography on silica gel (0 to 10% EtOAc in hexane). 556 mg of a white solid was isolated. Proton/Fluorine NMR showed this to be the coupled intermediate with a little bit of the leftover carbazole. The solid was dissolved in 5 mL of THF. The solution was treated with 1 mL of 6M HCl, and the mixture was stirred at ambient temperature overnight. TLC showed no conversion by morning, so the mixture was stirred at 70° C. for 4 hours. TLC showed several products forming. Suspecting that de-silylation might be occurring, the reaction was stopped. The crude solution was adsorbed to silica and purified by chromatography (0 to 10% EtOAc in hexane). 136 mg of desired product was isolated as a white solid (22%).

$^1$H NMR (500 MHz, CDCl$_3$) δ 8.14 (d, J=7.7 Hz, 4H), 7.47-7.35 (m, 8H), 7.24 (s, 4H), 6.97 (dd, J=8.8, 3.1 Hz, 2H), 6.80 (dd, J=8.6, 3.1 Hz, 2H), 6.40 (s, 2H), 3.60 (t, J=6.4 Hz, 4H), 1.83 (s, 6H), 1.73 (s, 4H), 1.66 (q, J=6.3 Hz, 2H), 1.37 (s, 12H), 0.79 (s, 18H), 0.19 (s, 36H).

$^{13}$C NMR (126 MHz, CDCl$_3$) δ 159.88, 157.94, 149.93, 147.75, 142.95, 140.99, 138.07, 133.62, 133.55, 132.85, 132.78, 129.19, 127.59, 126.37, 125.01, 124.43, 123.85, 119.76, 117.37, 117.19, 116.12, 115.94, 114.52, 70.92, 57.06, 38.22, 32.50, 31.94, 31.67, 16.32, −0.82.

$^{19}$F NMR (470 MHz, CDCl$_3$) δ −118.21 (t, J=8.6 Hz).

Preparation of 2,7-bis(trimethylsilyl)-9H-carbazole detailed in *J. Org. Chem.* 2019, 84, 11783.

Example 57—Synthesis of Inventive Metal-Ligand Complex 31 (IMLC-31)

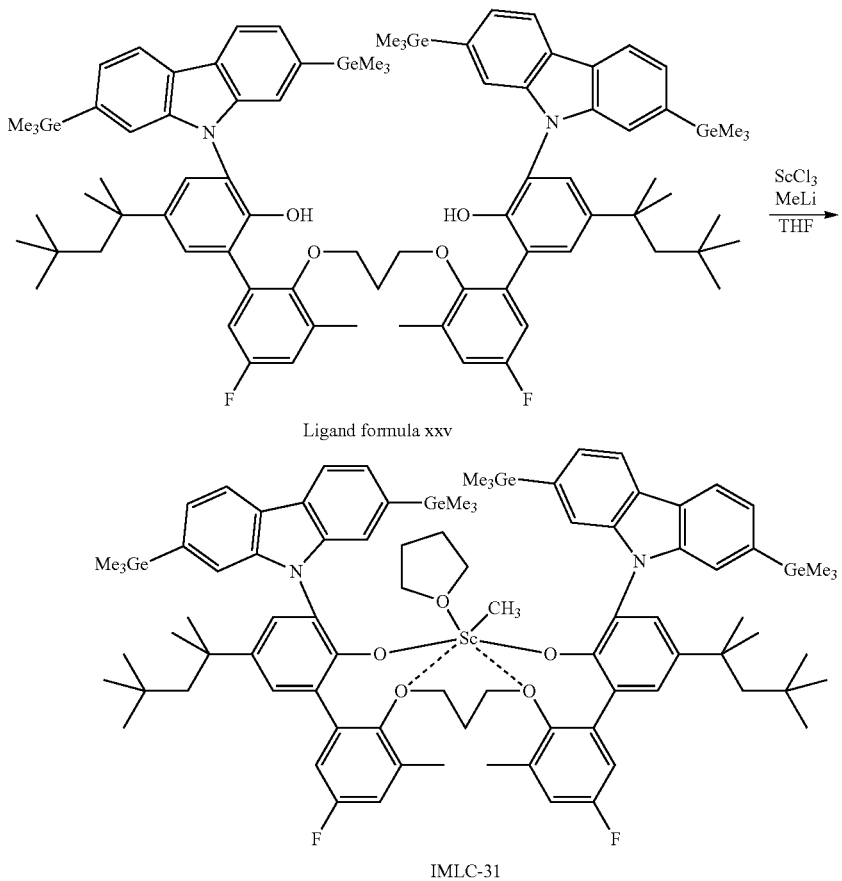

In a glovebox, a 20 mL vial was charged with ScCl$_3$ (18.0 mg, 0.119 mmol, 1.00 equiv) and 4.5 mL dry THF. The mixture was allowed to stir overnight at ambient temperature. After ~16 hours, the slurry was placed in a glovebox freezer for 1 hour. The vial was then removed from the glovebox, and treated with methyl lithium (1.6 M in diethyl ether, 0.231 mL, 0.369 mmol, 3.1 equiv). The mixture became homogeneous within a minute. Less than 2 minutes after addition of methyllithium, ligand formula xxv was added (2',2'''-(propane-1,3-diylbis(oxy))bis(3-(2,7-bis(trimethylgermyl)-9H-carbazol-9-yl)-5'-fluoro-3'-methyl-5-(2,4,4-trimethylpentan-2-yl)-[1,1'-biphenyl]-2-ol)) (178 mg, 0.119 mmol, 1.00 equiv). The mixture stirred for 4 hours, and solvent was removed by vacuum pump. The solid residue was mixed with 5 mL dry hexane, and the slurry was filtered through a 0.45 um syringe filter. The filtrate was concentrated to a white solid. The solid was suspended in ~3 mL pentane. The slurry was filtered, and the white solid recovered. 74.9 mg of white solid was isolated (39%).

$^1$H NMR (500 MHz, CD$_2$Cl$_2$) δ 8.18 (d, J=7.7 Hz, 1H), 8.15 (d, J=7.5 Hz, 1H), 8.11 (d, J=7.6 Hz, 1H), 7.96 (d, J=7.6 Hz, 1H), 7.89 (s, 1H), 7.58-7.50 (m, 2H), 7.46-7.38 (m, 2H), 7.34 (d, J=2.6 Hz, 1H), 7.33-7.26 (m, 2H), 7.26-7.21 (m, 2H), 7.17 (d, J=7.6 Hz, 1H), 7.09 (s, 1H), 6.91 (dd, J=9.3, 3.2 Hz, 1H), 6.59 (dd, J=9.2, 3.2 Hz, 1H), 6.48 (dd, J=8.6, 3.2 Hz, 1H), 6.29 (dd, J=8.5, 3.2 Hz, 1H), 4.23-4.10 (m, 1H), 3.95-3.78 (m, 1H), 3.72 (dd, J=7.5, 4.1 Hz, 1H), 3.68-3.53 (m, 1H), 2.77 (q, J=6.7 Hz, 2H), 2.65-2.47 (m, 2H), 2.06-1.92 (m, 1H), 1.86 (d, J=16.5 Hz, 1H), 1.77 (dd, J=14.4, 9.8 Hz, 2H), 1.71-1.55 (m, 5H), 1.41 (s, 3H), 1.38-1.31 (m, 9H), 1.02-0.89 (m, 4H), 0.82 (s, 9H), 0.79 (s, 9H), 0.66 (s, 3H), 0.52 (s, 9H), 0.39 (s, 9H), 0.21 (s, 9H), 0.06 (s, 9H), −1.84 (s, 3H).

$^{13}$C NMR (126 MHz, CD$_2$Cl$_2$) δ 160.82, 158.88, 158.45, 155.95, 155.35, 149.12, 148.76, 148.74, 142.15, 140.92, 139.72, 139.66, 139.56, 139.32, 138.90, 138.70, 137.13, 136.91, 136.65, 136.45, 134.90, 134.83, 134.14, 134.07, 129.87, 129.17, 128.45, 127.87, 127.62, 125.97, 124.74, 124.56, 124.46, 123.81, 123.54, 123.32, 123.28, 123.08, 122.88, 122.47, 119.73, 119.41, 119.11, 118.81, 117.54, 117.12, 116.94, 116.26, 116.24, 116.10, 116.03, 115.92, 115.85, 115.08, 114.90, 114.49, 78.05, 74.23, 70.66, 57.96, 57.04, 37.73, 33.32, 32.37, 32.32, 32.23, 31.67, 31.61, 30.27, 30.22, 29.57, 24.38, 17.30, 14.82, −1.67 (2), −1.85, −2.35.

$^{19}$F NMR (470 MHz, CD$_2$Cl$_2$) δ −118.22−−118.37 (m).

Example 58—2,7-bis(trimethylgermyl)-9H-carbazole

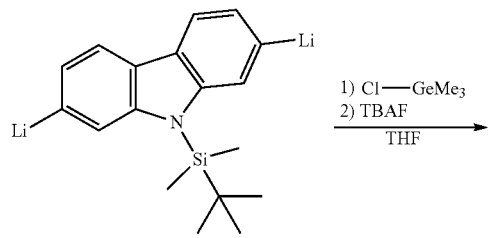

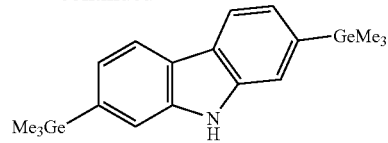

In a glovebox, a 50 mL jar was charged with 2,7-dilithio-9-(tert-butyldimethylsilyl)-9H-carbazole (1.00 g, 3.41 mmol, 1.00 equiv) and 17 mL dry THF. Chlorotrimethylgermane (1.26 mL, 10.2 mmol, 3.00 equiv) was added, and the mixture stirred for 45 minutes. Solid organolithium quickly dissolved as the reaction progressed. The clear, colorless solution was quenched with aq. Ammonium chloride. Product was extracted with several portions of dichloromethane. Combined organic fractions were concentrated, and the residue purified by chromatography on silica gel (0 to 10% EtOAc in hexane). 0.995 g of a white solid was isolated. Proton/Carbon NMR confirmed that this was the silylated intermediate. The carbazole was dissolved in 10 mL THF, and was treated with tetrabutylammonium fluoride trihydrate (0.609 g, 1.93 mmol, 1.00 equiv). The mixture stirred for 20 minutes, and TLC indicated complete consumption of the starting material. The solution was quenched with aq. Ammonium chloride. Product was extracted with several portions of dichloromethane. Combined organic fractions were concentrated, and the residue purified by chromatography on silica gel (0 to 20% EtOAc in hexane). 0.720 g of product was isolated as a white solid (53% over two steps).

$^1$H NMR (400 MHz, CDCl$_3$) δ 8.05 (d, J=7.7 Hz, 2H), 7.94 (s, 1H), 7.54 (s, 2H), 7.32 (dd, J=7.6, 0.8 Hz, 2H), 0.45 (s, 18H).

$^{13}$C NMR (101 MHz, CDCl$_3$) δ 140.11, 139.37, 123.64, 123.47, 119.80, 114.94, −1.49.

Preparation of 2,7-dilithio-9-(tert-butyldimethylsilyl)-9H-carbazole detailed in WO2017058981 A1.

Example 59—Preparation of Ligand Formula (xxv)

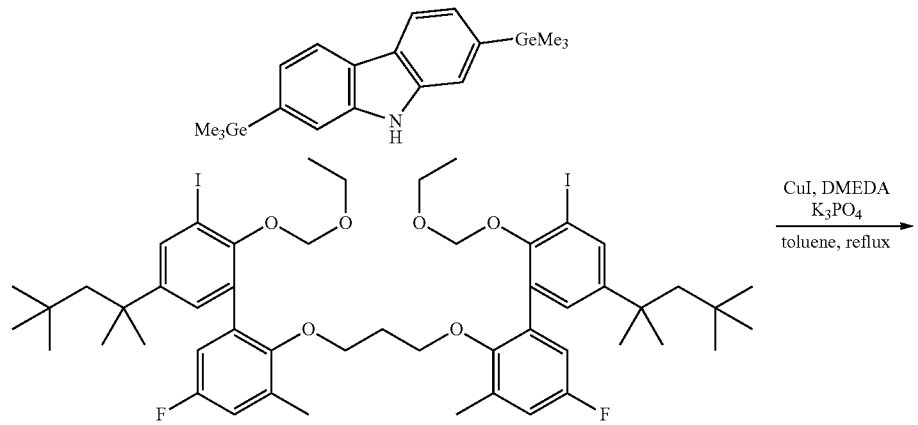

-continued

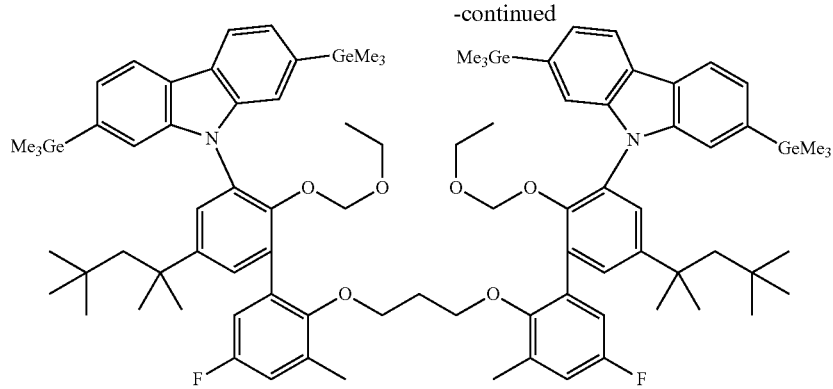

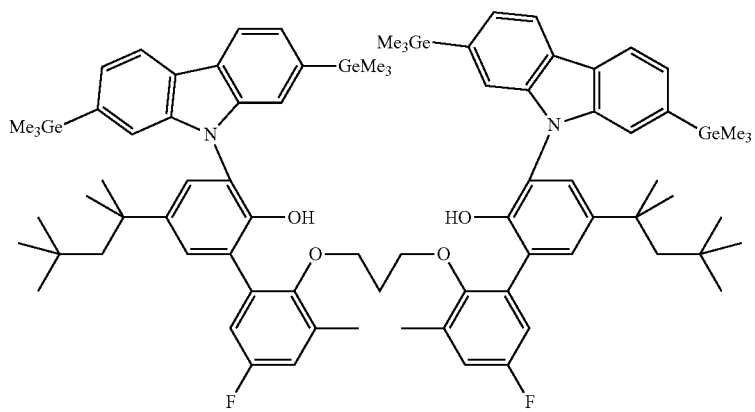

Ligand formula xxv

In a glovebox, a 50 mL round bottom flask was charged with 1,3-bis((2'-(ethoxymethoxy)-5-fluoro-3'-iodo-3-methyl-5'-(2,4,4-trimethylpentan-2-yl)-[1,1'-biphenyl]-2-yl)oxy)propane (0.500 g, 0.468 mmol, 1.00 equiv), 2,7-bis(trimethylgermyl)-9H-carbazole (0.469 g, 1.17 mmol, 2.50 equiv), $K_3PO_4$ (0.595 g, 2.81 mmol, 6.00 equiv), CuI (89 mg, 0.47 mmol, 1.0 equiv), N,N'-dimethylethylenediamine (0.081 mL, 0.75 mmol, 1.6 equiv), and 6 mL toluene. A reflux condenser was attached, the unit was sealed with a rubber septum, and was transferred to a fume hood. The mixture was allowed to stir at 120° C. under a blanket of nitrogen for 48 hours. The heterogeneous mixture was cooled and diluted with dichloromethane. The slurry was filtered through a plug of silica and the filtrate was concentrated. The residue was purified by chromatography on silica gel (0 to 10% EtOAc in hexane). 552 mg of a white solid was isolated. Proton/Fluorine NMR showed this to be the coupled intermediate with a little bit of the leftover carbazole. The intermediate (420 mg, 0.260 mmol, 1.00 equiv) was dissolved in 4.5 mL dry DMF. The solution was treated with sodium ethanethiolate (88 mg, 4.0 equiv), and stirred at 100° C. for two hours. TLC showed complete consumption of the starting material. The solution was cooled, quenched with brine, and product was extracted with several portions of diethyl ether. Combined organic fractions were concentrated, and the residue was purified by chromatography on silica gel (0 to 20% dichloromethane in hexane). 347 mg of product was isolated as a white solid (49% over two steps).

$^1$H NMR (400 MHz, $CDCl_3$) δ 8.12 (d, J=7.7 Hz, 4H), 7.42 (s, 4H), 7.35 (d, J=7.6 Hz, 4H), 7.18 (s, 4H), 6.97 (dd, J=8.8, 3.2 Hz, 2H), 6.79 (dd, J=8.7, 3.1 Hz, 2H), 6.36 (s, 2H), 3.61 (t, J=6.2 Hz, 4H), 1.84 (s, 6H), 1.73 (s, 4H), 1.66 (p, J=6.0 Hz, 2H), 1.37 (s, 12H), 0.79 (s, 18H), 0.29 (s, 36H).

$^{13}$C NMR (101 MHz, $CDCl_3$) δ 160.10, 157.68, 150.01, 149.98, 147.73, 142.96, 141.01, 140.19, 133.61, 133.52, 132.83, 132.75, 129.14, 127.53, 126.38, 126.37, 125.03, 124.04, 123.52, 119.75, 117.36, 117.14, 116.12, 115.89, 114.03, 70.90, 57.06, 38.22, 32.48, 31.93, 31.66, 16.33, −1.50.

$^{19}$F NMR (376 MHz, $CDCl_3$) δ −118.23 (t, J=8.7 Hz).

Example 60—Synthesis of Inventive Metal-Ligand Complex 32 (IMLC-32)

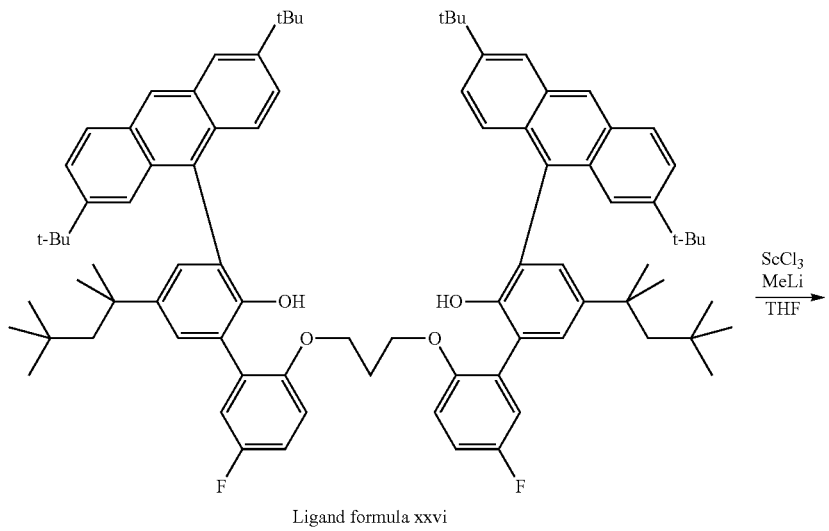

Ligand formula xxvi

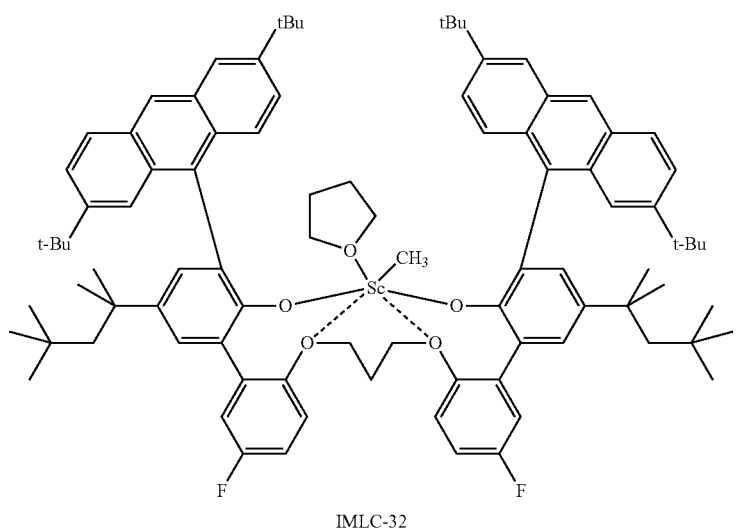

IMLC-32

In a glovebox, a 20 mL vial was charged with ScCl₃ (28.3 mg, 0.187 mmol, 1.00 equiv) and 4.5 mL dry THF. The mixture was allowed to stir overnight at ambient temperature. After ~16 hours, the slurry was placed in a glovebox freezer for 1 hour. The vial was then removed from the glovebox, and treated with methyllithium (1.53 M in diethyl ether, 0.379 mL, 3.1 equiv). The mixture became homogeneous within a few minutes. Less than 5 minutes after addition of methyllithium, ligand formula xxvi was added (6',6'''-(propane-1,3-diylbis(oxy))bis(3-(2,6-di-tert-butylanthracen-9-yl)-3'-fluoro-5-(2,4,4-trimethylpentan-2-yl)-[1,1'-biphenyl]-2-ol)) (234 mg, 0.187 mmol, 1.00 equiv). After 3 hours of stirring, the solvent was removed by vacuum pump, and the solid was suspended in 6 mL of 1:1 hexane:toluene. The solution was filtered through a 0.45 um syringe filter, and the solvent was removed from the filtrate by vacuum pump. A yellow solid was isolated. The solid was dissolved in 1 mL dry pentane, and was chilled in the glovebox freezer overnight. A small amount of white solid precipitated, which was removed by decantation. The solid was dried (32 mg). The decanted liquid was concentrated to give 182 mg of yellow solid (71%). Proton/Fluorine NMR of each portion showed that the product was contained mostly in the pentane-soluble portion. The complex existed as a mixture of four different rotational isomers.

$^1$H NMR (400 MHz, CD$_2$Cl$_2$) δ 8.47-6.05 (m, 24H), 4.59-3.28 (m, 6H), 2.27-0.72 (m, 78H), −2.76--3.06 (m, 3H).

$^{19}$F NMR (470 MHz, CD$_2$Cl$_2$) δ −117.10--117.24 (m), −117.31--117.43 (m), −117.56--117.68 (m), −117.79 (td, J=8.5, 5.1 Hz), −119.21 (td, J=8.8, 5.5 Hz), −119.35 (td, J=8.9, 5.6 Hz), −120.05 (qd, J=10.8, 8.9, 6.3 Hz).

Preparation of Ligand formula xxvi detailed in WO2020047384 A1.

Example 61—Synthesis of Inventive Metal-Ligand Complex 33 (IMLC-33)

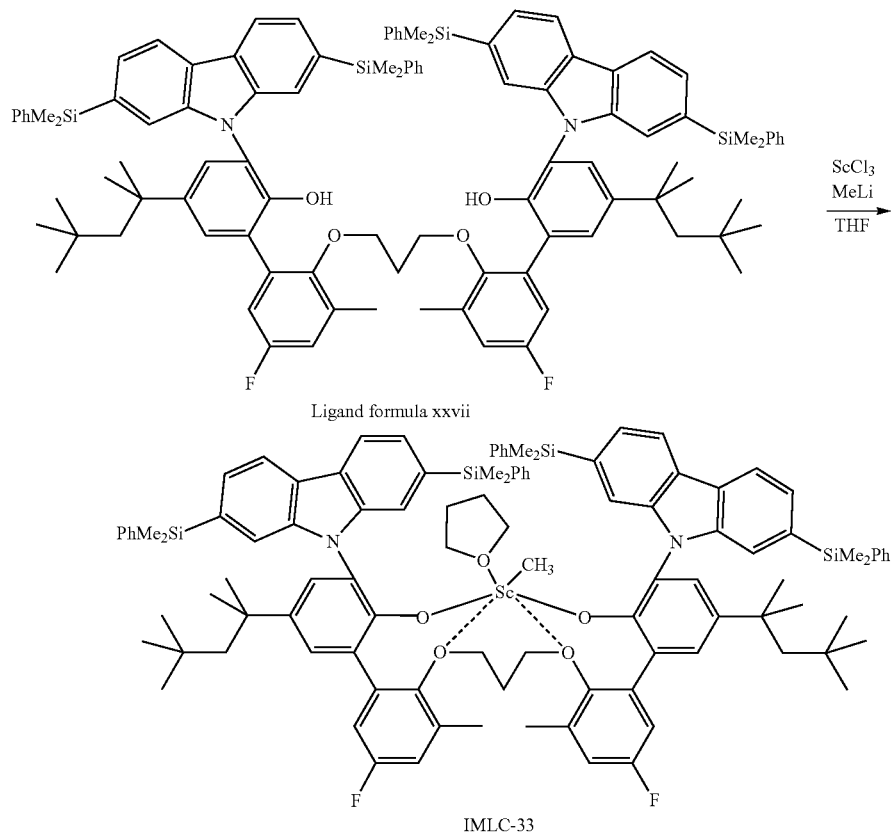

In a glovebox, a 20 mL vial was charged with ScCl₃ (27.0 mg, 0.179 mmol, 1.00 equiv) and 4.5 mL dry THF. The mixture was allowed to stir overnight at ambient temperature. After ~16 hours, the slurry was placed in a glovebox freezer for 1 hour. The vial was then removed from the glovebox, and treated with methyl lithium (1.53 M in diethyl ether, 0.362 mL, 0.554 mmol, 3.1 equiv). The mixture became homogeneous within a minute. Less than 2 minutes after addition of methyllithium, of Ligand formula xxvii was added (2',2'''-(propane-1,3-diylbis(oxy))bis(3-(2,7-bis(dimethyl(phenyl)silyl)-9H-carbazol-9-yl)-5'-fluoro-3'-methyl-5-(2,4,4-trimethylpentan-2-yl)-[1,1'-biphenyl]-2-ol)) (280 mg, 0.179 mmol, 1.00 equiv). The mixture stirred for 4 hours, and solvent was removed by vacuum pump. The solid residue was mixed with 5 mL dry 1:1 hexane:toluene, and the slurry was filtered through a 0.45 um syringe filter. The filtrate was concentrated to a white solid. 266 mg of solid was recovered (87%).

$^1$H NMR (500 MHz, CD$_2$Cl$_2$) δ 8.26-8.21 (m, 1H), 8.19-8.15 (m, 1H), 8.12 (dd, J=7.7, 0.8 Hz, 1H), 7.95 (td, J=7.3, 0.8 Hz, 1H), 7.93 (d, J=1.0 Hz, 1H), 7.65-7.58 (m, 3H), 7.52 (dd, J=7.6, 0.9 Hz, 1H), 7.51-7.47 (m, 4H), 7.40-7.38 (m, 3H), 7.36-7.32 (m, 5H), 7.32-7.29 (m, 2H), 7.28-7.16 (m, 13H), 6.86-6.82 (m, 1H), 6.54 (ddd, J=13.3, 8.9, 3.3 Hz, 2H), 6.14 (dd, J=8.5, 3.1 Hz, 1H), 4.01-3.83 (m, 1H), 3.61-3.54 (m, 1H), 3.54-3.39 (m, 2H), 2.72-2.62 (m, 2H), 2.53-2.43 (m, 2H), 1.75 (dd, J=14.4, 2.1 Hz, 2H), 1.67-1.50 (m, 4H), 1.42 (s, 3H), 1.39 (s, 3H), 1.34-1.26 (m, 12H), 0.78 (s, 9H), 0.76-0.72 (m, 13H), 0.66 (s, 3H), 0.61 (s, 3H), 0.60 (s, 3H), 0.36 (s, 3H), 0.35 (s, 3H), 0.34 (s, 3H), 0.18 (s, 3H), -1.72 (s, 3H).

$^{13}$C NMR (126 MHz, CD$_2$Cl$_2$) δ 160.84, 160.34, 158.90, 158.40, 155.98, 155.42, 149.09, 149.07, 148.64, 148.62, 142.24, 141.24, 139.97, 139.94, 139.21, 139.00, 138.99, 138.61, 136.96, 136.90, 136.64, 136.57, 136.47, 135.40, 134.99, 134.86, 134.79, 134.35, 134.33, 134.30, 134.27, 134.16, 134.12, 134.09, 134.08, 134.02, 133.98, 133.29, 129.68, 129.25, 128.92, 128.71, 128.66, 128.63, 128.48, 128.11, 127.90, 127.78, 127.77, 127.58, 127.57, 127.53, 127.50, 127.43, 125.74, 125.08, 124.92, 124.66, 124.59, 124.41, 124.38, 123.44, 122.99, 119.99, 119.58, 119.29, 118.88, 118.83, 117.72, 117.56, 117.23, 117.05, 116.10, 115.85, 115.67, 115.06, 114.88, 77.80, 74.14, 70.75, 57.74, 56.98, 37.67, 37.66, 33.28, 32.44, 32.30, 32.25, 31.62, 30.14, 30.01, 29.62, 24.18, 24.15, 17.08, 15.05, -2.06, -2.25, -2.38, -2.42, -2.48, -2.53, -2.76, -2.82.

$^{19}$F NMR (470 MHz, CD$_2$Cl$_2$) δ -118.07 (t, J=8.9 Hz), -118.36 (t, J=8.8 Hz).

Example 62—2,7-bis(dimethyl(phenyl)silyl)-9H-carbazole

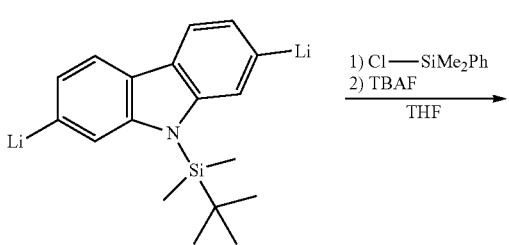

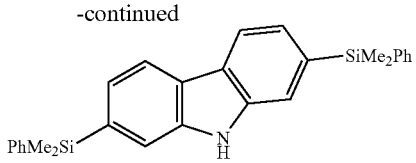

In a glovebox, a 50 mL jar was charged with 2,7-dilithio-9-(tert-butyldimethylsilyl)-9H-carbazole (1.00 g, 3.41 mmol, 1.00 equiv) and 17 mL dry THF. Chlorodimethylphenylsilane (1.72 mL, 10.2 mmol, 3.00 equiv) was added, and the mixture stirred for 45 minutes. Solid organolithium quickly dissolved as the reaction progressed. The clear, colorless solution was quenched with aq. Ammonium chloride. Product was extracted with several portions of dichloromethane. Combined organic fractions were concentrated. The solution was dried with $Na_2SO_4$, filtered through basic alumina, and concentrated to a white solid. 2.021 g of a crude white solid was isolated and used without further purification. The carbazole was dissolved in 10 mL THF, and was treated with tetrabutylammonium fluoride trihydrate (2.02 g, 3.41 mmol, 1.00 equiv). The mixture stirred for 20 minutes, and TLC indicated complete consumption of the starting material. The solution was quenched with aq. Ammonium chloride. Product was extracted with several portions of dichloromethane. Combined organic fractions were concentrated, and the residue purified by chromatography on silica gel (0 to 20% EtOAc in hexane). 0.803 g of product was isolated as a white solid (54% over two steps).

$^1$H NMR (500 MHz, $CDCl_3$) δ 8.06 (d, J=7.7 Hz, 2H), 7.87 (s, 1H), 7.60-7.49 (m, 6H), 7.44-7.31 (m, 8H), 0.62 (s, 12H).

$^{13}$C NMR (126 MHz, $CDCl_3$) δ 139.31, 138.62, 135.79, 134.27, 129.07, 127.81, 124.85, 123.93, 119.93, 116.52, −2.07.

Example 63—Preparation of Ligand Formula (xxvii)

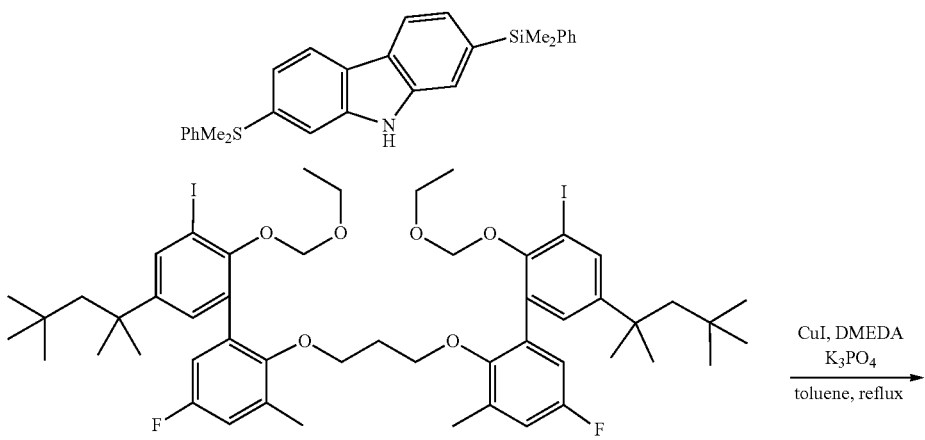

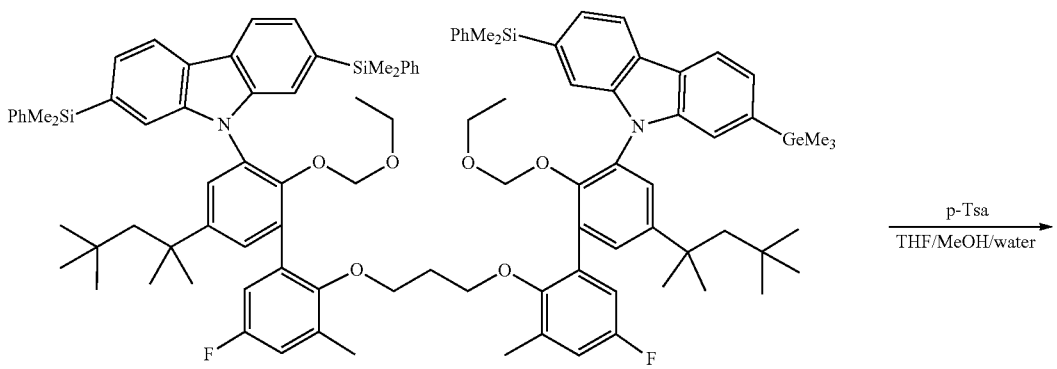

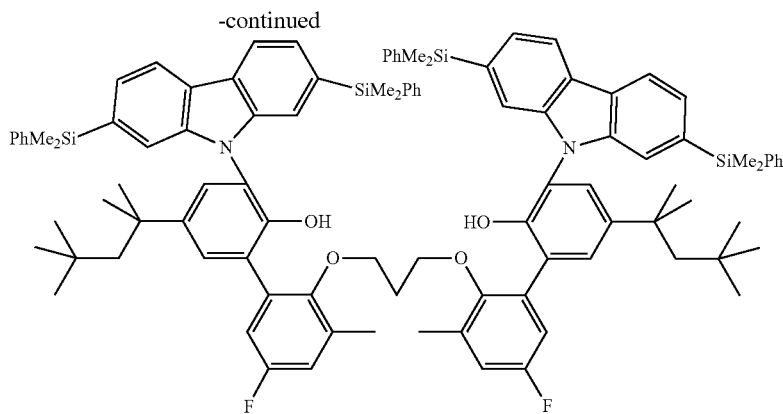

Ligand formula xxvii

In a glovebox, a 50 mL round bottom flask was charged with 1,3-bis((2'-(ethoxymethoxy)-5-fluoro-3'-iodo-3-methyl-5'-(2,4,4-trimethylpentan-2-yl)-[1,1'-biphenyl]-2-yl)oxy)propane (0.500 g, 0.468 mmol, 1.00 equiv), 2,7-bis(trimethylgermyl)-9H-carbazole (0.500 g, 0.468 mmol, 1.00 equiv), the 2,7-bis(dimethyl(phenyl)silyl)-9H-carbazole (0.448 g, 1.03 mmol, 2.20 equiv), K$_3$PO$_4$ (0.596 g, 2.81 mmol, 6.00 equiv), CuI (89 mg, 0.47 mmol, 1.0 equiv), N,N'-dimethylethylenediamine (0.081 mL, 0.75 mmol, 1.6 equiv), and 6 mL toluene. A reflux condenser was attached, the unit was sealed with a rubber septum, and was transferred to a fume hood. The mixture was allowed to stir at 120° C. under a blanket of nitrogen for 48 hours. An additional portion of CuI (89 mg) and DMEDA (0.081 mL) were added. Stirring continued for another 48 hours. The solution was cooled, diluted with dichloromethane, and the slurry filtered through a plug of alumina. The filtrate was concentrated, and the residue purified by chromatography on silica gel (0 to 10% EtOAc in hexane). 177 mg of the desired intermediate was isolated and taken onto the next step. The intermediate was dissolved in 6 mL of 1:1 THF:methanol. This was treated with 20 mg of p-toluenesulfonic acid monohydrate, and was allowed to reflux for 5 hours. TLC showed complete consumption of the starting material. The solution was cooled, and diluted with dichloromethane and water. Phases were separated, and the aqueous phase extracted with a few additional portions of dichloromethane. Combined organic fractions were concentrated and purified by chromatography on silica gel (0 to 20% EtOAc in hexane). 129 mg of product was isolated as a white solid (18% yield over two steps).

$^1$H NMR (400 MHz, CDCl$_3$) δ 8.13 (d, J=7.8 Hz, 4H), 7.46-7.33 (m, 16H), 7.28 (s, 4H), 7.24-7.06 (m, 12H), 6.88 (dd, J=8.9, 3.2 Hz, 2H), 6.77 (dd, J=8.6, 3.1 Hz, 2H), 6.43 (s, 2H), 3.42 (t, J=6.3 Hz, 4H), 1.73 (s, 6H), 1.68 (s, 4H), 1.50-1.39 (m, 2H), 1.32 (s, 12H), 0.71 (s, 18H), 0.57-0.36 (m, 24H).

$^{13}$C NMR (101 MHz, CDCl$_3$) δ 160.13, 157.70, 149.85, 149.82, 147.58, 142.93, 140.99, 138.48, 135.61, 134.15, 134.09, 133.62, 133.54, 132.81, 132.72, 128.97, 128.87, 127.71, 127.65, 127.61, 127.40, 126.39, 125.34, 124.92, 124.03, 119.87, 117.31, 117.09, 116.17, 115.94, 115.67, 70.96, 57.02, 38.16, 32.39, 31.83, 31.58, 30.47, 16.19, −2.04, −2.10.

$^{19}$F NMR (470 MHz, CDCl$_3$) δ −118.16 (m).

Example 64—Synthesis of Inventive Metal-Ligand Complex 34 (IMLC-34)

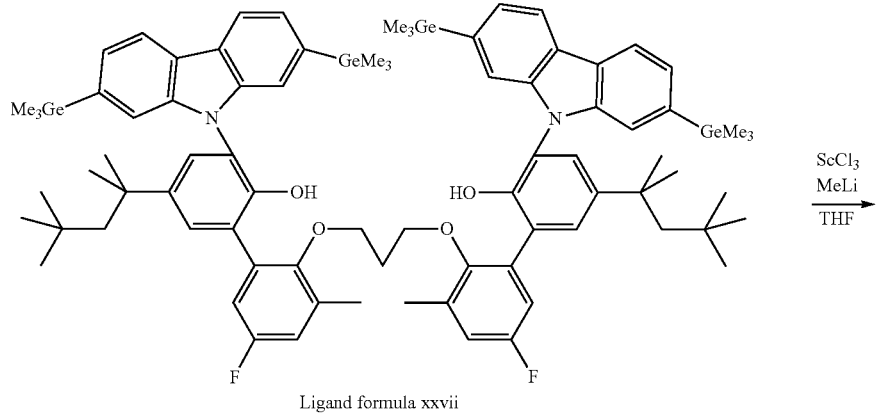

Ligand formula xxvii

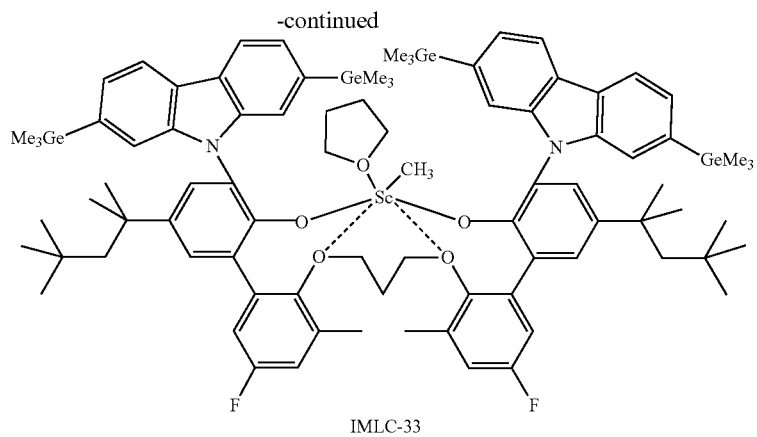

IMLC-33

In a glovebox, a 20 mL vial was charged with ScCl$_3$ (27.0 mg, 0.179 mmol, 1.00 equiv) and 4.5 mL dry THF. The mixture was allowed to stir overnight at ambient temperature. After ~16 hours, the slurry was placed in a glovebox freezer for 1 hour. The vial was then removed from the glovebox, and treated with methyl lithium (1.53 M in diethyl ether, 0.362 mL, 0.554 mmol, 3.1 equiv). The mixture became homogeneous within a minute. Less than 2 minutes after addition of methyllithium, 6',6'''-(propane-1,3-diylbis (oxy))bis(3-(2,7-bis(trimethylgermyl)-9H-carbazol-9-yl)-3'-fluoro-5-(2,4,4-trimethylpentan-2-yl)-[1,1'-biphenyl]-2-ol) was added (262 mg, 0.179 mmol, 1.00 equiv). The mixture stirred for 5 hours, and solvent was removed by vacuum pump. The solid residue was mixed with 5 mL dry 2:1 hexane:toluene, and the slurry was filtered through a 0.45 um syringe filter. The filtrate was concentrated to a white solid. The solid was suspended in ~2 mL pentane. The mixture was chilled in a glovebox freezer overnight. The slurry was filtered and the white solid dried under vacuum. 199 mg of solid was isolated (69%).

$^1$H NMR (500 MHz, CD$_2$Cl$_2$) δ 8.32 (dd, J=7.7, 0.8 Hz, 1H), 8.28 (dd, J=7.7, 0.8 Hz, 1H), 8.10 (dd, J=7.6, 0.8 Hz, 1H), 8.05 (dd, J=7.6, 0.8 Hz, 1H), 7.58 (t, J=0.9 Hz, 1H), 7.55 (t, J=0.9 Hz, 1H), 7.51-7.44 (m, 3H), 7.37 (d, J=2.7 Hz, 1H), 7.27 (d, J=2.6 Hz, 1H), 7.25-7.19 (m, 3H), 7.14 (d, J=0.9 Hz, 1H), 7.09 (t, J=0.8 Hz, 1H), 6.98 (ddd, J=9.5, 5.2, 3.2 Hz, 2H), 6.47 (ddd, J=8.9, 7.6, 3.2 Hz, 1H), 6.11 (ddd, J=8.8, 7.8, 3.2 Hz, 1H), 4.78 (dd, J=8.8, 5.1 Hz, 1H), 4.48 (dd, J=8.9, 5.1 Hz, 1H), 4.10 (ddd, J=10.7, 8.5, 2.1 Hz, 1H), 3.60 (dddd, J=15.9, 10.2, 6.6, 3.0 Hz, 2H), 3.42 (ddd, J=9.4, 8.4, 3.5 Hz, 1H), 2.45-2.34 (m, 4H), 1.83-1.62 (m, 5H), 1.53 (ddt, J=15.7, 8.0, 4.0 Hz, 1H), 1.45-1.31 (m, 12H), 0.91 (ddd, J=7.6, 5.0, 2.4 Hz, 4H), 0.81 (s, 9H), 0.80 (s, 9H), 0.35 (s, 9H), 0.32 (s, 9H), 0.21 (s, 9H), 0.19 (s, 9H), −2.51 (s, 3H).

$^{13}$C NMR (101 MHz, CD$_2$Cl$_2$) δ 161.54, 160.60, 159.11, 158.18, 156.96, 156.08, 151.15, 151.13, 150.00, 149.97, 141.43, 141.30, 141.24, 141.15, 139.99, 139.90, 139.28, 138.89, 136.93, 136.87, 136.66, 136.57, 135.78, 135.70, 130.01, 128.91, 128.69, 128.19, 128.10, 127.92, 127.55, 125.38, 125.26, 125.18, 124.26, 123.94, 123.40, 123.20, 123.17, 123.09, 123.04, 122.73, 122.64, 122.42, 122.28, 119.82, 119.77, 119.19, 119.07, 117.85, 117.61 (2), 117.36, 116.43, 115.61, 114.85, 114.62, 113.87, 113.80, 113.65, 113.46, 78.59, 74.71, 70.21, 57.20, 57.10, 37.81, 37.69, 32.68, 32.40, 32.38, 32.35, 31.70, 31.68, 31.60, 30.64, 30.38, 29.77, 24.50, −1.70, −1.78, −1.99, −2.13.

$^{19}$F NMR (470 MHz, CD$_2$Cl$_2$) δ −116.82−−117.34 (m), −118.67 (td, J=8.2, 5.0 Hz).

Example 65—1,3-bis((5-fluoro-3'-iodo-2'-methoxy-5'-(2,4,4-trimethylpentan-2-yl)-[1,1'-biphenyl]-2-yl) oxy)propane

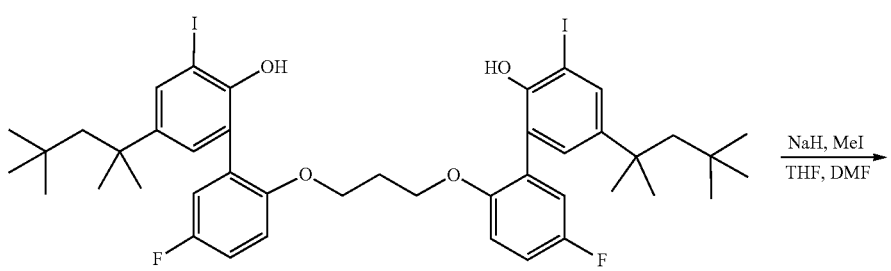

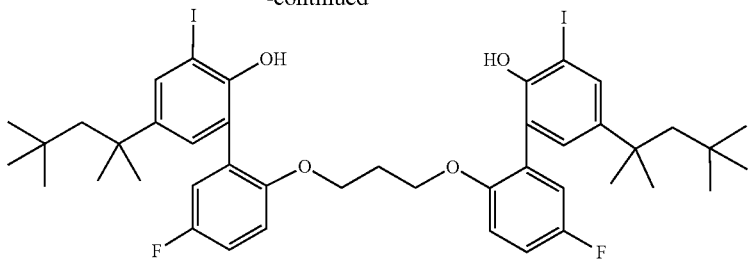

In a glovebox, the solid 6',6'''-(propane-1,3-diylbis(oxy))bis(3'-fluoro-3-iodo-5-(2,4,4-trimethylpentan-2-yl)-[1,1'-biphenyl]-2-ol) (5.00 g, 5.41 mmol, 1.00 equiv) was placed in a 100 mL jar, and dissolved in THF (50 mL). The solution was treated with sodium hydride (0.298 g, 2.3 equiv). After 10 minutes, the solution was treated with iodomethane (0.81 mL, 2.4 equiv) and 10 mL dry DMF. The mixture stirred for 3 hours. TLC showed complete conversion of the phenol intermediate. The solution was diluted with water, and the product was extracted with portions of dichloromethane. Combined organic fractions were dried with $MgSO_4$ and filtered through a plug of silica gel. The filtrate was concentrated and the residue was purified by chromatography on silica gel (0 to 10% EtOAc in hexane). 4.93 g of colorless oil was isolated (96%).

$^1$H NMR (400 MHz, $CDCl_3$) δ 7.72 (d, J=2.4 Hz, 2H), 7.14 (d, J=2.4 Hz, 2H), 7.05-6.89 (m, 4H), 6.82 (dd, J=8.9, 4.5 Hz, 2H), 3.87 (t, J=5.8 Hz, 4H), 3.27 (s, 6H), 1.86 (p, J=5.9 Hz, 2H), 1.69 (s, 4H), 1.31 (s, 12H), 0.73 (s, 18H).

$^{13}$C NMR (101 MHz, $CDCl_3$) δ 157.78, 155.40, 154.94, 152.18, 152.16, 147.38, 136.50, 130.61, 130.12, 129.12, 129.04, 117.78, 117.55, 115.07, 114.84, 113.30, 113.21, 91.55, 65.10, 60.52, 56.93, 38.17, 32.41, 31.85, 31.45, 29.16.

$^{19}$F NMR (470 MHz, $CDCl_3$) δ -124.29 (td, J=8.3, 4.5 Hz).

Preparation of 6',6'''-(propane-1,3-diylbis(oxy))bis(3'-fluoro-3-iodo-5-(2,4,4-trimethylpentan-2-yl)-[1,1'-biphenyl]-2-ol) detailed in WO2020047384 A1.

Example 66—Preparation of Ligand Formula (xxviii)

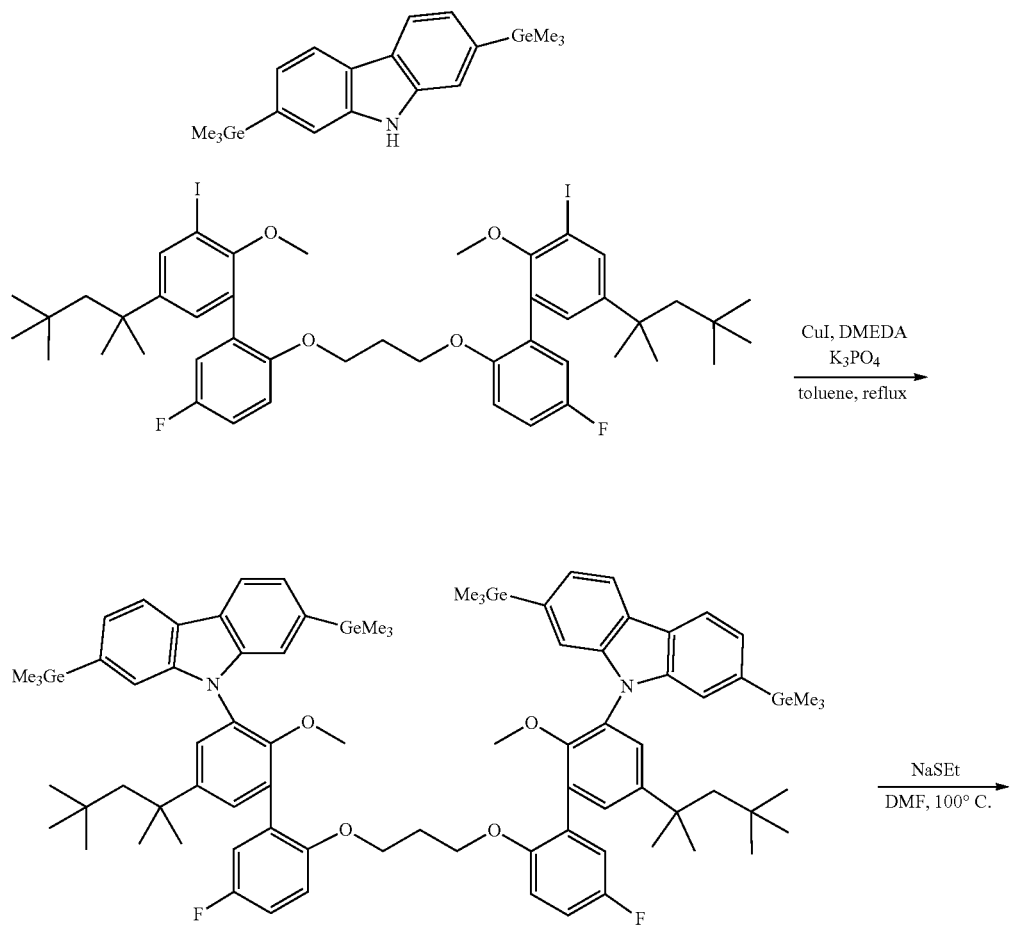

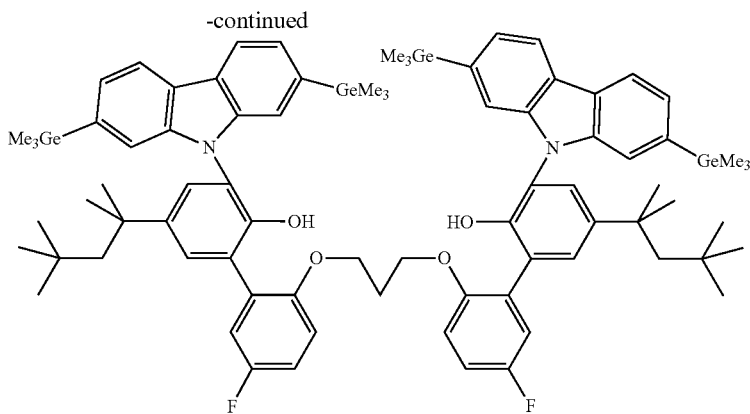

In a glovebox, a 50 mL round bottom flask was charged with 1,3-bis((5-fluoro-3'-iodo-2'-methoxy-5'-(2,4,4-trimethylpentan-2-yl)-[1,1'-biphenyl]-2-yl)oxy)propane (0.950 g, 0.997 mmol, 1.00 equiv), the 2,7-bis(trimethylgermyl)-9H-carbazole (0.999 g, 2.49 mmol, 2.50 equiv), $K_3PO_4$ (1.27 g, 5.98 mmol, 6.00 equiv), CuI (190 mg, 0.997 mmol, 1.0 equiv), N,N'-dimethylethylenediamine (0.172 mL, 1.60 mmol, 1.60 equiv), and 10 mL toluene. A reflux condenser was attached, the unit was sealed with a rubber septum, and was transferred to a fume hood. The mixture was allowed to stir at 120° C. under a blanket of nitrogen for 24 hours. The heterogeneous mixture was cooled and diluted with dichloromethane. The slurry was filtered through a plug of silica and the filtrate was concentrated. The residue was purified by chromatography on silica gel (0 to 10% EtOAc in hexane). 0.970 mg of a white solid was isolated. Proton/Fluorine NMR showed this to be the coupled intermediate with a little bit of the leftover carbazole. The solid was dissolved in 6.5 mL dry DMF under nitrogen. The solution was treated with sodium ethanethiolate (218 mg, 2.59 mmol, 4.0 equiv), and stirred at 100° C. for 48 hours. TLC showed consumption of the starting material. The solution was cooled, quenched with brine, and product was extracted with portions of dichloromethane. Combined organic fractions were purified by chromatography on silica gel (0 to 40% dichloromethane in hexane). 510 mg of product was isolated as a white solid (35% over two steps).

$^1$H NMR (500 MHz, $CDCl_3$) δ 8.21 (dd, J=7.7, 0.8 Hz, 4H), 7.41 (dd, J=7.6, 0.8 Hz, 4H), 7.32 (d, J=2.4 Hz, 2H), 7.26 (s, 2H), 7.14 (d, J=0.9 Hz, 4H), 6.92 (dd, J=8.8, 3.2 Hz, 2H), 6.36-6.17 (m, 2H), 5.56 (dd, J=9.0, 4.4 Hz, 2H), 5.15 (s, 2H), 3.66 (t, J=5.5 Hz, 4H), 1.90-1.77 (m, 2H), 1.35 (s, 12H), 0.77 (s, 18H), 0.34 (s, 36H).

$^{13}$C NMR (101 MHz, $CDCl_3$) δ 158.06, 155.68, 151.18, 151.16, 148.15, 142.61, 141.36, 140.44, 129.57, 127.67, 127.60, 127.48, 125.88, 124.27, 123.54, 123.48, 119.78, 118.11, 117.87, 115.34, 115.12, 113.89, 112.54, 112.45, 64.44, 57.16, 38.13, 32.45, 31.88, 31.58, 28.88, −1.45.

$^{19}$F NMR (470 MHz, $CDCl_3$) δ −123.22 (td, J=8.3, 4.3 Hz).

Example 67—Synthesis of Inventive Metal-Ligand Complex 35 (IMLC-35)

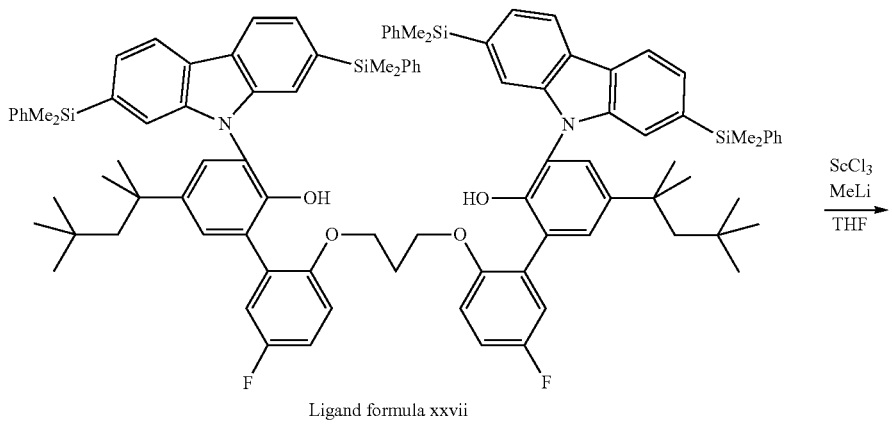

Ligand formula xxvii

-continued

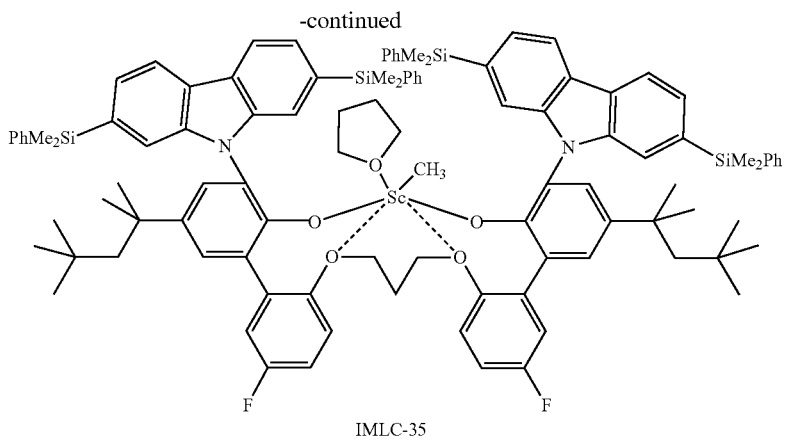

IMLC-35

In a glovebox, a 20 mL vial was charged with ScCl₃ (30.8 mg, 0.204 mmol, 1.00 equiv) and 4.5 mL dry THF. The mixture was allowed to stir overnight at ambient temperature. After ~16 hours, the slurry was placed in a glovebox freezer for 1 hour. The vial was then removed from the glovebox, and treated with methyl lithium (1.53 M in diethyl ether, 0.412 mL, 0.631 mmol, 3.1 equiv). The mixture became homogeneous within a minute. Less than 2 minutes after addition of methyllithium, ligand formula xxix was added (6',6'''-(propane-1,3-diylbis(oxy))bis(3-(2,7-bis(dimethyl(phenyl)silyl)-9H-carbazol-9-yl)-3'-fluoro-5-(2,4,4-trimethylpentan-2-yl)-[1,1'-biphenyl]-2-ol)) (314 mg, 0.204 mmol, 1.00 equiv). The mixture stirred for 5 hours, and solvent was removed by vacuum pump. The solid residue was mixed with 5 mL dry 2:1 hexane:toluene, and the slurry was filtered through a 0.45 um syringe filter. The filtrate was concentrated to a white solid. The solid was dissolved in ~2 mL warm pentane. The mixture was chilled in a glovebox freezer overnight, which precipitated a white solid. The solvent was removed by decantation, and the white solid dried under vacuum. 0.278 g of solid was isolated (82%).

¹H NMR (500 MHz, CD₂Cl₂) δ 8.40 (dd, J=7.7, 0.8 Hz, 1H), 8.29 (dd, J=7.7, 0.8 Hz, 1H), 8.17 (dd, J=7.7, 0.8 Hz, 1H), 8.05 (dd, J=7.8, 0.8 Hz, 1H), 7.65 (dd, J=7.7, 0.9 Hz, 1H), 7.59 (d, J=1.0 Hz, 1H), 7.56 (dd, J=7.7, 0.9 Hz, 1H), 7.52 (d, J=0.9 Hz, 1H), 7.45 (d, J=2.6 Hz, 1H), 7.42-7.39 (m, 2H), 7.35-7.29 (m, 7H), 7.25-7.08 (m, 14H), 7.06-6.99 (m, 4H), 6.96-6.90 (m, 1H), 6.88 (dd, J=9.4, 3.2 Hz, 1H), 6.47 (ddd, J=8.9, 7.7, 3.2 Hz, 1H), 6.10 (ddd, J=8.8, 7.7, 3.2 Hz, 1H), 4.38 (dd, J=8.8, 5.2 Hz, 1H), 4.23 (dd, J=8.9, 5.2 Hz, 1H), 3.38 (ddd, J=10.6, 8.0, 2.1 Hz, 1H), 2.92 (ddd, J=9.5, 5.8, 3.5 Hz, 1H), 2.63 (dtd, J=13.7, 8.5, 7.6, 2.8 Hz, 2H), 2.26-2.14 (m, 4H), 1.83 (d, J=14.5 Hz, 1H), 1.80-1.63 (m, 4H), 1.41 (s, 3H), 1.41 (s, 3H), 1.37 (s, 3H), 1.33 (s, 3H), 1.12-1.02 (m, 1H), 0.84 (s, 9H), 0.80 (s, 9H), 0.61 (s, 3H), 0.60 (s, 3H), 0.54 (s, 3H), 0.52 (s, 3H), 0.43 (s, 3H), 0.36 (s, 3H), 0.35 (s, 3H), 0.31 (s, 3H), -2.41 (s, 3H).

¹³C NMR (101 MHz, CD₂Cl₂) δ 161.58, 160.75, 159.16, 158.33, 156.70, 155.85, 150.92, 150.89, 149.75, 149.72, 141.35, 141.17, 141.15, 140.92, 139.04, 138.78, 138.36, 137.47, 136.86, 136.75, 136.68, 136.59, 136.06, 135.98, 135.81, 135.79, 135.28, 134.19, 134.12, 134.07, 134.04, 134.02, 133.98, 129.58, 128.91, 128.78, 128.68, 128.61, 128.58, 128.30, 128.10, 127.75, 127.57, 127.49, 127.41, 127.38, 127.31, 127.28, 127.09, 125.67, 125.58, 125.18, 125.13, 124.66, 124.54, 124.51, 124.30, 124.12, 123.97, 123.70, 123.54, 123.45, 122.88, 122.51, 119.92, 119.88, 119.31, 119.27, 118.08, 117.75, 117.58, 117.52, 117.37, 117.14, 115.11, 114.76, 114.66, 114.43, 113.78, 113.55, 77.92, 75.13, 70.12, 57.23, 57.17, 37.81, 37.65, 32.92, 32.45, 32.37, 32.34, 31.76, 31.61, 30.71, 30.32, 29.40, 24.25, -1.95, -2.09, -2.47, -2.53, -2.64, -2.78, -2.83(2).

¹⁹F NMR (470 MHz, CD₂Cl₂) δ -117.37 (td, J=8.2, 5.0 Hz), -118.41 (td, J=8.4, 5.2 Hz).

Example 68—Ligand Formula (xxix)

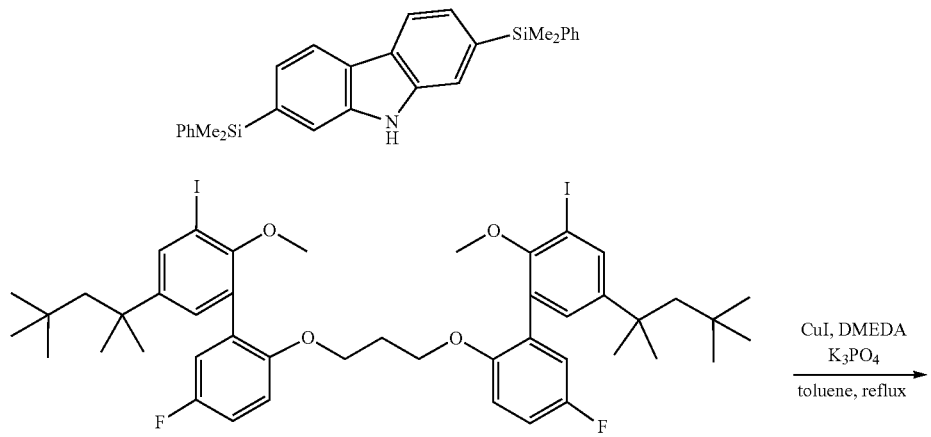

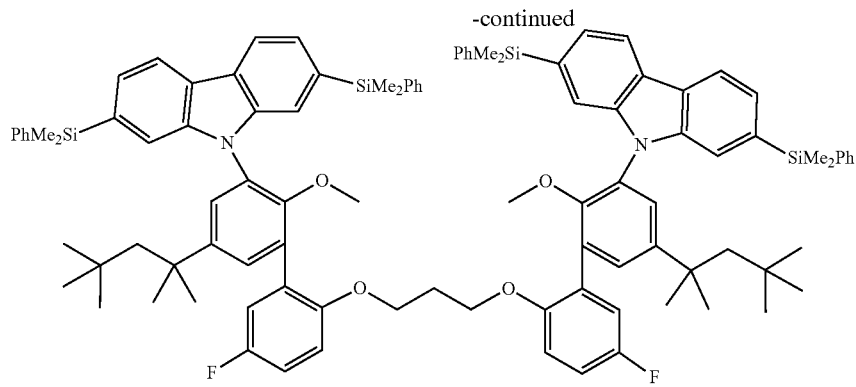

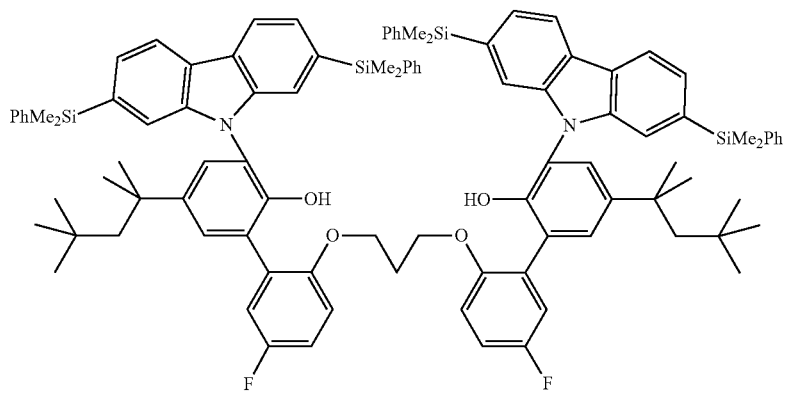

In a glovebox, a 50 mL round bottom flask was charged with 1,3-bis((5-fluoro-3'-iodo-2'-methoxy-5'-(2,4,4-trimethylpentan-2-yl)-[1,1'-biphenyl]-2-yl)oxy)propane (1.31 g, 1.38 mmol, 1.00 equiv), 2,7-bis(dimethyl(phenyl)silyl)-9H-carbazole (1.80 g, 4.13 mmol, 3.00 equiv), $K_3PO_4$ (1.75 g, 8.25 mmol, 6.00 equiv), CuI (524 mg, 2.75 mmol, 2.00 equiv), N,N'-dimethylethylenediamine (0.474 mL, 4.40 mmol, 3.2 equiv), and 13.8 mL toluene. A reflux condenser was attached, the unit was sealed with a rubber septum, and was transferred to a fume hood. The mixture was allowed to stir at 120° C. under a blanket of nitrogen for 24 hours. TLC indicated complete consumption of the di-iodide with mainly leftover carbazole left. The solution was cooled, diluted with dichloromethane, and the slurry filtered through a plug of alumina. The filtrate was concentrated, and the residue purified by chromatography on silica gel (0 to 10% EtOAc in hexane). 2.028 g of a colorless oil was isolated that contained the desired intermediate with leftover carbazole (roughly 1:1.5 mol ratio). The material was dissolved in 13 mL dry DMF, and was treated with sodium ethanethiolate (0.434 g, 5.16 mmol). The mixture was stirred at 100° C. for 48 hours. The solution was cooled, quenched with brine, and product was extracted with portions of dichloromethane. Combined organic fractions were purified by chromatography on silica gel (0 to 40% dichloromethane in hexane). 1.02 g of product was isolated as a white solid (48% over two steps).

$^1$H NMR (400 MHz, $CDCl_3$) δ 8.22 (dd, J=7.7, 0.8 Hz, 4H), 7.47 (dd, J=7.7, 0.9 Hz, 4H), 7.45-7.38 (m, 8H), 7.29 (d, J=2.4 Hz, 2H), 7.25-7.15 (m, 18H), 6.83 (dd, J=8.7, 3.2 Hz, 2H), 6.21 (td, J=8.5, 3.1 Hz, 2H), 5.62 (dd, J=9.1, 4.5 Hz, 2H), 5.15 (s, 2H), 3.42 (t, J=5.4 Hz, 4H), 1.30 (s, 12H), 0.71 (s, 18H), 0.50 (s, 12H), 0.48 (s, 12H).

$^{13}$C NMR (101 MHz, $CDCl_3$) δ 158.02, 155.64, 151.10, 147.79, 142.53, 141.24, 138.42, 135.95, 134.10, 129.36, 128.96, 127.68, 127.60, 127.52, 127.15, 125.92, 125.52, 124.04, 123.45, 119.89, 118.10, 117.86, 115.54, 115.27, 115.04, 112.79, 112.70, 64.33, 57.09, 38.08, 32.38, 31.81, 31.53, 28.74, −1.99, −2.15.

$^{19}$F NMR (376 MHz, $CDCl_3$) δ −123.09 (td, J=8.3, 4.4 Hz).

Example 69—Synthesis of Inventive Metal-Ligand Complex 36 (IMLC-36)

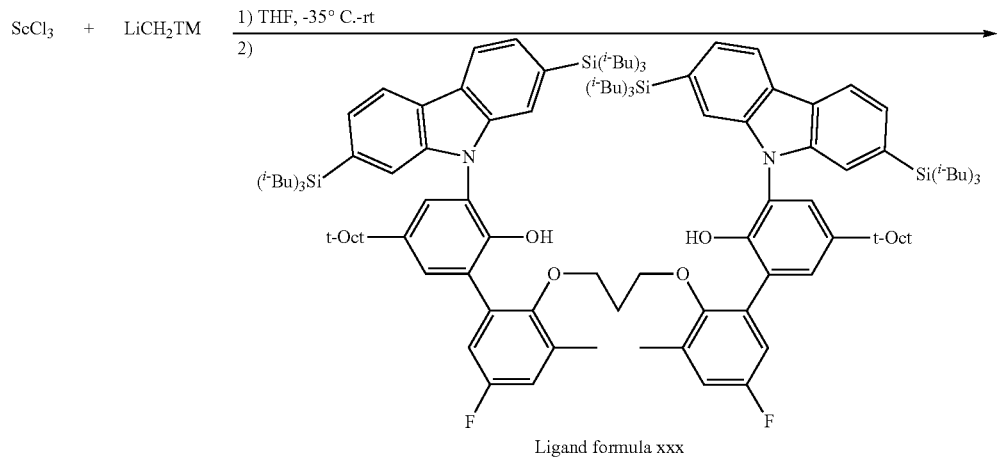

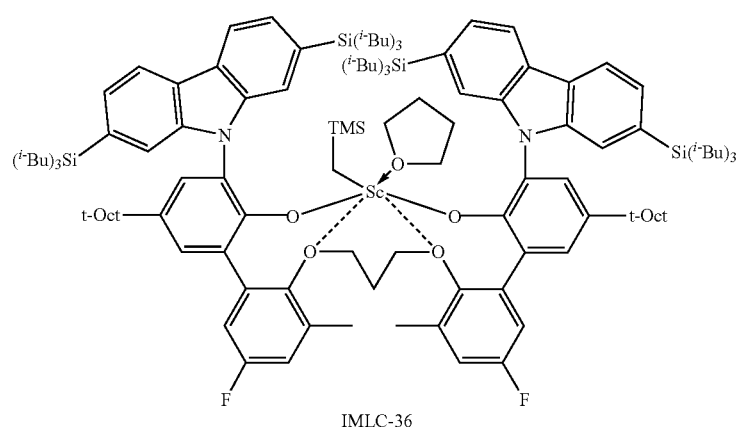

IMLC-36

In a $N_2$ filled glovebox, a 20 mL vial was charged with $ScCl_3$ (17.2 mg, 0.11 mmol, 1 equiv.) in 5 mL THF. The solution was vigorously stirred for 4 h at room temperature in order to break the chunks of $ScCl_3$. The solution was cooled to −35° C. for 30 mins. Recrystallized solid $LiCH_2TMS$ (33 mg, 0.35 mmol, 3.1 equiv.) in 5 mL THF was added to the solution and the reaction mixture was stirred at room temperature for 3 h. The solution was cooled at −35° C. for 30 mins. A 5 mL THF solution of Ligand Formula xxx (182 mg, 0.11 mmol, 1 equiv.) was added to the above solution and the final reaction mixture was stirred at room temperature for overnight. THF was evaporated under vacuum and the residue was triturated with cold toluene. The residue was dried under vacuum to obtain white solid (86 mg, 42%).

$^1$H NMR (400 MHz, Benzene-$d_6$) δ 8.41-6.94 (m, 20H), 4.17 (d, J=9.4 Hz, 2H), 4.05-3.17 (m, 6H), 2.31-0.43 (m, 142H), −0.24 (s, 9H), −0.82 (d, J=12.5 Hz, 1H), −1.34 (d, J=12.5 Hz, 1H).

Preparation of Ligand Formula xxx detailed in WO2017004462 A1.

Example 70—Synthesis of Inventive Metal-Ligand Complex 37 (IMLC-37)

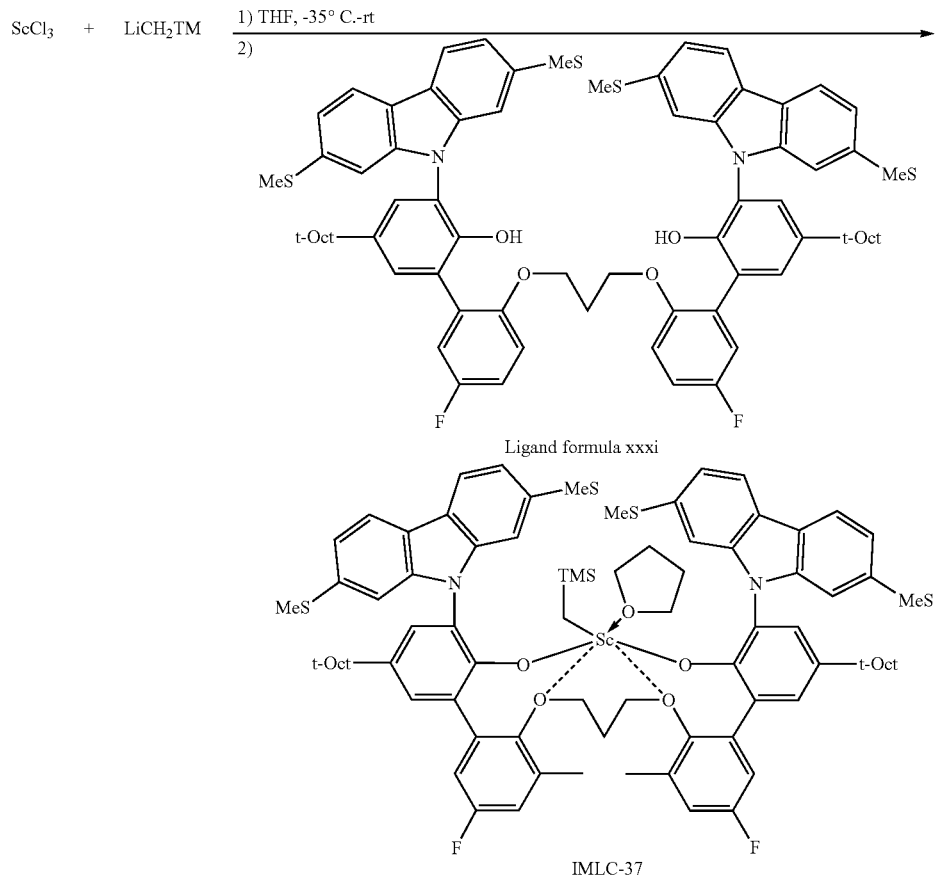

In a $N_2$ filled glovebox, a 20 mL vial was charged with $ScCl_3$ (16 mg, 0.1 mmol, 1 equiv.) in 5 mL THF. The solution was vigorously stirred for 4 h at room temperature in order to break the chunks of $ScCl_3$. The solution was cooled to −35° C. for 30 mins. Recrystallized solid $LiCH_2TMS$ (31 mg, 0.33 mmol, 3.1 equiv.) in 5 mL THF was added to the solution and the reaction mixture was stirred at room temperature for 3 h. The solution was cooled at −35° C. for 30 mins. A 5 mL THF solution of Ligand Formula xxxi (132 mg, 0.1 mmol, 1 equiv.) was added to the above solution and the final reaction mixture was stirred at room temperature for overnight. THF was evaporated under vacuum and the residue was triturated with cold toluene. The residue was dried under vacuum to obtain white solid (69 mg, 45%).

$^1H$ NMR (400 MHz, Benzene-$d_6$) δ 8.32-6.55 (m, 24H), 5.53 (dt, J=9.0, 5.5 Hz, 2H), 5.39 (ddd, J=8.6, 6.8, 4.3 Hz, 2H), 5.32 (dd, J=8.9, 5.0 Hz, 2H), 3.9-2.9 (m, 8H), 2.9-0.5, (m, 76H), −0.39 (s, 9H), −0.97 (d, J=12.9 Hz, 1H), −1.84 (d, J=12.8 Hz, 1H).

$^{19}F$ NMR (376 MHz, Benzene-$d_6$) δ −115.31--115.55 (m), −116.56--116.90 (m).

Example 71—2,7-dimesityl-9H-carbazole

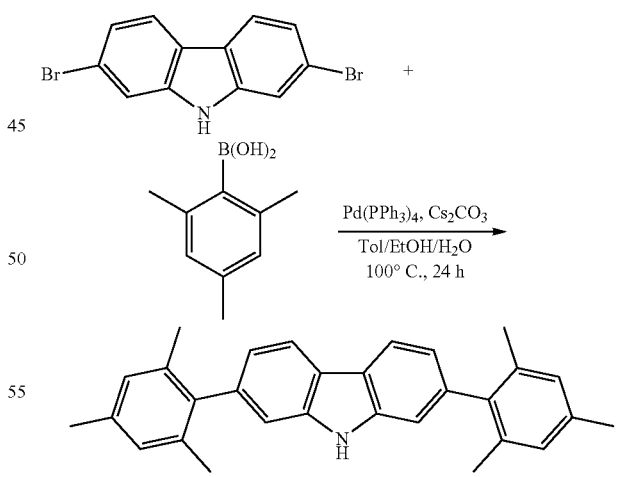

A 500 mL round bottom flask was charged with 2,7-dibromo-9H-carbazole (4.0 g, 12.0 mmol, 1 equiv.), 2,4,6-trimethylphenyl boronic acid (6.0 g, 37 mmol, 3 equiv.), Cesium carbonate (12.0 g, 37.0 mmol, 3 equiv.). Then, tetrakis(triphenylphosphine)palladium (711 mg, 0.62 mmol, 5 mol %) was added to the reaction mixture. The RB was equipped with a reflux condenser was evacuated, then back-filled with nitrogen, this evacuation/re-fill process was repeated thrice. Freshly prepared deoxygenated toluene (40 mL), ethanol (30 mL), and H₂O (30 mL) were added via syringes to the reaction mixture, the yellow mixture was placed in a mantle heated to 100° C. The reaction mixture was stirred for 24 h and the completion of the reaction was monitored by NMR. The reaction was allowed to cool at room temperature. The organic phase was extracted with dichloromethane (70×3). The combined organic layers were dried over Na₂SO₄ and evaporated the solvent under vacuo. The orange solid cake was washed with dichloromethane to afford white solid (4.3 g, 87%).

¹H NMR (400 MHz, Chloroform-d) δ 8.13 (d, J=7.9 Hz, 2H), 8.10 (s, 1H), 7.23-7.19 (m, 2H), 7.03 (dd, J=7.9, 1.3 Hz, 2H), 6.99 (s, 4H), 2.37 (s, 6H), 2.05 (s, 12H).

¹³C NMR (101 MHz, CDCl₃) δ 140.1, 139.8, 139.1, 136.7, 136.4, 128.2, 122.0, 121.3, 120.3, 111.3, 21.2, 20.92.

Example 72—2,7-dimesityl-9-(2-((tetrahydro-2H-pyran-2-yl)oxy)-5-(2,4,4-trimethylpentan-2-yl)phenyl)-9H-carbazole mL of acetonitrile. The white solid was dried under vacuum to yield product (1.3 g, 63%).

¹H NMR (400 MHz, Chloroform-d) δ 8.18 (d, J=7.9 Hz, 2H), 7.46 (d, J=2.4 Hz, 1H), 7.35 (dd, J=8.7, 2.5 Hz, 1H), 7.18 (d, J=8.7 Hz, 1H), 7.05 (dd, J=7.9, 1.4 Hz, 2H), 6.97 (d, J=1.4 Hz, 1H), 6.95-6.87 (m, 5H), 5.22 (t, J=2.9 Hz, 1H), 3.41 (td, J=11.3, 2.5 Hz, 1H), 3.27 (dt, J=11.5, 3.7 Hz, 1H), 2.32 (d, J=1.6 Hz, 6H), 2.05-1.97 (m, 12H), 1.56 (s, 4H), 1.48-1.35 (m, 1H), 1.33 (d, J=4.4 Hz, 5H), 1.29-1.2 (m, 1H), 1.15 (dq, J=9.8, 6.5, 5.3 Hz, 3H), 0.67 (s, 9H).

¹³C NMR (101 MHz, CDCl₃) δ 151.2, 144.7, 142.4, 142.4, 140.0, 140.0, 138.8, 138.7, 136.5, 136.4, 136.3, 136.2, 136.2, 136.2, 128.1, 128.1, 128.1, 128.0, 128.0, 127.1, 126.7, 121.6, 121.6, 121.1, 121.1, 119.9, 117.2, 111.1, 111.0, 97.0, 61.5, 57.2, 38.3, 32.5, 31.8, 31.7, 31.5, 30.1, 25.1, 21.2, 20.9, 20.9, 20.8, 20.8, 20.7, 17.9.

Example 73—Preparation of Ligand Formula (xxxi)

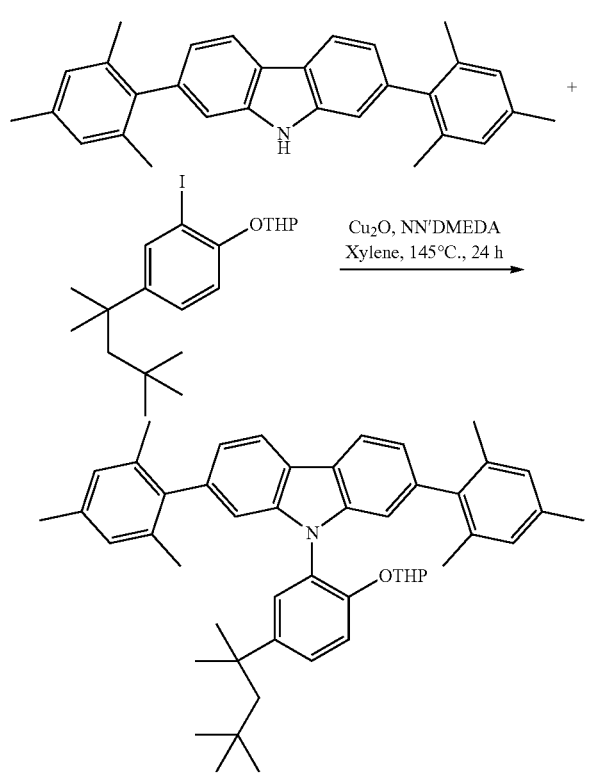

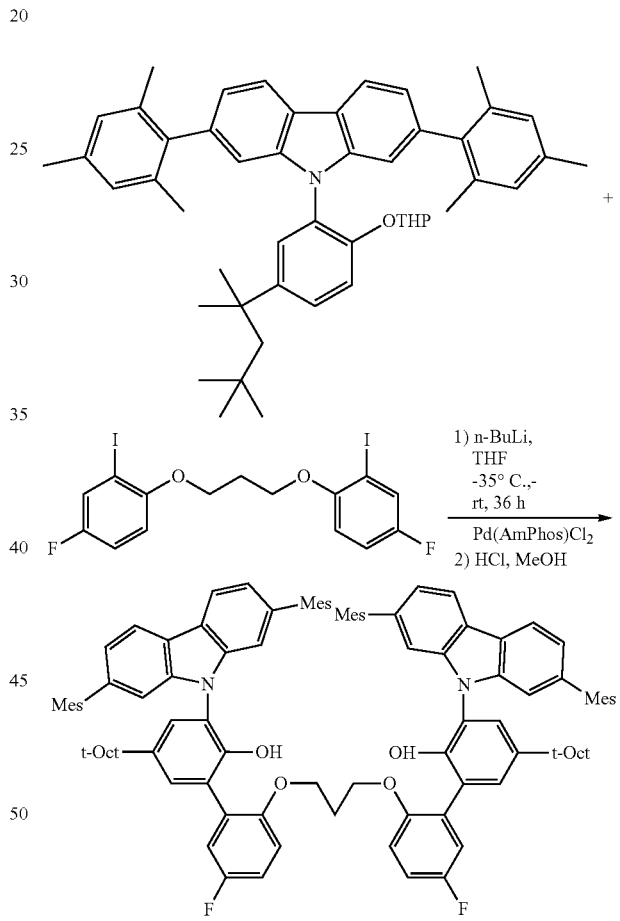

A 100 mL round bottom flask was charged with 2,7-dimesityl-9H-carbazole (1.2 g, 3.0 mmol, 1 equiv.), 2-(2-iodo-4-(2,4,4-trimethylpentan-2-yl)phenoxy)tetrahydro-2H-pyran (2.2 g, 5.4 mmol, 1.8 equiv.), K₃PO₄ (3.8 g, 18 mmol, 6 equiv.). The flask was brought into a N₂-filled glovebox and Cu₂O (851 mg, 6 mmol, 2 equiv.), NN'DMEDA (839 mg, 9.5 mmol, 3.2 equiv.), and dry and degassed xylene (15 mL) were added to it. The heterogeneous reaction mixture was stirred at 145° C. with vigorous stirring for 24 h. The completion of the reaction was monitored by NMR. The orange reaction mixture was taken out of the glovebox and filtered the through celite. Acetonitrile (50 mL) was added to the filtrate and the solid product crushed out. The white solid was collected in a disposable frit funnel and washed with 20

In a N₂-filled glovebox, a 40 mL vial was charged with 2,7-dimesityl-9-(5-octoxy-2-tetrahydropyran-2-tetrahydropyran-2-yloxy-phenyl)carbazole (500 mg, 0.72 mmol, 2.3 equiv.) and 3 mL THF. The solution was cooled to −35° C. in a glovebox freezer for 20 mins and 2.5 M n-Butyllithium was added (0.0.32 mL, 0.78 mmol, 2.4 equiv.) to the solution. The solution was stirred for 1.5 h at room temperature then cooled to −35° C. for 30 mins. A solution of dichlorozinc (72 mg, 0.53 mmol, 1.7 equiv.) in 3 mL THF was added and the resulting solution was stirred for 1 h at room temperature. A THF (3 mL) solution of 1,3-bis(4-fluoro-2-iodophenoxy)propane (160 mg, 0.31 mmol, 1 equiv.), and Bis(di-tert-butyl(4-dimethylaminophenyl)phosphine)dichloropalladium(II) (11 mg, 0.02 mmol, 0.05 equiv.) was added to the above ArZnX solution. The reaction was heated to 50° C. and stirred the reaction mixture for 24 h. The completion of the reaction was monitored by NMR. The vial was taken out of the glovebox and MeOH (5 mL) and Conc. HCl (4 drops from a glass pipet) were added to the reaction mixture. The solution was stirred at room temperature for 18 h. The solvent was removed under reduced pressure. The crude residue was loaded on to a column directly and purified the product using 50% $CH_2Cl_2$ in hexanes. Upon evaporation of the solvents, a white solid (162 mg, 42%) was obtained.

$^1$H NMR (400 MHz, $CDCl_3$) δ 8.25 (d, J=8.0 Hz, 4H), 7.39-7.34 (m, 2H), 7.14-7.05 (m, 6H), 6.94 (d, J=1.8 Hz, 4H), 6.93-6.84 (m, 10H), 6.43 (ddd, J=9.0, 7.9, 3.2 Hz, 2H), 6.01 (dd, J=9.1, 4.4 Hz, 2H), 5.64 (s, 2H), 3.40 (t, J=5.5 Hz, 4H), 2.27 (s, 12H), 2.00 (d, J=21.6 Hz, 26H), 1.57 (d, J=5.8 Hz, 4H), 1.26 (s, 12H), 0.59 (s, 18H).

$^{13}$C NMR (101 MHz, $CDCl_3$) δ 209.4, 207.1, 201.7, 201.7, 199.0, 193.9, 193.1, 190.8, 190.0, 187.7, 187.1, 187.1, 180.2, 179.2, 179.1, 178.4, 177.3, 175.3, 173.0, 172.5, 171.3, 169.5, 169.2, 166.4, 166.2, 163.8, 163.7, 161.7, 115.2, 108.2, 89.1, 83.3, 82.6, 82.4, 72.0, 71.8, 71.8.

Preparation of 1,3-bis(4-fluoro-2-iodophenoxy)propane detailed in WO 2012027448.

Example 74—Synthesis of Inventive Metal-Ligand Complex 38 (IMLC-38)

In a $N_2$ filled glovebox, a 20 mL vial was charged with $ScCl_3$ (15 mg, 0.1 mmol, 1 equiv.) in 5 mL THF. The solution was vigorously stirred for 4 h at room temperature in order to break the chunks of $ScCl_3$. The solution was cooled to −35° C. for 30 mins. Recrystallized solid $LiCH_2TMS$ (29 mg, 0.31 mmol, 3.1 equiv.) in 5 mL THF was added to the solution and the reaction mixture was stirred at room temperature for 3 h. The solution was cooled at −35° C. for 30 mins. A 5 mL THF solution of Ligand Formula xxxii (127 mg, 0.1 mmol, 1 equiv.) was added to the above solution and the final reaction mixture was stirred at room temperature for overnight. THF was evaporated under vacuum and the residue was triturated with cold toluene. The residue was dried under vacuum to obtain white solid (81 mg, 55%).

$^1$H NMR (400 MHz, Benzene-$d_6$) δ 8.23-5.9 (m, 28H), 3.99 (dt, J=18.3, 9.7 Hz, 2H), 3.5-2.7 (m, 6H), 2.5-0.5 (m, 78H), −0.53 (s, 9H), −0.89 (d, J=11.9 Hz, 1H), −1.00 (d, J=11.9 Hz, 1H).

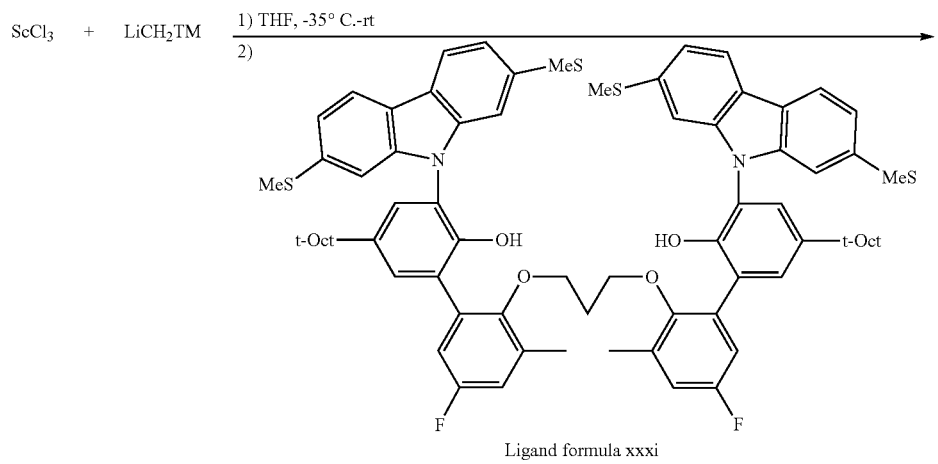

Ligand formula xxxi

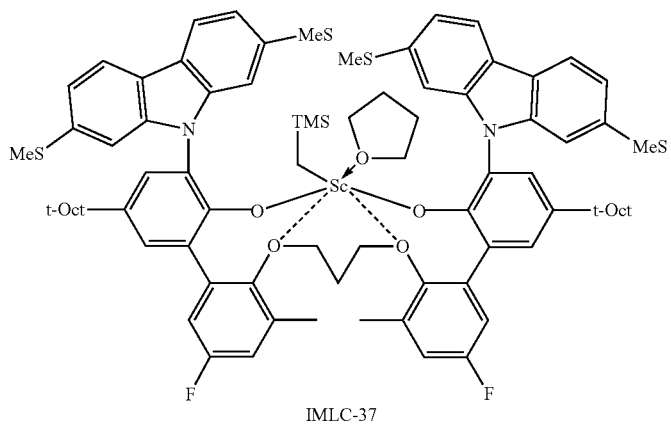

IMLC-37

Example 75—Preparation of Ligand Formula (xxxii)

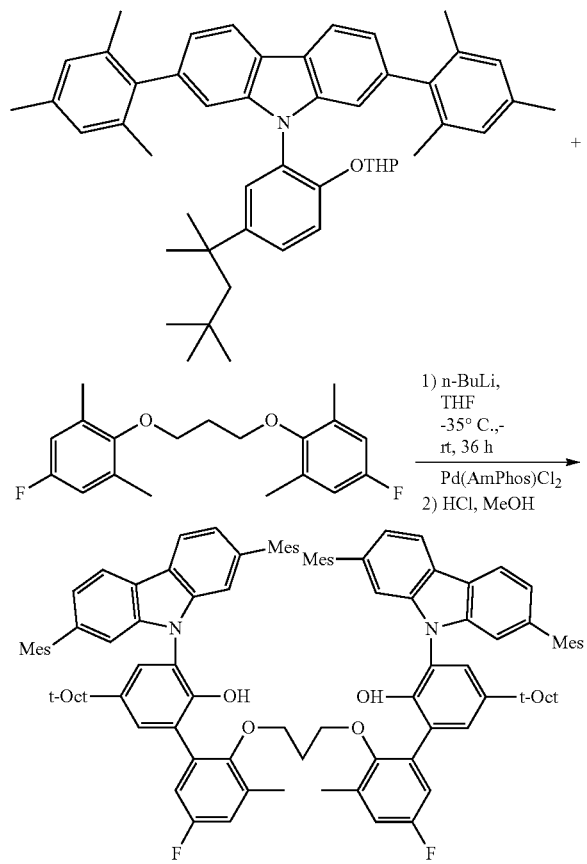

In a N$_2$-filled glovebox, a 40 mL vial was charged with 2,7-dimesityl-9-(5-octoxy-2-tetrahydropyran-2-tetrahydropyran-2-yloxy-phenyl)carbazole (500 mg, 0.72 mmol, 2.3 equiv.) and 3 mL THF. The solution was cooled to −35° C. in a glovebox freezer for 20 mins and 2.5 M n-Butyllithium was added (0.0.32 mL, 0.78 mmol, 2.4 equiv.) to the solution. The solution was stirred for 1.5 h at room temperature then cooled to −35° C. for 30 mins. A solution of dichlorozinc (72 mg, 0.53 mmol, 1.7 equiv.) in 3 mL THF was added and the resulting solution was stirred for 1 h at room temperature. A THF (3 mL) solution of 1,3-bis(4-fluoro-2-iodo-6-methylphenoxy)propane (169 mg, 0.31 mmol, 1 equiv.), and Bis(di-tert-butyl(4-dimethylaminophenyl)phosphine)dichloropalladium(II) (11 mg, 0.02 mmol, 0.05 equiv.) was added to the above ArZnX solution. The reaction was heated to 50° C. and stirred the reaction mixture for 24 h. The completion of the reaction was monitored by NMR. The vial was taken out of the glovebox and MeOH (5 mL) and Conc. HCl (4 drops from a glass pipet) were added to the reaction mixture. The solution was stirred at room temperature for 18 h. The solvent was removed under reduced pressure. The crude residue was loaded on to a column directly and purified the product using 50% CH$_2$Cl$_2$ in hexanes. Upon evaporation of the solvents, a white solid (161 mg, 410%) was obtained.

$^1$H NMR (400 MHz, CDCl$_3$) δ 8.09 (d, J=7.9 Hz, 4H), 7.36 (d, J=2.4 Hz, 2H), 7.20 (d, J=2.4 Hz, 2H), 6.94 (dd, J=7.9, 1.4 Hz, 4H), 6.83-6.73 (m, 11H), 6.73-6.60 (m, 7H), 3.19 (t, J=6.7 Hz, 4H), 2.12 (s, 12H), 1.88 (s, 12H), 1.78 (s, 12H), 1.60 (s, 10H), 1.40-1.29 (m, 2H), 1.23 (s, 10H), 0.55 (s, 18H).

$^{13}$C NMR (101 MHz, CDCl$_3$) δ 160.4, 158.0, 149.5, 149.5, 147.9, 143.3, 142.0, 139.9, 139.0, 136.5, 136.3, 136.1, 133.7, 133.6, 133.2, 133.1, 129.0, 128.5, 128.1, 128.1, 128.0, 126.7, 126.7, 125.8, 122.0, 121.4, 120.2, 117.5, 117.3, 116.5, 116.2, 111.0, 77.4, 71.1, 57.4, 38.3, 32.5, 31.8, 31.6, 21.1, 20.9, 20.9, 16.2.

Preparation of 1,3-bis(4-fluoro-2-iodo-6-methylphenoxy)propane detailed in WO 2014105414.

The Comparative metal-ligand complexes C1 and C2 (herein "Comparative C1" and "Comparative C2") were each intermixed with Co-catalyst 1 to form a catalyst system. The inventive metal-ligand complexes 1, 2, and 3 have a structure according to the metal-ligand complex of formula (I). The Comparative Procatalysts had the following structures:

Comparative C1

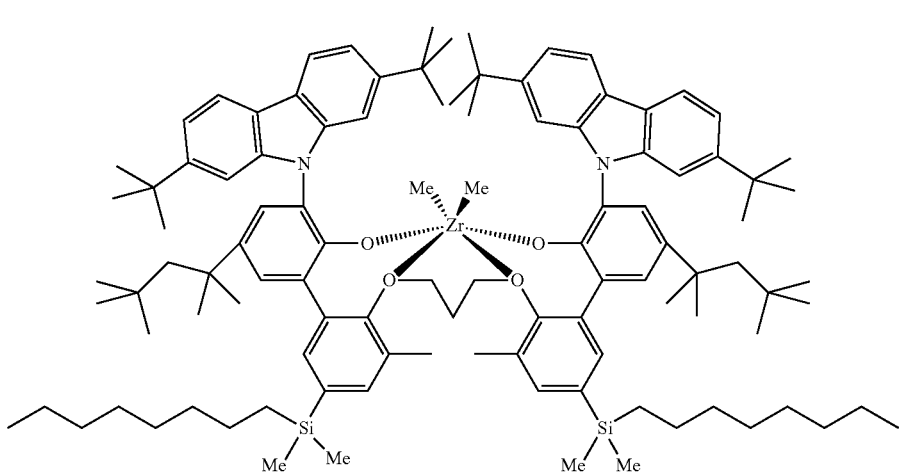

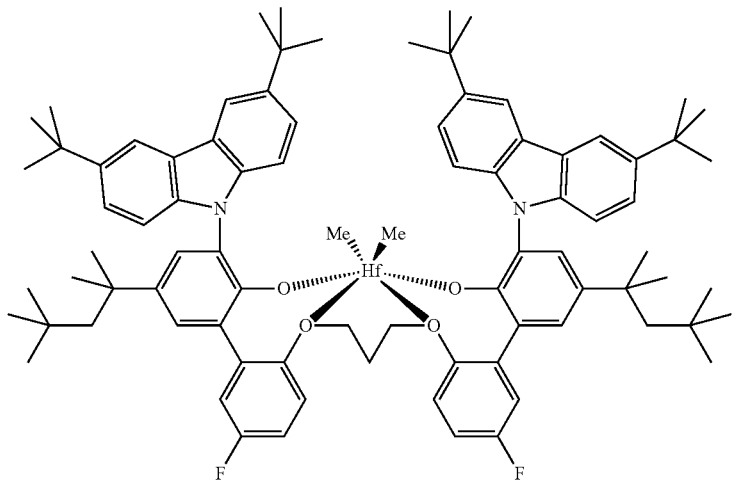

Comparative C2

Example 76—Continuous Process Polymerization Results

Raw materials (ethylene, 1-octene) and the process solvent (a narrow boiling range high-purity isoparaffinic solvent trademarked Isopar E commercially available from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to above reaction pressure at 525 psig. The solvent and comonomer (1-octene) feed is pressurized via mechanical positive displacement pump to above reaction pressure at 525 psig. Modified methylaluminoxane (MMAO), commercially available from AkzoNobel, is used as an impurity scavenger. The individual catalyst components (procatalyst cocatalyst) are manually batch diluted to specified component concentrations with purified solvent (Isopar E) and pressured to above reaction pressure at 525 psig. The cocatalyst is [HNMe($C_{18}H_{37}$)$_2$][B($C_6F_5$)$_4$], commercially available from Boulder Scientific, and is used at a 1.2 molar ratio relative to the procatalyst. All reaction feed flows are measured with mass flow meters and independently controlled with computer automated valve control systems.

The continuous solution polymerizations are carried out in a 5 L continuously stirred-tank reactor (CSTR). The reactor has independent control of all fresh solvent, monomer, comonomer, hydrogen, and catalyst component feeds. The combined solvent, monomer, comonomer and hydrogen feed to the reactor is temperature controlled to anywhere between 5° C. to 50° C. and typically 25° C. The fresh comonomer feed to the polymerization reactor is fed in with the solvent feed. The fresh solvent feed is controlled typically with each injector receiving half of the total fresh feed mass flow. The cocatalyst is fed based on a calculated specified molar ratio (1.2 molar equivalents) to the procatalyst component. Immediately following each fresh injection location, the feed streams are mixed with the circulating polymerization reactor contents with static mixing elements. The effluent from the polymerization reactor (containing solvent, monomer, comonomer, hydrogen, catalyst components, and molten polymer) exits the first reactor loop and passes through a control valve (responsible for maintaining the pressure of the first reactor at a specified target). As the stream exits the reactor it is contacted with water to stop the reaction. In addition, various additives such as anti-oxidants, can be added at this point. The stream then goes through another set of static mixing elements to evenly disperse the catalyst kill and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatization system where the polymer is removed from the solvent, hydrogen, and unreacted monomer and comonomer. The separated and devolatized polymer melt is pumped through a die specially designed for underwater pelletization, cut into uniform solid pellets, dried, and transferred into a box for storage.

TABLE 1

Continuous Process Ethylene/1-Octene Copolymerization Reactions of IMLC-1 and IMLC-2 in comparison to Comparative C2.

| Catalyst | Temp. (° C.) | Additive | Additive Feed (g/h) | % Solids (%)[A] | $H_2$ (mol %)[B] | C2 conversion (%) | Eff.[C] | $I_{10}/I_2$ | MI (g/10 min) | Density (g/cc) | Reactivity Ratio ($r_1$) |
|---|---|---|---|---|---|---|---|---|---|---|---|
| IMLC-1 | 180 | TEA | 51.78 | 21.83 | 0.03 | 93.51 | 3.57 | 5.3 | 5.17 | 0.9550 | 1850 |
| IMLC-1 | 190 | TEA | 49.4 | 21.9 | 0.01 | 93.54 | 2.26 | 5.3 | 9.12 | 0.9530 | 900 |

TABLE 1-continued

Continuous Process Ethylene/1-Octene Copolymerization Reactions
of IMLC-1 and IMLC-2 in comparison to Comparative C2.

| Catalyst | Temp. (° C.) | Additive | Additive Feed (g/h) | % Solids (%)[A] | $H_2$ (mol %)[B] | C2 conversion (%) | Eff.[C] | $I_{10}/I_2$ | MI (g/10 min) | Density (g/cc) | Reactivity Ratio ($r_1$) |
|---|---|---|---|---|---|---|---|---|---|---|---|
| IMLC-2 | 180 | TEA | 49.8 | 21.78 | 0.04 | 93.58 | 1.54 | 5.4 | 5.61 | 0.9544 | 1300 |
| IMLC-2 | 190 | TEA | 50.1 | 21.74 | 0.03 | 93.55 | 1.23 | 5.3 | 8.81 | 0.9520 | 700 |
| Comp. C1[D] | 190 | MMAO | 100.03 | 21.1 | 0.07 | 93.45 | 35.0 | 6.0 | 4.55 | 0.9403 | 150 |

Continuous reactor conditions: solvent feed = 17.3 kg/h, ethylene feed = 5.3 kg/h, 1-octene feed 1.3 kg/h, ethylene exit = 9 g/L.
[A]% Solids is the concentration of polymer in the reactor,
[B]$H_2$ (mol %) is defined as the mole fraction of hydrogen, relative to ethylene, fed into the reactor.
[C]The efficiency (Eff.) is measured as $10^6$ g polymer/g Metal).
[D]Metal-ligand complex C1 was combined with the additive bis(octadecyl)methylammonium tetrakis(pentafluorophenyl)borate (1:1.2 ratio of catalyst/additive)

Procedure for Batch Reactor Polymerization. Raw materials (ethylene, 1-octene) and the process solvent (a narrow boiling range high-purity isoparaffinic solvent trademarked ISOPAR E commercially available from ExxonMobil Corporation) are purified with molecular sieves before introduction into the reaction environment. A one gallon (3.79 L) stirred autoclave reactor was charged with ISOPAR E, and 1-octene. The reactor was then heated to the desired temperature and charged with ethylene to reach the desired pressure. Hydrogen was also added at this point if desired. The catalyst composition was prepared in a drybox under inert atmosphere by mixing the desired pro-catalyst and optionally one or more additives as desired, with additional solvent to give a total volume of about 15-20 mL. The activated catalyst mixture was then quick-injected into the reactor. The reactor pressure and temperature were kept constant by feeding ethylene during the polymerization and cooling the reactor as needed. After 10 minutes, the ethylene feed was shut off and the solution transferred into a nitrogen-purged resin kettle. The polymer was thoroughly dried in a vacuum oven, and the reactor was thoroughly rinsed with hot ISOPAR E between polymerization runs.

Further polymerizations were carried out in a batch reactor according to the procedure previously described in this disclosure. Catalyst solutions were prepared under a nitrogen atmosphere. The Inventive metal-ligand complexes were combined with a co-catalyst. For the results summarized in Table 2, batch polymerization reactions were carried out with increased 1-octene loading (600 g) in the reactor to better differentiate the level of comonomer incorporation between the inventive Metal-ligand complex 1 and Metal-ligand complex 2 with the Comparative Metal-ligand complex C1. Conditions for the batch reactor were: (1) 225 psi C2, 600 g 1-octene, and 40 mmol $H_2$ were reacted in the presence of 750 g isopar-E at a reaction temperature of 120° C. for a run time of 10 minutes; (2) 320 psi C2, 600 g 1-octene, and 40 mmol $H_2$ were reacted in the presence of 710 g isopar-E at reactor temperature of 160° C. and a run time of 10 minutes; or (3) 410 psi C2, 600 g 1-octene, 40 mmol $H_2$, and 50 equiv of co-catalyst, MMAO, were reacted in the presence of 715 g isopar-E at a reactor temperature of 190° C. for a run time of 10 min. In the comparative examples, 1.2 molar equivalents of Co-catalyst 1 relative to metal in the procatalyst were used to activate the Comparative C1. The results of the high 1-octene polymerization reactions are shown in Table 2.

TABLE 2

Batch Polymerizations Inventive Examples, IMLC-1 to IMLC-16 in comparison to
Comparative Metal-ligand complex C1 and Comparative Metal-ligand complex C2

| Catalyst | Temp (° C.) | Addit. Name | Addit. Amt.* | $H_2$ mmol | Loading (μmol) | Yield (g) | Efficiency kg poly/gM | $M_w$ (kg/mol) | $M_w/M_n$ | wt % octene | Tm (° C.) |
|---|---|---|---|---|---|---|---|---|---|---|---|
| IMLC-1 | 120 | MMAO | 50 | 0 | 0.2 | 8.8 | 979 | 331 | 2.25 | ND | 132 |
| IMLC-1 | 160 | MMAO | 50 | 0 | 0.2 | 11.8 | 1312 | 128 | 2.13 | ND | 133 |
| IMLC-1 | 190 | MMAO | 50 | 0 | 0.5 | 5.7 | 254 | 71 | 2.20 | ND | 133 |
| IMLC-2 | 120 | MMAO | 50 | 0 | 0.1 | 18.8 | 4181 | 279 | 2.08 | ND | 132 |
| IMLC-2 | 160 | MMAO | 50 | 0 | 0.2 | 18.5 | 2057 | 116 | 2.00 | ND | 132 |
| IMLC-2 | 190 | MMAO | 50 | 0 | 0.4 | 14.5 | 806 | 60 | 1.92 | ND | 132 |
| IMLC-3 | 120 | MMAO | 50 | 0 | 0.16 | 10 | 1390 | 782 | 2.10 | 1.36 | 123 |
| IMLC-3 | 160 | MMAO | 50 | 0 | 0.6 | 11.5 | 426 | 175 | 2.16 | 0.70 | 125 |
| IMLC-3 | 190 | MMAO | 50 | 0 | 2.3 | 11.8 | 114 | 53 | 2.12 | 0.52 | 128 |
| Comp C2** | 120 | MMAO | 50 | 0 | 0.1 | 45.2 | 2532 | 577 | 1.98 | 30.14 | 65 |
| Comp C2** | 160 | MMAO | 50 | 0 | 0.1 | 16.4 | 919 | 438 | 1.83 | 13.63 | 96 |
| Comp C2** | 190 | MMAO | 50 | 0 | 0.3 | 24.8 | 463 | 284 | 1.84 | 10.81 | 102 |
| IMLC-4 | 120 | MMAO | 50 | 0 | 1.0 | 22.9 | 509 | 114 | 1.48 | 0.96 | 125 |
| IMLC-4 | 160 | MMAO | 50 | 0 | 1.5 | 18.7 | 277 | 34 | 1.85 | 0.24 | 128 |
| IMLC-4 | 190 | MMAO | 50 | 0 | 2.5 | 8.5 | 76 | 6 | 2.38 | 1.14 | 127 |
| IMLC-5 | 120 | MMAO | 50 | 0 | 0.3 | 51.6 | 3826 | 482 | 2.49 | ND | 132 |
| IMLC-5 | 160 | MMAO | 50 | 0 | 0.6 | 6.8 | 252 | 241 | 2.06 | ND | 133 |
| IMLC-5 | 190 | MMAO | 50 | 0 | 1.1 | 14.6 | 295 | 90 | 1.95 | ND | 132 |
| IMLC-6 | 120 | TEA | 50 | 0 | 0.3 | 26.4 | 1957 | 402 | 2.06 | 0.61 | 124 |
| IMLC-6 | 160 | TEA | 50 | 0 | 2.0 | 12.2 | 136 | 67 | 1.98 | 0.70 | 127 |
| IMLC-6 | 190 | TEA | 50 | 0 | 7.5 | 7.8 | 23 | 17 | 2.16 | 1.08 | 128 |
| IMLC-7 | 160 | MMAO | 50 | 0 | 0.14 | 14.1 | 2240 | 266 | 2.08 | ND | 132 |
| IMLC-7 | 160 | MMAO | 50 | 40 | 0.14 | 11.1 | 1763 | 121 | 2.03 | ND | 133 |

TABLE 2-continued

Batch Polymerizations Inventive Examples, IMLC-1 to IMLC-16 in comparison to
Comparative Metal-ligand complex C1 and Comparative Metal-ligand complex C2

| Catalyst | Temp (° C.) | Additive Name | Addit. Amt.* | H$_2$ mmol | Loading (μmol) | Yield (g) | Efficiency kg poly/gM | M$_w$ (kg/mol) | M$_w$/M$_n$ | wt % octene | Tm (° C.) |
|---|---|---|---|---|---|---|---|---|---|---|---|
| IMLC-7  | 190 | MMAO | 50 | 0  | 0.48 | 10.9 | 505  | 104 | 2.32 | ND    | 132 |
| IMLC-7  | 190 | MMAO | 50 | 40 | 0.48 | 10.4 | 482  | 62  | 2.39 | ND    | 132 |
| IMLC-8  | 160 | TEA  | 20 | 0  | 0.25 | 20.5 | 1824 | 24  | 3.76 | 1.49  | 128 |
| IMLC-8  | 160 | TEA  | 20 | 40 | 0.35 | 21.3 | 1354 | 21  | 2.55 | 1.44  | 129 |
| IMLC-8  | 190 | TEA  | 20 | 0  | 0.63 | 13.2 | 466  | 21  | 4.23 | 1.63  | 127 |
| IMLC-8  | 190 | TEA  | 20 | 40 | 0.81 | 23.6 | 648  | 18  | 2.68 | 1.80  | 129 |
| IMLC-9  | 160 | TEA  | 20 | 0  | 0.25 | 30.7 | 2731 | 196 | 2.68 | 1.32  | 131 |
| IMLC-9  | 160 | TEA  | 20 | 40 | 0.25 | 14.8 | 1317 | 123 | 2.41 | 0.36  | 132 |
| IMLC-9  | 190 | TEA  | 20 | 0  | 0.45 | 17.8 | 880  | 98  | 2.81 | −0.64 | 131 |
| IMLC-9  | 190 | TEA  | 20 | 40 | 0.50 | 18.2 | 810  | 85  | 2.96 | 0.26  | 131 |
| IMLC-10 | 160 | TEA  | 20 | 0  | 0.75 | 17.7 | 525  | 137 | 2.86 | 0.43  | 127 |
| IMLC-10 | 160 | TEA  | 20 | 40 | 0.90 | 20.2 | 499  | 114 | 2.29 | 0.22  | 127 |
| IMLC-10 | 190 | TEA  | 20 | 0  | 2.6  | 15.3 | 131  | 49  | 3.77 | 1.02  | 128 |
| IMLC-10 | 190 | TEA  | 20 | 40 | 2.8  | 22.1 | 176  | 44  | 2.34 | 0.71  | 128 |
| IMLC-11 | 120 | TEA  | 50 | 0  | 15   | 6.7  | 10   | 4   | 1.54 | 4.19  | 124 |
| IMLC-12 | 160 | TEA  | 20 | 0  | 3.6  | 21.1 | 130  | 39  | 2.33 | 0.87  | 129 |
| IMLC-13 | 120 | TEA  | 20 | 0  | 10   | 22.4 | 25   | 40  | 1.96 | 0.17  | 131 |
| IMLC-13 | 160 | TEA  | 20 | 0  | 0.6  | 12.1 | 227  | 81  | 1.79 | ND    | 132 |
| IMLC-13 | 190 | TEA  | 20 | 0  | 1.8  | 7.9  | 49   | 33  | 1.77 | 0.28  | 132 |
| IMLC-14 | 160 | TEA  | 20 | 0  | 0.6  | 12.1 | 227  | 207 | 1.97 | ND    | 131 |
| IMLC-14 | 160 | TEA  | 20 | 40 | 0.6  | 14.2 | 266  | 100 | 1.99 | ND    | 132 |
| IMLC-14 | 190 | TEA  | 20 | 0  | 1.2  | 13.1 | 123  | 73  | 1.77 | 0.74  | 133 |
| IMLC-14 | 190 | TEA  | 20 | 40 | 1.2  | 13.1 | 123  | 48  | 1.84 | ND    | 133 |
| IMLC-15 | 160 | TEA  | 20 | 0  | 5    | 28   | 36   | 85  | 1.81 | ND    | 132 |
| IMLC-15 | 190 | TEA  | 20 | 0  | 7.5  | 11.5 | 10   | 40  | 1.91 | ND    | 131 |
| IMLC-16 | 160 | TEA  | 20 | 0  | 0.4  | 24   | 364  | 179 | 1.94 | ND    | 131 |
| IMLC-16 | 190 | TEA  | 20 | 0  | 0.8  | 13.9 | 105  | 71  | 1.75 | 0.02  | 132 |
| IMLC-17 | 160 | TEA  | 20 | 0  | 0.3  | 20.0 | 1483 | 149 | 2.02 | ND    | 130 |
| IMLC-17 | 190 | TEA  | 20 | 0  | 0.4  | 10.1 | 562  | 69  | 1.96 | ND    | 131 |
| IMLC-18 | 160 | TEA  | 20 | 0  | 0.6  | 13.7 | 508  | 229 | 2.15 | ND    | 132 |
| IMLC-18 | 190 | TEA  | 20 | 0  | 2    | 24.7 | 275  | 70  | 3.74 | ND    | 133 |
| IMLC-19 | 160 | TEA  | 20 | 0  | 0.95 | 16.4 | 384  | 199 | 2.07 | ND    | — |
| IMLC-19 | 190 | TEA  | 20 | 0  | 1.5  | 13.3 | 197  | 81  | 1.99 | ND    | — |
| IMLC-20 | 160 | TEA  | 20 | 0  | 0.2  | 10.6 | 982  | 267 | 2.04 | ND    | 132 |
| IMLC-20 | 190 | TEA  | 20 | 0  | 0.4  | 3.2  | 148  | 103 | 2.02 | ND    | 133 |
| IMLC-21 | 160 | TEA  | 20 | 0  | 0.31 | 19.7 | 1400 | 269 | 2.07 | ND    | 132 |
| IMLC-21 | 160 | TEA  | 20 | 40 | 0.31 | 18.0 | 1280 | 119 | 1.99 | ND    | 133 |
| IMLC-21 | 190 | TEA  | 20 | 0  | 0.54 | 10.0 | 410  | 104 | 1.98 | ND    | 132 |
| IMLC-21 | 190 | TEA  | 20 | 40 | 0.75 | 13.7 | 410  | 57  | 1.92 | ND    | 132 |
| IMLC-22 | 160 | TEA  | 20 | 0  | 0.17 | 18.0 | 2380 | 131 | 2.04 | ND    | 131 |
| IMLC-22 | 160 | TEA  | 20 | 40 | 0.14 | 14.3 | 2210 | 92  | 1.97 | ND    | 132 |
| IMLC-22 | 190 | TEA  | 20 | 0  | 0.31 | 12.4 | 880  | 70  | 1.94 | ND    | 132 |
| IMLC-22 | 190 | TEA  | 20 | 40 | 0.26 | 15.6 | 1310 | 52  | 1.93 | ND    | 132 |
| IMLC-23 | 160 | TEA  | 20 | 0  | 1.65 | 15.1 | 200  | 162 | 3.91 | ND    | 132 |
| IMLC-23 | 160 | TEA  | 20 | 40 | 1.8  | 13.3 | 160  | 87  | 3.29 | ND    | 132 |
| IMLC-23 | 190 | TEA  | 20 | 0  | 6.0  | 18.4 | 70   | 59  | 6.99 | ND    | 132 |
| IMLC-23 | 190 | TEA  | 20 | 40 | 3.3  | 9.6  | 60   | 35  | 5.7  | ND    | 131 |
| IMLC-24 | 160 | TEA  | 20 | 0  | 0.2  | 8.3  | 960  | 645 | 1.95 | ND    | 133 |
| IMLC-24 | 160 | TEA  | 20 | 40 | 0.2  | 14.1 | 1540 | 118 | 2.08 | ND    |     |
| IMLC-24 | 190 | TEA  | 20 | 0  | 0.29 | 9.6  | 740  | 261 | 2.41 | ND    | 133 |
| IMLC-24 | 190 | TEA  | 20 | 40 | 0.31 | 6.0  | 430  | 78  | 2.01 | ND    | 134 |
| IMLC-25 | 160 | TEA  | 20 | 0  | 0.29 | 13.8 | 1066 | 317 | 2.05 | ND    | 132 |
| IMLC-25 | 160 | TEA  | 20 | 40 | 0.24 | 7.8  | 722  | 104 | 1.97 | ND    | 132 |
| IMLC-25 | 190 | TEA  | 20 | 0  | 0.42 | 5.9  | 312  | 115 | 2.02 | ND    | 132 |
| IMLC-25 | 190 | TEA  | 20 | 40 | 0.48 | 9.0  | 417  | 57  | 1.99 | ND    | 132 |
| IMLC-26 | 160 | MMAO | 20 | 0  | 0.16 | 11.6 | 1593 | 555 | 2.05 | ND    | 132 |
| IMLC-26 | 160 | MMAO | 20 | 40 | 0.17 | 11.4 | 1503 | 123 | 2.04 | ND    | 134 |
| IMLC-26 | 190 | MMAO | 20 | 0  | 0.25 | 8.5  | 756  | 235 | 2.17 | ND    | 133 |
| IMLC-26 | 190 | MMAO | 20 | 40 | 0.19 | 14   | 1661 | 69  | 1.96 | ND    | 134 |
| IMLC-27 | 160 | TEA  | 20 | 0  | 1.25 | 9.4  | 167  | 145 | 2.08 | ND    | 132 |
| IMLC-27 | 190 | TEA  | 20 | 0  | 2.5  | 8.3  | 74   | 63  | 2.13 | ND    | 132 |

ND = below detection limit of the instrument

Reactor conditions for Table 2: (1) 120° C., 225 psi C2, 100 g 1-octene, 1250 g isopar-E, 10 min. run time; (2) 160° C., 320 psi C2, 60 g 1-octene, 1250 g isopar-E, 10 min. run time; (3) 190° C., 410 psi C2, 65 g 1-octene, 1250 g isopar-E, 10 min. run time.
*The amount of additive was based on equivalence. Equivalence is measured as a ratio of moles Al/moles M, in which M is the metal center of the metal-ligand complex.
**1.2 molar equivalents of bis(octadecyl)methylammonium tetrakis(pentafluorophenyl)borate (Co-catalyst 1) relative to metal in the procatalyst were used to activate Comparative C2.

TABLE 3

Batch Polymerizations Reactions with High Amounts of Octene.

| Catalyst | Temp. (° C.) | Additive Name | Addit. Amt. * | Loading (μmol) | Yield (g) | Efficiency (kg poly/gM) | $M_w$ (kg/mol) | $M_w/M_n$ | wt % octene | Tm (° C.) |
|---|---|---|---|---|---|---|---|---|---|---|
| IMLC-1 | 120 | MMAO | 50 | 0.2 | 16.9 | 1879 | 209 | 1.93 | ND | 127 |
| IMLC-1 | 160 | MMAO | 50 | 0.5 | 16.7 | 743 | 42 | 1.79 | 0.44 | 128 |
| IMLC-1 | 190 | MMAO | 50 | 1.5 | 6.7 | 99 | 21 | 1.79 | 1.44 | 128 |
| IMLC-2 | 120 | MMAO | 50 | 0.1 | 22.8 | 5071 | 161 | 1.99 | 0.56 | 127 |
| IMLC-2 | 160 | MMAO | 50 | 0.1 | 12.1 | 2691 | 37 | 1.96 | 1.05 | 128 |
| IMLC-2 | 190 | MMAO | 50 | 0.2 | 14.3 | 1590 | 21 | 1.98 | 1.45 | 128 |
| Comp. C1 | 120 | MMAO | 50 | 0.05 | 15.5 | 3398 | 69 | 2.06 | 4.98 | 118 |
| Comp. C1 | 160 | MMAO | 50 | 0.08 | 18.3 | 2508 | 49 | 2.18 | 5.32 | 118 |
| Comp. C1 | 190 | MMAO | 50 | 0.12 | 25.1 | 2293 | 34 | 4.40 | 5.95 | 118 |
| IMLC-5 | 120 | MMAO | 50 | 0.5 | 10 | 445 | 187 | 2.02 | ND | 128 |
| IMLC-5 | 160 | MMAO | 50 | 0.7 | 24.1 | 766 | 42 | 1.90 | 0.61 | 129 |
| IMLC-5 | 190 | MMAO | 50 | 1.1 | 10.1 | 204 | 24 | 2.01 | 1.30 | 129 |
| IMLC-7 | 160 | MMAO | 50 | 0.12 | 8.9 | 1650 | 52 | 2.24 | 0.40 | 129 |
| IMLC-7 | 190 | MMAO | 50 | 0.90 | 17.9 | 442 | 23 | 3.17 | 1.79 | 128 |
| IMLC-8 | 160 | TEA | 20 | 0.35 | 18.8 | 1190 | 9 | 5.92 | 17.4 | 111 |
| IMLC-8 | 190 | TEA | 20 | 1.0 | 17.7 | 390 | 9 | 6.62 | 19.8 | 110 |
| IMLC-9 | 160 | TEA | 20 | 0.25 | 19.6 | 1744 | 39 | 2.89 | 1.83 | 126 |
| IMLC-9 | 190 | TEA | 20 | 0.50 | 17.7 | 787 | 29 | 3.82 | 3.52 | 126 |
| IMLC-10 | 160 | TEA | 20 | 1.05 | 34.4 | 730 | 26 | 2.31 | | 114 |
| IMLC-10 | 190 | TEA | 20 | 3.0 | 22.0 | 160 | 12 | 2.71 | | 115 |
| IMLC-14 | 160 | TEA | 20 | 0.9 | 26 | 325 | 39 | 1.91 | 1.87 | 128 |
| IMLC-14 | 190 | TEA | 20 | 1.5 | 13.3 | 100 | 24 | 2.95 | 2.05 | 127 |
| IMLC-15 | 160 | TEA | 20 | 2 | 38.2 | 121 | 25 | 1.89 | 2.43 | 127 |
| IMLC-15 | 190 | TEA | 20 | 4 | 17.7 | 28 | 11 | 2.04 | 3.57 | 126 |
| IMLC-16 | 160 | TEA | 20 | 0.8 | 36 | 273 | 34 | 1.79 | 1.94 | 126 |
| IMLC-16 | 190 | TEA | 20 | 1.6 | 19.3 | 73 | 14 | 2.18 | 3.28 | 126 |
| IMLC-17 | 160 | TEA | 20 | 0.7 | 21.3 | 677 | 20 | 2.58 | 2.89 | 124 |
| IMLC-17 | 190 | TEA | 20 | 0.8 | 22.4 | 623 | 12 | 1.88 | 3.10 | 124 |
| IMLC-18 | 160 | TEA | 20 | 0.9 | 15.5 | 383 | 50 | 1.93 | 0.17 | 128 |
| IMLC-18 | 190 | TEA | 20 | 1.3 | 16 | 274 | 25 | 1.93 | 0.39 | 128 |
| IMLC-20 | 160 | TEA | 20 | 0.27 | 7.3 | 481 | 59 | 1.99 | 0.48 | 128 |
| IMLC-20 | 190 | TEA | 20 | 0.4 | 7.5 | 348 | 20 | 2.18 | 1.22 | 128 |
| IMLC-21 | 160 | TEA | 20 | 0.55 | 15.4 | 620 | 55 | 1.95 | 0.23 | 127 |
| IMLC-21 | 190 | TEA | 20 | 0.9 | 13.0 | 320 | 21 | 2.26 | ND | 128 |
| IMLC-22 | 160 | TEA | 20 | 0.48 | 18.4 | 850 | 21 | 1.89 | 1.11 | 126 |
| IMLC-22 | 190 | TEA | 20 | 0.53 | 13.9 | 590 | 13 | 2.41 | 1.87 | 126 |
| IMLC-23 | 160 | TEA | 20 | 2.15 | 21.1 | 220 | 87 | 8.39 | ND | 128 |
| IMLC-23 | 190 | TEA | 20 | 5.0 | 15.0 | 70 | 34 | 5.90 | ND | 129 |
| IMLC-24 | 160 | TEA | 20 | 0.36 | 18.0 | 1110 | 133 | 2.15 | ND | 129 |
| IMLC-24 | 190 | TEA | 20 | 0.55 | 18.2 | 730 | 54 | 2.06 | ND | 130 |
| IMLC-25 | 160 | TEA | 20 | 0.43 | 8.7 | 448 | 67 | 1.98 | 0.46 | 127 |
| IMLC-25 | 190 | TEA | 20 | 0.53 | 7.9 | 332 | 30 | 1.94 | 0.25 | 128 |

Reaction Conditions for Table 3: (1) 120° C., 225 psi C2, 600 g 1-octene, 750 g isopar-E, 0 mmol $H_2$, 10 min. run time; (2) 160° C., 320 psi C2, 600 g 1-octene, 710 g isopar-E, 0 mmol $H_2$, 10 min. run time; (3) 190° C., 410 psi C2, 600 g 1-octene, 715 g isopar-E, 0 mmol $H_2$, 10 min. run time. 50 equiv of co-catalyst, 1.2 molar equivalents of Co-catalyst 1 relative to metal in the procatalyst were used to activate the Comparative C1.
ND = below detection limit of the instrument.
TEA is triethylaluminum.

In most of the polymerization runs tabulated in Table 2, the weight percent of units derived from 1-octene was below the detection limit. To obtain a better understanding of the ethylene selectivity of the inventive metal-ligand complexes, the amount of 1-octene in the reactor was increased. The reaction conditions for each polymerization run in Table 3 included 600 grams of 1-octene, which was six times greater than the reaction conditions in Table 2. By increasing the amount of octene in the reactor, the amount of units derived from octene in the produced polymer should increase based on the kinetics of the reaction. With six times the amount of 1-octene in the reactor, the inventive metal-ligand complexes were still highly selective towards ethylene producing polymers with less than 3 weight percent units derived from octene.

The results in Table 3 showed IMLC-8 produced polymers with a high weight percent of units derived from octene. However, the polymer produced by IMLC-8 also had a very low molecular weight. The low molecular weight in combination with the high octene weight percent indicated that octene acted as chain termination reagent. Since the amount of ethylene that would have been polymerized into the polymer chain was barred, the amount of octene was inversely high. However, based on the results in Table 2, IMLC-8 is ethylene selective.

TABLE 4

Polymerization Reactions in the presence of an additive, bis(octadecyl)methylammonium tetrakis(pentafluorophenyl)borate

| Catalyst | Loading (μmol) | Additive (equiv) | Yield (g) | Efficiency kg poly/gM | $M_w$ (kg/mol) | $M_w/M_n$ | wt % octene | Tm (° C.) |
|---|---|---|---|---|---|---|---|---|
| IMLC-1 | 0.3 | 0.1 | 10.5 | 778 | 105 | 1.77 | ND | 133 |
| IMLC-1 | 0.3 | 0.2 | 10.3 | 764 | 106 | 1.81 | ND | 133 |
| IMLC-1 | 0.4 | 0.5 | 11.5 | 639 | 107 | 1.79 | ND | 133 |
| IMLC-1 | 0.4 | 1.0 | 18.3 | 1018 | 94 | 1.80 | ND | 132 |
| IMLC-1 | 0.4 | 1.2 | 19.2 | 1068 | 93 | 1.82 | ND | 132 |

Reaction conditions of Table 4: (1) 190° C., 410 psi C2, 65 g 1-octene, 1250 g isopar-E, 0 mmol $H_2$, 10 min. run time. 20 equiv. of a second additive, TEA, were used in each run.

Batch Reactor Polymerization Procedure. The batch reactor polymerization reactions are conducted in a 2 L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve that empties the reactor contents into a stainless steel dump pot. The dump pot is prefilled with a catalyst kill solution (typically 5 mL of an Irgafos/Irganox/toluene mixture). The dump pot is vented to a 30 gallon blow-down tank, with both the pot and the tank purged with nitrogen. All solvents used for polymerization or catalyst makeup are run through solvent purification columns to remove any impurities that may affect polymerization. The 1-octene and IsoparE are passed through two columns, the first containing A2 alumina, the second containing Q5. The ethylene is passed through two columns, the first containing A204 alumina and 4 Å molecular sieves, the second containing Q5 reactant. The $N_2$, used for transfers, is passed through a single column containing A204 alumina, 4 Å molecular sieves and Q5.

The reactor is loaded first from the shot tank that may contain IsoparE solvent and/or 1-octene, depending on reactor load. The shot tank is filled to the load set points by use of a lab scale to which the shot tank is mounted. After liquid feed addition, the reactor is heated up to the polymerization temperature set point. If ethylene is used, it is added to the reactor when the ethylene is at the reaction temperature to maintain reaction pressure set point. The amount of ethylene added is monitored by a micro-motion flow meter. For some experiments, the standard conditions at 120° C. are 46 g ethylene and 303 g 1-octene in 611 g of IsoparE, and the standard conditions at 150° C. are 43 g ethylene and 303 g 1-octene in 547 g of IsoparE.

The metal-ligand complex and co-catalyst are mixed with the appropriate amount of purified toluene to achieve a molarity solution. The metal-ligand complex and co-catalyst are handled in an inert glove box, drawn into a syringe and pressure transferred into the catalyst shot tank. The syringe is rinsed three times with 5 mL of toluene. Immediately after the catalyst is added, the run timer begins. If ethylene is used, it is added by the Camile to maintain reaction pressure set point in the reactor. The polymerization reactions are run for 10 minutes, then the agitator is stopped, and the bottom dump valve is opened to empty reactor contents to the dump pot. The contents of the dump pot are poured into trays and placed in a lab hood where the solvent was evaporated off overnight. The trays containing the remaining polymer are transferred to a vacuum oven, where they are heated up to 140° C. under vacuum to remove any remaining solvent. After the trays cool to ambient temperature, the polymers were weighed for yield to measure efficiencies, and submitted for polymer testing.

TABLE 5

Batch Polymerizations Inventive Examples, IMLC-A to IMLC-Z in comparison to IMLC-1

| Catalyst | Temp (° C.) | Additive Name | Addit. Amt. (μmol) | $H_2$ mmol | Loading (μmol) | Yield (g) | Efficiency kg poly/gM | $M_w$ (kg/mol) | $M_w/M_n$ | wt % octene | Tm (° C.) |
|---|---|---|---|---|---|---|---|---|---|---|---|
| IMLC-1 | 190 | none | 0 | 0 | 0.1 | 6.1 | 1357 | 110 | 2.16 | ND | 134 |
| IMLC-28 | 190 | none | 0 | 0 | 0.2 | 5.1 | 567 | 79 | 2.14 | ND | 132 |
| IMLC-29 | 190 | none | 0 | 0 | 0.1 | 5.8 | 1290 | 126 | 2.13 | ND | 135 |
| IMLC-31 | 190 | none | 0 | 0 | 0.05 | 4.6 | 2046 | 213 | 2.41 | ND | 137 |
| IMLC-31 | 190 | MMAO | 10 | 0 | 0.05 | 7.8 | 3470 | 193 | 2.38 | ND | 136 |
| IMLC-31 | 190 | MMAO | 50 | 0 | 0.05 | 4.4 | 1957 | 101 | 2.44 | ND | 134 |
| IMLC-31 | 190 | MMAO | 200 | 0 | 0.05 | 2.3 | 1023 | 36 | 3.04 | ND | 132 |
| IMLC-32 | 190 | None | 0 | 0 | 0.1 | 5.9 | 1312 | 137 | 2.25 | ND | 134 |
| IMLC-32 | 190 | MMAO | 50 | 0 | 0.1 | 3.3 | 734 | 74 | 2.40 | ND | 133 |
| IMLC-33 | 190 | none | 0 | 0 | 0.1 | 31.3 | 6962 | 350 | 2.83 | ND | 141 |
| IMLC-33 | 190 | MMAO | 50 | 0 | 0.1 | 23.5 | 5227 | 242 | 2.87 | ND | 137 |
| IMLC-34 | 190 | none | 0 | 0 | 0.1 | 9.1 | 2024 | 162 | 3.12 | ND | 134 |
| IMLC-34 | 190 | MAO | 50 | 0 | 0.1 | 7.5 | 1668 | 85 | 3.41 | ND | 132 |
| IMLC-35 | 190 | none | 0 | 0 | 0.1 | 13.8 | 3070 | 232 | 3.34 | ND | 135 |
| IMLC-35 | 190 | MMAO | 50 | 0 | 0.1 | 10.5 | 2336 | 125 | 3.36 | ND | 133 |
| IMLC-36 | 190 | none | 0 | 0 | 0.05 | 2.3 | 1023 | 399 | 2.61 | ND | 137 |
| IMLC-36 | 190 | MMAO | 50 | 0 | 0.05 | 6.8 | 3025 | 405 | 2.81 | ND | 140 |
| IMLC-37 | 190 | MMAO | 50 | 0 | 0.1 | 7.7 | 1713 | 421 | 5.67 | ND | 139 |

ND = below detection limit of the instrument
Reactor conditions for Table 5: (1) 190° C., 43 g C2, 28 g 1-octene, 520 g isopar-E, 10 min. run time.

TABLE 6

Batch Polymerizations Reactions of IMLC-A to IMLC-Z with High Amounts of Octene.

| Catalyst | Temp. (° C.) | Additive Name | Addit. Amt. (μmol) | Loading (μmol) | Yield (g) | Efficiency (kg poly/gM) | $M_w$ (kg/mol) | $M_w/M_n$ | wt % octene | Tm (° C.) |
|---|---|---|---|---|---|---|---|---|---|---|
| IMLC-28 | 150 | none | 0 | 0.1 | 8.6 | 1913 | 49 | 2.07 | 1.04 | 129 |
| IMLC-28 | 150 | MMAO | 50 | 0.1 | 1.5 | 334 | 46 | 2.22 | 1.18 | 130 |
| IMLC-28 | 190 | none | 0 | 0.2 | 6.5 | 723 | 38 | 2.47 | 0.48 | 128 |
| IMLC-28 | 190 | MMAO | 50 | 0.2 | 4.5 | 500 | 26 | 2.17 | 1.51 | 128 |
| IMLC-29 | 150 | none | 0 | 0.1 | 12.5 | 2781 | 65 | 2.15 | 0.60 | 131 |
| IMLC-29 | 150 | MMAO | 50 | 0.1 | 6.1 | 1357 | 71 | 2.17 | 0.49 | 132 |
| IMLC-29 | 190 | none | 0 | 0.1 | 2.7 | 601 | 42 | 2.12 | 0.92 | 130 |
| IMLC-29 | 190 | MMAO | 50 | 0.2 | 9.2 | 1023 | 33 | 2.20 | 0.30 | 130 |
| IMLC-30 | 150 | none | 0 | 0.1 | 2.4 | 534 | 97 | 2.27 | ND | 130 |
| IMLC-30 | 150 | MMAO | 50 | 0.1 | 1.3 | 289 | 68 | 2.50 | ND | 130 |
| IMLC-30 | 190 | none | 0 | 0.1 | 2.9 | 645 | 45 | 2.22 | ND | 130 |
| IMLC-30 | 190 | MMAO | 50 | 0.1 | 1.9 | 423 | 35 | 2.20 | 2.91 | 130 |
| IMLC-31 | 150 | none | 0 | 0.1 | 13.2 | 2936 | 98 | 2.03 | 0.32 | 130 |
| IMLC-31 | 150 | MMAO | 50 | 0.1 | 4.1 | 912 | 85 | 2.11 | 0.23 | 131 |
| IMLC-31 | 190 | none | 0 | 0.1 | 10.4 | 2313 | 42 | 2.04 | 0.47 | 129 |
| IMLC-31 | 190 | MMAO | 50 | 0.1 | 4.8 | 1067 | 36 | 2.09 | 0.70 | 130 |
| IMLC-32 | 150 | none | 0 | 0.1 | 33.7 | 7496 | 134 | 2.20 | 0.58 | 131 |
| IMLC-32 | 190 | none | 0 | 0.1 | 4.7 | 1045 | 37 | 2.04 | 0.26 | 129 |
| IMLC-32 | 190 | MMAO | 50 | 0.1 | 1.9 | 422 | 29 | 2.32 | 0.46 | 129 |
| IMLC-33 | 150 | none | 0 | 0.1 | 48.5 | 10788 | 224 | 2.52 | ND | 132 |
| IMLC-33 | 150 | MMAO | 50 | 0.1 | 22.8 | 5072 | 202 | 2.66 | ND | 131 |
| IMLC-33 | 190 | none | 0 | 0.1 | 23.3 | 5183 | 75 | 2.35 | 0.23 | 130 |
| IMLC-33 | 190 | MMAO | 50 | 0.1 | 15.6 | 3470 | 59 | 2.30 | ND | 130 |
| IMLC-34 | 190 | none | 0 | 0.1 | 1.5 | 334 | 25 | 2.47 | 2.88 | 125 |
| IMLC-34 | 190 | MMAO | 50 | 0.1 | 4.1 | 912 | 27 | 3.24 | 3.12 | 125 |
| IMLC-35 | 190 | none | 0 | 0.1 | 1.5 | 334 | 41 | 3.09 | 2.35 | 126 |
| IMLC-35 | 190 | MMAO | 50 | 0.1 | 5.1 | 1134 | 35 | 3.46 | 0.90 | 127 |
| IMLC-36 | 150 | none | 0 | 0.1 | 7.0 | 1557 | 226 | 2.35 | 0.88 | 132 |
| IMLC-36 | 150 | MMAO | 50 | 0.1 | 17.2 | 3826 | 282 | 2.49 | 0.47 | 136 |
| IMLC-36 | 190 | none | 0 | 0.1 | 10.8 | 2402 | 157 | 2.60 | ND | 132 |
| IMLC-36 | 190 | MMAO | 50 | 0.1 | 14.4 | 3203 | 133 | 2.58 | ND | 133 |
| IMLC-37 | 190 | none | 0 | 0.1 | 0.4 | 89 | 185 | 5.08 | 2.30 | 127 |
| IMLC-37 | 190 | MMAO | 50 | 0.1 | 4.8 | 1067 | 271 | 4.46 | ND | 137 |
| IMLC-3 8 | 190 | none | 0 | 0.1 | 0.4 | 89 | 106 | 3.72 | 6.77 | 121 |
| IMLC-3 8 | 190 | MMAO | 50 | 0.1 | 0.9 | 200 | 64 | 3.41 | 1.38 | 124 |

ND = below detection limit of the instrument

Reaction Conditions for Table 6: (1) 150° C., 43 g C2, 300 g 1-octene, 520 g isopar-E, 0 mmol $H_2$, 10 min. run time; (2) 190° C., 43 g C2, 300 g 1-octene, 520 g isopar-E, 0 mmol $H_2$, 10 min. run time;
ND = below detection limit of the instrument.

TABLE 7

Batch Polymerization Reations, in which each reaction is run in the Absence of an Additive containing Aluminum.

| Catalyst | Ethylene Partial Pressure (psi) | Loading (μmol) | MMAO (equiv) | Run Time (min) | Yield (g) | Efficiency (kg polymer/gM) | $M_w$ (kg/mol) | $M_w/M_n$ | wt % octene | Tm (° C.) |
|---|---|---|---|---|---|---|---|---|---|---|
| IMLC-1 | 400 | 0.5 | 0 | 0.4 | 19.6 | 872 | 23 | 2.2 | 1.6 | 128 |
| IMLC-1 | 400 | 0.2 | 0 | 2.4 | 7.3 | 812 | 31 | 2.1 | 1.3 | 129 |
| IMLC-1 | 415 | 0.2 | 10 | 5.6 | 8.5 | 945 | 30 | 2.2 | 1.4 | 128 |
| IMLC-1 | 415 | 0.15 | 10 | 10.1 | 8 | 1186 | 32 | 2.3 | 2.1 | 129 |
| IMLC-1 | 415 | 0.15 | 10 | 10.2 | 6.7 | 994 | 34 | 2.3 | 1.8 | 128 |

Reaction conditions for Table 7: 190° C., 300 g 1-octene, 525 g isopar-E, 0 mmol $H_2$.

Lower loading of alumoxanes do not act as activators, rather they serve as scavenging agent. A scavenging agent sequesters impurities in the reactor prior to addition of the precatalyst, and as such, does not constitute and activator. As indicated by the results in Table 7, neither an additive nor a co-catalyst is required to produce polymer.

TABLE 8

Polymerization Reactions in the presence of an additive, tris(pentafluorophenyl)borane

| Catalyst | Temp (° C.) | Loading (μmol) | Additive (equiv) | Yield (g) | Efficiency kg poly/gM | $M_w$ (kg/mol) | $M_w/M_n$ | wt % octene | Tm (° C.) |
|---|---|---|---|---|---|---|---|---|---|
| IMLC-1 | 160 | 0.12 | 0.1 | 14.6 | 2706 | 261 | 2.12 | ND | 132 |
| IMLC-1 | 160 | 0.12 | 0.5 | 12.1 | 2243 | 285 | 2.09 | ND | 132 |
| IMLC-1 | 160 | 0.12 | 1.2 | 10 | 1854 | 211 | 2.07 | ND | 132 |
| IMLC-1 | 190 | 0.27 | 0.1 | 10.3 | 849 | 104 | 1.99 | ND | 132 |
| IMLC-1 | 190 | 0.27 | 0.5 | 10.3 | 849 | 110 | 1.98 | ND | 132 |
| IMLC-1 | 190 | 0.27 | 1.2 | 7.1 | 585 | 110 | 1.97 | ND | 132 |

Reaction conditions of Table 8: (1) 160° C., 320 psi C2, 60 g 1-octene, 1250 g isopar-E, 0 mmol $H_2$, 10 min. run time; (2) 190° C., 410 psi C2, 65 g 1-octene, 1250 g isopar-E, 0 mmol $H_2$, 10 min. run time. 20 equiv. of a second additive, TEA, were used in each run.

Equipment Standards

All solvents and reagents are obtained from commercial sources and used as received unless otherwise noted. Anhydrous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Varian 400-MR and VNMRS-500 spectrometers. Chemical shifts for $^1$H NMR data are reported in ppm downfield from internal tetramethylsilane (TMS, δ scale) using residual protons in the deuterated solvent as references. $^{13}$C NMR data are determined with $^1$H decoupling, and the chemical shifts are reported downfield from tetramethylsilane (TMS, δ scale) in ppm versus the using residual carbons in the deuterated solvent as references.

The invention claimed is:
1. A metal-ligand complex according to formula (I):

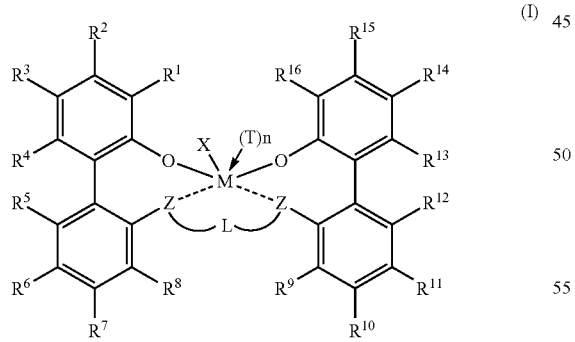

where:
M is scandium, yttrium, or a lanthanide metal having an oxidation state of +3;
X is a ligand chosen from $(C_1-C_{40})$hydrocarbyl, $(C_1-C_{40})$heterohydrocarbyl, —$CH_2Si(R^C)_{3-Q}(OR^C)_Q$, —$Si(R^C)_{3-Q}(OR^C)_Q$, —$OSi(R^C)_{3-Q}(OR^C)_Q$, —$CH_2Ge(R^C)_{3-Q}(OR^C)_Q$, —$Ge(R^C)_{3-Q}(OR^C)_Q$, $P(R^C)_{2-W}(OR^C)_W$, —$P(O)(R^C)_{2-W}(OR^C)_W$, —$N(R^C)_2$, —$NH(R^C)$, —$N(Si(R^C)_3)_2$, —$NR^CSi$ $(R^C)_3$, —$NHSi(R^C)_3$, —$OR^C$, —$SR^C$, —$NO_2$, —CN, —$CF_3$, —$OCF_3$, —$S(O)R^C$, —$S(O)_2R^C$, —$OS(O)_2R^C$, —N=$C(R^C)_2$, —N=$CH(R^C)$, —N=$CH_2$, —N=$P(R^C)_3$, —$OC(O)R^C$, —$C(O)$ $OR^C$, —$N(R^C)C(O)R^C$, —$N(R^C)C(O)H$, —NHC(O) $R^C$, —$C(O)N(R^C)_2$, —$C(O)NHR^C$, —$C(O)NH_2$, a halogen, $B(R^Y)_4$, $Al(R^Y)_4$, or $Ga(R^Y)_4$, or a hydrogen, wherein each $R^C$ is independently a substituted or unsubstituted $(C_1-C_{30})$hydrocarbyl, or a substituted or unsubstituted $(C_1-C_{30})$heterohydrocarbyl, and each Q is 0, 1, 2 or 3, and each W is 0, 1, or 2;

each $R^Y$ is —H, $(C_1-C_{30})$hydrocarbyl, or halogen atom;
each T is independently Lewis Base;
n is 1 or 2, when n is 1, X and T are optionally linked, when n is 2, X and one of T are optionally linked;
the metal-ligand complex is overall charge-neutral;
each Z is independently chosen from —O—, —S—, —$N(R^N)$—, or —$P(R^P)$—, wherein the dotted line optionally defines a dative bond;
$R^1$ and $R^{16}$ are independently selected from the group consisting of $(C_1-C_{40})$hydrocarbyl, $(C_1-C_{40})$heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS$ $(O)$—, $R^CS(O)_2$—, —N=$C(R^C)_2$, $R^CC(O)O$—, $R^COC$ $(O)$—, $R^CC(O)N(R)$—, $(R^C)_2NC(O)$—, or halogen;

$R^2$, $R^3$, $R^4$, $R^5$, $R^6$, $R^7$, $R^8$, $R^9$, $R^{10}$, $R^{11}$, $R^{12}$, $R^{13}$, $R^{14}$, and $R^{15}$ are independently selected from —H, $(C_1-C_{40})$ hydrocarbyl, $(C_1-C_{40})$heterohydrocarbyl, —$Si(R^C)_3$, —$Ge(R^C)_3$, —$P(R^P)_2$, —$N(R^N)_2$—$OR^C$, —$SR^C$, —$NO_2$, —CN, —$CF_3$, $R^CS(O)$—, $R^CS(O)_2$—, $(R^C)_2C=N$—, $(R^C)_2P=N$—, $R^CC(O)O$—, $R^COC$ $(O)$—, $R^CC(O)N(R)$—, $(R^C)_2NC(O)$—, and halogen;
provided that when M is yttrium or a lanthanide metal, $R^1$ is not —H, phenyl or tert-butyl; and $R^{16}$ is not —H, phenyl or tert-butyl;
L is $(C_1-C_{40})$hydrocarbylene or $(C_1-C_{40})$heterohydrocarbylene; and
each $R^C$, $R^P$, and $R^N$ in formula (I) is independently a $(C_1-C_{30})$hydrocarbyl, $(C_1-C_{30})$heterohydrocarbyl, or —H.

2. The metal-ligand complex according to claim 1, where $R^1$ and $R^{16}$ are chosen from radicals having formula (II), radicals having formula (III), and radicals having formula (IV):

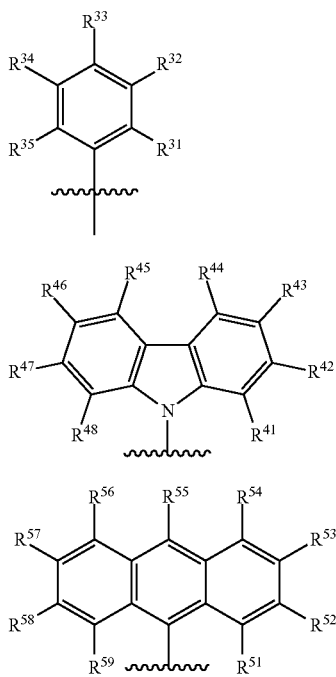

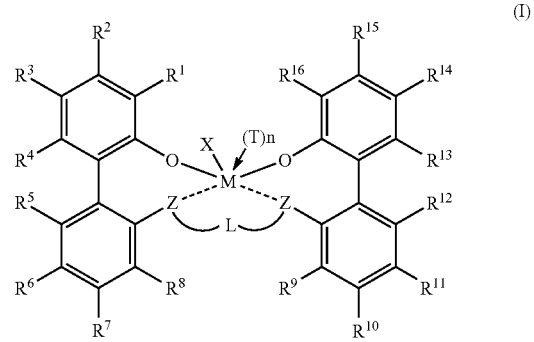

where each of $R^{31-35}$, $R^{41-48}$, and $R^{51-59}$ is independently chosen from —H, $(C_1$-$C_{40})$hydrocarbyl, $(C_1$-$C_{40})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, $R^C$S(O)—, $R^C$S(O)$_2$—, $(R^C)_2$C=N—, $R^C$C(O)O—, $R^C$OC(O)—, $R^C$C(O)N$(R^N)$—, $(R^C)_2$NC(O)—, or halogen; provided that when $R^1$ and $R^{16}$ are formula (II), at least one of $R^{31}$ to $R^{35}$ is not —H.

3. The metal-ligand complex according to claim 2, wherein at least one of $R^1$ and $R^{16}$ is a radical having formula (III) and $R^{42}$ and $R^{47}$ are $(C_1$-$C_{20})$hydrocarbyl, —Si$[(C_1$-$C_{20})$hydrocarbyl]$_3$, or —Ge$[(C_1$-$C_{20})$hydrocarbyl]$_3$; or $R^{43}$ and $R^{46}$ are $(C_1$-$C_{20})$hydrocarbyl, —Si$[(C_1$-$C_{20})$hydrocarbyl]$_3$, or —Ge$[(C_1$-$C_{20})$hydrocarbyl]$_3$.

4. The metal-ligand complex according to claim 2, wherein at least one of $R^1$ and $R^{16}$ is a radical having formula (II), and at least one of $R^{31}$ to $R^{35}$ is not —H or $R^{32}$ and $R^{34}$ are $(C_1$-$C_{20})$hydrocarbyl, —Si$[(C_1$-$C_{20})$hydrocarbyl]$_3$, or —Ge$[(C_1$-$C_{20})$hydrocarbyl]$_3$.

5. The metal-ligand complex according to claim 2, wherein at least one of $R^1$ and $R^{16}$ is a radical having formula (IV) and wherein at least two of $R^{52}$, $R^{53}$, $R^{55}$, $R^{57}$, and $R^{58}$ are $(C_1$-$C_{20})$hydrocarbyl, —Si$[(C_1$-$C_{20})$hydrocarbyl]$_3$, or —Ge$[(C_1$-$C_{20})$hydrocarbyl]$_3$.

6. The metal-ligand complex of claim 1, wherein when M is yttrium or a lanthanide metal, at least one of $R^{5-8}$ is not —H and at least one of $R^{9-12}$ is not —H.

7. The metal-ligand complex according to claim 1, wherein $R^8$ and $R^9$ are methyl.

8. The metal-ligand complex according to claim 1, wherein $R^3$ and $R^{14}$ are $(C_1$-$C_{10})$alkyl or —OR$^C$, wherein $R^C$ is $(C_1$-$C_{30})$hydrocarbyl.

9. The metal-ligand complex according to claim 1, wherein $R^6$ and $R^{11}$ are tert-butyl or halogen.

10. The metal-ligand complex according to claim 1, where L is chosen from —CH$_2$—, —CH$_2$(CH$_2$)$_m$CH$_2$—, where m is from 0 to 3, —CH$_2$Si$(R^C)_2$CH$_2$—, —CH$_2$Ge$(R^C)_2$CH$_2$—, —CH(CH$_3$)CH$_2$CH*(CH$_3$), and —CH$_2$(phen-1,2-di-yl)CH$_2$—, where each $R^C$ in L is $(C_1$-$C_{20})$hydrocarbyl, and "C*" is a carbon atom from which a hydrogen atom is removed to form a secondary or tertiary alkyl radical.

11. The metal-ligand complex according to claim 1, wherein X is —CH$_2$Si$[(C_1$-$C_{20})$alkyl]$_3$, $(C_1$-$C_{12})$alkyl, or halogen atom.

12. The metal-ligand complex according to claim 1, wherein at least one T is $(C_1$-$C_{20})$heterohydrocarbon, wherein the hetero atom of the heterohydrocarbon is oxygen.

13. The metal-ligand complex according to claim 1, wherein at least one T is tetrahydrofuran, diethyl ether, or methyl tert-butyl ether (MTBE).

14. A polymerization process comprising:
polymerizing ethylene and one or more olefins in the presence of a catalyst system comprising the metal-ligand complex of claim 1, under olefin polymerizing conditions to form an ethylene-based polymer.

15. The polymerization process of claim 14, wherein the catalyst system further comprises at least one co-catalyst.

16. The polymerization process of claim 14, wherein a co-catalyst is absent from the catalyst system.

17. The polymerization process of claim 14, wherein the polymerization process is a solution polymerization process.

18. The polymerization process of claim 14, wherein the catalyst system further comprises an additive.

19. The polymerization process of claim 18, wherein the additive is modified methylaluminoxane.

20. A metal-ligand complex according to formula (I):

where:
M is scandium, yttrium, or a lanthanide metal having an oxidation state of +3;
X is a ligand chosen from $(C_1$-$C_{40})$hydrocarbyl, $(C_1$-$C_{40})$heterohydrocarbyl, —CH$_2$Si$(R^C)_{3-Q}$(OR$^C)_Q$, —Si$(R^C)_{3-Q}$(OR$^C)_Q$, —OSi$(R^C)_{3-Q}$(OR$^C)_Q$, —CH$_2$Ge$(R^C)_{3-Q}$(OR$^C)_Q$, —Ge$(R^C)_{3-Q}$(OR$^C)_Q$, P$(R^C)_{2-W}$(OR$^C)_W$, —P(O)$(R^C)_{2-W}$(OR$^C)_W$, —N$(R^C)_2$, —NH$(R^C)$, —N(Si$(R^C)_3)_2$, —NR$^C$Si$(R^C)_3$, —NHSi$(R^C)_3$, —OR$^C$, —SR$^C$, —NO$_2$, —CN, —CF$_3$, —OCF$_3$, —S(O)R$^C$, —S(O)$_2$R$^C$, —OS(O)$_2$R$^C$, —N=C$(R^C)_2$, —N=CH$(R^C)$, —N=CH$_2$, —N=P$(R^C)_3$, —OC(O)R$^C$, —C(O)OR$^C$, —N$(R^C)$C(O)R$^C$, —N$(R^C)$C(O)H, —NHC(O)R$^C$, —C(O)N$(R^C)_2$, —C(O)NHR$^C$, —C(O)NH$_2$, a halogen, B$(R^Y)_4$, Al$(R^Y)_4$, or Ga$(R^Y)_4$, or a hydrogen, wherein each $R^C$ is independently a substituted or unsubstituted $(C_1$-$C_{30})$hydrocarbyl, or a substituted or unsubstituted $(C_1$-$C_{30})$heterohydrocarbyl, and each Q is 0, 1, 2 or 3, and each W is 0, 1, or 2;
each $R^Y$ is —H, $(C_1$-$C_{30})$hydrocarbyl, or halogen atom;

each T is independently Lewis Base;

n is 0;

the metal-ligand complex is overall charge-neutral;

each Z is independently chosen from —O—, —S—, —N($R^N$)—, or —P($R^P$)—, wherein the dotted line optionally defines a dative bond;

$R^2, R^3, R^4, R^5, R^6, R^7, R^8, R^9, R^{10}, R^{11}, R^{12}, R^{13}, R^{14}$, and $R^{15}$ are independently selected from —H, ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$—O$R^C$, —S$R^C$, —NO$_2$, —CN, —CF$_3$, $R^C$S(O)—, $R^C$S(O)$_2$—, ($R^C$)$_2$C=N—, ($R^C$)$_2$P=N—, $R^C$C(O)O—, $R^C$OC(O)—, $R^C$C(O)N(R)—, ($R^C$)$_2$NC(O)—, and halogen;

L is ($C_1$-$C_{40}$)hydrocarbylene or ($C_1$-$C_{40}$)heterohydrocarbylene;

each $R^C$, $R^P$, and $R^N$ in formula (I) is independently a ($C_1$-$C_{30}$)hydrocarbyl, ($C_1$-$C_{30}$)heterohydrocarbyl, or —H; and $R^1$ and $R^{16}$ are chosen from radicals having formula (II), radicals having formula (III), and radicals having formula (IV):

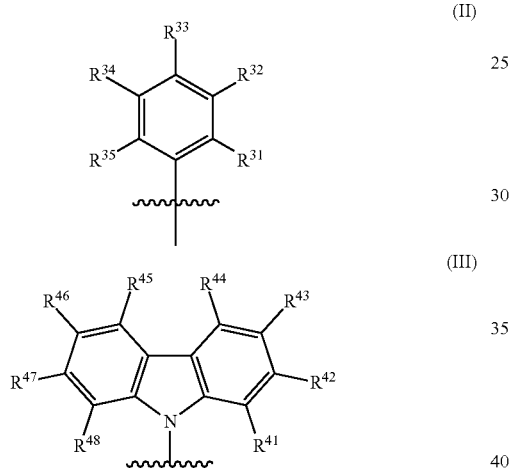

(II)

(III)

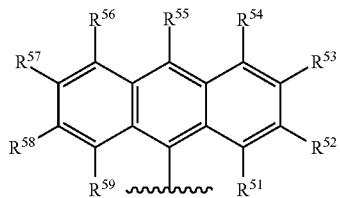

(IV)

where each of $R^{31-35}$, $R^{41-48}$, and $R^{51-59}$ is independently chosen from —H, ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^C$)$_2$NC(O)—, or halogen;

when at least one of $R^1$ and $R^{16}$ is a radical having formula (II), at least one of $R^{31}$ to $R^{35}$ is not —H or $R^{32}$ and $R^{34}$ are ($C_1$-$C_{20}$)hydrocarbyl, —Si[($C_1$-$C_{20}$)hydrocarbyl]$_3$, or —Ge[($C_1$-$C_{20}$)hydrocarbyl]$_3$;

when at least one of $R^1$ and $R^{16}$ is a radical having formula (III), $R^{42}$ and $R^{47}$ are ($C_1$-$C_{20}$)hydrocarbyl, —Si[($C_1$-$C_{20}$)hydrocarbyl]$_3$, or —Ge[($C_1$-$C_{20}$)hydrocarbyl]$_3$; or $R^{43}$ and $R^{46}$ are ($C_1$-$C_{20}$)hydrocarbyl, —Si[($C_1$-$C_{20}$)hydrocarbyl]$_3$, or —Ge[($C_1$-$C_{20}$)hydrocarbyl]$_3$; and when at least one of $R^1$ and $R^{16}$ is a radical having formula (IV), at least two of $R^{52}$, $R^{53}$, $R^{55}$, $R^{57}$, and $R^{58}$ are ($C_1$-$C_{20}$)hydrocarbyl, —Si[($C_1$-$C_{20}$)hydrocarbyl]$_3$, or —Ge[($C_1$-$C_{20}$)hydrocarbyl]$_3$.

* * * * *